(12) United States Patent
Dahlen et al.

(10) Patent No.: US 6,594,667 B2
(45) Date of Patent: Jul. 15, 2003

(54) METHOD, SYSTEM AND PROGRAM PRODUCTS FOR MODIFYING COUPLING FACILITY STRUCTURES

(75) Inventors: Dennis J. Dahlen, Rhinebeck, NY (US); David A. Elko, Austin, TX (US); Jeffrey M. Nick, West Park, NY (US); David H. Surman, Milton, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/379,435

(22) Filed: Aug. 23, 1999

(65) Prior Publication Data

US 2003/0033386 A1 Feb. 13, 2003

(51) Int. Cl.$^7$ .............................. G06F 17/00; G06F 7/00
(52) U.S. Cl. ..................... 707/101; 707/200; 707/10; 711/100
(58) Field of Search ................................ 707/100, 101, 707/200; 711/100

(56) References Cited

U.S. PATENT DOCUMENTS

| | | | |
|---|---|---|---|
| 5,280,611 A | 1/1994 | Mohan et al. ............... 707/8 |
| 5,305,448 A | 4/1994 | Insalaco et al. ............. 711/164 |
| 5,317,739 A | 5/1994 | Elko et al. .................. 709/216 |
| 5,339,427 A | 8/1994 | Elko et al. .................. 709/103 |
| 5,455,942 A | 10/1995 | Mohan et al. ............... 707/202 |
| 5,457,793 A | 10/1995 | Elko et al. .................. 707/205 |
| 5,463,736 A | 10/1995 | Elko et al. .................... 710/28 |
| 5,465,359 A | 11/1995 | Allen et al. ................. 709/101 |
| 5,493,668 A | 2/1996 | Elko et al. .................. 711/130 |
| 5,515,499 A | 5/1996 | Allen et al. .................... 714/5 |
| 5,537,574 A | 7/1996 | Elko et al. .................. 711/141 |
| 5,561,809 A | 10/1996 | Elko et al. .................. 709/170 |
| 5,581,737 A | 12/1996 | Dahlen et al. ............... 711/170 |
| 5,634,072 A | 5/1997 | Allen et al. ................. 709/104 |
| 5,706,432 A | 1/1998 | Elko et al. .................. 709/213 |
| 5,838,994 A | 11/1998 | Valizadeh .................... 710/112 |
| 5,887,135 A | 3/1999 | Dahlen et al. ............... 709/250 |
| 6,088,764 A | 7/2000 | Shyam et al. ................ 711/112 |

Primary Examiner—Greta Robinson
Assistant Examiner—Susan Rayyan
(74) Attorney, Agent, or Firm—William A. Kinnaman, Jr.; Blanche E. Schiller, Esq.; Heslin Rothenberg Farley & Mesiti P.C.

(57) ABSTRACT

Storage structures of a shared storage processor of a computing environment are modified. One or more target maximum counts are specified, which are to be used in modifying a storage structure of the shared storage processor. The one or more target maximum counts are then used to modify the storage structure.

24 Claims, 60 Drawing Sheets

CACHE-STRUCTURE CONTROLS

| | |
|---|---|
| TOTAL CHANGED DATA AREA ELEMENT COUNT | (TCDAEC) |
| TOTAL-DIRECTORY-ENTRY COUNT | (TDEC) |
| TOTAL-DATA-AREA-ELEMENT COUNT | (TDAEC) |
| TOTAL STRUCTURE CHANGED COUNT | (TSCC) |
| ADJUNCT-ASSIGNMENT INDICATOR | (AAI) |
| MAXIMUM STORAGE CLASS | (MSC) |
| MAXIMUM CASTOUT CLASS | (MCC) |
| NAME CLASS MASK | (NCM) |
| DATA-AREA-ELEMENT CHARACTERISTIC | (DAEX) |
| MAXIMUM DATA-AREA SIZE | (MDAS) |
| STRUCTURE SIZE | (SS) |
| MAXIMUM STRUCTURE SIZE | (MXSS) |
| MARGINAL STRUCTURE SIZE | (MRSS) |
| MINIMUM APPORTIONABLE STRUCTURE SIZE | (MASS) |
| STRUCTURE SIZE CHANGE INDICATOR | (SSCI) |
| TARGET DIRECTORY-ENTRY COUNT | (TGDEC) |
| TARGET DATA AREA ELEMENT COUNT | (TGDAEC) |
| TARGET STRUCTURE SIZE | (TSS) |
| STRUCTURE AUTHORITY | (SAU) |
| USER STRUCTURE CONTROL | (USC) |
| LCID VECTOR | (LCIDV) |
| EXTENDED USER STRUCTURE CTRL | (EUSC) |
| CASTOUT-CLASS CURSOR | (CCCUR) |
| FREE-DATA-AREA ELEMENT COUNT | (FDAEC) |
| FREE-DIRECTORY-ENTRY COUNT | (FDEC) |
| GLOBAL COUNT OF UNCHANGED DIRECTORY ENTRIES WITH REGISTERED INTEREST | (GCUDRI) |
| PENDING DIRECTORY-TO-DATA RATIO | (PDTDR) |
| REAPPORTIONMENT IN PROGRESS INDICATOR | (REIPI) |
| STRUCTURE COPY CONTROL | (SCC) |
| STRUCTURE COPY CONTROL VERSION NUMBER | (SCCNV) |
| UDF-ORDER QUEUE INDICATOR | (UDFOQI) |
| WWCO QUEUE | (WQ) |
| WWCO QUEUE COUNT | (WQC) |

DIRECTORY INFORMATION BLOCK

| NAME | (N) |
|---|---|
| USER-DATA FIELD | (UDF) |
| STORAGE CLASS | (STC) |
| CHANGE INDICATOR | (C) |
| DATA-CACHED INDICATOR | (D) |
| CASTOUT-PARITY INDICATOR | (CP) |
| CASTOUT CLASS | (CCL) |
| CASTOUT-LOCK | (CO) |
| CASTOUT LOCK STATE | (COLS) |
| DATA-AREA SIZE | (DAS) |
| REFERENCE INDICATOR | (R) |
| VALID INDICATOR | (V) |
| VERSION NUMBER | (VN) |
| LOCAL-CACHE IDENTIFIER | (LCID) |
| LCEN-VALIDITY INDICATOR | (LVI) |
| LOCAL-CACHE ENTRY NUMBER | (LCEN) |

*fig. 5*

STORAGE CLASS CONTROLS

STORAGE-CLASS QUEUE

RECLAIMING CONTROLS

STORAGE-CLASS COUNTERS

BROWSE CONTROLS

*fig. 6*

STORAGE CLASS COUNTERS

| | |
|---|---|
| CASTOUT COUNTER | (COC) |
| COMPLETED REFERENCE LIST COUNTER | (CRLC) |
| DATA AREA COUNTER | (DAC) |
| DATA AREA ELEMENT COUNTER | (DAEC) |
| DATA AREA RECLAIM COUNTER | (DARC) |
| DIRECTORY ENTRY COUNTER | (DEC) |
| DIRECTORY ENTRY RECLAIM COUNTER | (DERC) |
| PARTIALLY COMPLETED REFERENCE LIST COUNTER | (PCRLC) |
| READ HIT COUNTER | (RHC) |
| READ MISS ASSIGNMENT SUPPRESSED COUNTER | (RMASC) |
| READ MISS DIRECTORY HIT COUNTER | (RMDHC) |
| READ MISS NAME ASSIGNED COUNTER | (RMNAC) |
| READ MISS TARGET STORAGE CLASS FULL COUNTER | (RMTSFC) |
| REFERENCE SIGNAL MISS COUNTER | (RSMC) |
| TARGET STORAGE CLASS FULL COUNTER | (TSCFC) |
| TOTAL CHANGED COUNT | (TCC) |
| UNCHANGED DIRECTORY ENTRIES WITH REGISTERED INTEREST COUNTER | (UDERIC) |
| WRITE HIT CHANGE BIT 0 COUNTER | (WHCB0C) |
| WRITE HIT CHANGE BIT 1 COUNTER | (WHCB1C) |
| WRITE MISS INVALID STATE COUNTER | (WMISC) |
| WRITE MISS NOT REGISTERED COUNTER | (WMNRC) |
| WRITE MISS TARGET STORAGE CLASS FULL COUNTER | (WMTSFC) |
| WRITE UNCHANGED WITH XI COUNTER | (WUXIC) |
| XI FOR COMPLEMENT INVALIDATION COUNTER | (XICIC) |
| XI FOR DIRECTORY RECLAIM COUNTER | (XIFDRC) |
| XI FOR LOCAL COPY REMOVAL COUNTER | (XILRC) |
| XI FOR NAME INVALIDATION COUNTER | (XIFNIC) |
| XI FOR WRITE COUNTER | (XIFWC) |

*fig. 7*

CASTOUT CLASS CONTROL BLOCK

| | |
|---|---|
| CASTOUT–CLASS COUNT | (CCC) |
| CASTOUT–CLASS QUEUE | (CCQ) |
| CASTOUT–CLASS SCAN CONTROLS | (CCSC) |
| UDF–ORDER QUEUE | (UDFOQ) |

*fig. 8*

BROWSE CONTROLS

| | |
|---|---|
| BROWSE CURSOR | (BCUR) |
| BROWSE STATE | (BST) |
| BROWSE REGISTER | (BREG) |

*fig. 7A*

BROWSE REGISTER

| | |
|---|---|
| BROWSE ACTIVE BIT | (BA) |
| BROWSER IDENTIFIER | (BID) |
| PREVIOUS BROWSE CURSOR | (PBCUR) |
| CURRENT BROWSE CURSOR | (CBUR) |

*fig. 7B*

LIST-STRUCTURE CONTROLS ⎽902

| | |
|---|---|
| ENTRY-REAPPORTIONMENT IN PROGRESS INDICATOR | (EREIPI) |
| EVENT MONITOR CONTROLS COUNT | (EMCC) |
| MAXIMUM DATA-LIST-ENTRY SIZE | (MDLES) |
| LIST-STRUCTURE TYPE | (LST) |
| LOCK-TABLE-ENTRY CHARACTERISTIC | (LTEX) |
| MARGINAL STRUCTURE SIZE | (MRSS) |
| LOCK-TABLE-ENTRY COUNT | (LTEC) |
| LIST COUNT | (LC) |
| LIST ELEMENT CHARACTERISTIC | (LELX) |
| STRUCTURE SIZE | (SS) |
| STRUCTURE SIZE CHANGE INDICATOR | (SSCI) |
| MAXIMUM STRUCTURE SIZE | (MXSS) |
| MAXIMUM EVENT MONITOR CONTROLS COUNT | (MEMCC) |
| MAXIMUM LIST-SET-ELEMENT COUNT | (MLSELC) |
| LIST-SET CURSOR | (LSCUR) |
| LIST-SET-ELEMENT COUNT | (LSELC) |
| NON-ZERO-LOCK-TABLE-ENTRY COUNT | (NLTEC) |
| MAXIMUM LIST-SET-ENTRY COUNT | (MSLEC) |
| LIST-SET-ENTRY COUNT | (LSEC) |
| STRUCTURE AUTHORITY | (SAU) |
| TARGET STRUCTURE SIZE | (TSS) |
| TARGET MAXIMUM ELEMENT COUNT | (TMELC) |
| TARGET MAXIMUM ENTRY COUNT | (TMEC) |
| TARGET MAXIMUM EVENT MONITOR-COUNT | (TMEMC) |
| USER STRUCTRE CONTROL | (USC) |
| USER-IDENTIFIER VECTOR | (UIDV) |
| EXTENDED USER STRUCTURE CONTROL | (EUSC) |
| MINIMUM APPORTIONABLE STRUCTURE SIZE | (MASS) |
| MONITOR-REAPPORTIONMENT-IN-PROGRESS INDICATOR | (MREIPI) |
| PENDING ENTRY TO ELEMENT RATIO | (PETELR) |
| PENDING MONITOR-TO ENTRY STORAGE RATIO | (PMTESR) |
| REAPPORTIONMENT IN PROGRESS INDICATOR | (REIPI) |
| STRUCTURE-COPY CONTROL | (SCC) |
| STRUCTURE-COPY-CONTROL VERSION NUMBER | (SCCVN) |

*fig. 10*

LIST-USER CONTROL BLOCK (LUCB)

904

| | |
|---|---|
| USER STATE | (US) |
| LIST-NOTIFICATION TOKEN | (LNT) |
| USER AUTHORITY | (UAU) |
| SYSTEM IDENTIFIER | (SYID) |
| USER-ATTACHMENT CONTROL | (UAC) |

*fig. 11*

LIST ENTRY CONTROL BLOCK (LECB)

920

| | |
|---|---|
| ADJUNCT FORMAT CONTROL | (AFC) |
| ADJUNCT LOCK ENTRY INDICATOR | (ALEI) |
| DATA-LIST-ENTRY SIZE | (DLES) |
| LIST NUMBER | (LN) |
| LIST-ENTRY IDENTIFIER | (LEID) |
| LIST-ENTRY KEY | (LEK) |
| LIST-ENTRY NAME | (LEN) |
| VERSION NUMBER | (VN) |

LIST CONTROLS

| | |
|---|---|
| ASSIGNMENT KEY | (AK) |
| ASSIGNMENT KEY THRESHOLD | (AKT) |
| CURSOR DIRECTION | (CDIR) |
| LIST-ENTRY-COUNT LIMIT | (LECL) |
| LIST-ELEMENT-COUNT LIMIT | (LELCL) |
| LIST-ENTRY-COUNT | (LEC) |
| LIST-ELEMENT-COUNT | (LELC) |
| LIST AUTHORITY | (LAU) |
| LIST CURSOR | (LCUR) |
| LIST-MONITOR-TABLE ENTRY 0 | |
|     LIST-MONITORING-ACTIVE BIT | (LMAB) |
|     LIST-NOTIFICATION-REQUEST TYPE | (LNRT) |
|     LIST-NOTIFICATION-ENTRY NUMBER | (LNEN) |
| LIST-MONITOR-TABLE ENTRY 1 | |
|     LIST-MONITORING-ACTIVE | |
|     LIST-NOTIFICATION-REQUEST TYPE | |
|     LIST-NOTIFICATION-ENTRY NUMBER | |
| LIST-MONITOR-TABLE ENTRY n | |
|     LIST-MONITORING-ACTIVE | |
|     LIST-NOTIFICATION-REQUEST TYPE | |
|     LIST-NOTIFICATION-ENTRY NUMBER | |
| LIST SET SCAN CONTROLS | |
| LIST STATE TRANSITION COUNT | (LSTC) |
| USER LIST CONTROL | (ULC) |

*fig. 12*

EVENT-MONITOR CONTROLS

| EVENT-MONITOR-QUEUED INDICATIOR | (EMQI) |
| LIST-ENTRY KEY | (LEK) |
| LIST NUMBER | (LN) |
| USER IDENTIFIER | (UID) |
| USER NOTIFICATION CONTROL | (UNC) |

*fig. 14*

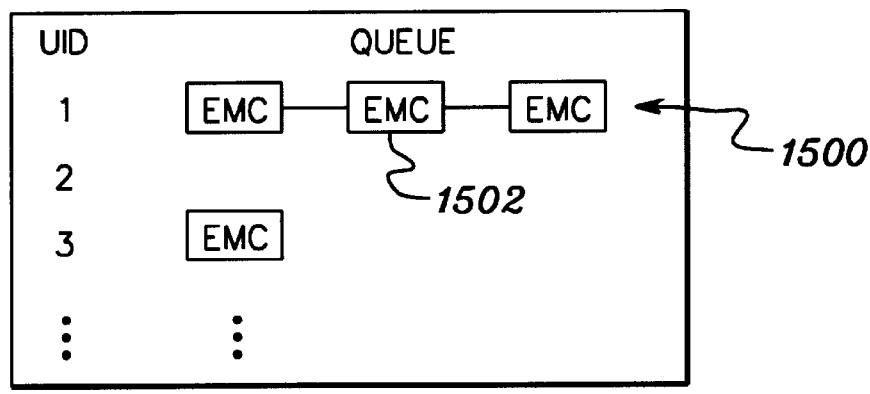

*fig. 15*

EVENT-QUEUE CONTROLS 924

| EVENT-MONITOR-CONTROLS-QUEUED COUNT | (EMCQC) |
| EVENT-NOTIFICATION-ENTRY NUMBER | (ENEN) |
| EVENT-NOTIFICATION-REQUEST TYPE | (ENRT) |
| EVENT-QUEUE-MONITORING ACTIVE BIT | (EQMAB) |
| EVENT-QUEUE-TRANSITION COUNT | (EQTC) |

*fig. 16*

CACHE OPERANDS

```
ADJUNCT AREA                            (AA)
ALLOCATION TYPE                         (AT)
APPORTIONMENT PRIORITY INDICATOR        (API)
ASSIGNMENT CONTROL                      (AC)
ATTACHMENT OVERRIDE CONTROL             (AOC)
ATTACHMENT REQUEST TYPE                 (ART)
BOUNDED COUNTS PRIORITY INDICATOR       (BCPI)
BROWSER IDENTIFIER                      (BID)
BROWSER ACTIVE BITS                     (BAB)
COMMAND CODE                            (CC)
COMPLEMENT COPY INVALIDATION CODE       (CCIC)
CASTOUT CLASS REQUEST TYPE              (CCRT)
CASTOUT CLASS SCAN IDENTIFIER           (CCSID)
CASTOUT CLASS SCAN RESTART TOKEN        (CCSRT)
CCSC UPDATE TYPE                        (CCSCUT)
CASTOUT CLASS                           (CCL)
CASTOUT-LOCK CONTROL                    (COLC)
CASTOUT-PARITY BITS INDICATOR           (CP)
CASTOUT-PROCESS IDENTIFIER              (CPID)
CHANGE-BIT OVERINDICATION               (CBO)
CHANGE CONTROL                          (CHGC)
COMPARATIVE STRUCTURE AUTHORITY         (CSAU)
COMPARATIVE VERSION NUMBER              (CVN)
DATA-BLOCK SIZE                         (DBS)
DATA-TOLERATION FACTOR                  (DTF)
DIRECTORY-TOLERATION FACTOR             (DITF)
ENDING REGISTRATION INDEX               (ERX)
```

*fig. 17A*

CACHE OPERANDS

| | |
|---|---|
| HALT REGISTER NAME LIST | (HRNL) |
| INVALIDATE WITHOUT RECLAIM CONTROL | (IWORC) |
| LCID UNASSIGNMENT CONTROL | (LUC) |
| LOCAL-CACHE AUTHORITY | (LCAU) |
| LOCAL-CACHE IDENTIFIER | (LCID) |
| LOCAL-CACHE IDENTIFIER LOCATION | (LCIDLC) |
| LCR READ TYPE | (LCRRT) |
| LOCAL-CACHE REGISTRATION RESTART TOKEN | (LCRRTK) |
| NAME MASK | (NM) |
| NAME-REPLACEMENT CONTROL | (NRC) |
| REPLACEMENT NAME | (RN) |
| STRUCTURE IDENTIFIER | (SID) |
| SUPPRESS READ | (SR) |
| SUPPRESS REGISTRATION | (SREG) |
| STARTING REGISTRATION INDEX | (SRX) |
| STORAGE CLASS | (STC) |
| TARGET COUNT PRIORITY INDICATOR | (TCPI) |
| TARGET DIRECTORY-TO-DATA RATIO | (TDTDR) |
| TARGET DIRECTORY ENTRY COUNT | (TGDEC) |
| TARGET DATA AREA ELEMENT COUNT | (TGDAEC) |
| TARGET RATIO VALIDITY INDICATOR | (TRVI) |
| TARGET STRUCTURE SIZE | (TSS) |
| USER DATA FIELD | (UDF) |
| UDF ORDER QUEUE INDICATOR | (UDFOQI) |
| VERSION NUMBER | (VN) |
| VERSION COMPARISOM REQUEST TYPE | (VCRT) |
| VERSION REQUEST TYPE | (VRT) |

*fig. 17B*

LIST OPERANDS

| | |
|---|---|
| ADJUNCT LIST ENTRY | (ALE) |
| ALLOCATION TYPE | (AT) |
| ATTACH OVERRIDE CONTROL | (AOC) |
| APPORTIONMENT PRIORITY INDICATOR | (API) |
| ASSIGNMENT-KEY INCREMENT | (AKI) |
| ASSIGNMENT-KEY-REQUEST TYPE | (AKRT) |
| ASSIGNMENT-KEY-UPDATE TYPE | (AKUT) |
| ATTACHMENT REQUEST TYPE | (ART) |
| BOUNDED COUNTS PRIORITY INDICATOR | (BCPI) |
| COMPARATIVE GLOBAL-LOCK MANAGER | (CGLM) |
| COMPARATIVE LIST AUTHORITY | (CLAU) |
| COMPARATIVE STRUCTURE AUTHORITY | (CSAU) |
| COMPARATIVE USER AUTHORITY | (CUAU) |
| COMPARATIVE VERSION NUMBER | (CVN) |
| CURSOR DIRECTION | (CD) |
| DATA-LIST-ENTRY SIZE | (DLES) |
| DIRECTION | (DIR) |
| ELEMENT-TOLERATION FACTOR | (ELTF) |
| EMC RESTART TOKEN | (ERT) |
| ENDING EVENT INDEX | (ETX) |
| ENDING LIST NUMBER | (ELN) |
| ENTRY-LOCATOR TYPE | (ELT) |
| ENTRY-TOLERATION FACTOR | (ETF) |
| EVENT MONITOR QUEUE INDICATOR CONTROL | (EMQIC) |
| EVENT-MONITOR-TOLERATION FACTOR | (EMTF) |
| EVENT NOTIFICATION ENTRY NUMBER | (ENEN) |
| EVENT-NOTIFICATION-REQUEST TYPE | (ENRT) |
| EMC PROCESSED COUNT | (EPC) |
| EVENT-QUEUE-MONITORING-ACTIVE BIT | (EQMAB) |
| HALT REGISTER EVENT MONITORS | (HREMS) |
| INITIAL-NOTIFICATION-REQUEST TYPE | (INRT) |
| KEY-REQUEST TYPE | (KRT) |
| LIST-AUTHORITY-COMPARISON TYPE | (LAUCT) |
| LIST-AUTHORITY-REPLACEMENT TYPE | (LAURT) |
| LIST COUNT | (LC) |
| LIST CURSOR | (LCUR) |

*fig. 17C*

LIST OPERANDS

| | |
|---|---|
| LIST-CURSOR REQUEST TYPE | (LCURT) |
| LIST-CURSOR-UPDATE TYPE | (LCUT) |
| LIST-ELEMENT CHARACTERISTIC | (LELX) |
| LIST-ENTRY TYPE | (LET) |
| LIST-MONITORING-ACTIVE BIT | (LMAB) |
| LIST NUMBER COMPARISON TYPE | (LNCT) |
| LIST-NOTIFICATION-REQUEST TYPE | (LNRT) |
| LIST NUMBER | (LN) |
| LOCAL-LOCK BIT | (LLB) |
| LOCK-REQUEST TYPE | (LRT) |
| LIST SET SCAN IDENTIFIER | (LSSID) |
| LIST SET SCAN RESTART TOKEN | (LSSRT) |
| LIST SET SCAN CONTROLS UPDATE TYPE | (LSSCUT) |
| LIST STRUCTURE TYPE | (LST) |
| LOCK-TABLE-ENTRY CHARACTERISTIC | (LTEX) |
| LOCK-TABLE-ENTRY COUNT | (LTEC) |
| LOCK-TABLE-ENTRY NUMBER | (LTEN) |
| MAXIMUM STRUCTURE SIZE | (MXSS) |
| PROGRAMMABLE LIST ENTRY ID | (PLEID) |
| STRUCTURE IDENTIFIER | (SID) |
| STARTING LIST NUMBER | (SLN) |
| STARTING EVENT INDEX | (STX) |
| STRUCTURE AUTHORITY | (SAU) |
| TARGET COUNT PRIORITY INDICATOR | (TCPI) |
| TARGET ENTRY-TO-ELEMENT RATIO | (TETELR) |
| TARGET MAXIUM ENTRY COUNT | (TMEC) |
| TARGET MAXIMUM ELEMENT COUNT | (TMELC) |
| TARGET MAXIMUM EVENT MONITOR COUNT | (TMEMC) |
| TARGET MONITOR-TO-ENTRY STORAGE RATIO | (TMTESR) |
| TARGET RATIO VALIDITY INDICATOR | (TRVI) |
| TARGET STRUCTURE SIZE | (TSS) |
| USER IDENTIFIER | (UID) |
| USER IDENTIFIER LOCATON | (UIDLC) |
| VERSION-COMPARISON-REQUEST TYPE | (VCRT) |
| VERSION-REQUEST TYPE | (VRT) |
| WRITE EVENT QUEUE TRANSITION COUNT | (WEQTC) |

*fig. 17D*

REGISTRATION BLOCK  3600

| OPERAND | ACRONYM |
|---|---|
| STORAGE CLASS | STC |
| ASSIGNMENT CONTROL | AC |
| NAME-REPL CONTROL | NRC |
| LOCAL-CACHE IDENTIFIER | LCID |
| NAME | N |
| REPLACEMENT NAME | RN |
| LOCAL-CACHE ENTRY NUMBER | LCEN |

*fig. 36A*

DATA BLOCK  3602

| REGISTRATION BLOCK #1 |
|---|
| REGISTRATION BLOCK #2 |
| ⋮ |

*fig. 36B*

METHOD, SYSTEM AND PROGRAM PRODUCTS FOR MODIFYING COUPLING FACILITY STRUCTURES

CROSS-REFERENCE TO RELATED APPLICATIONS

This application contains subject matter which is related to the subject matter of the following patents/applications, each of which is assigned to the same assignee as this application. Each of the below listed patents/applications is hereby incorporated herein by reference in its entirety:

"System-Managed Rebuild Of Coupling Facility Structures," Allen et al., Ser. No. 09/378,780, filed Aug. 23, 1999;

"Directed Allocation Of Coupling Facility Structures," Dahlen et al., Ser. No. 09/378,861, filed Aug. 23, 1999;

"Method, System And Program Products For Copying Coupling Facility Structures," Dahlen et al., Ser. No. 09/379,054, filed Aug. 23, 1999;

"Method, System And Program Products For Copying Coupling Facility Cache Structures," Elko et al., Ser. No. 09/378,839, filed Aug. 23, 1999;

"Method, System And Program Products For Copying Coupling Facility List Structures," Dahlen et al., Ser. No. 09/379,097, filed Aug. 23, 1999;

"Method, System And Program Products For Copying Coupling Facility Lock Structures," Dahlen et al., Ser. No. 09/379,053, filed Aug. 23, 1999;

"Method, System And Program Products For Browsing Fully-Associative Collections Of Items," Elko et al., Ser. No. 09/379,103, filed Aug. 23, 1999;

"Method And System For Reconfiguring A Storage Structure Within A Structure Processing Facility," Allen et al., U.S. Patent No. 5,515,499, Issued May 7, 1996;

"Multiple Processor System Having Software For Selecting Shared Cache Entries Of An Associated Castout Class For Transfer To A DASD With One I/O Operation," Elko et al., U.S. Pat. No. 5,493,668, Issued on Feb. 20, 1996;

"Software Cache Management Of A Shared Electronic Store In a Supplex," Elko et al., U.S. Pat. No. 5,457,793, Issued Oct. 10, 1995;

"Method, System And Program Products For Managing Changed Data Of Castout Classes," Elko et al., Ser. No. 09/251,888, Filed Feb. 19, 1999;

"Method, System and Program Products For Providing User-Managed Duplexing of Coupling Facility Cache Structures," Elko et al, Ser. No. 09/255,382, Filed on Feb. 22, 1999;

"Castout Processing For Duplexed Cache Structures", Elko et al., Ser. No. 09/255,383, Filed on Feb. 22, 1999;

"Sysplex Shared Data Coherency Method," Elko et al., U.S. Pat. No. 5,537,574, Issued Jul. 16, 1996;

"Method And Apparatus For Coupling Data Processing Systems," Elko et al., U.S. Pat. No. 5,317,739, Issued May 31, 1994;

"In A Multiprocessing System Having A Coupling Facility, Communicating Messages Between The Processors And The Coupling Facility In Either A Synchronous Operation Or An Asynchronous Operation", Elko et al., U.S. Pat. No. 5,561,809, Issued on Oct. 1, 1996;

"Mechanism For Receiving Messages At A Coupling Facility", Elko et al., U.S. Pat. No. 5,706,432, Issued Jan. 6, 1998;

"Coupling Facility For Receiving Commands From Plurality Of Hosts For Activating Selected Connection Paths To I/O Devices And Maintaining Status Thereof", Elko et al., U.S. Pat. No. 5,463,736, Issued Oct. 31, 1995;

"A Method And System For Managing Data and Users of Data in a Data Processing System," Allen et al., U.S. Pat. No. 5,465,359, Issued on Nov. 7, 1995;

"Shared Access Serialization Featuring Second Process Lock Steal And Subsequent Write Access Denial To First Process" Insalaco et al, U.S. Pat. No. 5,305,448, Issued on Apr. 19, 1994;

"Method Of Managing Resources In One Or More Coupling Facilities Coupled To One Or More Operating Systems In One Or More Central Programming Complexes Using A Policy," Allen et al., U.S. Pat. No. 5,634,072, Issued On May 27, 1997;

"Partial Page Write Detection For A Shared Cache Using A Bit Pattern Written At The Beginning And End Of Each Page", Narang et al., U.S. Pat. No. 5,455,942, Issued Oct. 3, 1995;

"Method For Managing Database Recovery From Failure Of A Shared Store In a System Including A Plurality Of Transaction-Based Systems Of The Write-Ahead Logging Type", Narang et al., U.S. Pat. No. 5,280,611, Issued Jan. 18, 1994;

"Method And Apparatus Of Distributed Locking For Shared Data, Employing A Central Coupling Facility", U.S. Pat. No. 5,339,427, Issued Aug. 16, 1994;

"Method And Apparatus For Expansion, Contraction, And Reapportionment Of Structured External Storage Structures", Dahlen et al., U.S. Pat. No. 5,581,737, Issued Dec. 3, 1996; and "Method And Apparatus For Previewing The Results Of a Data Structure Allocation," Dahlen et al., Ser. No. 09/071,555,Filed: May 1, 1998; and "System And Method For Management Of Object Transitions And An External Storage Facility Accessed By One Or More Processors," Dahlen et al., U.S. Pat. No. 5,887,135, Issued Mar. 23, 1999.

TECHNICAL FIELD

This invention relates, in general, to data processing within a computing environment and, in particular, to reconfiguring structures within a shared facility of the computing environment.

BACKGROUND ART

One example of a shared facility is the coupling facility offered by International Business Machines Corporation. The coupling facility is a shared external storage processor that contains storage accessible by one or more processors coupled to the coupling facility and performs operations requested by the programs in those processors. Data and controls to be shared are stored in storage structures within the coupling facility. In one example, these storage structures include cache, list and/or lock structures.

It is desirable, and sometimes necessary, to reconfigure one or more of the storage structures. For example, it may be desirable or necessary to change the characteristics of a structure or to move the structure from one coupling facility to another coupling facility. If such a reconfiguration is necessary, then it is imperative that it be performed in a manner that is least disruptive for the users of the structure.

Previous attempts have been made to provide capabilities that enable reconfiguration of storage structures of a coupling facility. However, a need still exists for a reconfiguration technique that is minimally disruptive to the users of the structures, is simple from the users' perspective, and is mostly transparent to the users. A further need exists for a capability that facilitates the operation of the reconfiguration, particularly in those sysplexes where there are numerous structures and users of those structures. A need exists for a reconfiguration capability that is controlled by the operating system, rather than the users.

SUMMARY OF THE INVENTION

The shortcomings of the prior art are overcome and additional advantages are provided through the provision of a method of modifying storage structures within a shared storage processor of a computing environment. The shared storage processor is coupled to one or more processors of the computing environment, and the method includes, for instance, specifying one or more target maximum counts to be used in modifying a storage structure in the shared storage processor; and modifying the storage structure using the one or more target maximum counts.

In a further aspect of the present invention, a system of modifying storage structures within a shared storage processor of a computing environment is provided. The shared storage processor is coupled to one or more processors of the computing environment, and the system includes, for instance, means for specifying one or more target maximum counts to be used in modifying a storage structure of the shared storage processor; and means for modifying the storage structure using the one or more target maximum counts.

In yet a further aspect of the present invention, at least one program storage device readable by a machine, tangibly embodying at least one program of instructions executable by the machine to perform a method of modifying storage structures within a shared storage processor of a computing environment is provided. The shared storage processor is coupled to one or more processors of the computing environment, and the method includes, for instance, specifying one or more target maximum counts to be used in modifying a storage structure of the shared storage processor; and modifying the storage structure using the one or more target maximum counts.

The present invention advantageously provides a structure modification technique (i.e., expansion, contraction and reapportion) that enables a structure to be modified using target maximum counts. In one example, the modification capability is controlled by the operating system, and thus, facilitates exploitation by the users of the structures. Further, the modification capability allows previously allocated structures to be modified to satisfy new and pending requests.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 depicts one example of the controls associated with a cache structure of FIG. 1, in accordance with the principles of the present invention;

FIG. 5 depicts one embodiment of a directory information block in connection with the directory depicted in FIG. 1, in accordance with the principles of the present invention;

FIG. 6 depicts one embodiment of storage class controls used in accordance with the principles of the present invention;

FIG. 7 depicts one embodiment of the storage class counters of FIG. 6, in accordance with the principles of the present invention;

FIG. 7a depicts one embodiment of the browse controls of FIG. 6, in accordance with the principles of the present invention;

FIG. 7b depicts one embodiment of the browse register of FIG. 7a, in accordance with the principles of the present invention;

FIG. 8 depicts one embodiment of a castout class control block used in accordance with the principles of the present invention;

FIG. 10 depicts one embodiment of controls associated with the list structure of FIG. 9, in accordance with the principles of the present invention;

FIG. 11 depicts one example of a list user control block used in accordance with the principles of the present invention;

FIG. 12 depicts one example of list controls used in accordance with the principles of the present invention;

FIG. 13 depicts one example of a list entry control block used in accordance with the principles of the present invention;

FIG. 14 depicts one example of event monitor controls used in accordance with the principles of the present invention;

FIG. 15 depicts one example of event queues used in accordance with the principles of the present invention;

FIG. 16 depicts one example of event queue controls associated with the event queues of FIG. 15, in accordance with the principles of the present invention;

FIGS. 17a–17b depict one embodiment of cache request/response operands used in accordance with the principles of the present invention;

FIGS. 17c–17d depict one embodiment of list request/response operands used in accordance with the principles of the present invention;

FIG. 36a depicts one example of a registration block, in accordance with the principles of the present invention;

FIG. 36b depicts one embodiment of a data block containing registration blocks, in accordance with the principles of the present invention;

FIG. 50 depicts one embodiment of the logic associated with the cleanup phase of FIG. 19, in accordance with the principles of the present invention; and.

BEST MODE FOR CARRYING OUT THE INVENTION

Figure 1:
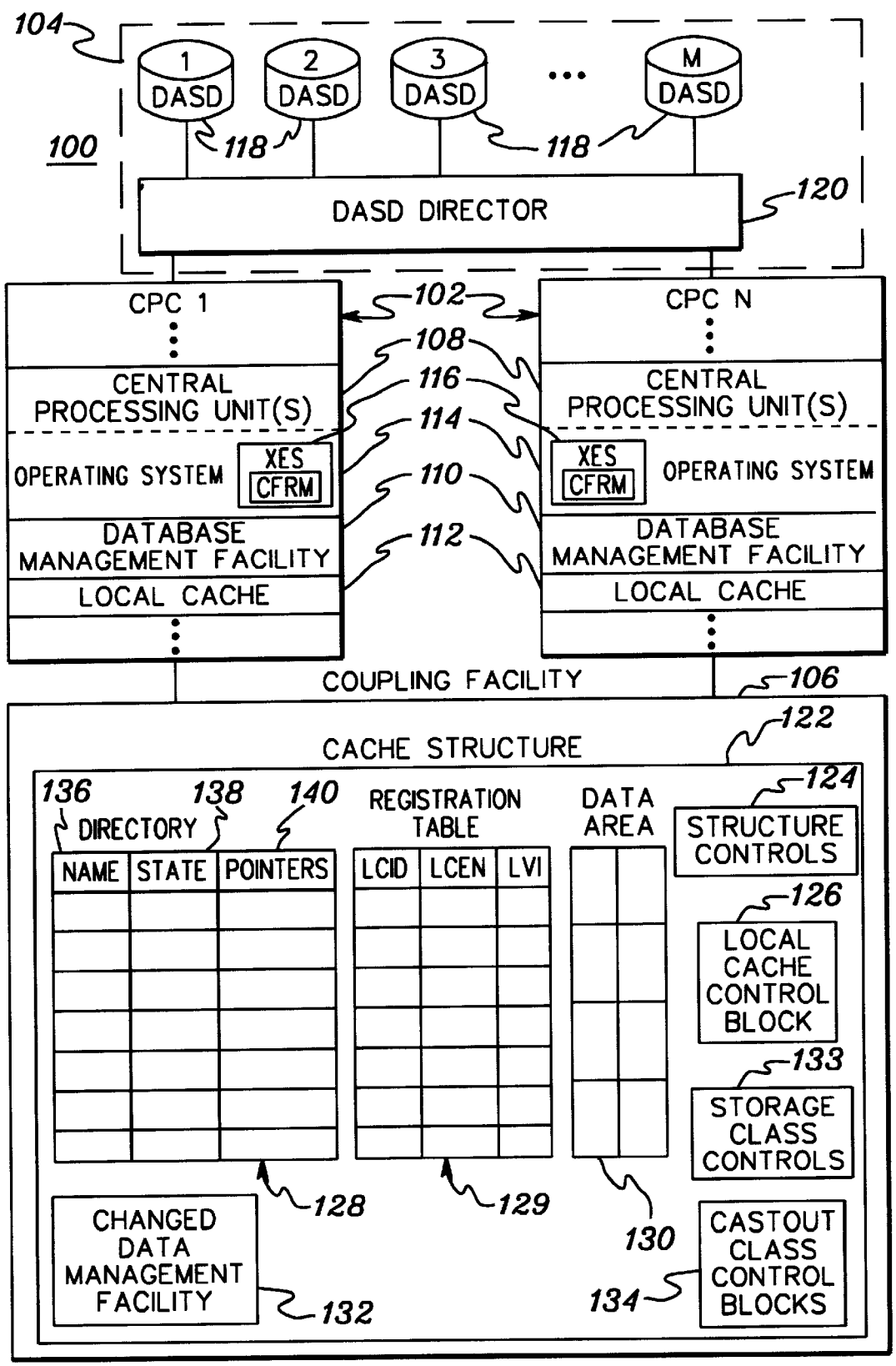
FIG. 1 depicts one example of a computing environment incorporating and using the capabilities of the present invention.

One embodiment of a computing environment incorporating and using the capabilities of the present invention is depicted in FIG. 1. Computing environment 100 is based, for instance, on the Enterprise Systems Architecture (ESA)/390 offered by International Business Machines Corporation, Armonk, N.Y. ESA/390 is described in an IBM Publication entitled Enterprise Systems Architecture/390 Principles Of Operation, IBM Publication No. SA22-7201-04, June 1997, which is hereby incorporated herein by reference in its entirety. One example of a computing environment based on ESA/390 is the 9672 Parallel Enterprise Server offered by International Business Machines Corporation.

Computing environment 100 includes, for instance, one or more central processing complexes (CPCs) 102, a secondary storage unit 104 and at least one coupling facility 106. Each central processing complex includes, for example, at least one central processing unit 108, at least one database management facility 110, and at least one local cache 112. Each central processing unit executes an operating system 114, such as the Multiple Virtual Storage (MVS) or OS/390 operating system offered by International Business Machines Corporation, which is used for controlling execution of programs and the processing of data.

Each operating system 114 includes a Cross-System Extended Services (XES) facility 116 for managing and accessing information in the coupling facility and for providing various aspects of the present invention, as described further below. In particular, it is a Coupling Facility Resource Manager (CFRM) component of XES that is responsible for various aspects of the present invention.

Each database management facility 110 owns and controls a set of resources within the computer system. As one example, the database management facility is DB2, offered by International Business Machines Corporation.

Each local cache 112 includes data associated with its respective central processing complex. In particular, each local cache includes a name field for referencing data; a data field for storing the data; an optional adjunct data field for additional data; and a state field for indicating whether the data in the data field is valid.

Coupled to the central processing complexes is secondary storage unit 104. In one example, the secondary storage includes one or more direct access storage devices (DASD) 118, and a DASD director 120 coupled thereto. DASD director 120 controls access to the direct access storage devices. The DASD director couples the secondary storage unit to the central processing complexes via one or more channels (e.g., ESCON channels).

Each central processing complex 102 is also coupled to coupling facility 106 (a.k.a., a structured external storage (SES) processor). (In one embodiment, each central processing complex is coupled to a plurality of coupling facilities 106.) Coupling facility 106 contains storage accessible by the central processing complexes and performs operations requested by programs in the CPCs. Aspects of the operation of a coupling facility are described in detail in such references as Elko et al., U.S. Pat. No. 5,317,739 entitled "Method And Apparatus For Coupling Data. Processing Systems", issued May 31, 1994; Elko et al., U.S. Pat. No. 5,561,809, entitled "In A Multiprocessing System Having A Coupling Facility Communicating Messages Between The Processors And The Coupling Facility In Either A Synchronous Operation Or An Asynchronous Operation", issued on Oct. 1, 1996; Elko et al., U.S. Pat. No. 5,706,432, entitled "Mechanism For Receiving Messages At A Coupling Facility", issued Jan. 6, 1998, and the patents and applications referred to therein, all of which are hereby incorporated herein by reference in their entirety.

Coupling facility 106 includes, for instance, one or more storage structures, such as a cache structure 122. Each cache structure includes, for instance, a number of cache structure controls 124, a number of local cache control blocks (LCCB) 126, a directory 128, a registration table 129, a data area 130, a changed data management facility 132, a number of storage class controls 133, and one or more castout class control blocks 134, each of which is explained in further detail below. (In other embodiments, the cache structure and/or the coupling facility may include other or additional components or information.)

As shown in FIG. 2, cache structure controls 124 include, for instance, the following controls:

(a) Total Changed Data-Area-Element Count (TCDAEC): A value that indicates the number of data-area elements in the cache structure that are in the changed state; i.e., either the change bit is set, or the castout lock is set to a nonzero value in the directory entry.

(b) Total-Directory-Entry Count (TDEC): A value that specifies the number of directory entries allocated for the cache.

(c) Total-Data-Area-Element Count (TDAEC): A value that specifies the number of data-area elements allocated for the cache.

(d) Total Structure Changed Count (TSCC): A value that indicates the number of directory entries in the cache structure that are in the changed state; i.e., either the change bit is set, or the castout lock is set to the nonzero value.

(e) Adjunct-Assignment Indicator (AAI): A value that indicates the presence or absence of adjunct areas. Two possible values are: adjunct areas not assigned; adjunct areas assigned. When adjunct areas are assigned, an adjunct area is associated with-each directory entry.

(f) Maximum Storage Class (MSC): A value that specifies the number of storage classes. Valid storage class values range, for instance, from one to the maximum storage class value.

(g) Maximum Castout Class (MCC): A value that specifies the number of castout classes. Valid castout class values range, for instance, from one to the maximum castout class value.

(h) Name-Class Mask (NCM): A value that determines the subset of bytes in the name field, called the name-class subfield, that specify the name class. The bytes in the name field that constitute the name-class subfield are in one-to-one correspondence with the bits in the name-class mask that are set to binary 1. When the name-class mask consists of all zeros or all ones, name classes are not supported in the cache structure.

(i) Data-Area-Element Characteristic (DAEX): A value that specifies the number of bytes in each data-area element. The size of the data-area element in bytes is, for instance, the product of 256 and 2 raised to the power of the value specified in the data-area element characteristic.

(j) Maximum Data-Area Size (MDAS): A value that specifies the maximum allowable size of a data area as an integral multiple of the data-area-element size. The maximum data-area size is set by the program when the cache is allocated.

(k) Structure Size (SS): A value that specifies the number of units of coupling facility storage allocated for the cache.

(l) Maximum Structure Size (MXSS): A value that specifies the maximum number of units of coupling facility storage that can be allocated for the cache.

(m) Marginal Structure Size (MRSS): A value that specifies the minimum number of units of coupling facility storage that can be allocated for the cache.

(n) Minimum Apportionable Structure Size (MASS): A value that specifies the minimum number of units of coupling facility storage that can be allocated for the cache, in integral multiples of the coupling facility storage increment, that are sufficient for creating the associated controls, and enough elements and entries to substantially satisfy the target directory-to-data ratio.

(o) Structure-Size-Change Indicator (SSCI): A value that indicates whether an expansion or contraction process is currently active for the cache structure. When the value is one, the cache is being expanded or contracted. When the value is zero, no expansion or contraction is active.

(p) Target Dirctory-Entry Count (TGDEC): A value that specifies the target for the maximum number of possible directory entries in a cache structure. In one example, valid counts are from 0 to $2^{32}-1$.

(q) Target Data Area Element Count (TGDAEC): A value that specifies the target for the maximum number of data-area elements that are available for assignment to directory entries in a cache structure. In one example, valid counts are from 0 to $2^{32}-1$.

(r) Target Structure Size (TSS): A value that specifies the target number of units to be allocated. Valid sizes are, for instance, from the coupling facility storage increment to a maximum of $2^{44}-4$ k bytes in integral multiples of the coupling facility increment.

(s) Structure Authority (SAU): A value associated with each bit in a structure identifier (SID) vector. The structure authority has two parts: A time of day (TOD), which reflects the moment when a system was allocating the structure and the system ID (SYID) used to make the TOD unique. Paired with the sysplex name, it further identifies who caused the structure to be allocated.

(t) User Structure Control (USC): A value defined by the user.

(u) LCID Vector (LCIDV): A bit string with an initial value of zero. The bit positions start at zero and increase sequentially to the local-cache-identifier limit. The bit at position (i) in the string is set to one when a local cache is attached with a local-cache identifier (LCID) value of (i). When the bit is one, the local-cache-identifier is assigned. The bit at position (i) is reset to zero when the local cache is detached and LCID unassignment is requested, when the cache structure is deallocated,. or when a coupling facility power-on reset occurs. When the bit is zero, the local-cache-identifier is not assigned.

(v) Extended User Structure Control (EUSC): An extension to the user structure control.

(w) Castout-Class Cursor (CCCUR): A value that is either zero or contains the value of the current castout class in a castout-class scan process. When the castout-class cursor is zero, it is in the reset state. The initial value of the castout-class cursor is zero.

(x) Free-Data-Area Element Count (FDAEC): A value that specifies the number of data-area elements allocated for the cache that are not assigned to a directory entry.

(y) Free-Directory-Entry Count (FDEC): A value that specifies the number of directory entries allocated for the cache that are not assigned to the directory.

(z) Global Count of Unchanged Directory Entries with Registered Interest (GCUDRI): The number of directory entries in the cache structure which have at least one valid row in the local-cache register and where the change bit and castout lock are both zero.

(aa) Pending Directory-to-Data Ratio (PDTDR): A value that contains the last requested target directory-to-data ratio on an allocate cache structure command. The PDTDR object is updated when the cache structure is initially allocated and when a reapportionment process is initiated.

(bb) Reapportionment-in-Progress Indicator (REIPI): A value that indicates whether a reapportionment process is currently active for the cache structure. When the value is one, the cache is being reapportioned. When the value is zero, no reapportionment is active.

Figure 3:
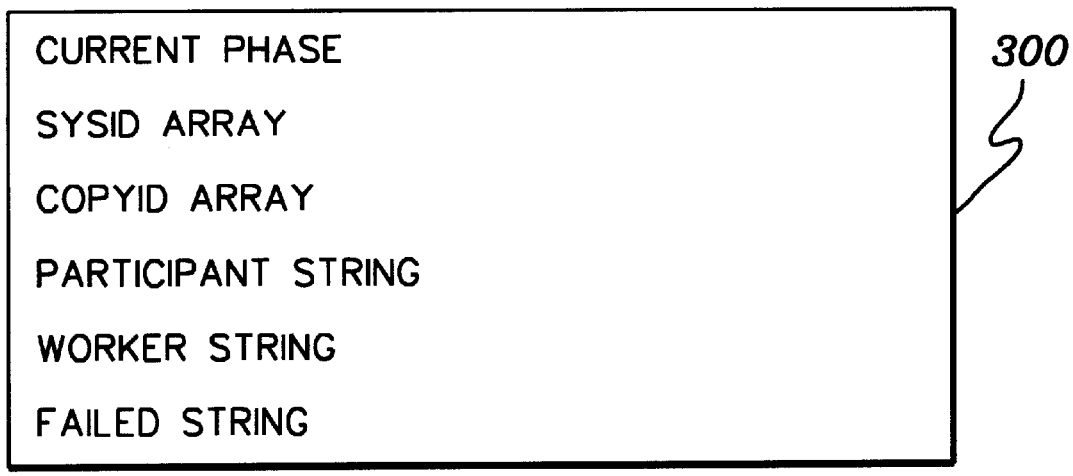
FIG. 3 depicts one example of a structure copy control used in accordance with the principles of the present invention.

(cc) Structure-Copy Control (SCC): A field maintained by a collection of systems during a structure-copy process. The structure-copy control is initialized to zero when the cache structure is created. One example of a structure copy control is described with reference to FIG. 3.

As one example, a structure copy control 300 includes a current phase field that indicates the current phase of copy processing (described below); a system identifier (SYSID) array that includes the system identifiers of the registered participants of the structure copy process; a copy identifier (COPYID) array that includes an identifier for each copy process instance; a participant string that includes, for instance, a bit per system in the SYSID array—a bit set to one indicates the system can participate in the copy process; a worker string that includes, for instance, a bit per system in the SYSID array—a bit set to one indicates the system is currently participating in the copy process; and a failed string that includes, for instance, a bit per system in the SYSID array—a bit set to one indicates a failed system.

In particular, as each copy process participant is started by CFRM to run on the various systems in the sysplex, the copy processor assigns itself a unique COPYID (by finding an unassigned bit in the participant string), and then uses that COPYID as the index into all of the arrays and bitstrings contained in the SCC. The copy processor then atomically (a) records its SYSID in the sysid array entry, (b) records its COPYID in the COPYID array, and (c) marks itself as a participant in the participant string.

(dd) Structure-Copy-Control Version Number (SCCVN) (FIG. 2): A field which is used to serialize updates to the SCC. The structure-copy-control version number is initialized to zero when the cache structure is created.

(ee) UDF-Order-Queue Indicator (UDFOQI): A value that indicates the presence or absence of UDF-order queues in the castout classes. The two possible values are: 0 UDF-order queues are not present; and 1 UDF-order queues are maintained. When the indicator has a value of one, a UDF-order queue is associated with each castout class.

(ff) WWCO Queue (WQ): A subset of the directory designating directory entries in the write-with-castout state. In one example, one WWCO queue exists in the cache structure.

(gg) WWCO-QUEUE Count (WQC): A value associated with the WWCO queue. Its value indicates the number of directory entries that are queued on the WWCO queue. The count is returned on a Read-Cache-Structure-Information command (described below).

Figure 4:
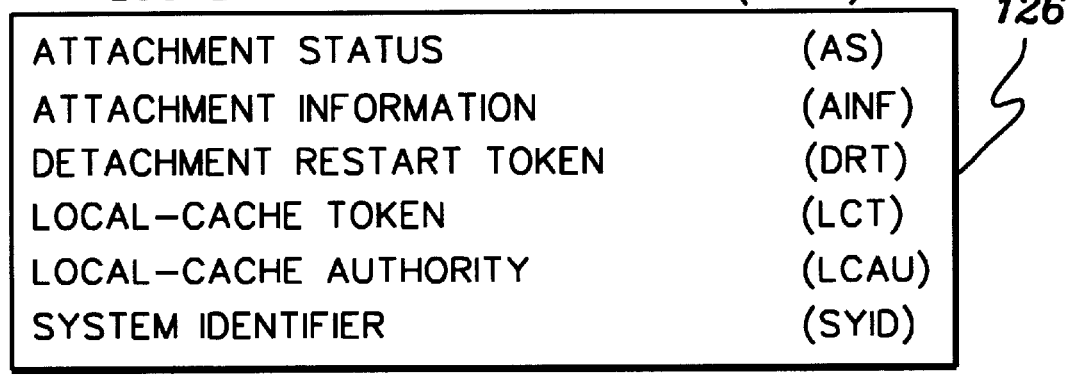
FIG. 4 depicts one example of a local cache control block associated with each local cache of the computing environment depicted in FIG. 1, in accordance with the principles of the present invention.

Returning to FIG. 1, in addition to structure controls 124, cache structure 122 includes local cache control block 126. Local cache control block 126 includes a number of local cache controls, which are initialized when a local cache is attached to a coupling facility cache. The controls are valid when a local cache identifier (LCID), used to identify a local cache, is assigned. In one embodiment, local cache control block 126 includes the following fields (FIG. 4):

(a) Attachment Status (AS): A control that describes the state of the attachment of a local cache. When the value of the attachment status is one, the local cache is active (attached). When the value of the attachment status is zero, the local cache is inactive (detached). When the local cache is inactive (detached), the user is in a failed-persistent state.

The attachment status controls the execution of commands that specify the local cache. When the local cache is active (attached), commands that specify the local cache are processed normally.

(b) Attachment Information (AINF): A value set by the program when the local cache is attached.

(c) Detachment Restart Token (DRT): A value used to indicate how far along a detachment process has proceeded.

(d) Local-Cache Token (LCT): A value used to identify the local cache on the CPC.

(e) Local-Cache Authority (LCAU): A value set by the program when the local cache is attached.

(f) System Identifier (SYID): A value specified by the program when a message path, used to communicate commands and messages (as described in U.S. Pat. No. 5,561,809 entitled, "In A Multiprocessing System Having A Coupling Facility, Communicating Messages Between The Processors And The Coupling Facility In Either A Synchronous Operation Or An Asynchronous Operation," by Elko et al., issued Oct. 1, 1996; and "Coupling Facility For Receiving Commands From Plurality Of Hosts For Activating Selected Connection Paths To I/O Devices And Maintaining Status Thereof," by Elko et al., U.S. Pat. No. 5,463,736, issued Oct. 31, 1995, each of which is hereby incorporated herein by reference in its entirety) is activated. The system identifier is maintained in a message-path status vector and copied into the local cache controls when an attach-local-cache command is communicated over the message path.

Referring back to FIG. 1, cache structure 122 also includes directory 128. Cache directory 128 is a collection of directory entries partitioned into storage classes and arranged as a fully associative array. The subset of changed directory entries is additionally partitioned into castout classes. Each directory entry includes, for instance, a name field 136, a state field 138 and one or more pointers 140. Whenever a named data object is placed in a coupling facility cache or local cache, its name is registered in name field 136 and its state is registered in state field 138 by the cache directory. Further details relating to state field 138 are described with reference to FIG. 5.

In general, the state information indicates whether the data is changed, unchanged, locked for castout, or resident in coupling facility 106. In particular, state field 138 includes, for instance:

(a) A User-Data Field (UDF): The user-data field contains a value that is associated with the data when it is initially changed in the coupling facility cache and is maintained until the data area is re-used. The user-data field is valid when the data is cached as changed. The user data field contains a time value or timestamp, which represents the oldest point in time when the data element is changed and that change has not yet been migrated to DASD. (UDF is further described in a U.S. patent application Ser. No. 09/251,888, Elko et al., entitled "Method, System And Program Products For Managing Changed Data Of Castout Classes", filed Feb. 19, 1999, which is hereby incorporated herein by reference in its entirety.)

(b) A Storage Class (STC): A value which identifies the storage class assigned for the name.

(c) A Change Indicator (C): A value which, in conjunction with the castout lock, indicates the changed state of the data. When the change bit is one, the data is cached as changed. When the change bit is zero and the data is not locked for castout, the data is either not cached, or is cached but not changed. When the change bit is zero and the data is locked for castout, the data is cached as changed. Whenever the data is in the changed state, the most recent version of the data resides in the cache. When the change bit is one, the data bit is also one.

(d) A Data-Cached Indicator (D): A value which indicates whether the data is located in the SES cache. When the data bit is one, the data is cached. When the data bit is zero, the data is not cached.

(e) A Castout-Parity Indicator (CP): A field which indicates the current assignment of the castout parity. Three possible values are: castout parity is zero; castout parity is one; the castout parity is unknown. One example of the castout parity bits indicator is described in U.S. Pat. No. 5,455,942, entitled "Partial Page Write Detection For A Shared Cache Using A Bit Pattern Written At The Beginning And End of Each Page", Narang et al., issued Oct. 3, 1995, which is hereby incorporated herein by reference in its entirety.

(f) A Castout Class (CCL): A value which identifies the castout class assigned for the name.

(g) A Castout-Lock (CO): A value which indicates the castout state of the data. When the castout lock is zero, the data is not being castout. When the castout lock is not zero, the value of the first byte of the castout lock identifies the local cache that is casting out the data block from the coupling facility cache to DASD. The value of the second byte identifies the castout process on the local system. When the castout lock is not zero, the data bit is one.

(h) A Castout Lock State (COLS): A value that defines the state of the castout lock. For example, 00 is reset; 01 is read for castout; 10 is write with castout; and 11 is unassigned.

(i) A Data-Area Size (DAS): A value that specifies the size of the data area as an integral multiple of the data-area-element size. The initial value is zero when the directory entry is assigned and is zero until the data bit is set to one.

(j) A Reference Indicator (R): A value which indicates whether a reference signal has been processed for the name.

(k) A Valid Indicator (V): A value which indicates the valid state of the directory entry.

(l) A Version Number (VN): An unsigned binary integer that is conditionally compared and conditionally updated. The version number is initialized to zero when a name is assigned to the directory.

In addition to the above, directory information block 128 (FIG. 1) also includes one or more pointers 140 to register 129. Register 129 is, for instance, a table containing information on the location of the locally cached copies of the data block. Each row in the table corresponds to an attached local cache. The columns contain a local cache identifier (LCID) (also see FIG. 5), a local-cache-entry number (LCEN) and a valid bit (LVI) for the local-cache-entry number. A valid local-cache-entry number is registered in the local-cache register when the registration process is executed for the specified name and local cache. A local-cache-entry number is invalidated when a local cache is detached, or when a local copy invalidation process is executed for the specified name and the local cache is a member of the set of local caches being invalidated. The LCEN field is invalid, when LVI is zero.

In addition to the above, directory 138 includes zero or more pointers 140 to optional data area 130 and optional adjunct data areas (not shown). Data area 130 is the area in the cache in which the user data is stored. The data object cached in the shared cache is identified by a software-assigned name. Therefore, any request for reading or writing data in the shared cache specifies the name of the data object, which is the object of the request. The directory is conventionally indexed by the names of the data objects which are objects of the read or write commands.

As mentioned above, the entries of cache directory 128 (FIG. 1) are partitioned into storage classes. As one example, storage classes are described in U.S. Pat. No. 5,457,793 entitled "Software Cache Management of a Shared Electronic Store In A Supplex," by Elko et al., issued on Oct. 10, 1995, which is hereby incorporated herein by reference in its entirety. Each storage class includes, for instance, a set of storage class controls 133. In on embodiment, these controls include the following (FIG. 6):

(a) Storage-Class Queue (SCQ): An ordered list of the directory entries in the storage class. The queue is ordered, for example, in reference order; the most recently referenced directory elements are at the bottom of the queue and the oldest, or least recently referenced, are at the top of the queue.

(b) Reclaiming controls which include, for instance, the following:

(1) Reclaiming Counters (RCT): An array of counters associated with each storage class and a cursor addressing a single array element. The values of the reclaiming counters are initialized to the values in the reclaiming vector when a set-reclaiming-vector command is processed or when the repeat factor is decremented to a nonzero value.

When a reclaim operation is performed, the cursor identifies the target storage class where the reclaiming operation is performed, provided the reclaiming vector is alive.

(2) Reclaiming Vector (RV): An array of counters associated with each storage class. A reclaiming-vector entry (RVE) exists for each storage class defined in the cache and is indexed by storage-class value. The array is initialized by the set-reclaiming-vector command.

(3) Repeat Factor (RF): A value that specifies the number of times the reclaiming counts are initialized with the values in the reclaiming vector. The repeat factor is set to a program-specified value by the set-reclaiming-vector command. When the repeat factor is zero, the reclaiming vector is inactive.

(c) Storage class counters, which include, for instance, the following (see also FIG. 7):

(1) Castout Counter (COC): Indicates that a castout operation was performed for the storage class in the read-for-castout state.

(2) Completed-Reference-List Counter (CRLC): Processing of a reference list had been completed by initiating a reference signal for each name that is in the name list and is assigned to the directory.

(3) Data-Area Counter (DAC): The number of data areas assigned to the storage class.

(4) Data-Area-Element Counter (DAEC): The number of data-area elements assigned to the storage class.

(5) Data-Area-Reclaim Counter (DARC): A data-area-assignment operation for the storage class required that a data area be reclaimed, and the reclaim operation was successful.

(6) Directory-Entry Counter (DEC): The number of directory entries assigned to the storage class.

(7) Directory-Entry-Reclaim Counter (DERC): A name-assignment operation for the storage class required that a directory entry be reclaimed, and the reclaim operation was successful.

(8) Partially-Completed-Reference-List Counter (PCRLC): Processing of a reference list was abandoned due to the expiration of a model-dependent timeout.

(9) Read-Hit Counter (RHC): The referenced entry contained data for a read-and-register command.

(10) Read-Miss-Assignment-Suppressed Counter (RMASC): A read-and-register command specified a name which was not assigned in the directory, and name assignment was suppressed for the command.

(11) Read-Miss-Directory-Hit Counter (RMDHC): A read-and-register command specified an assigned name in the directory for which the data was not cached.

(12) Read-Miss-Name-Assigned Counter (RMNAC): A read-and-register command specified a name which was not assigned in the directory, and a directory entry was successfully assigned to the name.

(13) Read-Miss-Target-Storage-Class-Full Counter (RMTSFC): A read-and-register command specified a name which was not assigned in the directory, and a name-assignment could not be completed for the specified storage class due to a lack of storage resources in the target storage class.

(14) Reference-Signal-Miss Counter (RSMC): A name was processed for a process-reference-list command which was not found in the specified storage class.

(15) Target-Storage-Class-Full Counter (TSCFC): A directory-entry assignment or data-area assignment could not be completed when the storage class was selected as the target storage class.

(16) Total Changed Count (TCC): The number of directory entries in the storage class that are in the changed state; i.e., either the changed bit is set or the castout lock is set to a nonzero value. The count is returned on a write-when-registered or write-and-register command, when a change signal is processed as well as on a read-storage-class-information command.

(17) Unchanged-Directory-Entries-with-Registered-Interest Counter (UDERIC): The number of directory entries in the storage class which have at least one valid row in the local cache register, and where the change bit and castout lock are both zero.

(18) Write-Hit-Change-Bit-0 Counter (WHCB0C): A write-and-register or write-when registered command completed by storing the data with the change bit set to zero.

(19) Write-Hit-Change-Bit-1 Counter (WHCB1C): A write-and-register or write-when registered command completed by storing the data with the change bit set to one.

(20) Write-Miss-Invalid-State Counter (WMISC): A write-and-register or write-when-registered command specified a change-bit value of zero when the data was cached as changed.

(21) Write-Miss-Not-Registered Counter (WMNRC): A write-when-registered command could not be completed; the specified local-cache-entry was not listed in the user register.

(22) Write-Miss-Target-Storage-Class-Full Counter (WMTSFC): A write-and-register or write-when-registered command could not be completed for the source storage class due to a lack of storage resources in the target storage class.

(23) Write-unchanged-with-XI Counter (WUXIC): A write-and-register or write-when-registered command with the change control (CHGC) bit zero, and the complement-copy-invalidation control (CCIC) bit one, successfully stored the data to the coupling facility.

(24) XI-for-Complement-Invalidation Counter (XICIC): A cross-invalidate (XI) signal was issued to satisfy an invalidate-complement-copies command.

(25) XI-for-Directory-Reclaim Counter (XIFDRC): A cross-invalidate (XI) signal was issued to satisfy a directory-entry-reclaim operation.

(26) XI-for-Local-Copy-Removal Counter (XILRC): A cross-invalidate (XI) signal was issued to invalidate a local copy in the local cache that is requesting a local-cache-entry-registration process. The invalidation may occur for one of two reasons: (1) the local-cache-entry number is being replaced in the local-cache register, or (2) the local-cache-entry registration process failed with a target-storage-class-full condition and the command is read for castout.

(27) XI-for-Name-Invalidation Counter (XINIC): A cross-invalidate (XI) signal was issued to satisfy an invalidate-name command.

(28) XI-for-Write Counter (XIFWC): A cross-invalidate (XI) signal was issued to satisfy a write-when-registered or write-and-register command.

(d) Browse controls (FIG. 6), which include, for instance, the following (see also FIG. 7a):

(1) Browse Cursor (BCUR): A value that is either zero or identifies the current location in the storage-class queue of an active browse process. When the browse cursor is zero, it is in the reset state. The initial value of the browse cursor is zero. The browse cursor is also zero when the browse state is inactive or complete.

(2) Browse State (BST): A value that determines the current state of the browse operation. The possible states are: 00 Inactive, all browse controls are zero; 01 browse active; 10 browse complete; and 11 unassigned. The initial value of the browse state is binary 00.

(3) Browse Register (BREG): The browse register is a table containing information on the set of active browsers participating in the browse process. There are, for instance, up to 32 possible active browsers and the browse register contains a row for each possible browser. The columns of the table include, for example, the following (FIG. 7b):

(a) Browser active bits (BAB), indicating the active state for the browser represented by the row in the browse register. The possible values are: 0 inactive, and 1 active browser.

(b) A browser identifier (BID), identifying a browser and being used as an index value for references to the browse register.

(c) A previous browse cursor (PBCUR), which is a value that is either zero or contains the value of the browse cursor for the previous invocation of the browse process by the browser. When the previous browse cursor is zero, it is in the reset state. The initial value of the previous browse cursor is zero. The previous browse cursor is also zero when the browser state is inactive, or when the browser state is active and the current browse cursor is zero.

(d) A current browse cursor (CBCUR), which is a value that is either zero or contains the value of the browse cursor at the completion of the current invocation of the browse process by the browser. When the current browse cursor is zero, it is in the reset state. The initial value of the current browse cursor is zero. The current browse cursor is also zero when the browser state is inactive.

Referring back to FIG. 1, as previously mentioned, the subset of changed directory entries is also partitioned into castout classes. As one example, castout classes are described in U.S. Pat. No. 5,493,668 entitled "Multiple Processor System Having Software for Selecting Shared Cache Entries of An Associated Castout Class for Transfer To A DASD with One I/O Operation", Elko et al., Issued on Feb. 20, 1996; and in "Method, System And Program Products For Managing Changed Data Of Castout Classes," Elko et al., Ser. No. 09/251,888, filed Feb. 19, 1999, each of which is hereby incorporated herein by reference in its entirety. Each castout class has associated therewith a set of castout class control blocks 134. In one embodiment, these controls include the following (FIG. 8):

(a) Castout-Class Count (CCC): A value associated with a castout class. Its value indicates the number of data-area elements assigned to directory entries in the castout class. The count is returned on a write-when-registered or write-and-register command when a change signal is processed for the castout class, and the count is returned on a read-castout-class-information command when the castout class lies in the specified range.

(b) Castout-Class Queue (CCQ): An ordered subset of the directory designating directory entries in the castout class. The queue is maintained in, for instance, update order; the most recently updated directory entries are at the bottom of the queue. The least recently updated entries are at the top of the queue. A castout-class queue exists for each castout class in the cache.

(c) Castout-class scan controls (CCSC), which include, for instance, the following:

(1) Castout-Class-Scan Identifier (CCSID): A value that determines the current state of the castout-class scan controls and, additionally, identifies the owner of the castout-class when a castout-class scan is in progress. When zero, the castout-class-scan controls for the castout class are in the available state. When nonzero, the castout-class scan controls are in the claimed state. The initial state of the castout-class-scan controls is the available state.

(2) Castout-Class-Scan State (CCSST): A value that, in conjunction with the castout-class-scan identifier, determines the current state of the castout-class scan. When the castout-class-scan controls are claimed and the castout-class-scan state is zero, the castout-class scan is in the in-progress state. When the castout-class-scan controls are claimed and the castout-class-scan state is one, the castout-class scan is in the completed state. When the castout-class-scan controls are available, the castout-class-scan-state object is zero.

(d) UDF-Order Queue (UDFOQ): An ordered subset of the directory designating directory entires in the castout class. The queue is maintained, for instance, in increasing UDF order; the directory entry with the smallest valued user-data field is located at the top of the queue. When the UDF-order-queue indicator is one, a UDF-order queue exists for each castout class in the cache. When the UDF-order-queue indicator is zero, no UDF-order queues exist.

Returning to FIG. 1, in one embodiment, cache structure 122 also includes changed data management facility 132. Changed data management facility 132 includes at least a portion of the logic used during castout processing. Changed data management facility 132 is further described in U.S. patent application Ser. No. 09/251,888, Elko et al., entitled "Method, System And Program Products For Managing Changed Data Of Castout Classes", (IBM Docket No. P09-98-037), filed Feb. 19, 1999, which is hereby incorporated herein by reference in its entirety.

Figure 9:
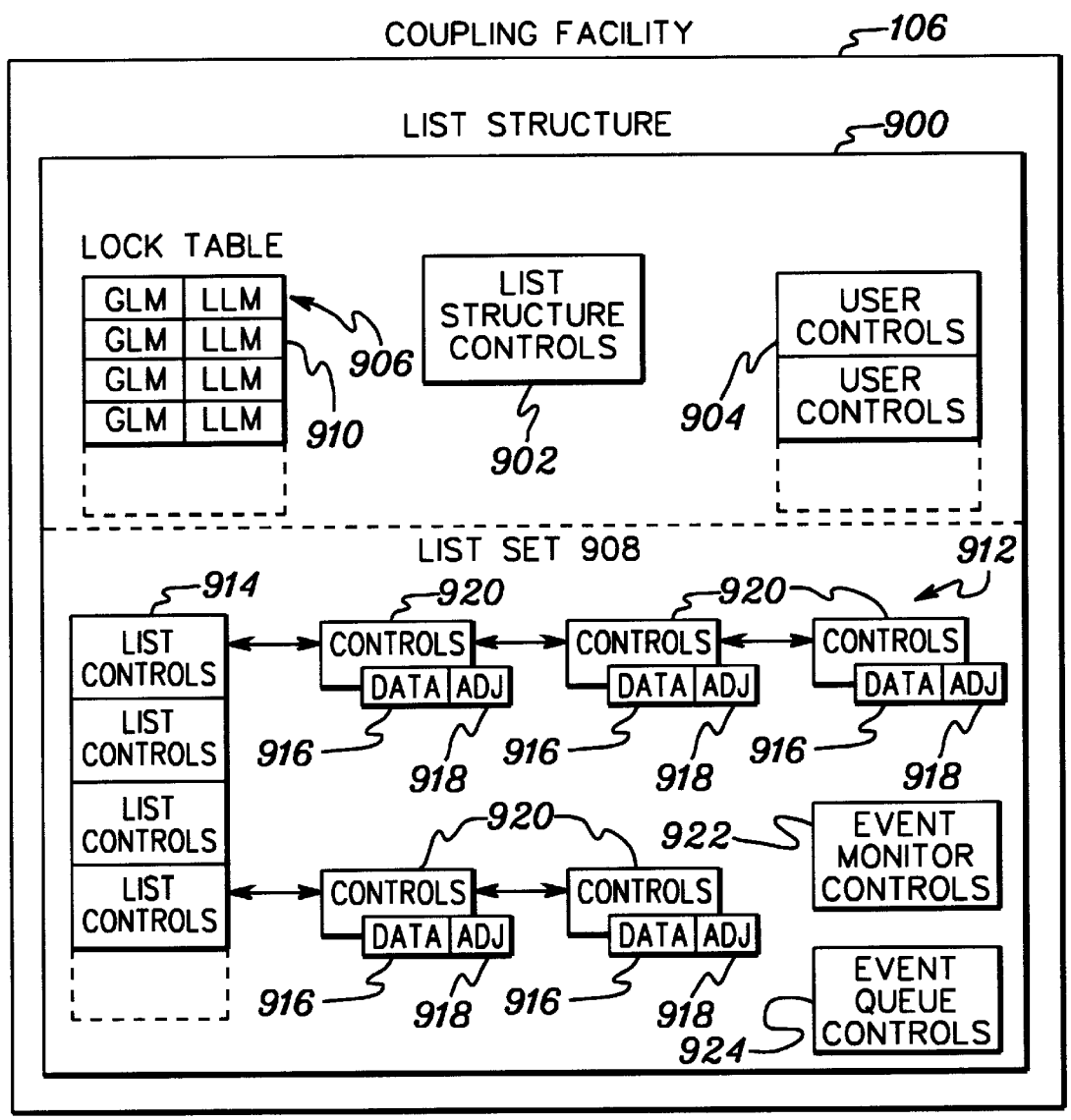
FIG. 9 depicts one example of a coupling facility list structure, in accordance with the principles of the present invention.

Described above is one example a cache structure. In addition to cache structures, however, a coupling facility may have other types of structures including, for instance, a list structure. One embodiment of a list structure 900 is depicted in FIG. 9. List structure 900 includes, for instance, list structure controls 902, user controls 904 and, optionally, a lock table 906 and/or a list set 908. (In other embodiments, the list structure may include other or additional components or information.) Each of the components of list structure 900 is described in detail below.

List structure controls 902 include attributes of the structure and are initialized when list structure 902 is created. List structure controls 902 include, for instance, the following controls (FIG. 10):

(a) Entry-Reapportionment-in-Progress Indicator (EREIPI): A value that indicates whether an entry-to-element-reapportionment process is currently active for the list structure. When the value is one, the list structure entry-to-element ratio is being reapportioned. When the value is zero, the list structure entry-to-element ratio is not being reapportioned.

(b) Event-Monitor-Controls Count (EMCC): A value that specifies the number of event-monitor controls objects currently in a list set. Valid counts are, for instance, from 0 to the maximum event-monitor-controls count.

(c) Extended User Structure Control (EUSC): An extension to the user structure control.

(d) List Count (LC): A value that specifies the number of lists created. Valid counts are, for instance, from 0 to the list-number limit.

(e) List-Element Characteristic (LELX): A value that specifies the number of bytes in each list element. The value of the list-element size (LELS), in bytes, is, for instance, the product of 256 and 2 raised to the power of the integer specified in the list-element characteristic. Valid sizes are, for instance, from 256 bytes to the maximum list element size in powers of 2.

(f) List-Set Cursor (LSCUR): A value that is either zero or contains the value of the current list number in a list-set-scan process. When the list-set cursor is zero, it is in the reset state. The initial value of the list-set cursor is zero.

(g) List-Set-Element Count (LSELC): A value that specifies the number of list elements that have been assigned to list entries or retry-data blocks, or both, in the list set. Valid counts are, for instance, from 0 to $2^{32}-1$.

(h) List-Set-Entry Count (LSEC): A value that specifies the number of existing list entries in the list set. Valid counts are, for instance, from 0 to $2^{32}-1$.

(i) List-Structure Type (LST): A value that indicates the list objects created on allocation. For example, the first bit is a program-list-entry-identifier indicator (PLEIDI), the second bit is an element-count indicator (ECI), the third bit is a lock indicator (LI), the fourth bit is a data indicator (DI), the fifth bit is an adjunct indicator (AI), the sixth bit is a name indicator (NI), and the seventh bit is a key indicator (KI).

The program-list-entry identifier indicator has, for instance, the following encoding: 0 the structure uses a coupling-facility-assigned LEID value; and 1 the structure uses a program-assigned LEID value.

The element-count indicator has, for instance, the following encoding: 0 List-entry count and list-entry-count limit are defined; and 1 List-element count and list-element-count limit are defined.

The lock indicator has, for instance, the following encoding: 0 No lock table is created; and 1 A lock table is created.

The data and adjunct indicators have, for instance, the following encoding: 00 No list set is created; 01 List entries have adjunct only; 10 List entries have data only; and 11 List entries have data and adjunct.

The name indicator has, for instance, the following encoding: 0 List entries not named; and 1 List entries named.

The key indicator has, for instance, the following encoding: 0 List entries not keyed; and 1 List entries keyed.

(j) Lock-Table-Entry Characteristic (LTEX): A value that specifies the number of bytes in each lock-table entry. The value of the lock-table-entry size (LTES) in bytes is, for instance, the product of 2 raised to the power of the value specified in the lock-table-entry-characteristic. Valid sizes are, for instance, from one byte to the maximum lock-table-entry size in powers of 2.

(k) Lock-Table-Entry Count (LTEC): A value that specifies the number of lock-table entries allocated. Valid counts are, for instance, from 0 to $2^{32}-1$.

(l) Marginal Structure Size (MRSS): A value that specifies the minimum number of units of coupling facility storage that is required for the creation of the requested lock-table entries, lists, and associated controls for the list structure, independent of either the storage-increment size or the requested target entry-to-element ratio.

(m) Maximum Data-List-Entry Size (MDLES): A value that specifies the maximum size of the data list entry as an integral multiple of the list-element size.

(n) Maximum Event-Monitor-Controls Count (MEMCC): A value that specifies the maximum number of possible event-monitor-controls objects in a list set. Valid counts are, for instance, from 0 to $2^{32}-1$ in integral multiples of the number of event-monitor controls that can be supported with the coupling facility storage-increment size.

(o) Maximum List-Set-Element Count (MLSELC): A value that specifies the maximum number of list elements that are available for assignment to list entries or retry-data blocks, or both, in the list set. Valid counts are, for instance, from 0 to $2^{32}-1$.

(p) Maximum List-Set-Entry Count (MLSEC): A value that specifies the maximum number of possible list entries in a list set.

(q) Maximum Structure Size (MXSS): A value that specifies the maximum number of units of coupling facility storage that can be allocated for the list. Valid sizes are, for instance, from the marginal structure size to a maximum of $2^{44}-4$ k bytes in integral multiples of the coupling facility storage increment.

(r) Minimum Apportionable Storage Size (MASS): A value that specifies the minimum number of units of coupling facility storage that can be allocated for the list, in integral multiples of the coupling facility storage increment, that are sufficient for creating the requested lock-table entries, lists, associated controls, enough even-monitor controls and list entries with their associated controls to substantially satisfy the target monitor-to-entry storage ratio, and enough entries and elements to substantially satisfy the target entry-to-element ratio.

(s) Monitor-Reapportionment-in-Progress Indicator (MREIPI): A value that indicates whether a monitor-to-entry-storage-reapportionment process is currently active for the list structure. When the value is one, the list structure monitor-to-entry storage ratio is being reapportioned. When the value is zero, the list structure monitor-to-entry storage ratio is not being reapportioned.

(t) Nonzero-Lock-Table-Entry Count (NLTEC): A value that specifies the number of nonzero lock-table entries that exist in the structure.

(u) Pending Entry-to-Element Ratio (PETELR): A field that contains the last requested target entry-to-element ratio to an allocate-list-structure command. The PETELR object is updated when the list structure is initially allocated and when a reapportionment process is initiated.

(v) Pending Monitor-to-Entry Storage Ratio (PMTESR): A field that contains the last requested target monitor-to-entry storage ratio on an allocate-list-structure command. The PMTESR object is updated when the list structure has been initially allocated and a monitor-to-entry-storage-reapportionment process is requested.

(w) Reapportionment-in-Progress Indicator (REIPI): A value that indicates whether a reapportionment process is currently active for the list structure. When the value is one, the list is being reapportioned. When the value is zero, no reapportionment is active.

(x) Structure Authority (SAU): A value associated with each bit in the SID vector.

(y) Structure-Copy Control (SCC): A field maintained by a collection of systems during a structure-copy process. The structure-copy control is initialized to zero when the list structure is created. One example of the structure copy control is described above.

(z) Structure-Copy-Control Version Number (SCCVN): A field which is used to serialize updates to the SCC. The structure-copy-control version number is initialized to zero when the list structure is created.

(aa) Structure Size (SS): A value that specifies the number of, for instance, 4 k-byte units allocated. Valid sizes are, for instance, from the coupling facility storage increment to a maximum of $2^{44}-4$ k bytes in integral multiples of the coupling facility storage increment.

(bb) Structure-Size Change Indicator (SSCI): A value that indicates whether an expansion or contraction process is currently active for the list structure. When the value is one, the list structure is being expanded or contracted. When the value is zero, no expansion or contraction is active.

(cc) Target Maximum-Element Count (TMELC): A value that specifies the target for the maximum number of list elements that are available for assignment to list entries or retry-data blocks, or both, in the list set.

(dd) Target Maximum-Entry Count (TMEC): A value that specifies the target for the maximum number of possible list entries in a list set.

(ee) Target Maximum-Event-Monitor Count (TMEMC): A value that specifies the target for the maximum number of event-monitor-controls objects that are available for registration of interest in subsidiary lists within the list set. Valid counts are, for instance, from 0 to $2^{32}-1$ in integral multiples of the number of event-monitor controls that can be supported within the coupling facility storage-increment size.

(ff) Target Structure Size (TSS): A value that specifies that target number of, for instance, 4 k-byte units to be allocated. Valid sizes are, for instance, from the coupling facility storage increment to a maximum of $2^{44}-4$ k bytes in integral multiples of the coupling facility storage increment.

(gg) User-Identifier Vector (UIDV): A bit string with an initial value of zero. The bit positions start at zero and increase sequentially to the user-identifier limit. The bit at position (i) in the string is set to one when a user is assigned with a UID value of (i). The bit at position (i) is reset to zero when a user is unassigned.

(hh) User Structure Control (USC): A field per structure defined by the user.

Referring back to FIG. 9, in addition to list structure controls 902, list structure 900 also includes user controls 904. In one example, user controls 904 include the following (FIG. 11):

(a) User State (US): A field that specifies the state of the user. When the value of the user state is one, the user is active (attached). When the value of the user state is zero, the user is inactive (detached). When the user is detached, the user is in a failed-persistent state.

(b) List-Notification Token (LNT): A value that specifies a list-notification vector to the system.

(c) User Authority (UAU): A value that is compared and conditionally updated.

(d) System Identifier (SYID): A value specified by the program when a message path is activated. The system identifier is maintained in the message-path status vector and copied into the user controls when an attach-list-structure-user command is communicated over the message path.

(e) User-Attachment Control (UAC): A field per attached user defined by the user.

Referring once again to FIG. 9, list structure 900 may include lock table 906. Lock table 906 includes a sequence of one or more lock table entries 910 identified by a lock table entry number (LTEN). In one embodiment, lock table entry 910 includes a lock table entry number, which starts at zero and runs consecutively; and a lock table entry value (LTEV), including a global lock manager (GLM) object and optionally, a local lock manager (LLM) object or both. The lock table entry format is determined by the list structure type located within list structure controls 902.

List structure 900 may also include list set 908. In one example, list set 908 includes one or more lists 912 represented by list controls 914, which are numbered consecutively, starting at zero. In one embodiment, list controls 914 include the following (FIG. 12):

(a) Assignment Key (AK): A value that specifies the value assigned to a list-entry key when a key-assignment operation is executed for a list entry that is moved or created on the list. The AK is initialized to zeros.

(b) Assignment Key Threshold (AKT): A value that specifies the maximum value of an assignment key. The AKT is initialized to zeros.

(c) Cursor Direction (CDIR): A value that indicates how the list cursor is updated when the list cursor is maintained or initialized by a write-list-controls command. It has the following encoding: 0 Left to right; and 1 Right to left. The CDIR is initialized to zero.

(d) List Authority (LAU): A value that is compared and conditionally updated. The LAU is initialized to zeros.

(e) List Cursor (LCUR): A list-entry identifier that identifies a list-cursor position. The LCUR is initialized to zeros.

(f) List-Element Count (LELC): A value that specifies the number of list elements currently in the list.

(g) List-Element-Count Limit (LELCL): A value that specifies the maximum number of possible list elements in a list. This object is initialized to the maximum list-set-element count when a list structure is created.

(h) List-Entry Count (LEC): A value that specifies the number of list entries currently in the list.

(i) List-Entry-Count Limit (LECL): A value that specifies the maximum number of possible list entries in a list. This object is initialized to the maximum list-set-entry count when a list structure is created.

(j) List-Monitor Table: A table that includes information used to process the list-notification vector of each user who has registered interest in the state transitions of the list.

The list-monitor table is a sequence of objects, called list-monitor-table entries. The number of list-monitor-table entries is determined when the table is created and is equal to, for instance, the maximum number of list structure users plus one. The list-monitor-table entries are numbered from zero to the user-identifier limit.

Each list-monitor-table entry includes, for example, a list-monitoring-active-bit object (LMAB), a list-notification-request-type (LNRT) object and a list-notification-entry-number (LNEN) object.

(k) List-Set-Scan controls: These controls include, for example, the following:

(1) List-Set-Scan Identifier (LSSID): A value that determines the current state of the list-set-scan controls and, additionally, identifies the owner of the list when a list-set scan is in progress. When zero, the list-set-scan controls for the list are in the available state. When nonzero, the list-set-scan controls are in the claimed state. The initial state of the list-set-scan controls is the available state.

(2) List-Set-Scan State (LSSST): A value that, in conjunction with the list-set-scan identifier, determines the current state of the list-set scan. When the list-set-scan controls are claimed and the list-set-scan state is zero, the list-set scan is in the in-progress state. When the list-set-scan controls are claimed and the list-set-scan state is one, the list-set scan is in the completed state. When the list-set-scan controls are available, the list-set-scan-state object is zero.

(l) List-State-Transition Count (LSTC): A value that specifies the number of empty to not-empty list-state transitions that have occurred.

(m) User List Control (UCL): A field per list defined by the user.

Returning to FIG. 9, each list 912 of list set 908 includes a sequence of zero or more entries. The list structure type determines whether the list entries have a data list entry 916, an adjunct list entry 918, or both. Associated with each entry of a list is list entry controls 920. Controls 920 include list entry location information and other information for controlling operations against data list entry 916. One example of list entry controls 920 is described with reference to FIG. 13:

(a) Adjunct-Format Control (AFC): A bit string including, for instance, 8 consecutive adjunct format bits. Each bit is associated with a particular adjunct format. The adjunct format control bits are as follows, in one example: Bits 0–6 Invalid; and bit 7 Adjunct-lock-entry-indicator (ALEI). The bits are mutually exclusive; at most one bit is set to binary 1. When all the bits are zero, the adjunct is unformatted and contains the adjunct-data-list entry.

The adjunct-lock-entry indicator (ALEI) is a value that specifies whether the adjunct list entry of a named entry is an adjunct-data entry or adjunct-lock entry. When a list entry is created by a lock-request process, the indicator is initialized to one; otherwise, it is initialized to zero.

(b) Data-List-Entry Size (DLES): A value that specifies the size of the data list entry as an integral multiple of the list-element size. Valid sizes are, for instance, from 0 to the maximum data-list-entry size.

(c) List-Entry Identifier (LEID): A value that designates the list entry. The LEID is written into the LEID object when the entry is created.

For LEIDs when the program-list-entry-identifier indicator is zero, a non-zero list-entry identifier that is unique to a list set for at least 100 years is assigned by the coupling facility.

For LEIDs when the program-list-entry-identifier indicator is one, the LEID value in the MCB is written into the LEID object for the list entry. The LEID value is checked to ensure that it is unique in the structure. There is no requirement for the LEID value to be unique for any specific length of time and may be reused once the entry which has that LEID assigned to it is deleted.

For LEIDs when the program-list-entry-identifier indicator is one, the LEID value may be any value except zero, which is invalid.

(d) List-Entry Key (LEK): A value that partially designates the position of the list entry in the list.

(e) List-Entry Name (LEN): A value that fully designates the position of the list entry in the list set. A list-entry name is unique to a list set at any particular instant and is provided by the program. List-entries are named when a name indicator of binary 1 is specified on allocation.

(f) List Number (LN): A value which designates the list that the list entry is in. Valid numbers are, for instance, from zero to the list count less one.

(g) Version Number (VN): A value that is conditionally compared and conditionally updated. The version number is initialized to zero when a list entry is created.

Referring once again to FIG. 9, list set 908 also includes event monitor controls (922). There is an event-monitor controls object for each user and subsidiary list combination for which a user has currently registered interest. In one example, event monitor controls 922 include the following (FIG. 14):

(a) Event-Monitor-Queued Indicator (EMQI): A value that indicates whether the event-monitor-controls object is queued to the event queue associated with the user id contained within the object. It has the following encoding: 0 The event-monitor-controls object is not queued to the associated event queue; and 1 The event-monitor-controls object is queued to the associated event queue.

(b) List-Entry Key (LEK): A value which partially designates the primary subsidiary list.

(c) List Number (LN): A value which partially designates the subsidiary list. Valid numbers are, for instance, from zero to the list count less one.

(d) User Identifier (UID): A value that identifies the user. Valid user identifiers are, for instance, from one to the UIDL.

(e) User Notification Control (UNC): A field per event-monitor controls defined by the user.

Referring to FIG. 9, there is also a set of event queue controls 924 within the list set. There is at least one event queue per user (UID). Event monitor controls objects associated with a particular user and subsidiary list may be queued to, or withdrawn from, that user's event queue, in response to empty/non-empty state changes that occur for the subsidiary list with which the event monitor controls object is associated.

As depicted in FIG. 15, each event queue 1500 includes a sequence of zero or more event monitor controls objects 1502. There is at least one event queue for each user (UID). Associated with each event queue are event-queue controls. One example of such controls is described with reference to FIG. 16:

(a) Event-Monitor-Controls-Queued Count (EMCQC): A value that specifies the number of event-monitor controls currently queued to the event queue.

(b) Event-Notification-Entry Number (ENEN): A value that specifies a list-notification-vector entry associated with an event queue.

(c) Event-Notification-Request Type (ENRT): A value that indicates whether the list-notification-vector summaries are to be updated when an empty to not-empty state transition occurs on an event queue. The bit has, for instance, the following encoding: 0 Do not update the list-notification-vector summaries; and 1 Update the list-notification-vector summaries.

(d) Event-Queue-Monitoring-Active Bit (EQMAB): A value that specifies whether the user associated with the event queue is monitoring the event queue. The bit has, for instance, the following encoding: 0 Not monitoring the event queue; and 1 Monitoring the event queue.

(e) Event-Queue-Transition Count (EQTC): A value that specifies the number of empty to not-empty event-queue transitions that have occurred.

In one embodiment, messages are communicated between CPC 102 and coupling facility 106 via a message command/response block. In one example, the message command/response block includes a plurality of operands. An operand may be a request operand, a response operand or both, depending upon the command. A number of request/response operands are depicted in FIGS. 17a–17d. In particular, cache operands are depicted in FIGS. 17a–17b; and list operands are depicted in FIGS. 17c–17d. (Other or differing operands may exist that are not depicted in the figures.)

Initially, examples of the cache operands are described (FIGS. 17a–17b):

(a) Adjunct Area (AA): A field associated with a data block.

(b) Allocation Type (AT): A value that indicates what action an allocate command should take. In one example, the first bit is a directed expand, contract, reapportion (ECR) indicator (DECRI), the second bit is the ratio indicator (RI), the third bit is the structure-size indicator (SSI), and the fourth bit is the user-structure-control indicator (USCI).

(c) Apportionment Priority Indicator (API): A value that directs the resolution of conflicts in the establishment of an accurate ratio in an expansion or contraction process or when the cache is initially allocated. A value of 1 indicates that maintaining an accurate ratio is of higher priority than maximizing the amount of storage resources that are assigned to the structure. A value of 0 indicates that maximizing storage resources is of higher priority and a less accurate ratio will be tolerated.

(d) Assignment Control (AC): The assignment control is value that controls the name-assignment process. The two possible values are: 0 Suppress assignment; and 1 Assign when required.

(e) Attachment Override Control (AOC): A value that controls the testing of the attachment status for the Write-and-Register and Register-Name-List commands. When the assignment-override control is one and the LCID is assigned, then LCEN-registration or the write operation are performed regardless of the attachment status of the local cache. When (1) the attachment-override control is zero, (2) the LCID is assigned but the local cache is not attached, and (3) the command is Register Name List and the LCID-location bit is one, no processing is performed. When (1) the attachment-override control is zero, (2) the local cache is not attached, and (3) the command is Write and Register or Register Name List and the LCID-location bit is zero, the command is completed with a request exception. The LCID is invalid. The attachment override control is ignored on a Write-and-Register command unless the castout-lock control is one.

(f) Attachment-Request Type (ART): A value that selects the target local-cache state. The bit has the following encoding: 00 Assign the LCID if not already assigned and place local cache in the attached state; 01 Assign the LCID and place local cache in the detachment-pending state; 10 Assign the LCID and leave local cache in the detached state; and 11 Invalid.

(g) Bounded Counts Priority Indicator (BCPI): A value that constrains the setting of the target-count objects when a cache structure is created and the target structure size is zero, or initial allocation is complete and directed ECR is requested. A value of binary '1' indicates that the target count objects are not to exceed the values of the target count request operands, but should be the largest counts possible given this constraint. A value of binary '0' indicates that setting of the target count objects is not constrained to be less than or equal to the target count request operands. This operand is ignored unless (1) a cache structure is being created and the target structure size and target counts priority indicator are both zero, or (2) the directed ECR indicator is binary "1".

(h) Browser Identifier (BID): A value that identifies a browser and is used as an index value or references to the browse register.

(i) Browser Active Bits (BAB): A bit string indicating the active state for the browser represented by the row in the browse register.

(j) Command Code (CC): A value that identifies the command.

(k) Complement-Copy-Invalidation Control (CCIC): A value that indicates that the complement copy invalidation is performed when the data is written unchanged to the coupling facility. This bit is only meaningful when the change control (CHGC) bit is zero.

(l) Castout-Class Request Type (CCRT): A value that indicates the type of read-castout-class request. It has the following encoding: 0 Read NB list; and 1 Read DEIB list.

(m) Castout-Class Scan Identifier (CCSID): A value that is used to claim ownership of a set of castout-class-scan controls.

(n) Castout-Class-Scan Restart Token (CCSRT): A value that controls the processing of a castout-class-Scan operation that spans multiple commands.

(o) CCSC Update Type (CCSCUT): A value that indicates how the castout-class scan controls are to be modified. The bit has the following encoding: 111 Claim next available CCL-scan controls; 001 Complete castout-class scan, 010 Reset matching in-progress CCL-scan controls; 011 Reset all in-progress castout-class-scan controls; 100 Invalid; 101 Invalid; 110 Reset matching CCL-scan controls; and 111 Reset all castout-class-scan controls.

(p) Castout Class (CCL): A value which identifies the castout class assigned for the name.

(q) Castout-Lock Control (COLC): A value that indicates that the data being written is also being castout and castout lock serialization is required.

(r) Castout-Parity Bits Indicator (CP): A field which indicates the current assignment of the castout parity. Three possible values are: castout parity is zero; castout parity is one; the castout parity is unknown.

(s) Castout-Process Identifier (CPID): A value that identifies the local castout process.

(t) Change-Bit Overindication (CBO): A value that controls the setting of the change bit in the directory entry when the castout lock is set or reset. When the value is zero, the change bit is not updated. When the value is one, and the state of the castout lock is read for castout the change bit is set to one. When the state of the castout lock is write with castout a value of one is invalid.

(u) Change Control (CHGC): A value that selects which process is used for writing the data. The two possible values are: 0 Write data unchanged; and 1 Write data changed.

(v) Comparative Structure Authority (CSAU): A value used as a comparison value to the structure authority when the structure is allocated and deallocated.

(w) Comparative Version Number (CVN): A value that is compared to the version-number object. This request operand is ignored unless the version-request type specifies version-number comparison.

(x) Data-Block Size (DBS): A value that specifies the size of the data block as an integral multiple of 4096-byte units.

(y) Data-Toleration Factor (DTF): A value that, when divided by 100, specifies the minimum number of data-area-elements that are free or unchanged after any checkpoint of a contraction, expansion or reapportionment process as a percentage of the total number of changed data-area elements.

(z) Directory-Toleration Factor (DITF): A value that, when divided by 100, specifies the minimum number of directory entries that are free or unchanged after any checkpoint of a contraction, expansion, or reapportionment process as a percentage of the total number of changed directory values.

(aa) Ending Registration Index (EXR): A value that indexes to the last registration block in the data block for the Register-Name-List command.

(bb) Halt Register Name List (HRNL): A value that controls if an LCEN is not registered and skipped or the registration process is halted. When the AOC bit is one and the HRNL bit is zero, the registration block is skipped and processing continues if a registration block specifies an LCID that is not assigned. When the AOC bit is one and the HRNL bit is one, processing is halted when a registration block that specifies an LCID that is not assigned is processed. When the AOC bit is zero and the HRNL bit is zero, the registration block is skipped and processing continues if a registration block specifies an LCID that is not attached. When the AOC bit is zero and the HRNL bit is one, processing is halted when a registration block specifies and LCID that is not attached. This operation is ignored when the LCIDLC bit is zero.

(cc) Invalidate Without Reclaim Control (IWORC); A value that controls the reclaim process for registering local-cache entries. When zero, directory entries are reclaimed as required for either name assignment or registration-block assignment. When one, directory-entry reclaim is suppressed for both name assignment and registration-block assignment. If no free directory entries are available and the IWORC is one, the local cache entry is invalidated.

(dd) LCID-Unassignment Control (LUC): A value that controls the unassignment of the local-cache identifier. When the value is binary 1, the local-cache identifier is unassigned, and the local cache controls are reset. The LCID value is available for assignment. When the value is binary 0, the LCID vector and the local-cache controls attachment status are not updated.

(ee) Local-Cache Authority (LCAU): A value set by the program when the local cache is attached.

(ff) Local-Cache Identifier (LCID): A value that identifies a local cache. Valid LCIDs are from one to the LCIDLMT when a user is attached or detached.

(gg) Local-Cache-Identifier Location (LCIDLC): A value that designates the local-cache identifier to be used by the Register-Name-List command. When zero, the LCID in the MCB is used. When one, the respective LCID in the registration block is used for each registration operation.

(hh) LCR Read Type (LCRRT): A value that identifies the queue-type for a Read-Local-Cache-Registers command. It has the following encoding: 00 Read LCRs in a castout class; 01 Read LCRs in the WWCO queue; 10 Browse LCRs in a storage class; and 11 Read LCRs in a storage-class range.

(ii) LCR Restart Token (LCRRTK): A value that controls the processing of an LCR read operation against either a castout class, a storage class, or the WWCO queue that spans multiple commands.

(jj) Name Mask (NM): A value that determines the bytes used for name comparison.

(kk) Name-Replacement Control (NRC): A value that controls the name-replacement process. In the Read-For-Castout command, the name-replacement control is only meaningful when the local-cache-entry-registration control is set to one. 0 Suppress replacement; and 1 Replace name.

(11) Replacement Name (RN): A 16-byte value that identifies a data block being replaced in a local cache.

(mm) Structure Identifier (SID): A value that identifies a structure.

(nn) Suppress Read (SR): A value that indicates if the read function of the Read-and-Register command is suppressed. A one indicates that the read is suppressed, a zero indicates the read occurs.

(oo) Suppress Registration (SREG): A value that controls the LCEN-registration process for the Write-and-Register and Read-and-Register commands. 0,Register the LCEN; and 1 Suppress LCEN registration.

(pp) Starting Registration Index (SRX): A two-byte value that indexes to the first registration block in the data block for the Register-Name-List command. Valid indices are from 1 to the ending registration index.

(qq) Storage Class (STC): A value that identifies a storage class. The specified value must be within the range of defined storage classes.

(rr) Target-Count Priority Indicator (TCPI): A value that directs the setting for the target-count objects when a cache structure is created and the target structure size is zero. A value of binary '1' indicates that the target count objects are to be set to the values of the target count request operands. If these counts are not achievable, the structure is not created. A value of binary '0' indicates that initial allocation should proceed even though the target counts are not achievable, but the counts should be the targets counts possible. This operand is ignored unless a cache structure is being created and the target structure size is zero.

(ss) Target Directory-to-Data Ratio (TDTDR): A field consisting of two values that specify the target for the relative number of directory entries to data-area elements possible in the cache. The first value contains the first number and the second value contains the second number. The first number divided by the sum of the two numbers represents the fraction of the total count of directory entries and data-area elements that consists of directory entries. The second number divided by the sum of the two numbers represents the fraction of the total count of directory entries and data-area elements that consist of data-area elements. The first number is to nonzero. The second number divided by the first number is not to exceed the maximum data-area size. When the second number is zero and the cache structure is being created, no data-area elements are created, and the cache structure is said to be a directory-only cache.

(tt) Target Directory-Entry Count (TGDEC): A value that specifies the target for the maximum number of possible directory entries in a cache structure. Valid counts are, for instance, from 0 to $2^{32}-1$. When the cache is not a directory-only cache, the value of the target data-area-element count divided by the value of the target directory-entry count is not to exceed the maximum data-area size. This operand is ignored unless one of the following conditions occurs:
1. A cache structure is created and the target structure size is zero;
2. Allocation parameters are being computed and the target structure size 5 is zero.

(uu) Target Data-Area-Element Count (TGDAEC): A value that specifies the target for the maximum number of data-area elements that are available for assignment to directory entries in a cache structure. Valid counts are from 0 to $2^{32}-1$. When the cache is a directory-only cache, the target data-area-element count is to be zero. When the cache is not a directory-only ache, the value of the target data-area-element count divided by the value for the target directory-entry count is not to exceed the maximum data-area size. This operand is ignored unless one of the following conditions occurs:
A cache structure is created and the target structure size is zero;
Allocation parameters are being computed and the target structure size is zero.

(vv) Target-Ratio Validity Indicator (TRVI): A value that, when one, indicates that the value of the target-directory-to-data-ratio request operand should be placed in the pending-directory-to-data ratio object. When the value is zero, the TDTDR request operand is ignored. This operand is ignored unless a structure is being created and the target structure size is zero.

(ww) Target Structure Size (TSS): A value that specifies the target number of units to be allocated. Valid sizes are, for instance, from the coupling facility storage increment to a maximum of $2^{44}-4k$ bytes in integral multiples of the coupling facility increment.

(xx) User Data Field (UDF): The user data field contains a value that is associated with the data when it is initially changed in the coupling facility cache and is maintained until the data area is re-used. The user data field is valid when the data is cached as changed. The user data field contains a time value or timestamp, which represents the oldest point in time when the data element is changed and that change has not yet been migrated to DASD.

(yy) UDF Order Queue Indicator (UDFOQI): A value that indicates the presence or absence of UDF-order queues in the castout classes. The two possible values are: 0 UDF-order queues are not present; and 1 UDF-order queues are maintained. When the indicator has a value of one, a UDF-order queue is associated with each castout class.

(zz) Version Number (VN): An integer value. This request operand is ignored unless the version-request type specifies replace the directory-entry version number.

(1) Version Comparison Request Type (VCRT): A value that indicates how the version number comparison is performed when the first bit of the version request type is binary "1". It has the following encoding: 0 Compare version-number object as equal to the CVN operand; 1 Compare version-number object as less than or equal to the CVN operand. This request operand is ignored unless the first bit of the version request type is binary "1".

(2) Version-Request Type (VRT): A value that indicates the type of version-number request. The first bit has the following encoding: 0 No action; and 1 Compare version numbers. The second and third bits have the following encoding: 00 No action; 01 decrement the version number; 10 Increment the version number; and 11 Replace the version number. The first bit acts as a validity bit for the comparative-version-number request operand. On a name-assignment operation, the first bit is ignored. The second and third bits are ignored when an invalidate-name or invalidate-name-list command is executed.

Referring to FIGS. 17c–17d, one embodiment of the list operands is described, as follows:

(a) Adjunct List Entry (ALE): A value that is read from or written to an adjunct list entry. This request operand is ignored unless the list structure has adjunct list entries and (1) a create operation is requested or (2) the list entry type specifies an adjunct list entry and a replace operation is requested.

(b) Allocation Type (AT): A value that indicates what action an allocate command should take. The first bit is the directed ECR indicator (DECRI), the next two bits are the ratio indicators (RI), the fourth bit is the structure-size indicator (SSI), and the fifth bit is the user-structure-control indicator (USCI).

(c) Attachment Override Control (AOC): A value. that controls the testing of the attachment status for the register event monitors and register list monitor commands. When the attachment override control is one and the UID is assigned, the register event monitor operation or the register list monitor operation, or the register event queue monitor operation is performed regardless of the attachment status of the user. When the attachment override control is zero and the user is not attached, the command is completed with a request exception and the UID is invalid, except for the Register Event Monitors command which may respond differently based on the UID location bit and the halt register events monitors bits.

(d) Apportionment Priority Indicator (API): A value that directs the resolution of conflicts in the establishment of an accurate ratio in an expansion or contraction process or when the list is initially allocated. A value of binary '1' indicates that maintaining an accurate ratio is of higher priority than maximizing the amount of storage resources that are assigned to the structure. A value of binary '0' indicates that maximizing storage resources if of higher priority and a less accurate ratio will be tolerated.

(e) Assignment Key Increment (AKI): A value that is added to the value of the assignment key when the assignment key is updated. This request operand is ignored unless the list entries are keyed, the assignment key request type is not zero, and the assignment key update type is binary '1'.

(f) Assignment Key Request Type (AKRT): A value that indicates when the list entry key is set to the value of the assignment key in the list controls. It has the following encoding: 00 List entry key not assigned; 01 List entry key assigned on move; 10 List entry key assigned on create; and 11 List entry key assigned on create or move. This request operand is ignored unless the list entries are keyed.

(g) Assignment Key Update Type (AKUT): A value that indicates how the assignment key is updated. It has the following encoding: 0 Assignment key not updated; and 1 Increment assignment key. This request operand is ignored unless the list entries are keyed and the assignment key request type (AKRT) is not zero.

(h) Attachment Request Type (ART): A value that indicates whether the user is to be placed in the attached state when the user identifier is assigned. The bit has the following encoding:0 Attach the user; and 1 Leave the user detached.

(i) Bounded Counts Priority Indicator (BCPI): A value that constrains the setting of the target count objects when a list structure is created and the target structure size is zero, or initial allocation is complete and directed ECR is requested. A value of binary "1" indicates that the target count objects are not to exceed the values of the target count request operands, but should be the largest counts possible given this constraint. A value of binary "0"indicates that setting of the target count objects is not constrained to be less than or equal to the target count request operands. This operand is ignored unless (1). a list structure is being created and the target structure size and target-counts-priority indicator are both zero, or (2) the directed ECR indicator is binary "1".

(j) Comparative Global-Lock Manager (CGLM): A value that is compared to the global lock manager object. This request operand is ignored unless the lock request type is valid and specifies a comparison of the global lock managers.

(k) Comparative List Authority (CLAU): A value that is compared to the list-authority object.

(1) Comparative Structure Authority.(CSAU): A value that is compared to the structure authority object.

(m) Comparative User Authority (CUAU): A value that is compared to the user authority object.

(n) Comparative Version Number (CVN): A value that is compared to the version-number object. This request operand is ignored unless the version-request type specifies version-number comparison.

(o) Cursor Direction (CDIR): A value that indicates how the list cursor is updated when the list cursor is maintained or initialized by a write list controls command. It has the following encoding: 0 Left to right; and 1 Right to left.

(p) Data List Entry Size (DLES): A value that specifies the size of the data list entry as an integral multiple of the list-element size. Valid sizes are, for instance, from 0 to the maximum data-list-entry size.

(q) Direction (DIR): A value that indicates how the positions of the list entries are numbered relative to a designated position. It has the following encoding: 0 Left to right; and 1 Right to left.

(r) Element Toleration Factor (ELTF): A value that, when divided by 100, specifies the minimum number of data list elements that may still be assigned to list entries or retry-data blocks, or both, after any checkpoint of a contraction, expansion, entry to element reapportionment or monitor to entry storage reapportionment process as a percentage of the total number of existing data list elements. Valid values are, for instance, from zero to 100. A value of zero implies that toleration is not requested. The operand is ignored if the lock indicator in the list structure type object is one and both data indicator and adjunct indicator are zeros, or if no contraction, expansion, entry to element reapportionment, or monitor to entry storage reapportionment process is requested.

(s) Ending Event Index (ETX): A value that indexes to the last event in the data block for the Register Event Monitors command. Valid indices are, for instance, from the STX to a maximum such that 64xETX is less than or equal to 64K.

(t) Ending List Number (ELN): A value that specifies the ending-list number for the Read Event Monitor Controls List command. The ELN is invalid if it is greater than or equal to the list count, or less than the starting list number.

(u) Entry Locator Type (ELT): A value that indicates how a list entry is located for a read, replace or delete operation, or as the source of a move operation.

(v) Entry Toleration Factor (ETF): A value that, when divided by 100, specifies the minimum number of list entries that may still be created after any checkpoint of a contraction, expansion, entry to element reapportionment or monitor to entry storage reapportionment process as a percentage of the total number of existing list entries. Valid values are, for instance, from zero to 100. A value of zero implies that toleration is not requested. The operand is ignored if the lock indicator in the list structure type object is one and both data indicator and adjunct indicator are zeros, or if no contraction, expansion, entry to element reapportionment, or monitor to entry storage reapportionment process is requested.

(w) Event Monitor Queue Indicator Control (EMQIC): A value that controls EMC enqueueing or withdrawal. The EMQIC bit is ignored if the INRT bit is zero. If the EMQIC bit is one and the INRT bit is one, the EMC is queued, not queued, withdrawn, or not withdrawn based on the EMQI bit. If the EMQIC bit is zero and the INRT bit is one, the EMC is queued, not queued, withdrawn, or not withdrawn based on the state of the sublist.

(x) Event Monitor Toleration Factor (EMTF): An integer that, when divided by 100, specifies the minimum number of event monitor controls that may still be created after any checkpoint of a contraction, expansion, entry to element reapportionment, or monitor to entry storage reapportionment process as a percentage of the total number of existing event monitor controls. Valid values are, for instance from zero to 100. A value of zero implies that toleration is not requested. The operand is ignored if the key indicator in the list structure type object is zero, or if no contraction, expansion, entry to element. reapportionment, or monitor to entry storage reapportionment process is requested.

(y) Event Notification Entry Number (ENEN): A value that specifies a list-notification-vector entry associated with an event queue.

(z) Event Notification Request Type (ENRT): A value that indicates whether the list-notification-vector summaries are to be updated when an empty to not-empty state transition occurs on a monitored event queue. The bit has the following encoding: 0 Do not update the list notification vector summaries; and 1 Update the list notification vector summaries.

(aa) EMC Processed Count (EPC): A value that indicates the number of EMCs processed by the Read Event Monitor Controls List command and placed in the data block.

(bb) EMC Restart Token (ERT): A value that determines at which EMC the read event monitor control list command restarts reading. Invalid values for the EMC restart token are model-dependent.

(cc) Event Queue Monitoring Active Bit (EQMAB): A value that specifies whether the user associated with the event queue is monitoring the event queue. The bit has the following encoding: 0 Not Monitoring the event queue; and 1 Monitoring the event queue.

(dd) Halt Register Event Monitors (HREMS): A value that controls if an EMC is not registered and skipped or the registration process is halted. When the AOC bit is one and the HREMS bit is zero, the EMC is skipped and processing continues if an EMC specifies a UID that is not assigned. When the AOC bit is one and the HREMS bit is one, processing is halted when an EMC that specifies a UID that is not assigned is processed. When the AOC bit is zero and the HREMS bit is zero, the EMC is skipped and processing continues if an EMC specifies a UID that is not attached. When the AOC bit is zero and the HREMS bit is one, processing is halted when an EMC that specifies a UID that is not attached is processed.

(ee) Initial Notification Request Type (INRT): A value that indicates whether to notify a monitor of the initial state of the monitored object except that when the request-monitor type specifies an event monitor and the EMQIC bit is one, the initial state of the monitored object is ignored and the EMQI bit in the REMS registration block is used. When the monitor request type specifies a list monitor, the initial notification request type has the following encoding: 0 No action; and 1 Notify the list monitor.

When the monitor request type specifies an event queue monitor, the initial notification request type has the following encoding: 0 No action; and 1 Notify the event queue monitor.

When the monitor request type specifies an event monitor, the initial notification request type has the following encoding: 0 No action; and 1 Queue or withdraw the event monitor controls object.

(ff) Key Request Type (KRT): A value that indicates how a keyed list entry is located when an entry is replaced, moved, read or deleted. For the Read List command, when the key comparison type operand is one, the key request type operand also specifies how keys are compared.

(gg) List Authority Comparison Type (LAUCT): A value that indicates the procedure for comparing the list authority. It has the following encoding:
00 Do not compare list authorities
01 Compare list authority object and CLAU operand for being equal
10 Compare list authority object for being less than or equal to the CLAU operand
11 Invalid
This request operand is ignored unless the entry is located by keyed or unkeyed position, by list cursor, or list number comparison is requested.

(hh) List Authority Replacement Type (LAURT): A value that indicates the procedure for updating the list authority. It has the following encoding:0 Do Not replace the list authority; and 1 Replace the list authority object with the LAU operand. This request operand is ignored unless the entry is located by keyed or unkeyed position, by list cursor, or list number comparison is requested.

(ii) List Count (LC): A value that specifies the number of lists to be allocated. Valid counts are, for instance, from 1 to the list number limit.
(jj) List Cursor (LCUR): A list-entry identifier that identifies a list-cursor position. The LCUR is initialized to zeros.
(kk) List Cursor Request Type (LCURT): The operand has the following encoding:0 Do not update the list cursor; and 1 Update the list cursor.
(ll) List Cursor Update Type (LCUT): A value that indicates how a list cursor is updated when list cursor update is requested.
(mm) List Element Characteristic (LELX): A value that specifies the number of bytes in each list element. Valid sizes are, for instance, from 256 bytes to the maximum list element size in powers of 2.
(nn) List Entry Type (LET): A value that indicates which list entries are read or replaced upon normal completion of the command execution. The first bit is a data indicator (DI), and the second is an adjunct indicator (AI).
00 List entry not read or written
01 Adjunct list entry read or written
10 Data list entry read or written
11 Data list entry and adjunct list entry read or written
The first bit of the list entry type is ignored when data list entries are not allocated. The second bit of the list entry type is ignored when adjunct list entries are not allocated. When a list entry is created, the list entry type operand is ignored. Instead-, the data an adjunct indicators from the list structure type object are used.
(oo) List Monitoring Active Bit (LMAB): A value that specifies whether the user associated with the list-monitor-table entry is monitoring the list.
The bit has the following encoding: 0 Not monitoring the list; and 1 Monitoring the list.
(pp) List Number Comparison Type (LNCT): A value that indicates whether list number comparison is requested. The operand has the following encoding: 0 Do not compare the list numbers; and 1 Compare the list numbers.
(qq) List Notification Request Type (LNRT): A value that indicates whether the list notification vector summaries are to be updated when an empty to not empty state transition occurs on a monitored list. The bit has the following encoding: 0 Do not update the list notification vector summaries; and 1 Update the list notification vector summaries.
(rr) List Number (LN): A value which partially designates a list in a list set. Valid numbers are, for instance, from zero to the list count less one.
(ss) Local Lock Bit (LLB): A value that is written to a local lock manager. This request operand is ignored unless a lock table is allocated and a local lock manager is compared or replaced.
(tt) Lock Request Type (LRT): A value that indicates the type of lock request.
When a single list entry command is issued, it following encoding:
000 No lock process requested
001 Invalid
010 Invalid
011 Invalid
100 Compare the global lock managers
101 Replace the global lock managers
110 Replace the local lock manager
111 Replace the global lock and local lock managers.
When a write lock table entry command is issued, it has the following encoding:
000 Invalid
001 Invalid
101 Invalid
011 Invalid
100 Invalid
101 Replace the global lock manager
110 Replace a local lock manager
111 Replace the global lock and local lock manager
When a read next lock table entry or multiple list entry command is issued, it has the following encoding:
000 No lock manager comparison
001 Invalid
010 Compare the local lock managers
011 Compare the global lock or local lock managers
100 Compare the global lock managers
101 Invalid
110 Invalid
111 Invalid
When a cleanup lock table entries command is issued, it has the following encoding:
000Invalid
001 Invalid
010 Cleanup the local lock managers
011 Cleanup the global lock and/or local lock managers.
100 Cleanup the global lock manager
101 Invalid
110 Invalid
111 Invalid
(uu) List Set Scan Identifier (LSSID): A value that is used to claim ownership of a set of list set scan controls. Zero is an invalid value.
(vv) List Set Scan Restart Token (LSSRT): A value that controls the processing of a list set scan operation that spans multiple commands.
(ww) LSSC Update Type (LSSCUT): A value that indicates how the list set scan controls are to be modified. The bit has the following
000 Claim next available list set scan controls
001 Complete list set scan for the list
010 Reset matching in progress list set can controls
011 Reset all in progress list set scan controls
100 Invalid
101 Invalid
110 Reset matching list set scan controls
111 Reset all list set scan controls.
(xx) List structure Type (LST): A value that indicates the list objects created on allocation. For example, the first bit is a element indicator (ECI), the second bit is a lockindicator (LI), the third bit is bit is a data indicator (DI), the fourth bit is an adjunct indicator (AI), the fifth bit is a name indicator (NI), and the sixth bit is a key indicator (KI).
(yy) Lock Table Entry Characteristic (LTEX): A value that specifies the number of bytes in each lock table entry. The value of the lock table entry size in bytes is the product of 2 raised to the power of the value specified in the lock table entry characteristic. Valid sizes are, for instance, from 1 byte to the maximum lock table entry size in powers of 2.
(zz) Lock Table Entry Count (LTEC): A value that specifies the number of lock-table entries allocated. Valid counts are, for instance, from 0 to $2^{32}-1$.

(1) Lock Table Entry Number (LTEN): A value that specifies an entry in a lock table. When a lock table is allocated, valid lock table entry numbers are from 0 to the lock table entry count less one. This request operand is ignored unless a valid nonzero lock request type is specified.

(2) Maximum Structure Size (MXSS): A binary integer that specifies the maximum number of 4,096-byte units allocated. Valid sizes are, for instance, from the smallest number or 4,096 units sufficient for creating the requested lock table entries, lists, associated controls, and at least one list entry when a list set is requested to a maximum of $2^{44}$–4,096 bytes.

(3) Programmable List Entry Identifier (PLEID): A system generated list entry identifier.

(4) Structure Identifier (SID): A value that identifies a structure.

(5) Starting List Number (SLN): A value that specifies the starting list number for the Read Event Monitor Controls List command. The SLN is invalid if it is greater than or equal to the list count, or greater than the ending list number.

(6) Starting Event Index (STX): A value that indexes to the first event in the data block for the Register Event Monitors command. Valid,indices are from 1 to the ending event index.

(7) Structure Authority (SAU): A value that is conditionally updated.

(8) Target Count Priority Indicator (TCPI): A value that directs the setting for the target-count objects when a cache structure is created and the target structure size is zero. A value of binary '1' indicates that the target count objects are to be set to the values of the target count request operands. If these counts are not achievable, the structure is not created. A value of binary '0' indicates that initial allocation should proceed even though the target counts are not achievable, but the counts should be the targets counts possible.

(9) Target Entry To Element Ratio (TETELR): A field consisting of two two-byte unsigned binary integers that specify the target for the relative number of list entries to list elements possible in the list set. The first two bytes contain the first number and the second two bytes contain the second number.

The first number divided by the sum of the two numbers represents the fraction of the total of the maximum list set element count and the maximum list set entry count that consists of list entries. The second number divided by the sum of the two numbers represents the fraction of the total of the maximum list set element count and the maximum list set entry count that consists of list elements associated with data list entries and retry-data block.

The second number is to be zero if the list is being created and the data indicator in the list structure type operand is zero. If the list is being created or the entry to element ratio is being reapportioned, and the data indicator is one, both numbers are to be nonzero. The second number divided by the first number is not to exceed the maximum data list entry size.

(10) Target Maximum Entry Count (TMEC): A value that specifies the target for the maximum number of possible list entries in a list set.

(11) Target Maximum Element Count (TMELC): A value that specifies the target for the maximum number of list elements that are available for assignment to list entries or retry-data blocks, or both, in the list set.

(12) Target Maximum Event Monitor Count (TMEMC): A value that specifies the target for the maximum number of event-monitor-controls objects that are available for registration of interest in subsidiary lists within the list set.

(13) Target Monitor To Entry Storage Ratio (TMTESR): A field consisting of two two-byte unsigned binary integers that specify the target for the relative amount of storage available for event monitor controls versus list entries and their associated controls. The first two bytes contain the first number and the second two bytes contain the second number.

The first number divided by the sum of the two numbers represents the fraction of the target structure size less the marginal structure size that is dedicated to event monitor controls. The second number divided by the sum of the two numbers represents the fraction of the target structure size less the marginal structure size that is dedicated to list entries and their associated controls.

When the first number is zero, the second number is assumed to be 100.

(14) Target Ratio Validity Indicator (TRVI): A value that, when one, indicates that the value of the target-directory-to-data-ratio request operand should be placed in the corresponding pending ratio objects. When the value is zero, the TETELR and TMTESR request operands are ignored.

(15) Target Structure Size (TSS): A value that specifies the target number of 4k-byte units allocated. This operand is ignored unless the structure is created, or an expansion or contraction request is successful.

(16) User Identifier (UID): An unsigned binary integer that identifies a user.

When the lock request type specifies global lock manager and local lock managers replacement, the user identifier specifies a global lock manager. Valid user identifiers are from one to the UIDL. When the lock request type specifies global lock manager replacement, the user identifier specifies a global lock manager and, when local lock managers exist, it also specifies a local lock manager. When the lock request type specifies local lock manager replacement or local lock manager comparison, the user identifier specifies a local lock manager.

(17) User Identifier Location (UIDLC): A value that designates the user identifier to be used by the Register Even Monitors command. When zero, the UID in the MCB is used. When one, the respective UID in the EMC in the data block is used for each of the EMCs.

(18) Version Comparison Request Type (VCRT): A value that indicates how the version number comparison is performed when the first bit of the version request type is binary '1'. It has the following encoding: 0 Compare version number object as equal to the CVN operand; and 1 Compare version number object as less than or equal to the CVN operand.

(19) Version Request Type (VRT): A three-bit value that indicates the type of version number request. The first bit has the following encoding: 0 No action; and 1 Compare version numbers.

The second and third bits have the following encoding: 00 No action; 01 Decrement the version number; 10 Increment the version number; and 11 Replace the version number.

(20) Write Event Queue Transition Count (WEQTC): A value that controls if the EQTC object is written by the RLM command. When the WEQTC bit has a value of one and the monitor request type specifies register event queue monitor, the EQTC object is written. Otherwise, the EQTC object is not written.

In one embodiment, rules governing aspects of the present invention (including, for instance, system-managed rebuild for cache, list and/or lock structures) are stored in an active coupling facility policy. As one example, the coupling facility policy is stored on a function data set, which is coupled to each central processing complex, as shown in the overview diagram of FIG. 18.

Figure 18:
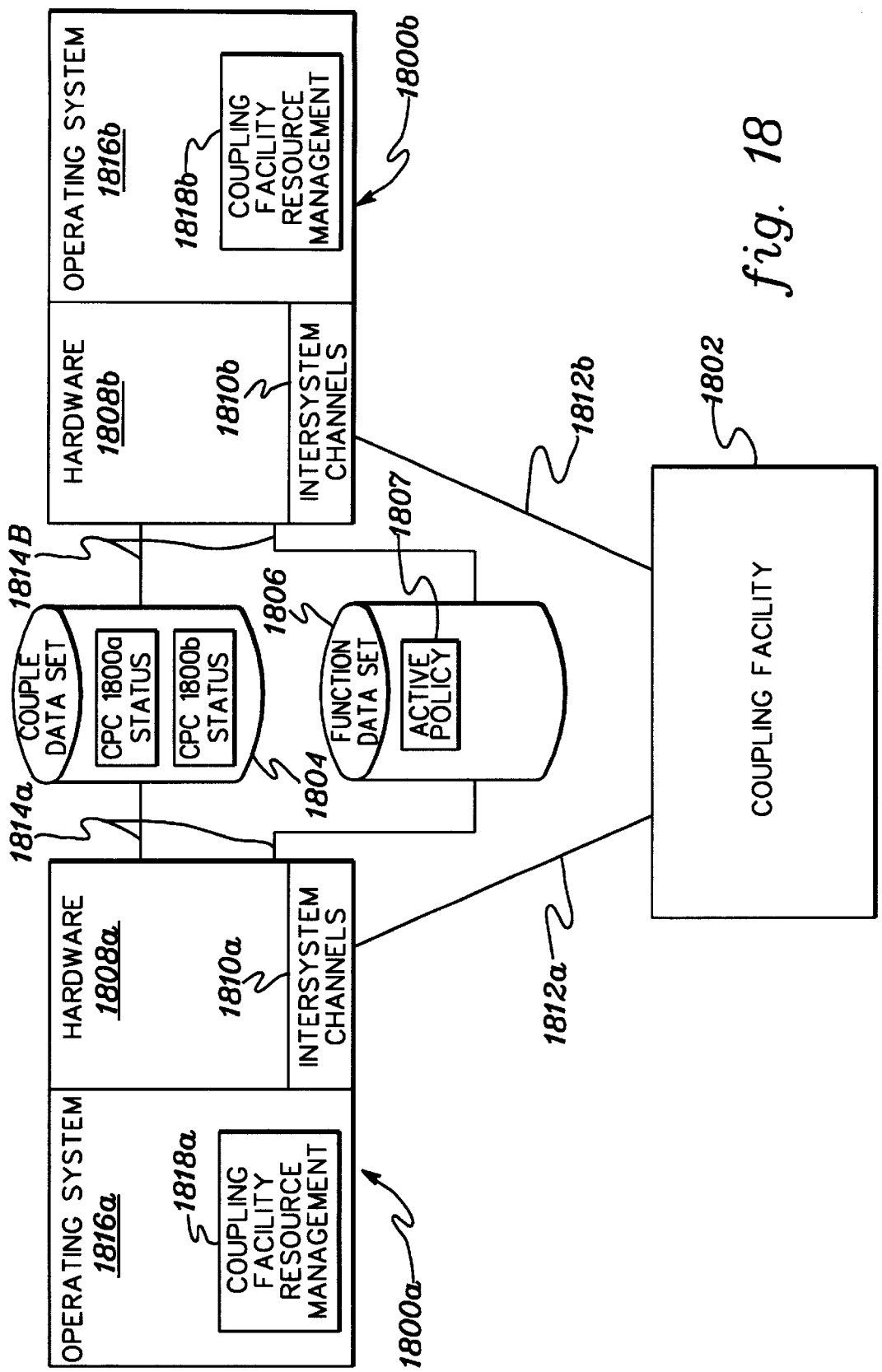
FIG. 18 illustrates one example of an overview diagram depicting an active policy coupled to central processing complexes, in accordance with the principles of the present invention.

Referring to FIG. 18, two CPC's (CPC 1800a and CPC 1800b) exist. Each CPC is coupled to a coupling facility 1802; a couple data set 1804, which includes the status for CPC 1800a and CPC 1800b; and a function data set 1806, which includes an active policy 1807 for coupling facility resources.

Each CPC includes hardware for connecting the respective CPC to the coupling facility and the couple and function data sets. In particular, located within CPC 1800a is hardware 1808a which includes, for instance, intersystem(I/S) channels 1810a to connect coupling facility 1802 via a bus 1812a to CPC 1800a, and I/O channels (not shown) to couple CPC 1800a via a link 1814a to couple data set 1804 and function data set 1806.

Similarly, located within CPC 1800b is hardware 1808b, which includes, for instance, I/S channels 1810b to connect coupling facility 1802 to CPC 1800b via a bus 1812b, and I/O channels(not shown) to couple CPC 1800b via a link 1814b to couple data set 1804 and function data set 1806.

In one embodiment, each CPC further includes an operating system 1816a, 1816b, respectively. Each operating system includes, as a part of XES services (see FIG. 1), a Coupling Facility Resource Manager (CFRM) 1818a, 1818b, respectively, which governs the coupling facility resource use in a sysplex. CFRM provides services to the installation to manage the coupling facility resources usage based on the customer environment. These services include, for instance, managing the gain/loss of function data set 1806, which contains CFR data; gain/loss of coupling facility 1802 access; cleanup of coupling facility resources for system failure; and controlling various aspects of the system-managed rebuild process of the present invention.

Figure 19:
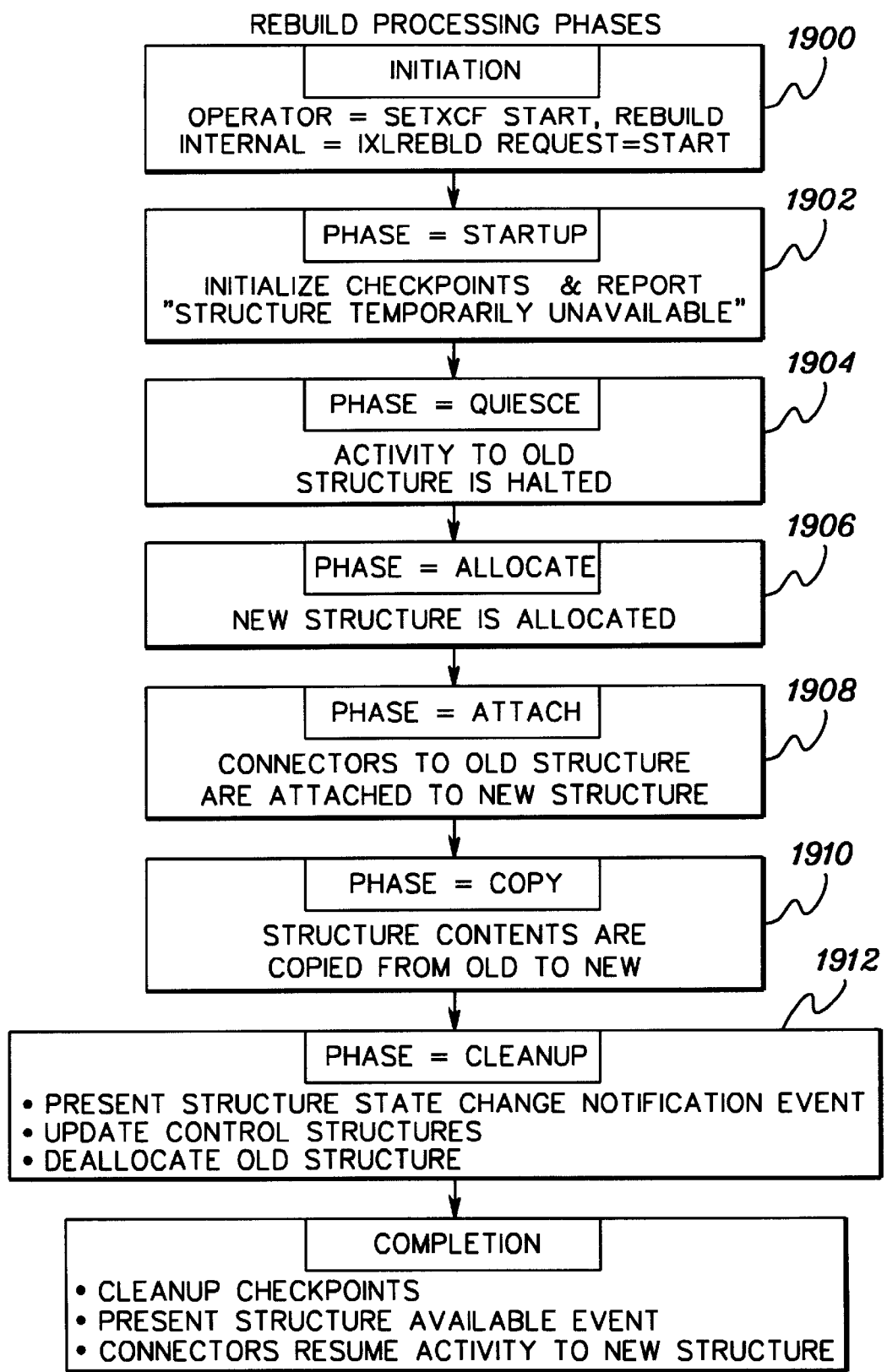
FIG. 19 depicts one embodiment of the phases associated with the system-managed rebuild processing of the present invention.

In accordance with one aspect of the present invention, system-managed rebuild enables the rebuilding of one structure into another structure of the same name, under the control of the operating system. As one example, it is the XES component (and in particular, CFRM) of the operating system that is controlling the processing. In order to perform a system-managed rebuild, a number of processing phases are executed. One example of these phases is depicted in FIG. 19 and described herein.

INITIATION

Figure 20:
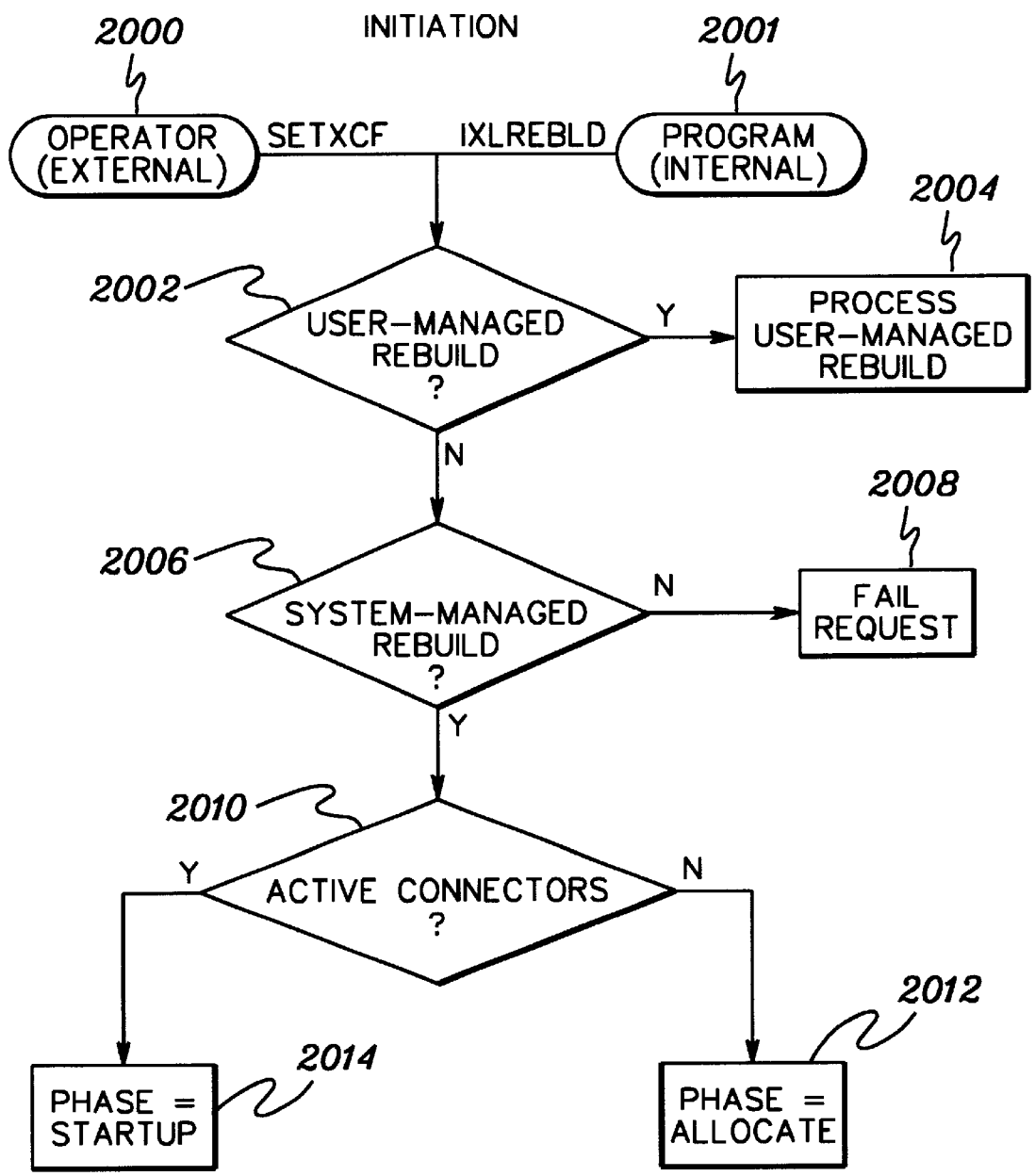
FIG. 20 depicts one embodiment of the logic associated with the initiation phase of FIG. 19, in accordance with the principles of the present invention.

A beginning phase of system-managed rebuild is the initiation phase, STEP 1900. During this phase a determination is made as to the type of rebuild being requested. One embodiment of the logic associated with the initiation phase is described with reference to FIG. 20.

The system-managed rebuild process can be started or stopped using either an operator command (2000)(e.g., SETXCF) or a programming interface (2001) (e.g., IXLREBLD). One example of IXLREBLD is described in U.S. U.S. Pat. No. 5,515,499 entitled "Method and System for Reconfiguring A Storage Structure within a Structure Processing Facility", Allen et al, Issued on May 7, 1996, which is hereby incorporated herein-by reference in its entirety.

Further, in one example, IXLREBLD has the following syntax:
REQUEST=START
  ,STRNAME=xstrname
    ,LOCATION=NORMAL
    ,LOCATION=OTHER
    ,LESSCONNACTION=TERMINATE|CONTINUE
  ,CFNAME=xcfname
    ,LOCATION=NORMAL
    ,LOCATION=OTHER
    ,LESSCONNACTION=TERMINATE|CONTINUE
  ,STARTREASON=LOSSCONN
  ,STARTREASON=STRFAILURE
  ,STARTREASON=CONNECTOR
    ,USERCODE=xusercode|0
  ,STARTREASON=OPERATOR
    ,CART=xcart
    ,CONSID=xconsid Where STRNAME indicates the structure name, CFNAME indicates the coupling facility name, and STARTREASON specifies the reason for starting the rebuild.

The operator command syntax is similar to the IXLREBLD syntax, except that startreasons are not specified by the operator, since the startreason is assumed to be "operator" when the SETXCF operator command is doing the initiating.

Regardless of how the rebuild process is initiated, once it is initiated, a determination is made as to whether user-managed rebuild is allowed, INQUIRY 2002. If there is at least one active connector to the structure and all active connectors support user-managed rebuild (ALLOWREBLD=YES is specified when the user connects to the structure), then a user-managed rebuild process is started, STEP 2004. The user-managed rebuild process enables a structure to be rebuilt under user control. One example of a user-managed rebuild process is described in "Method And System For Reconfiguring A Storage Structure Within A Structure Processing Facility," Allen et al., (Docket No. KI9-93-010AX), U.S. Pat. No. 5,515,499, Issued May 7, 1996, which is hereby incorporated herein by reference in its entirety.

Returning to INQUIRY 2002, if user-managed rebuild is not allowed, then a further determination is made as to whether system-managed rebuild is allowed, INQUIRY 2006. In one example, this determination is made, as follows:

(1) If active or active and failed-persistent connectors exist and they all indicate ALLOWAUTO=YES when they connect to the structure, then system-managed rebuild is allowed. In this case, the new structure is allocated with a different physical structure version number and the same logical structure version number as the old structure. A Structure State Change Notification event is presented at a later point in the process to the active connectors to inform them of the new physical structure version number, which can be saved for later use. Any subsequent connector or reconnector, is then able to compare the structure's current physical structure version number to the saved copy to determine if there were any changes (no changes, no recovery action).

(2) If there are active or active and failed-persistent connectors, and at least one does not indicate ALLOWAUTO, then the system-managed rebuild is not allowed.

(3) If only failed-persistent connectors exist (regardless of whether they ALLOWAUTO) or no connectors exist, then system-managed rebuild is allowed. In this case, the new structure is allocated with a different physical structure version number and the same logical structure version number as the old structure, but in most cases the physical structure number is changed to equal the old structure's physical structure version number before the system-managed rebuild completes. Any subsequent connector can compare the current physical structure version number to the saved copy to determine if there were any changes (no changes, no recovery action).

The processing that changes the physical structure version number of the new structure runs, for instance, at rebuild cleanup time, after the syncpoint has been reached.

In addition to the above, a variety of conditions can preclude initiation of a system-managed rebuild. These conditions, include, for instance, the following:

If the old structure is not allocated in a coupling facility that supports the system-managed rebuild architecture, then the start request is rejected.

If the old structure is a list/lock structure, but is not allocated with programmable list entry ids (described herein), the system-managed rebuild start request is rejected.

If there are active connections and at least one active connection is running on a system that does not support system-managed rebuild, the system-managed rebuild start request is rejected.

If system-managed rebuild is not allowed, then the rebuild request is failed, STEP 2008. However, if system-managed rebuild is allowed, then a further determination is made as to whether there are any active connectors that exist on the structure to be rebuilt, STEP 2010. If there are no active connectors, then the next phase of processing is the allocate phase, which is described in detail below, STEP 2012. However, if there are active connectors, then the next phase of processing is the startup phase, STEP 2014.

Returning to FIG. 19, subsequent to completing the initiation phase, CFRM transitions into the next phase of processing, STEP 1902. In one example, the next phase of system-managed rebuild is the startup phase, assuming there are active connectors to the structure being rebuilt.

STARTUP

Figure 21:
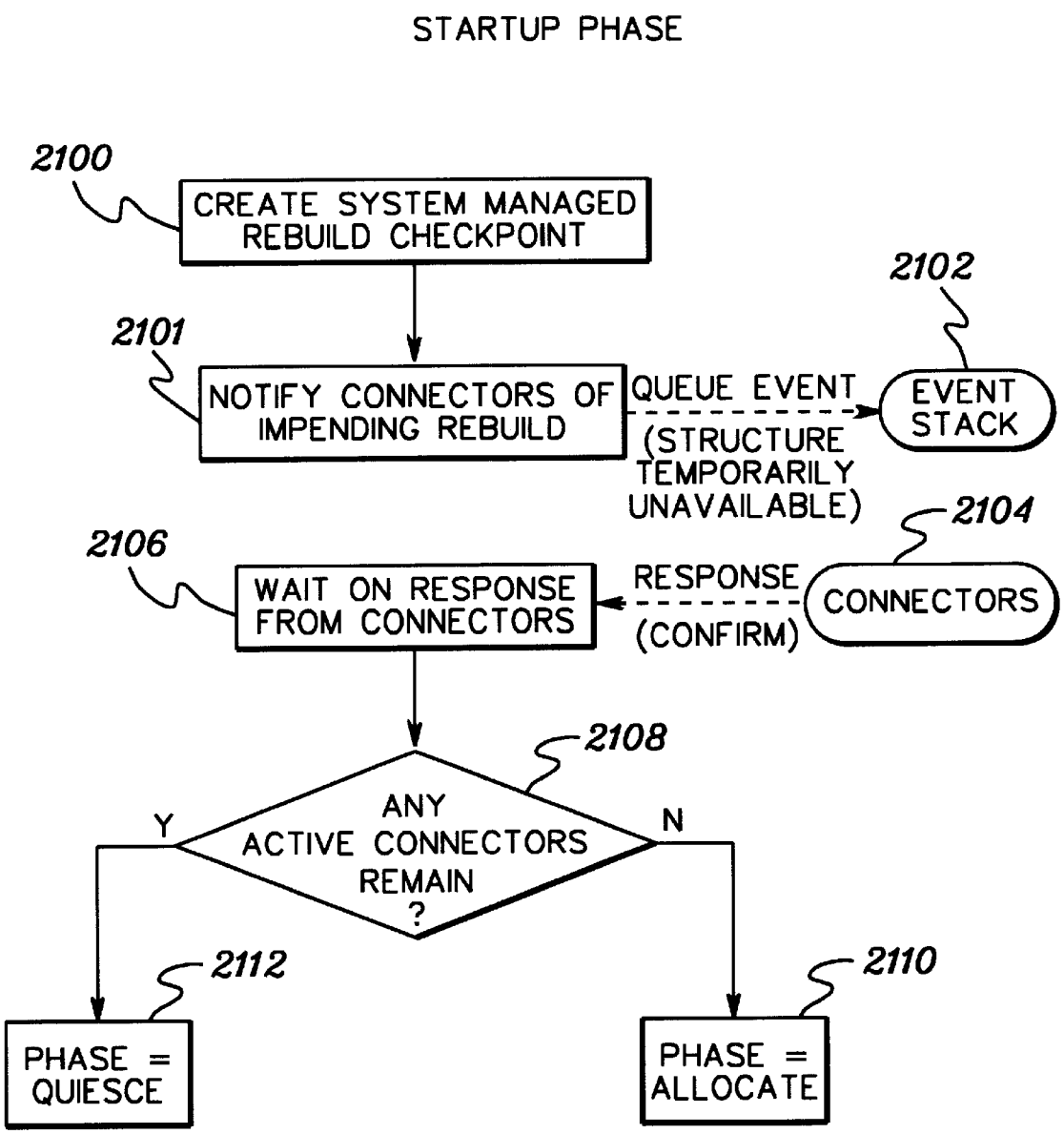
FIG. 21 depicts one embodiment of the logic associated with the startup phase of FIG. 19, in accordance with the principles of the present invention.

During the startup phase, checkpoints are initialized and users of the structure are notified that the structure will be temporarily unavailable. One embodiment of the startup phase is described with reference to FIG. 21.

Initially, a system-managed rebuild checkpoint is created, STEP 2100, and connectors to the structure are notified of the impending rebuild, STEP 2101. For example, a Structure Temporarily Unavailable Event is presented to the user's event exit (2102). This allows the connectors to prepare for the structure to be unavailable during the system-managed rebuild process, if they so chose. For example, since mainline requests are being internally queued during the rebuild process and will not be processed until rebuild is complete, the connectors could limit activity to the structure. Further, they could switch to alternative processing during the rebuild process, so that their application is not affected by the fact that requests are not being processed.

Each of the connectors that receives the Structure Temporarily Unavailable Event sends an event exit response (2104) indicating that it has received and processed the Structure Temporarily Unavailable Event.

The operating system waits for the responses from the connectors, STEP 2106. Once all of the connectors respond to the Structure Temporarily Unavailable Event, then a determination is made as to whether any active connectors remain, INQUIRY 2108. If there are no active connectors, then the next phase of processing is the allocate phase, STEP 2110. However, if active connectors do remain, then the next phase of processing is the quiesce phase, STEP 2112.

Returning to FIG. 19, subsequent to performing the startup phase, CFRM transitions into the next phase of processing, STEP 1904. In one example, the next phase of rebuild processing is the quiesce phase, assuming there are active connectors to the structure.

QUIESCE

Figure 22:
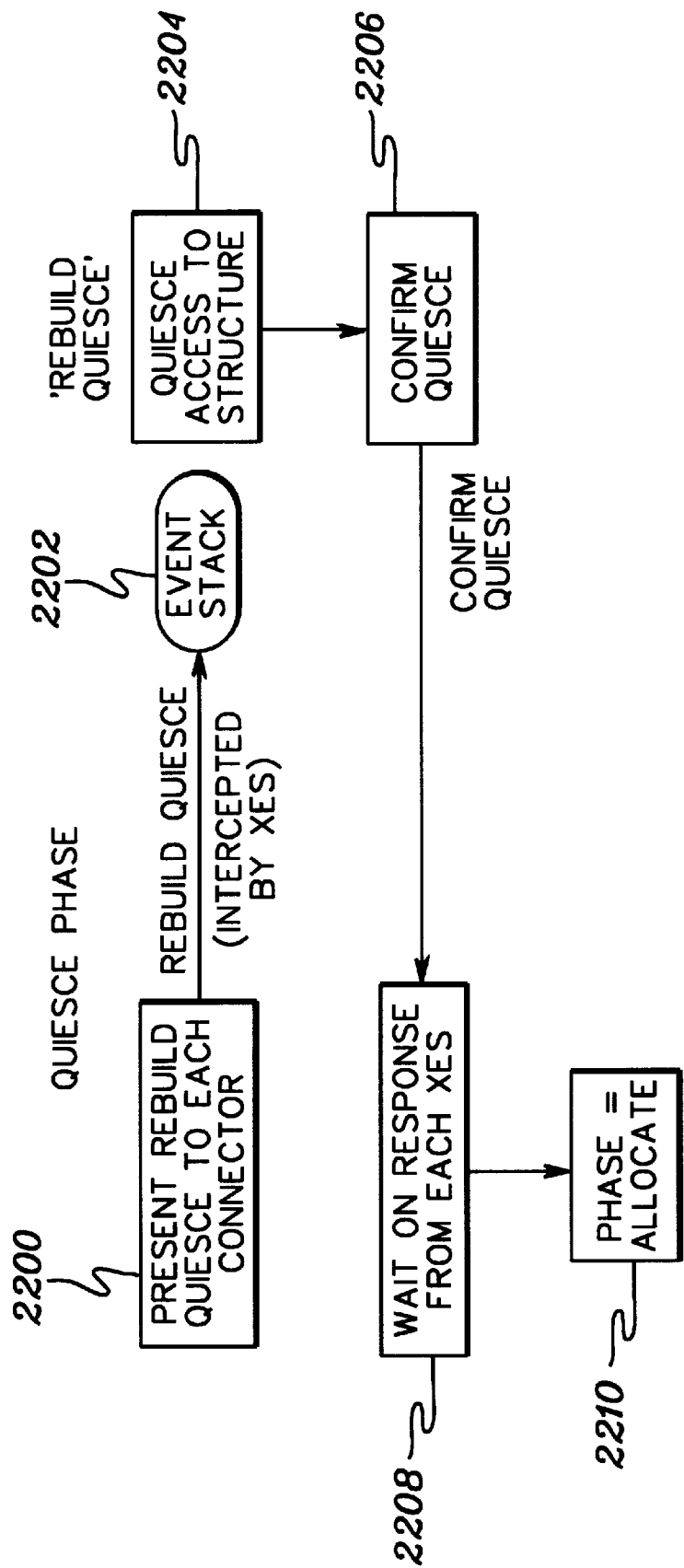
FIG. 22 depicts one embodiment of the logic associated with the quiesce phase of FIG. 19, in accordance with the principles of the present invention.

During the quiesce phase, activity to the old structure is halted. One embodiment of the processing associated with the quiesce phase is described with reference to FIG. 22. Initially, a Rebuild Quiesce Event is presented to each connector of the structure, STEP 2200. However, before the event reaches the connectors, it is intercepted by XES and thus, is never received by the connectors (2202). In one example, the events are intercepted as close as possible to where the user's exit would have been called.

When XES intercepts the event, the event exit quiesces access to the structure, STEP 2204. Thus, any requests of the structure are queued until the structure is unquiesced. As one example, to quiesce access to the structure XES sets an indicator so that any future coupling facility operations to the structure from the system will not be started. Any requests that have already been received from the user by XES and which are queued awaiting processing, are moved to a delay queue from which they will not be started until the structure is subsequently unquiesced. Any new requests received from the user after this point are similarly placed on the delay queue from which they will not be started until the structure is subsequently unquiesced. The user who submitted the request either receives a response code indicating that the request will be processed, and request results returned, asynchronously, or alternatively, the user's unit of work may be suspended for the duration of the system-managed rebuild quiesce, and then resumed after the request is driven to completion after the structure is unquiesced. Any currently active coupling facility requests that are actively executing against the structure are completed and the results are scheduled for return to the requester.

When the above steps are complete, XES has ensured that the current requests against the structure are done, and that no further requests to the structure can be started, until the structure is eventually unquiesced. Each system with an active connector performs this processing during the quiesce phase, so that all systems become quiesced.

Once the quiesce is complete, XES responds to the Rebuild Quiesce Event indicating completion, STEP 2206. CFRM waits for the responses from each XES confirming completion, STEP 2208. When all of the responses have been received, then the next phase of processing is initiated, STEP 2210.

Returning to FIG. 19, after the structure is quiesced, CFRM transitions into the next phase of processing, STEP 1906. In one example, the next phase of system-managed rebuild is the allocate phase.

ALLOCATE

The allocate phase is used to create a new structure within a coupling facility. In one embodiment, the new structure has the same characteristics as an existing structure (i.e., an old structure). The new structure is allocated within the same coupling facility as the existing structure or within a different coupling facility, either on the same system or a different system.

In one embodiment, the structure allocation process is a system-based (i.e., not connector based) process that is invoked by CFRM, and which runs under the CFRM main task. It runs under the main task, so that the allocation process can reference and update the CFRM policy. CFRM invokes the structure allocation process on a single system. This selected system is, for instance, the last system to confirm the quiesce phase processing.

Figure 23:
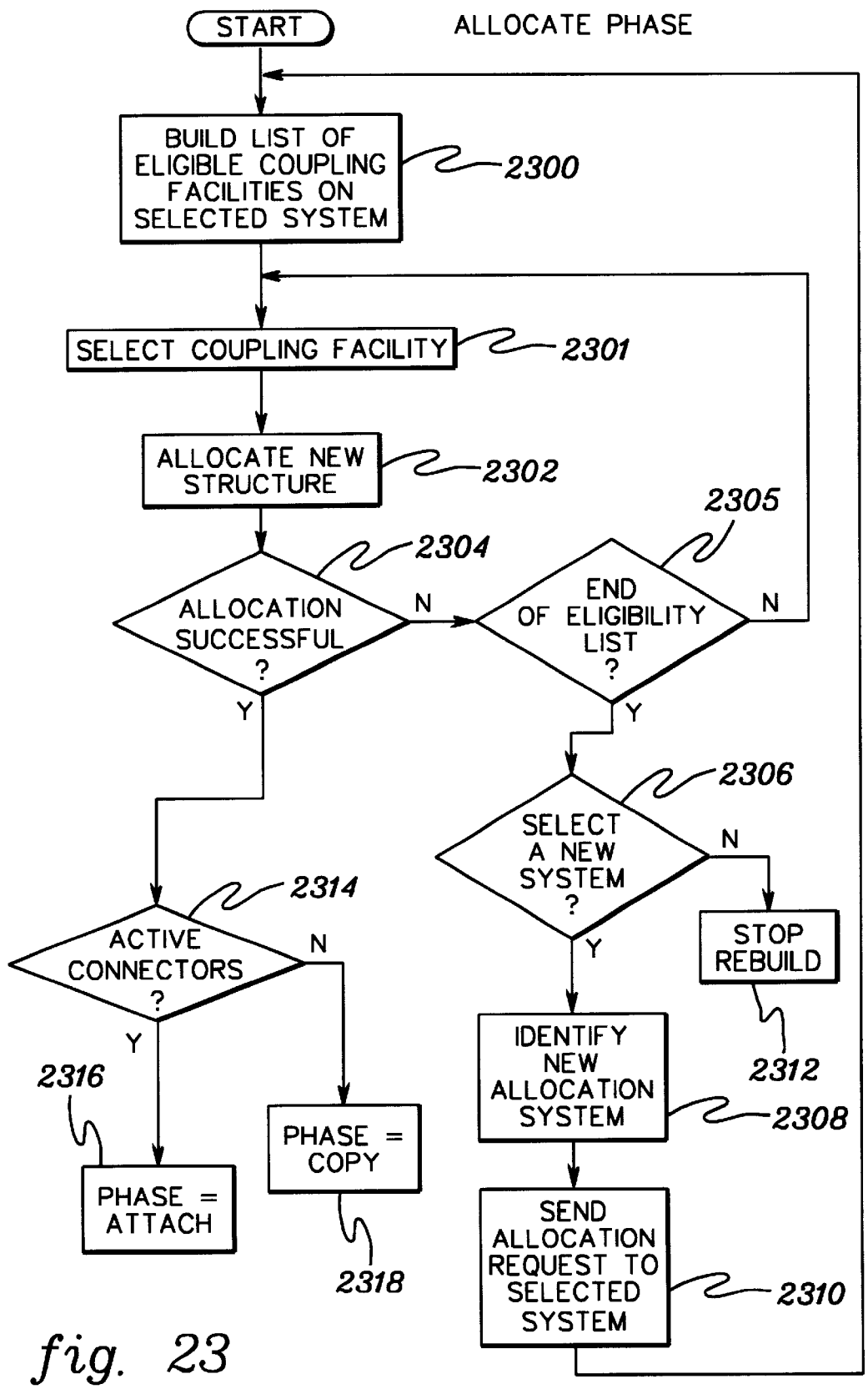
FIG. 23 depicts one embodiment of the logic associated with the allocate phase of FIG. 19, in accordance with the principles of the present invention.

One embodiment of the logic associated with the allocate phase is described with reference to FIG. 23. Initially, a list of eligible coupling facilities is built on the selected system, STEP 2300. This list includes one or more coupling facilities in which the structure may be allocated. The determination of the eligibility list is, in one example, based on various considerations. These considerations include, for instance, the following:

Application of pending policy:
Generally, pending policy changes are to take effect, except when the pending policy change includes a SIZE or INITSIZE change relative to the currently active policy. This size change might cause the structure to become unallocatable with the current total/maximum object counts. When the structure users, in aggregate, do not support structure alter, XES cannot inform the users of a change in their structure's allocated total/maximum object counts. Therefore, a pending policy change that includes a SIZE or INITSIZE change is left pending, when alter is not allowed. Upon completion of the system-managed rebuild, if a pending policy change is left pending, CFRM issues a message that indicates that the pending policy change did not take effect as a result of the rebuild, for this reason.

When a pending policy change is left pending, a rebuild-in-place in the same coupling facility is not allowed to occur. Thus, the current coupling facility location of the structure is dropped from the eligibility list.

LOCATION Specification:
When LOCATION(OTHER) is specified, a rebuild-in-place is prevented by dropping the current coupling facility location of the structure from the eligibility list.

Connectivity and the rebuild LESSCONNACTION specification:
In one embodiment, LESSCONNACTION (TERMINATE) is specified on ILXREBLD and thus, coupling facilities that do not provide full connectivity for all active connectors to the old structure are dropped completely from the eligibility list.

It is possible that the system running the eligibility list procedure does not itself have connectivity to one or more of the coupling facilities in the preference list. Such coupling facilities are dropped from the eligibility list, because the system cannot allocate the structure there. If this system is unable to allocate the structure, the structure allocation process is capable of routing the allocation process to run on a different system, which does have coupling facility connectivity to perform the allocation commands.

CFLEVEL:
The new structure is to be allocated in a coupling facility with a coupling facility level (CFLEVEL) that supports the architecture required by the system-managed rebuild function. Coupling facilities at a lower CFLEVEL are dropped from the eligibility list.

Furthermore, the old structure has associated with it a structure CFLEVEL value that is the highest CFLEVEL value that was told to any connector to the structure, since it was initially allocated. (Each connector is told the lower of the CFLEVEL requested by the connector and the actual CFLEVEL of the coupling facility in which the old structure was allocated.) From the standpoint of any structure user, and for the structure as a whole, the CFLEVEL may be increased, but not decreased, as a result of the rebuild.

To accomplish this, the structure CFLEVEL value from the old structure serves as the allocation floor for allocation of the new structure. Therefore, coupling facilities at a lower CFLEVEL than this allocation floor are dropped from the eligibility list.

Some of the connectors to the old structure may have requested a higher CFLEVEL than the CFLEVEL told connector value that they were told they connected to. Such connectors have a latent interest in a higher CFLEVEL and presumably might take advantage of higher CFLEVEL functions if the CFLEVEL could be raised to the level that they requested.

To attempt to accommodate this, XES examines the requested CFLEVEL for the entire set of active connectors, determines the highest requested CFLEVEL, and orders the eligibility list based on CFLEVEL so as to place coupling facilities, which satisfy the highest requested CFLEVEL ahead of coupling facilities, which do not satisfy this level. Later in the rebuild process, XES notifies connectors that their structure attributes may have changed as a result of the rebuild. Each connector is informed of a new told connector CFLEVEL value at that time.

Available space:
Eligibility list processing for available space differs depending on whether or not the structure users, in aggregate, support alter:
When alter is not supported:
When alter is not supported, directed allocation (described below) by target counts is used to attempt to allocate the structure with the same object counts that are present in the old structure. Eligibility list processing attempts to accommodate this as follows. The structure allocation process reads the structure attributes of the old structure and, for each coupling facility currently in the eligibility list, it uses the appropriate compute structure parameters command, providing these structure attributes as input, to determine what the target structure size (TSS) and minimum required control space (MRCS) would be for a structure which preserves the total object counts that are present in the old structure, with the maximum structure size (MXSS) value set equal to either the SIZE value from the structure's policy (after the pending policy size change, if any, is allowed to take effect) or to the computed actual structure size given the required counts, whichever is larger. One embodiment of the above computing is described in "Method And Apparatus For Previewing The Results Of A Data Structure Allocation," Dahlen et al., Ser.

No. 09/071,555, filed May 1, 1998; and in "Method And Apparatus For Expansion, Contraction, And Reapportionment Of Structured External Storage Structures", Dahlen et al., U.S. Pat. No. 5,581,737, Issued Dec. 3, 1996, each of which is hereby incorporated herein by reference in its entirety.

Once the TSS and MRCS to allocate the structure in each coupling facility are known, either the coupling facility has sufficient total available space and total available control space to accommodate the allocation of such a structure, or it does not. Any coupling facility which does not have enough of either kind of space is dropped from the eligibility list. All remaining coupling facilities have sufficient available space to accommodate the allocation of the new structure.

When alter is supported:

When alter is supported, directed allocation by target counts is not used to allocate the new structure. Rather, a target size for the new structure is calculated, which is the larger of the following sizes:

The current INITSIZE value from the policy (after the pending policy size change, if any, is allowed to take effect).

The structure size necessary to accommodate the actual in-use/changed objects present in the old structure, plus unchanged directory entries with registered interest for a cache structure, so that registration information can be copied, plus room for unused objects based on the toleration factors specified by the connectors.

This size is calculated by determining the actual in-use/changed counts (plus unchanged directory entries with registered interest for a cache structure), from the old structure; determining the composite toleration factors to be applied from the current set of active and failed-persistent connectors; increasing the actual counts by the toleration factors; and using the resulting object counts as input to the appropriate compute structure parameters command directed to a given coupling facility. The TSS and MRCS for such a structure are returned, along with the computed ratios.

By The actual target structure size is the larger of the above two TSS values, bounded by the maximum structure size (MXSS) specified by the SIZE parameter in the CFRM policy (if the calculated MXSS exceeds the SIZE parameter in the CFRM policy, then the structure is not allocated in that coupling facility, and the coupling facility is dropped from the eligibility list). The calculated TSS, MRCS, and structure ratios are saved in the eligibility list element for each of the possible target coupling facilities. Eligibility list processing attempts to accommodate allocation of a structure with this size as follows.

The eligibility list is sorted based on space considerations to place coupling facilities that currently have enough available space and enough available control space to accommodate the calculated structure values (for that given target coupling facility) ahead of those coupling facilities which do not, and among those coupling facilities which do not, to sort them in descending order of available space to provide for a best fit allocation based on available space.

By calculating the TSS in this manner, (a) the target structure size may differ somewhat from the old structure's size, even if there was no change to the INITSIZE specified in the policy, and (b) if there was a change to the INITSIZE specified in the policy, it may not be able to be completely accommodated due to the actual in-use/changed counts in the old structure. However, the INITSIZE that is specified in the policy is accommodated to the best degree as possible, permitting only those discrepancies that are used to ensure that the new structure is allocatable with sufficient space to accommodate the objects that are to be copied from the old structure.

For a cache structure, if no coupling facility can be found that accommodates the computed size to copy both the changed directory entries and data elements and the unchanged directory entries with registered interest, is being processed, the computations are redone passing in just the counts of changed directory entries and data elements (adjusted by toleration factors) as input, omitting the unchanged directory entries with registered interest. If at least one coupling facility can be found that can accommodate the MRCS and TSS that are so computed, then an attempt to allocate the structure in one of those coupling facilities is made, and an indicator is set specifying that registrations are not to be copied by the copy process for this structure. (When registrations are not copied, local vectors are cleared for the cache structure.)

Volatility:

If any connector to the old structure had requested nonvolatility at the time he connected (which CFRM remembers in the policy and the user controls), the eligibility list is sorted to give preference to nonvolatile coupling facilities. Otherwise, no sorting based on volatility is performed.

Failure-isolation:

Some or all of the connectors to the old structure may have requested failure-isolation (via requesting nonvolatility) at the time that they connected. Of those who requested failure-isolation, that requested failure-isolated state might or might hot actually have been achieved for any given connector. XES informs the connectors of their actual failure-isolation state at the time of connect.

When the new structure is allocated in a coupling facility, the failure-isolation state of some connectors may be different than that with respect to the old structure as a result of this. Because, prior to system-managed rebuild, failure-isolation was a static attribute, MVS does not report such changes in failure-isolation state. Thus, a Structure State Change Notification event is used to report such changes that occur as a result of a rebuild.

In eligibility list processing, XES attempts to provide failure-isolation for the subset of connectors who requested nonvolatility, giving consideration to both active connectors and failed-persistent connectors. Specifically, XES considers the failure-isolation attribute satisfied for a given coupling facility, if that coupling facility provides failure-isolation for all connectors who requested nonvolatility, and considers the failure-isolation attribute not satisfied for a given coupling facility, if the coupling facility fails to provide failure isolation for any connector who requested nonvolatility. Then, the coupling facilities in the eligibility list are ordered based on their satisfaction (or not) of the failure-isolation criterion.

Note that, in order to be able to determine whether or not particular coupling facilities provide failure-isolation with respect to particular connectors, use of system information for each coupling facility is used to determine whether a particular system (and thus, the active connectors running on that system) are failure-isolated with respect to a particular coupling facility. CFRM maintains system-level indicators for each coupling facility indicating whether or not the coupling facility and system are failure-isolated from one another, which can be used for this purpose.

Exclusion list:

The eligibility list is sorted to give preference to coupling facilities, which do not have any structure instances (old or new) allocated for any of the structures in the exclusion list.

Once all of the above eligibility list sorting and processing has been performed, a list of surviving candidate coupling facilities is provided, which is ordered by the eligibility list weight determined, as described above.

If the eligibility list becomes null at any point during the above eligibility list processing, the structure allocation process abandons the allocation attempt from this system and passes control to itself running on another system if possible. (In one embodiment, the attempt to pass control to another system occurs a limited number of times, e.g., one time). The system to which the responsibility is passed for running the structure allocation process performs its own eligibility list calculations based on its coupling facility connectivity and so forth.

If this system's eligibility list is null and it is not possible to pass the allocation responsibility to another system, then the rebuild process is stopped; the new structure cannot be allocated.

Once the list of eligible coupling facilities is built, the system selects a coupling facility from the list to be used in allocating the structure, STEP 2301. In one example, the first coupling facility on the eligibility list is selected.

Thereafter, an attempt is made to allocate the new structure within the selected coupling facility, STEP 2302. If this allocation attempt is unsuccessful, INQUIRY 2304, then a determination is made as to whether the end of the eligibility list has been reached, INQUIRY 2305. If the end has not been reached, then the next coupling facility on the list is selected, STEP 2301. However, if the end of the list has been reached, then a further determination is made as to whether a new system is to be selected to run the allocate process, INQUIRY 2306. In one example, a new system is selected once.

If a new system is to be selected, then the particular system is chosen, STEP 2308. In one example, the new system selected is based on the following criteria: whether it is capable of performing the allocate (e.g., appropriate CFLEVEL); it has connectivity to the coupling facility of the old structure; and it has the best connectivity to other coupling facilities into which the structure can be rebuilt. Thereafter, the allocation request is sent to the selected system, STEP 2310, and processing continues with STEP 2300 to build an eligibility list.

Returning to INQUIRY 2306, if a new system is not to be selected (e.g., since the predetermined number of times to select a new system has been exceeded), then the rebuild processing stops, since the structure cannot be allocated, STEP 2312.

Returning to INQUIRY 2304, if the allocation process is successful, then a further determination is made as to whether there are active connectors to the new structure, INQUIRY 2314. If there are active connectors, then the next phase of processing is the attach phase, STEP 2316. However, if there are no active connectors, then the next phase of processing is the copy phase, STEP 2318.

Further details associated with the allocation process are described herein. In one example, allocation includes invoking either an Allocate Cache Structure (ACS) command to allocate a cache structure, or an Allocate List Structure (ALST) command to allocate a list structure. Each of these commands is described below.

One embodiment of an Allocate Cache Structure (ACS) command is described below. (A further example of ACS is described in "Method And Apparatus For Coupling Data Processing Systems," Elko et al., U.S. Pat. No. 5,317,739, Issued May 31, 1994, which is hereby incorporated herein by reference in its entirety.) In one example, the Allocate Cache Structure command includes a message command block, having, for instance, the following operands: a message header; a command code (CC); a structure identifier (SID); an adjunct assignment indicator (AAI); an apportionment priority indicator (API); a UDF order queue indicator (UDFOQI); an allocation type (AT); a maximum data area size (MDAS); a data toleration factor (DTF); a directory toleration factor (DITF); a target structure size (TSS); a maximum structure size (MXSS); a user structure control (USC); a structure authority (SAU); a comparative structure authority (CSAU); a data area element characteristic (DAEX); a maximum storage class (MSC); a maximum castout class (MCC); a target directory to data ratio (TDTDR); a target directory entry count (TGDEC); a target data area element count (TGDAEC); a target counts priority indicator (TCPI); a target ratio validity indicator (TRVI); a name class mask (NCM); and an extended user structure control (EUSC).

In one example, the setting of the above operands (for ACS invocation) depends on the whether or not alter is allowed. If alter is not allowed, the operands are set as follows:

| | |
|---|---|
| SID - | obtained from SID vector scan of new coupling facility |
| AAI - | from a Read Cache Structure Information command (RCSI) (described herein) of old structure |
| UDFOQI - | from RCSI of old structure |
| API - | 0 (n/a for directed allocation with TCPI = 1) |
| AT - | 0 (n/a on initial allocation) |
| MDAS - | from RCSI of old structure |
| DTF - | 0 (n/a on initial allocation) |
| DITF - | 0 (n/a on initial allocation) |
| TSS - | 0 (to request directed allocation by target counts) |
| MXSS - | from SIZE specification in policy or computed actual structure size given the required counts, whichever is larger |
| USC - | from RCSI of old structure |
| SAU - | unique allocation TOD and SYSID |
| CSAU - | 0/SAU (depending on first/subsequent allocate command) |
| DAEX - | from RCSI of old structure |
| MSC - | from RCSI of old structure |
| MCC - | from RCSI of old structure |
| TDTDR - | from RCSI of old structure (old pending ratio PDTDR) |
| TGDEC - | from RCSI of old structure (old actual TDEC) |
| TGDAEC - | from RCSI of old structure (old actual TDAEC) |

-continued

| | |
|---|---|
| TCPI - | 1 (exact counts to be used) |
| EUSC - | from RCSI of old structure |
| TRVI - | 1 (set to indicate that the pending ratio is to be set from the specified target ratio operand). |

When alter is not allowed, any pending policy change that includes a size change is left pending. Directed allocation is used to attempt to allocate the new structure with the same total/maximum object counts from the old structure, passing in MXSS equal to the policy SIZE value, and passing the pending ratios from the old structure. If these counts cannot be achieved, the structure is not allocated in that coupling facility. If the new structure is allocated, its object counts are preserved between the old and new structure instances, as a result.

On the other hand, if alter is allowed, the operands are set as follows:

| | |
|---|---|
| SID - | obtained from SID vector scan of new coupling facility |
| AAI - | from RCSI of old structure |
| UDFOQI - | from RCSI of old structure |
| API - | based on RATIO specifications of connectors. If any connector specified RATIO = NO, indicating that an accurate ratio is important, specify API = 1. Otherwise, specify API = 0. |
| AT - | 0 (n/a on initial allocation) |
| MDAS - | from RCSI of old structure |
| DTF - | 0 (n/a on initial allocation) |
| DITF - | 0 (n/a on initial allocation) |
| TSS - | calculated TSS value for each coupling facility in eligibility list |
| MXSS - | from SIZE specification in policy |
| USC - | from RCSI of old structure |
| SAU - | unique allocation TOD and SYSID |
| CSAU - | 0/SAU(depending on first/subsequent allocate command) |
| DAEX - | from RCSI of old structure |
| MSC - | from RCSI of old structure |
| MCC - | from RCSI of old structure |
| TDTDR - | calculated target ratio for each coupling facility in eligibility list |
| TGDEC - | 0 (not doing directed allocation by target counts) |
| TGDAEC - | 0 (not doing directed allocation by target counts) |
| TCPI - | 0 (obtain best counts possible) |
| EUSC - | from RCSI of old structure |
| TRVI - | 0 (set to zero because it is only applicable to directed allocation by target counts). |

When alter is allowed, any pending policy change, including a SIZE or INITISIZE change, is allowed to take effect to the extent possible. Directed allocation is not used to allocate the new structure. Rather, allocation by target size, is employed, using the target size that was calculated for each coupling facility during the eligibility list available space processing described previously.

One embodiment of an Allocate List Structure (ALST) command is described below. (A further example of ALST is described in "Method And Apparatus For Coupling Data Processing Systems," Elko et al., U.S. Pat. No. 5,317,739, Issued May 31, 1994, which is hereby incorporated herein by reference in its entirety.) In one example, an Allocate List Structure command includes a message command block having, for instance, the following operands: a message header; a command code (CC); a structure identifier (SID); a target counts priority indicator (TCPI); an apportionment priority indicator (API); a target ratio validity indicator (TRVI); a list structure type (LST); a lock table entry characteristic (LTEX); a list element characteristic (LELX); a maximum data list entry size (MDLES); an allocation type (AT); an element toleration factor (ELTF); an entry toleration factor (ETF); a target entry to element ratio (TETELR); a lock table entry count (LTEC); a list count (LC); a target structure size (TSS); a maximum structure size (MXSS); a target monitor to entry storage ratio (TMTESR); a comparative structure authority (CSAU); a structure authority (SAU); a user structure control (USC); an event monitor toleration factor (EMTF); a target maximum element count (TMELC); a target maximum entry count (TMEC); a target maximum event monitor count (TMEMC); and an extended user structure control (EUSC).

As with the cache command, the setting of the above operands, in one example, depends on whether alter is supported. If alter is not specified, then the operands are set as follows:

| | |
|---|---|
| SID - | obtained from SID vector scan of new coupling facility |
| TCPI - | 1 (exact counts used) |
| API - | 0 (n/a for directed allocation with TCPI = 1) |
| TRVI - | 1 (set to indicate that the pending ratio is to be set from the specified target ratio operand). |
| LST - | from a Read List Structure Controls command (RLSC) (described herein) of old structure |
| LTEX - | from RLSC of old structure |
| LELX - | from RLSC of old structure |
| MDLES - | from RLSC of old structure |
| AT - | 0 (n/a on initial allocation) |
| ELTF - | 0 (n/a on initial allocation) |
| ETF - | 0 (n/a on initial allocation) |
| TETELR - | from RLSC of old structure (old pending ratio PETELR) |
| LTEC - | from RLSC of old structure |
| LC - | from RLSC of old structure |
| TSS - | 0 (to request directed allocation by target counts) |
| MXSS - | from SIZE specification in policy or computed actual structure size given the required counts, whichever is larger |
| TMTESR - | from RLSC of old structure (old pending ratio PMTESR) |
| CSAU - | 0/SAU (depending on first/subsequent allocate command) |
| SAU - | unique allocation TOD and SYSID |
| USC - | from RLSC of old structure |
| EMTF - | 0 (n/a on initial allocation |
| TMELC - | from RLSC of old structure (old actual MLSELC) |
| TMEC - | from RLSC of old structure (old actual MLSEC) |
| TMEMC - | from RLSC of old structure (old actual MEMCC) |
| EUSC - | from RLSC of old structure |

However, if alter is allowed, then the operands are set, as follows:

| | |
|---|---|
| SID - | obtained from SID vector scan new of coupling facility |
| TCPI - | 0 (obtain best counts possible) |

| | -continued |
|---|---|
| API - | based on RATIO specifications of connectors. If any connector specified RATIO = NO, indicating that an accurate ratio is important, specify API = 1. Otherwise, specify API = 0. |
| TRVI - | 0 (set to zero because it is only applicable to directed allocation by target counts). |
| LST - | from RLSC of old structure |
| LTEX - | from RLSC of old structure |
| LELX - | from RLSC of old structure |
| MDLES - | from RLSC of old structure |
| AT - | 0 (n/a on initial allocation) |
| ELTF - | 0 (n/a on initial allocation) |
| ETF - | 0 (n/a on initial allocation) |
| TETELR - | calculated ratio for each coupling facility in the eligibility list |
| LTEC - | from RLSC of old structure |
| LC - | from RLSC of old structure |
| TSS - | calculated TSS value for each coupling facility in eligibility list |
| MXSS - | from SIZE specification in policy |
| TMTESR - | calculated ratio for each CF in the eligibility list |
| CSAU - | 0/SAU (depending on first/subsequent allocate command) |
| SAU - | unique allocation TOD and SYSID |
| USC - | from RLSC of old structure |
| EMTF - | 0 (n/a on initial allocation) |
| TMELC - | 0 (not doing directed allocation by target counts) |
| TMEC - | 0 (not doing directed allocation by target counts) |
| TMEMC - | 0 (not doing directed allocation by target counts) |
| EUSC - | from RLSC of old structure |

One embodiment of the logic associated with allocating a new structure is described with reference to FIGS. 24a–24h. Initially, several inquiries are made to determine whether a structure allocation is being initiated or continued, or whether a structure is being expanded, contracted or reapportioned.

Figure 24A:
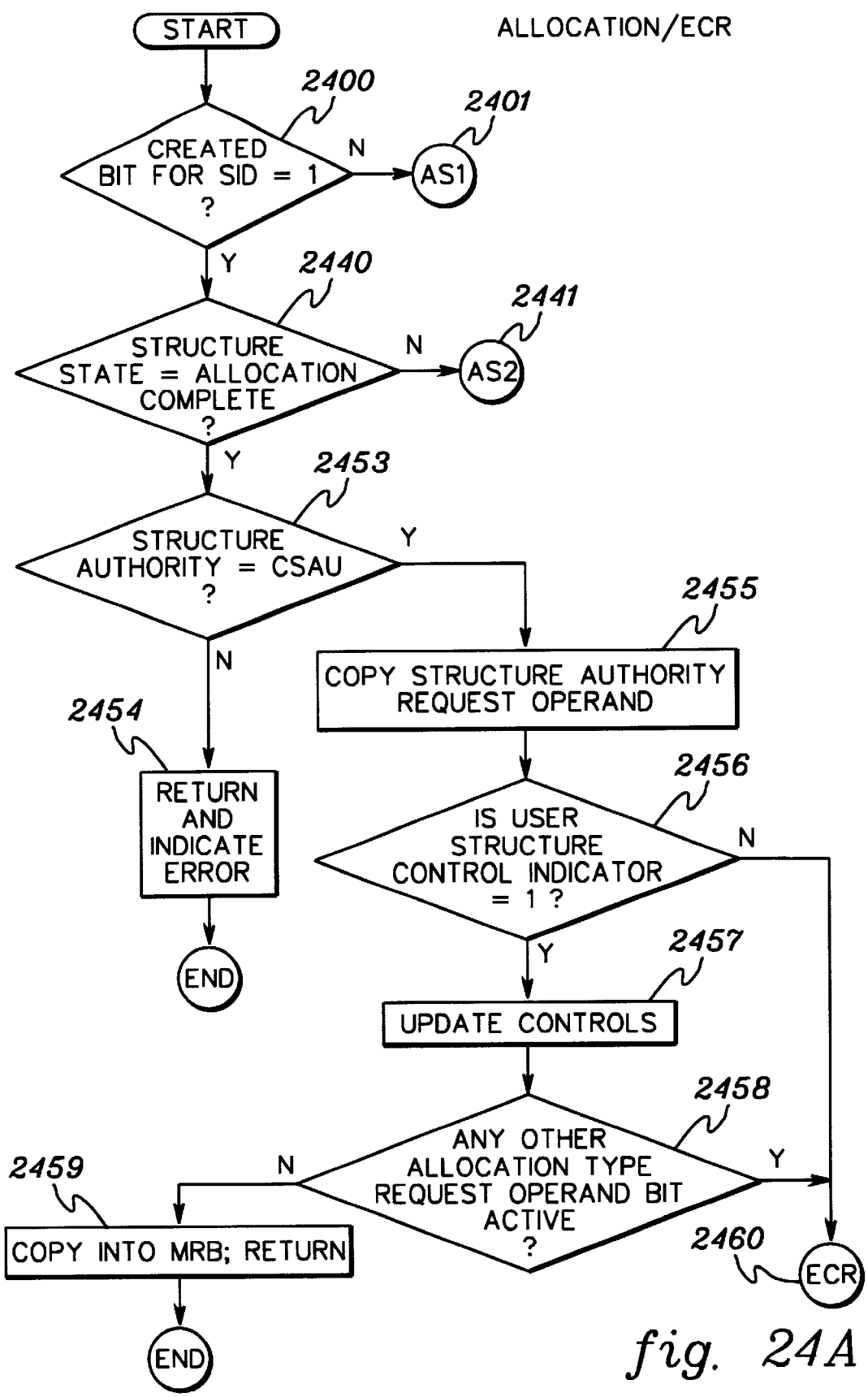
FIGS. 24a–24h depict one embodiment of the logic associated with allocating and/or expanding, contracting and reapportioning a structure, in accordance with the principles of the present invention.

For example, a determination is made as to whether the created bit (i.e., the bit indicating that the structure has been created) for the SID is equal to one, INQUIRY 2400 (FIG. 24a). If the created bit for the SID is not equal to one, then structure allocation is being initiated, STEP 2401.

Figure 24B:
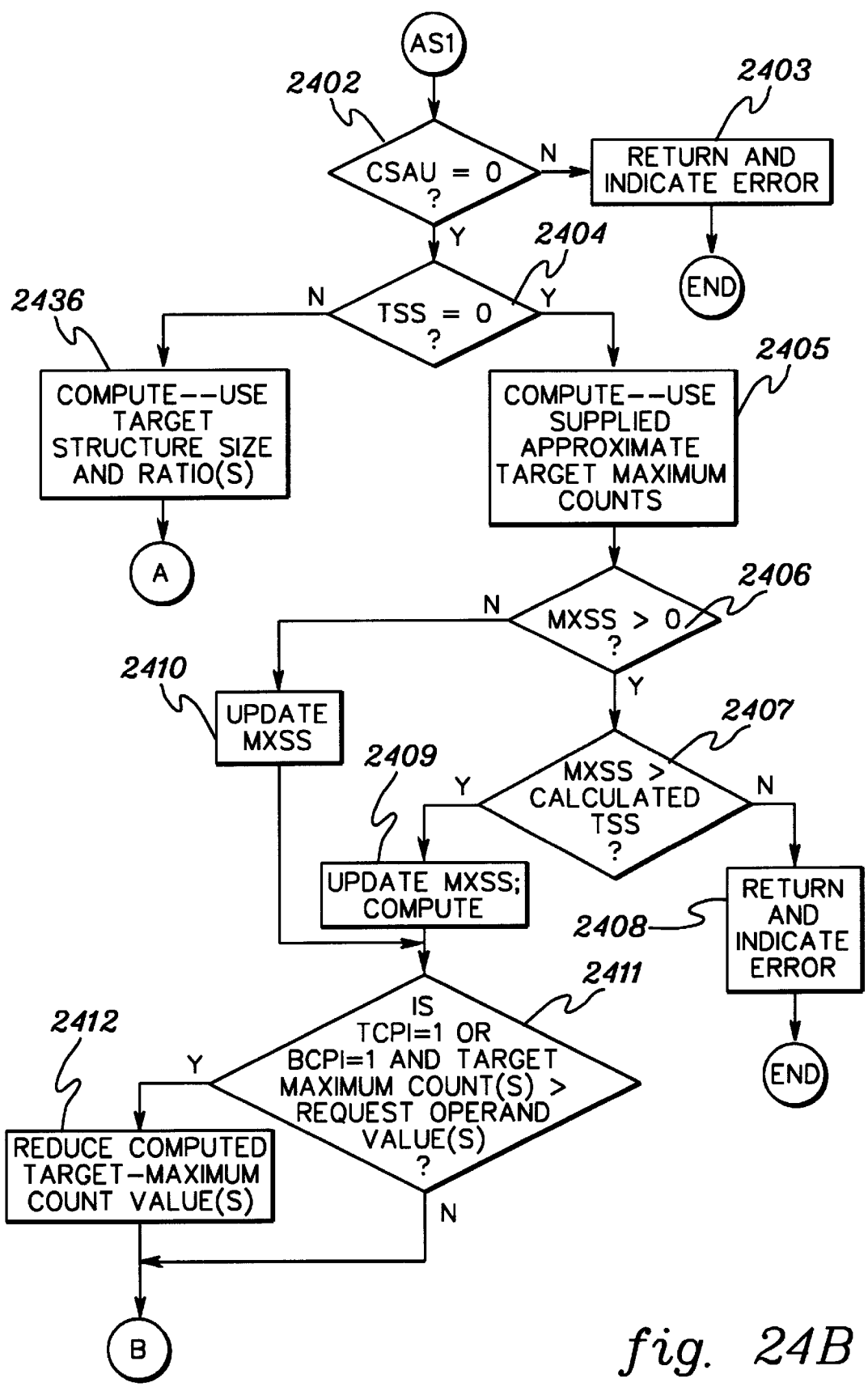

In performing the initial allocation, a determination is made as to whether the comparative structure authority operand is equal to zero, INQUIRY 2402 (FIG. 24b). Should the authority comparison fail, then an indicative response code is returned, STEP 2403. However, if the authority comparison is successful, then a further determination is made as to whether the target structure size (TSS) is equal to zero, INQUIRY 2404.

When the target structure size is equal to zero, then directed allocation is being performed. Directed allocation enables the specification of target maximum counts, and thus, allows an application to allocate a new structure that has the same characteristics as another structure (even when the coupling facility architecture level or implementation may be different). When directed allocation is specified, the target structure geometry (i.e., the distribution of structure resources) and actual target maximum counts are computed using supplied approximate target maximum counts as input, STEP 2405. The actual target maximum counts that are computed using the approximate target maximum counts supplied as request operands are greater than or equal to the approximate values. Additionally, the target ratio(s), the marginal structure size (MRSS) and the minimum apportionable structure size (MASS) are computed. Further, the maximum structure size (MXSS) is assumed to be the same as the calculated TSS.

Thereafter, a determination is made as to whether the maximum structure size (MXSS) request operand is greater than zero, INQUIRY 2406. If the MXSS request operand is greater than zero, then a further determination is made as to whether the maximum structure size request operand is greater than the target structure size, INQUIRY 2407. Should the MXSS operand be less than or equal to TSS, then an indicative error code is returned, STEP 2408, and processing of the allocate structure ends.

However, if the maximum structure size is greater than the target structure size, then MXSS is set equal to the MXSS request operand, STEP 2409. Additionally, the target structure geometry, the actual target maximum counts, MRSS, and MASS are recomputed as described above, but this time, the MXSS value supplied as a request operand is used in the computation. No change is made to the target ratio(s).

Returning to INQUIRY 2406, if MXSS is not greater than zero, then MXSS is set equal to the computed target structure size, STEP 2410.

After updating the maximum structure size, STEPS 2409, 2410, a determination is made as to whether the target-maximum count request operand values are in fact intended to serve only as approximations, INQUIRY 2411. Specifically, if the target counts priority indicator is equal to one or the bounded counts priority indicator is equal to one, then the target maximum count request operand values are not intended to be approximations—they are instead the exact values desired by the requester; in this case, any computed target maximum count value that is greater than the corresponding request operand value is reduced to the value of the corresponding request operand, STEP 2412.

Figure 24C:
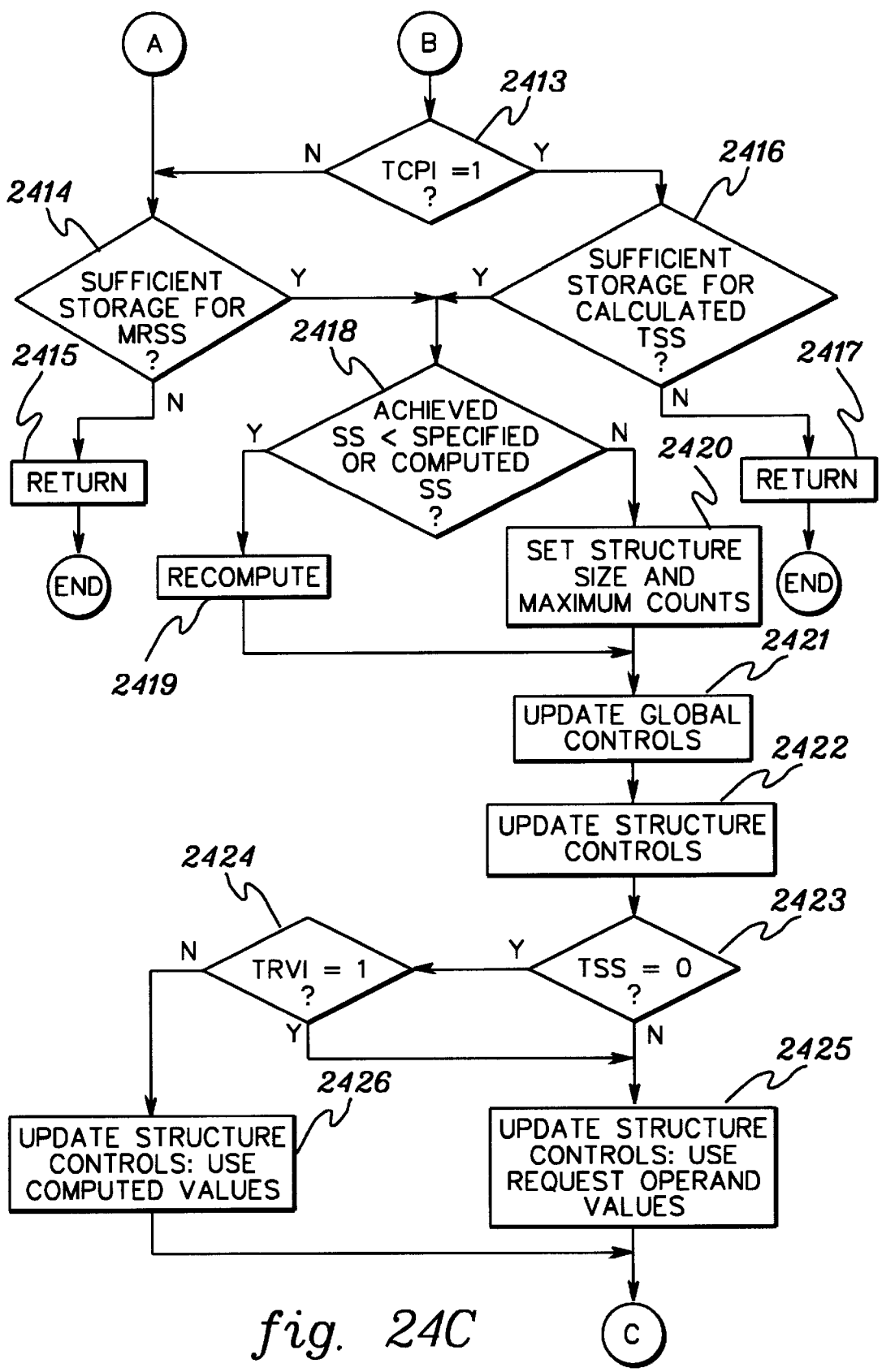

Subsequently, or if the request operand is to be an approximation, a determination is made as to whether a target counts priority indicator is equal to one, INQUIRY 2413 (FIG. 24c). If the target counts priority indicator is not equal to one, then a further determination is made as to whether there is sufficient storage to achieve the marginal structure size (MRSS), INQUIRY 2414. If there is insufficient storage, then an indicative response code is returned, STEP 2415. However, if there is sufficient storage, then processing continues as described herein.

Returning to INQUIRY 2413, if the target counts priority indicator is equal to one, then a further determination is made as to whether there is sufficient storage to satisfy the specified target maximum counts to achieve the target structure size, INQUIRY 2416. If there is insufficient storage to achieve the target structure size, then an indicative response code is returned, STEP 2417.

However, if there is sufficient storage to achieve either the marginal structure size or the target structure size, as the case may be, then processing continues, as described herein. In particular, a determination is made as to whether the achieved structure size is less than the specified or computed structure size (which is possible if TSS is greater than zero or TCPI is equal to zero), INQUIRY 2418. If the achieved structure size is less than the specified or computed structure size, then the target structure geometry and maximum counts are recomputed using the achieved structure size as input, STEP 2419. The target maximum counts, MRSS, MASS, TSS and MXSS remain unchanged.

However, if the achieved structure size is not less than the specified or computed structure size, then the structure size is set equal to the target structure size and the maximum counts are set equal to the target maximum counts, STEP 2420.

After recomputing the target structure geometry and the maximum counts or setting the structure size and maximum counts, the global controls are updated, STEP 2421. In one example, this includes setting the created bit for the structure identifier equal to one and associating storage frames with the SID.

Subsequently, various structure controls are updated, STEP 2422. For example, the structure size, target structure size, MXSS, MRSS, MASS, maximum counts, target maximum counts, SAU, USC, EUSC, etc. are updated.

Next, a determination is made as to whether the target structure size request operand is equal to zero, INQUIRY 2423. If it is equal to zero, then a further determination is made as to whether the target ratio validity indicator (TRVI) request operand is equal to one, INQUIRY 2424. Should the target structure size be equal to zero and the TRVI operand be equal to one or if the target structure size is not equal to zero, then structure controls are updated using request operand values, STEP 2425. In particular, the target ratio request operand value(s) are stored in the pending ratio(s). However, if the target structure size is equal to zero and the TRVI is not equal to one, then the structure controls are updated by storing the computed target ratio(s) into the pending ratio(s), STEP 2426.

Figure 24D:
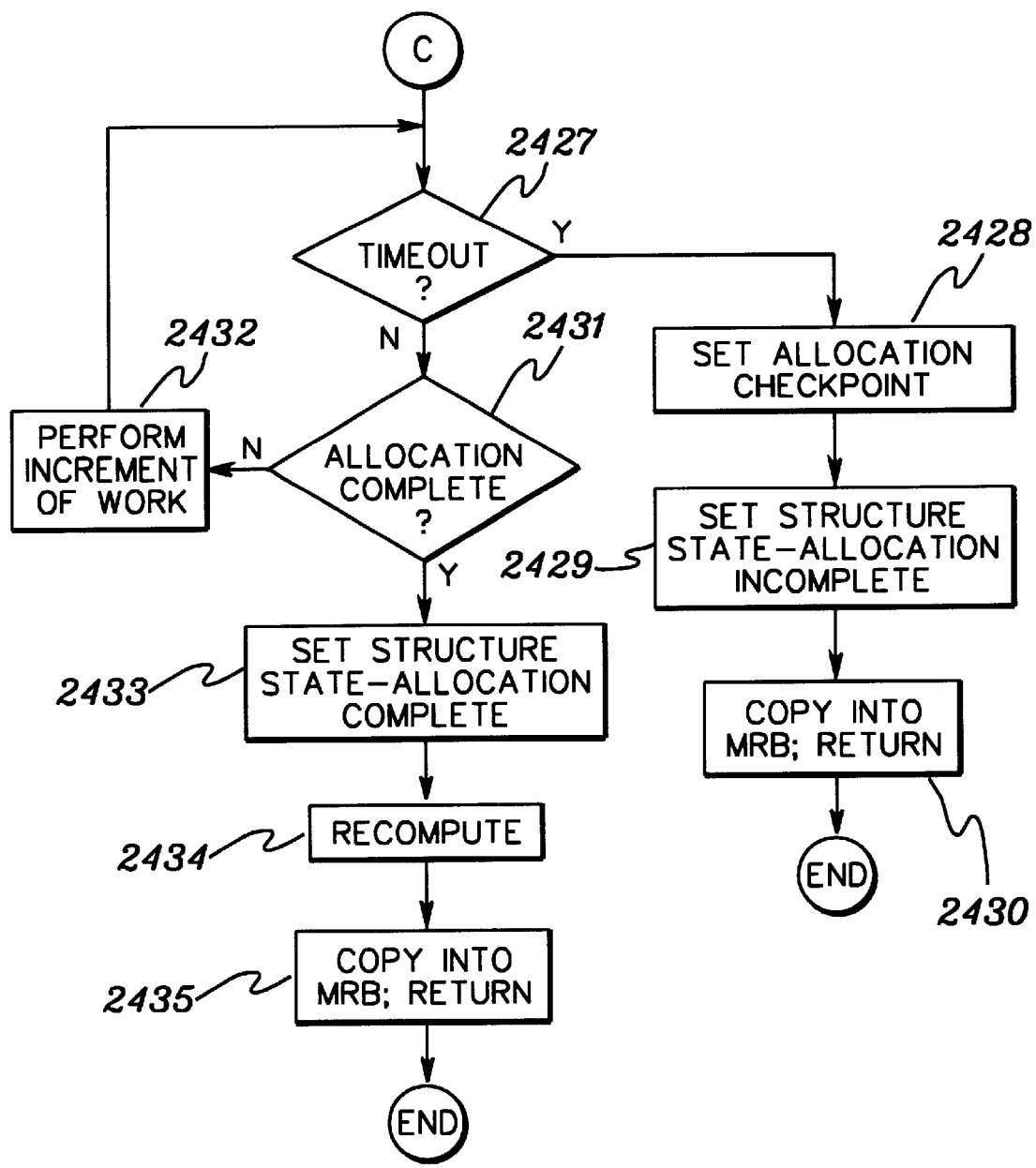

Subsequent to updating the structure controls, a determination is made as to whether there has been a model-dependent timeout, INQUIRY 2427 (FIG. 24*d*). If a timeout has occurred, then an allocation checkpoint is set, STEP 2428, and the structure state is set equal to allocation incomplete, STEP 2429. Additionally, the SS, TSS, MXSS, MRSS, MASS, maximum counts and target maximum counts are copied into the message response block, which is returned along with an indicative response code, STEP 2430. This ends initial allocation processing.

Returning to INQUIRY 2427, if a timeout has not been reached, then a determination is made as to whether allocation is complete, INQUIRY 2431. If allocation is not complete, then an increment of work is performed to advance progress of the initial allocation, STEP 2432. For example, control and data areas needed by the structure are created. Thereafter, processing continues with INQUIRY 2427.

If allocation is complete, then the structure state is set equal to allocation complete, STEP 2433, and the target maximum counts are recomputed to force them into agreement with the pending ratio(s), STEP 2434. Thereafter, the structure size, target structure size, MXSS, MRSS, MASS, maximum counts and target maximum counts are copied into the MRB, which is returned with an indicative response code, STEP 2435.

Returning to INQUIRY 2404 (FIG. 24*b*), if the target structure size is not equal to zero, then directed allocation is not being performed. Thus, the target structure geometry and target maximum counts are computed using the target structure size and target ratio(s) as input, STEP 2436. Additionally, MRSS and MASS are computed. Thereafter, processing continues with INQUIRY 2414 of FIG. 24*c*.

Returning to FIG. 24*a*, if the created bit for the structure identifier is equal to one, indicating that structure allocation has, at least, been initiated, then a further determination is made as to whether the structure state is allocation complete, INQUIRY 2440. If the structure state is not allocation complete, then processing continues to allocate the structure, STEP 2441.

Figure 24E:
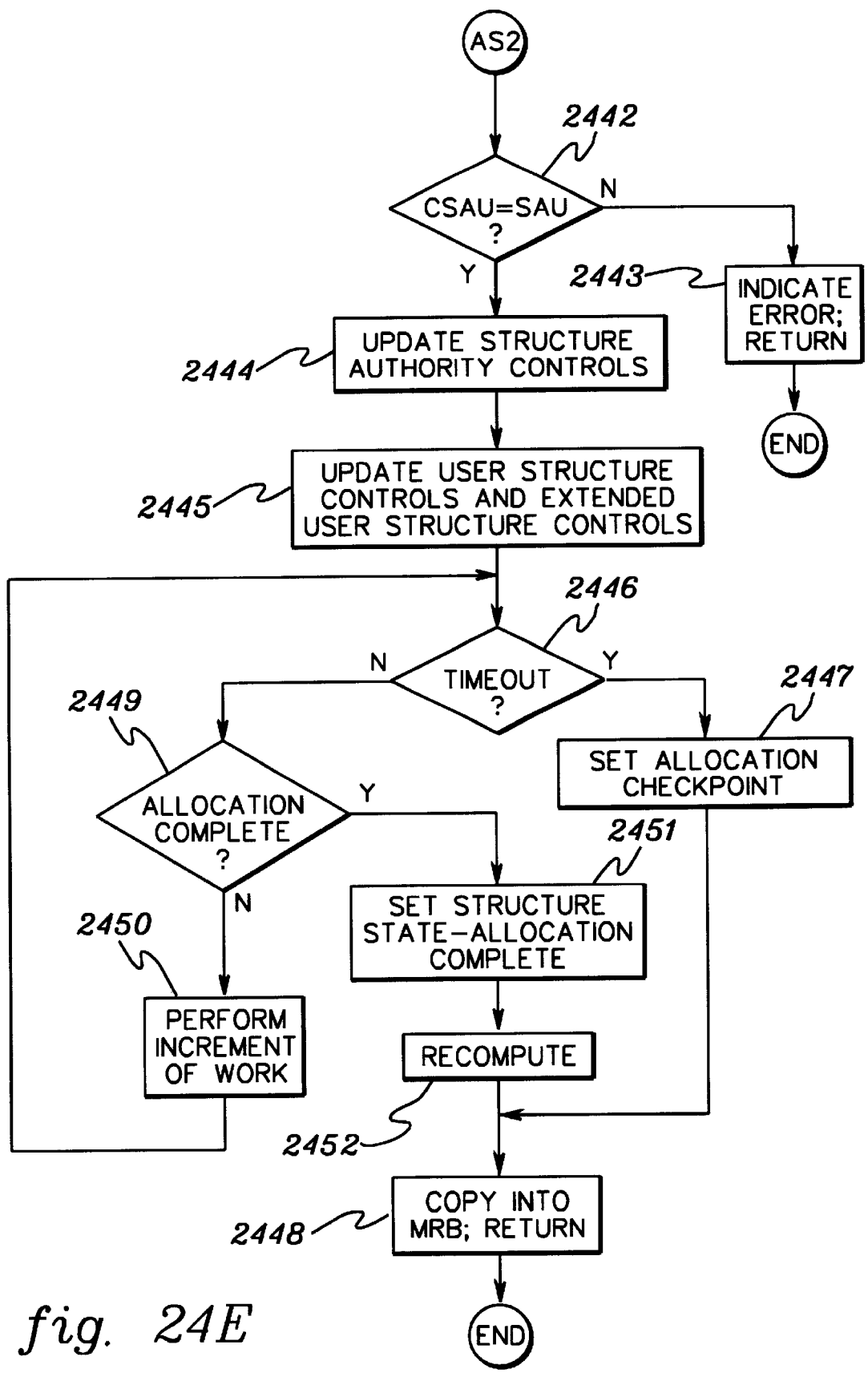

In order to continue allocation, a determination is made as to whether the comparative structure authority is equal to the structure authority, INQUIRY 2442 (FIG. 24*e*). If the comparative structure authority is not equal to the structure authority, then an indicative response code is returned, STEP 2443. However, if the comparative structure authority is equal to the structure authority, then the structure authority request operand from the MCB is copied into the structure authority controls, STEP 2444. Thereafter, the user structure controls and extended user structure controls are updated, STEP 2445. In particular, the value in the user structure controls request operand in the MCB is copied into the user structure controls object, and the value in the extended user structure controls request operand in the MCB is copied into the extended user structure controls object.

Next, a determination is made as to whether the allocate structure command has ended with a model-dependent timeout, INQUIRY 2446. If a timeout has occurred, then the allocation checkpoint is set, STEP 2447. Additionally, the structure size, target structure size, MXSS, MRSS, MASS, maximum counts and target maximum counts are copied into the MRB, which is returned along with an indicative response code, STEP 2448.

However, if a model-dependent timeout has not been reached, then a determination is made as to whether the allocation is complete, INQUIRY 2449. If allocation is incomplete, then an increment of work is performed to advance progress of the allocation, STEP 2450. That is, control and data areas needed by the structure are created. Thereafter, processing continues with INQUIRY 2446.

Returning to INQUIRY 2449, if allocation is complete, then the structure's state is set to allocation complete, STEP 2451. Additionally, the target maximum counts are recomputed to place them into agreement with the pending ratio(s), STEP 2452. Further, the structure size, target structure size, MXSS, MRSS, MASS, maximum counts and target maximum counts are copied into the MRB, which is returned along with an indicative response code, STEP 2448. Thereafter, processing of the continue structure allocation process is complete.

Returning to FIG. 24*a*, when the created bit for the structure identifier is equal to one and the structure state indicates allocation complete, then processing associated with a previously allocated structure is to take place.

As one example, a determination is made as to whether the structure authority is equal to the comparative structure authority, INQUIRY 2453. If the structure authority is not equal to the comparative structure authority, then an indicative response code is returned, STEP 2454. However, if the structure authority is equal to the comparative structure authority, then the structure authority request operand from the MCB is copied into the structure authority object in the structure controls, STEP 2455.

Subsequently, a determination is made as to whether the user structure control indicator of the allocation type request operand is equal to one, INQUIRY 2456. If the indicator is equal to one, then the user structure controls and extended user structure controls are updated, STEP 2457. Thereafter, a determination is made as to whether any other allocation type request operand bit is active (i.e., check if the operation was to update USC and EUSC, only), INQUIRY 2458. If no other allocation type request operand bits are active, then the structure size, TSS, MXSS, MRSS, MASS, maximum counts, target maximum counts, reapportionment in progress indicator(s), and structure size change in progress indicator are copied into the MRB, which is returned along with an indicative response code, STEP 2459.

Returning to INQUIRIES 2456 and 2458, if the user structure control indicator is not equal to one or if any other allocation type request operand bit is active, then processing continues with initiate, continue, resume or terminate an expand/contract/reapportion (ECR) operation, STEP 2460.

Figure 24F:
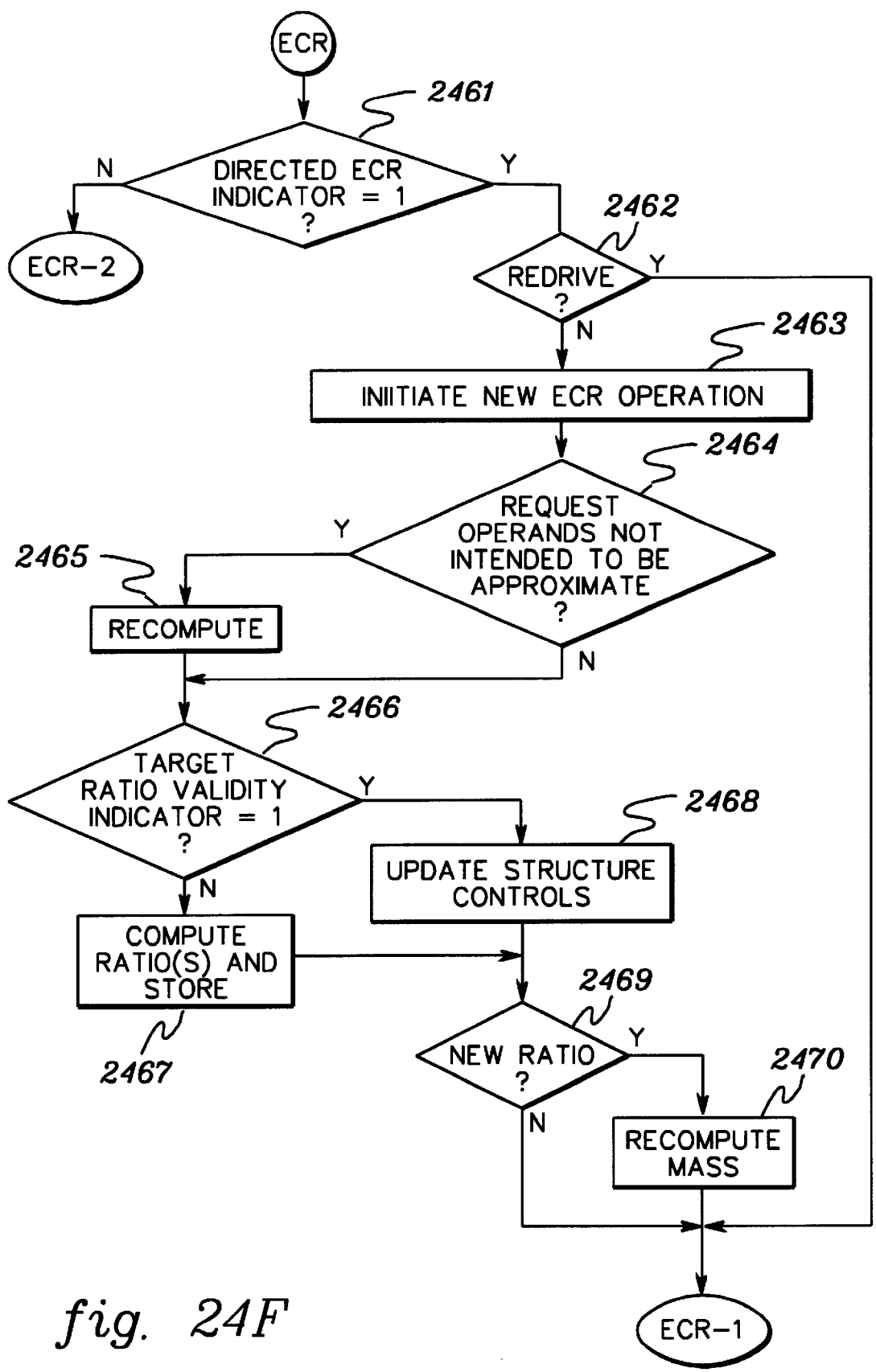

Referring to FIG. 24f, initially, a determination is made as to whether the directed ECR indicator is equal to one, INQUIRY 2461. If the directed ECR indicator is equal to one, then a determination is made as to whether this is a redrive of an ECR operation, INQUIRY 2462. In particular, a determination is made as to whether an ECR operation is already in progress and whether the target maximum count request operands specify precisely that ECR operation.

If this is not a redrive of an ECR operation, then a new ECR operation is being initiated, STEP 2463. Thus, any currently active ECR operation is terminated. Additionally, the target structure geometry and actual target maximum counts are computed using supplied approximate target maximum counts as input. Further, the reapportionment in progress indicator(s) and/or the structure size change in progress indicator, as appropriate, is set. The computed target structure size and the target maximum counts are then stored in the target structure controls.

Subsequently, a determination is made as to whether the request operand values were intended to be an approximation, INQUIRY 2464. Specifically, a check is made to see if the bounded counts priority indicator is equal to one and one or more of the computed actual target maximum counts is greater than the corresponding request operand value. If the request operand values are not intended to be an approximation, then any computed target maximum count object value that is greater than the corresponding request operand value is reduced to the value of the corresponding request operand, STEP 2465.

Subsequent to performing the recomputation or if the request operands are intended to be an approximation, then a further determination is made as to whether the target ratio validity indicator is equal to one, INQUIRY 2466. If the indicator is not equal to one, then the ratio(s) is computed using target maximum count request operand value(s) as input, STEP 2467. The results are stored in pending ratio object(s) in the structure controls.

However, if the target ratio validity indicator is equal to one, then the structure controls are updated, STEP 2468. In particular, the target ratio request operand(s) are copied into the pending ratio object(s) in the structure controls.

Thereafter, a determination is made as to whether there is a new ratio, INQUIRY 2469. If there is a new ratio, then the MASS is recomputed, STEP 2470. Thereafter, or if there is no new ratio, or if this is a redrive, INQUIRY 2462, then processing continues as described herein.

Figure 24G:
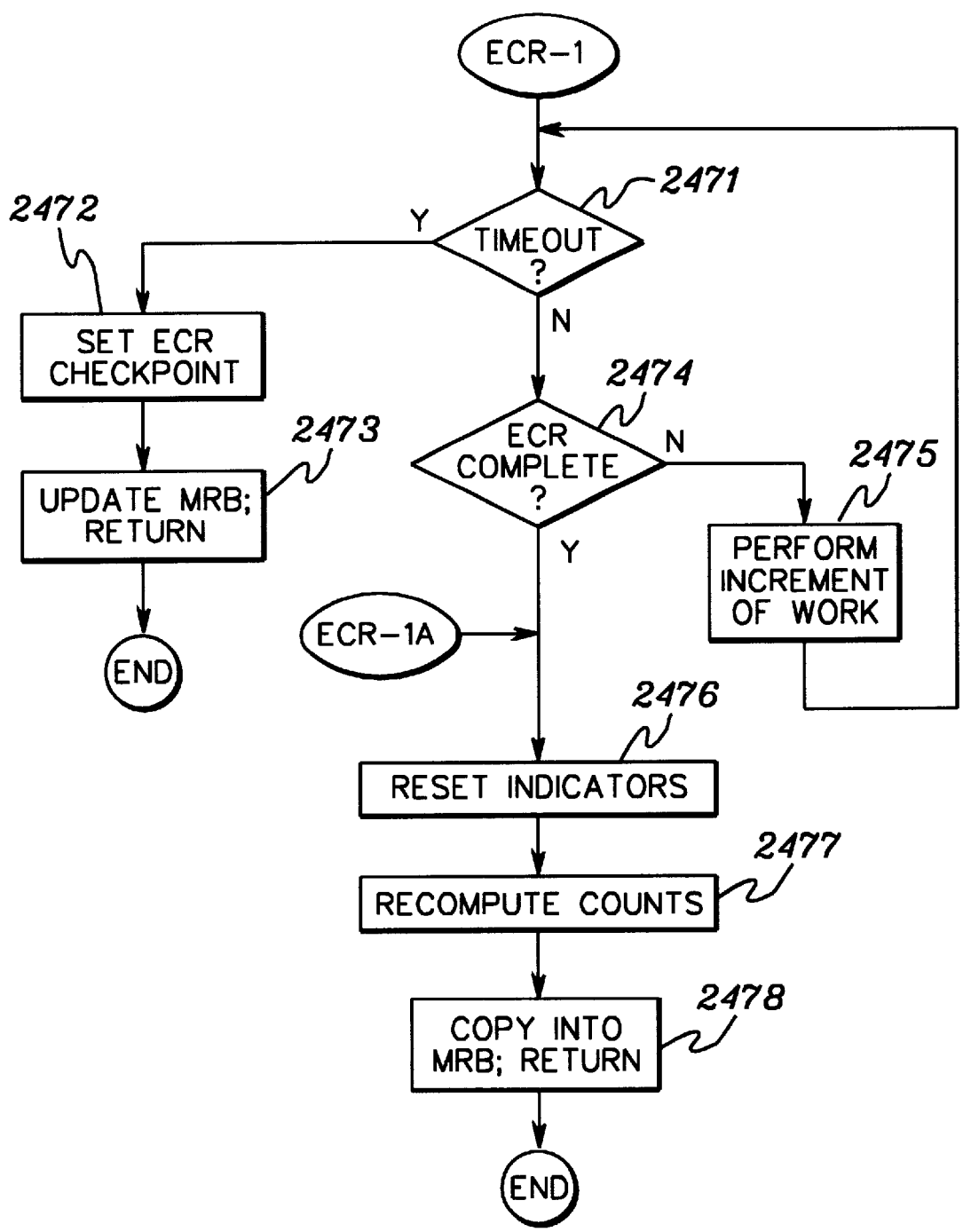

In one example, a determination is made as to whether there has been a model-dependent timeout, INQUIRY 2471 (FIG. 24g). If so, then the ECR checkpoint is set, STEP 2472. Additionally, the structure size, target structure size, MXSS, MRSS, MASS, maximum counts, target maximum counts, reapportionment in progress indicator(s) and structure size change in progress indicator are copied into the MRB, which is returned with an indicative response code, STEP 2473.

However, if there was no timeout, a determination is made as to whether the ECR operation is complete, INQUIRY 2474. If the ECR operation is incomplete, then an increment of work is performed to advance progress of the ECR operation, STEP 2475. Thereafter, processing continues with INQUIRY 2471.

However, if the ECR operation is complete, then the reapportionment in progress indicator(s) and the structure size change in progress indicator are reset, STEP 2476. Additionally, the target maximum counts are recomputed to place them into agreement with the pending ratio(s), STEP 2477. Subsequently, the structure size, target structure size, MXSS, MRSS, MASS, maximum counts and target maximum counts are copied into the MRB, which is returned along with an indicative return code, STEP 2478.

Figure 24H:
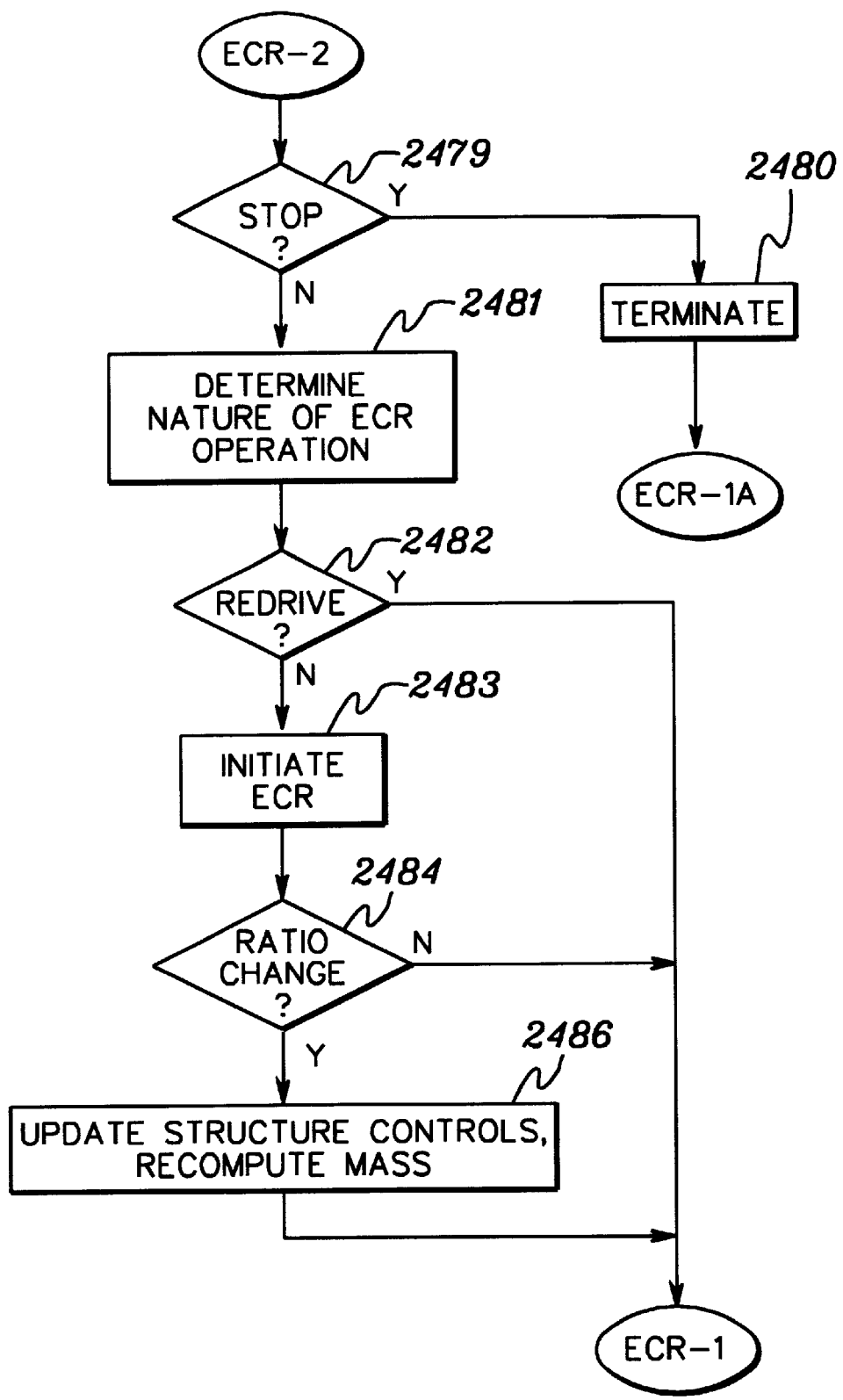

Returning to INQUIRY 2461 (FIG. 24f), if the directed ECR indicator is not equal to one, then a further determination is made as to whether the ECR operation is to be stopped, INQUIRY 2479 (FIG. 24h). In particular, if the allocation type request operand is equal to zero, then stop processing is indicated. Thus, any currently active ECR operation is terminated, STEP 2480. Thereafter, processing continues with STEP 2476 (FIG. 24g).

Returning to INQUIRY 2479 (FIG. 24h), if the allocation type request operand is not equal to zero, then the nature of the ECR operation is determined, STEP 2481. Specifically, the ratio indicator(s) and structure size indicator of the allocation type request operand are examined to determine the nature of the requested ECR operation. In particular, a determination is made as to whether this is a size change without ratio change; a ratio change without size change; or a combined size and ratio change.

Subsequently, a determination is made as to whether this is a redrive of an ECR operation, INQUIRY 2482. In particular, a check is performed to see whether an ECR operation is already in progress and whether the target structure size and/or target ratio request operand(s) specify that ECR operation. If this is a redrive operation, then processing continues with INQUIRY 2471 (FIG. 24g).

However, if this is not a redrive operation, then a new ECR operation is initiated, STEP 2483. Thus, any currently active ECR operation is terminated. Additionally, the target structure geometry and target maximum counts are computed using the target structure size and/or target or pending ratio(s) as input. Further, the reapportionment in progress indicator(s) and/or the structure size change in progress indicator, as appropriate, is set. The target structure size, if the ECR operation includes a size change, and the target maximum counts are stored in the structure controls.

Thereafter, a determination is made as to whether this ECR operation involves a ratio change, with or without a size change, INQUIRY 2484. If this is not a ratio change, then processing continues with STEP 2471 (FIG. 24g). However, if this is a ratio change, then the target ratio request operand(s) is copied into pending ratio object(s) in the structure controls. Additionally, the MASS is recomputed, STEP 2486. Thereafter, processing continues with INQUIRY 2471 (FIG. 24g).

In the structure allocation process described above, the structure authority is set to contain a physical structure version number, which is unique for each instance of the structure. This unique physical structure version number is used by reconciliation and other processes, which are to be able to reliably distinguish between two structure instances, and to determine which of two structure instances is the more recently allocated. A logical structure version number is also set in the extended user structure controls (EUSC) field; this is set to be identical for the old and new structure instances. XES returns the logical structure version number to the user as a piece of structure information on those interfaces where the structure version is to be returned.

The allocation process described above includes a description of directed allocation. Directed allocation allows an application to allocate, for instance, a structure in one coupling facility that has the same characteristics of an existing structure in a second coupling facility. This is accomplished by specifying target maximum counts, instead of a target structure size and target ratio of entries to elements.

Furthermore, directed allocation allows the modification of two structures in the same way. For example, the maximum entry and element counts in one structure can be changed by expanding, contracting or reapportioning the structure; and the identical process can be performed on the second structure as well.

While it is possible that the structure in one coupling facility may require more storage than its counterpart in another coupling facility, such a difference is not a factor in the context of allocation of identical structures or in the context of the identical expansion, contraction, or reapportionment of two structures. For example, in order for the structures to be allocated or modified, the target maximum counts are used. The structure size and the entry to element ratio are no longer inputs to the process, but rather are outputs of the process.

This capability has added value in the case of list-model structures where, in addition to entries and elements, there is a third type of controls object called an event monitor controls object. When the characteristics of a structure are to be specified in terms of a target structure size and target ratios, the number of event monitor controls objects that are needed are also expressed in terms of a target ratio of the amount of storage allocated to event monitor controls to the amount of storage allocated to list entries and list elements. Thus, a simplification in the specification of a structure is achieved by replacing the target structure size and two target ratios with the exact counts of the three types of objects that are needed.

Although the allocation process described above is described in the context of a system-managed structure rebuild, the allocation process is not limited to such a context or to the embodiment(s) described herein. The allocation process, including directed allocation and directed ECR (modification), can be used within various other processes that desire allocation or modification to be performed.

Returning to FIG. 19, subsequent to performing the allocate phase, CFRM transitions into the next phase, STEP 1908. In one example, the next phase is the attach phase.

ATTACH

During the attach phase of system-managed rebuild processing, connectors of the old structure are attached to the new structure. In one example, the attach process is a system-based process that is invoked by CFRM and which runs directly under the CFRM main task, so that the CFRM policy can be referenced and updated.

Figure 25:
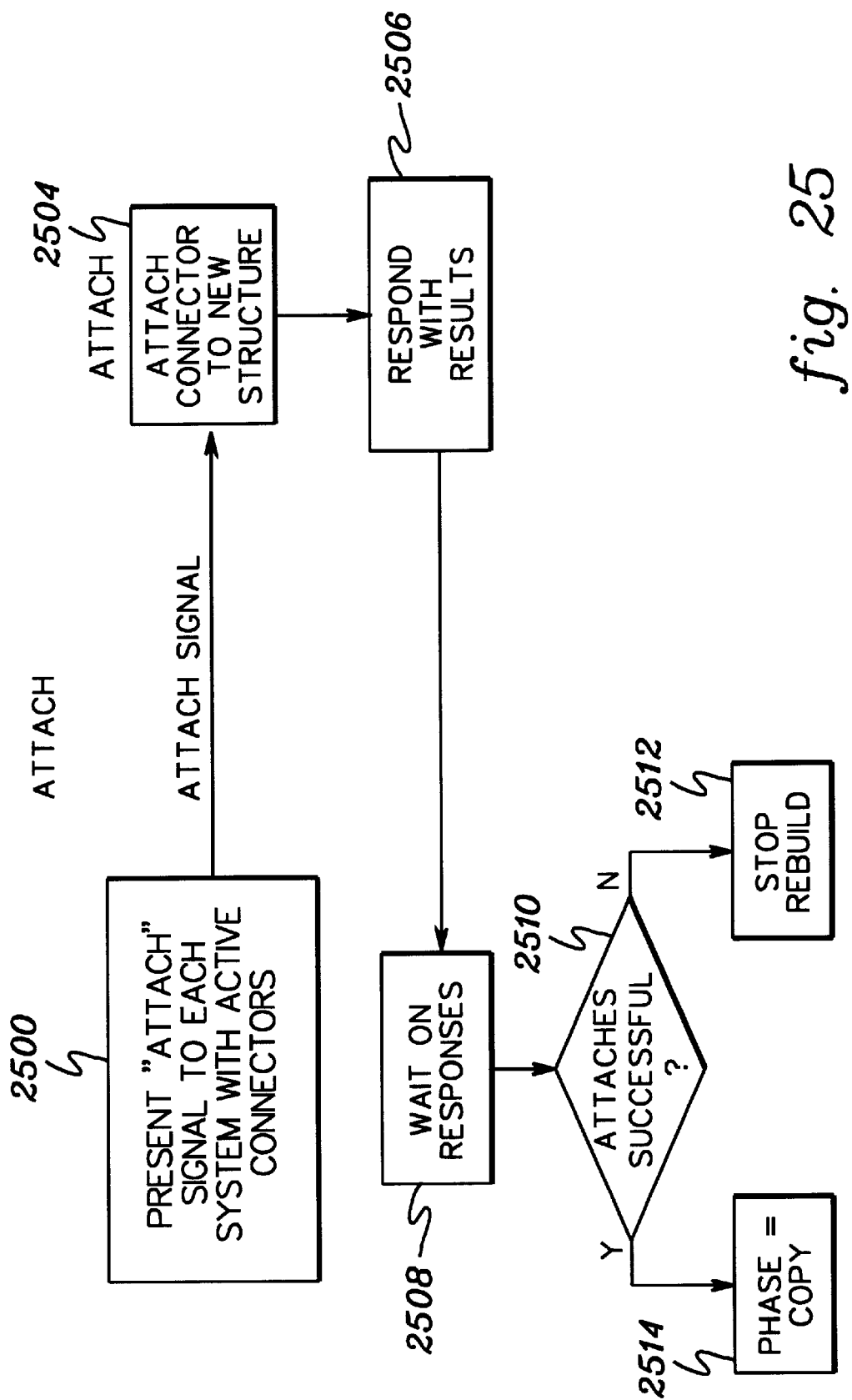
FIG. 25 depicts one embodiment of the logic associated with the attach phase of FIG. 19, in accordance with the principles of the present invention.

The attachment process runs on each system in the sysplex that has active connectors to the structure. (Note that failed-persistent connectors are handled by the copy process, not the attachment process.) Thus, CFRM presents an attach signal to each system with active connectors, STEP 2500 (FIG. 25).

Each system with active connectors attaches the connectors to the new structure, STEP 2504. As one example, the attachment process is passed a structure name and physical structure version number for the new structure. This identifies the instance of the structure that the connectors should be attached to. The attachment processing reads the CFRM policy and attempts to attach all active connectors to the system on which it is running to the new structure. The attachment process should attach the connectors with the same user attachment authority and local hardware vector token as used as attachment to the old structure.

In one example, the attach is performed using an Attach Local Cache (ALC) command for cache structures and an Attach List Structure User (ALSU) command for list structures. Since this is a new attachment to the new structure, the comparative user attachment authority value is initially zero. Embodiments of the ALC and ALSU commands are described herein. Further examples are described in "Method And Apparatus For Coupling Data Processing Systems," Elko et al., U.S. Pat. No. 5,317,739, Issued May 31, 1994, which is hereby incorporated herein by reference in its entirety.

The attachment process indicates in the CFRM policy those connectors who could be attached to the new structure. Users who are successfully attached are marked as dual in the rebuild connection information field in the CFRM policy user record for those users.

The results of the attachment process are indicated in the system confirm string, which is provided to CFRM, STEP 2506.

Once all attachment processes that were dispatched to run on the systems with active connectors have indicated that they are complete, the syncpoint for the attach phase is reached, STEP 2508. Thus, a determination is made as to whether all of the attaches were successful, STEP 2510. If one or more of the attaches was unsuccessful, then the rebuild is stopped, STEP 2512.

However, if all of the attaches were successful, then CFRM transitions into the next phase of processing, STEP 2514.

Returning to FIG. 19, after the attach phase is successfully completed, then the next phase of processing is the copy phase, STEP 1910.

Copy Process

In the copy phase of system-managed rebuild, the contents of one structure are copied to another newly allocated structure. During the copy phase, a copy process is invoked by the operating system (e.g., CFRM component of XES) in order to perform the copy. Various assumptions are made during the copy process. One embodiment of these assumptions is described below. Other embodiments may have the same or differing assumptions.

The copy process described herein runs during a system-based copy phase of an internalized rebuild process, which is not visible to the connectors. User structure accesses are quiesced from the systems, and thus, the old structure contents are frozen throughout the copy process. Additionally, the structure quiesce includes quiescing recovery actions.

New structure connections are prevented during the system-based copy phase (as well as other phases) of rebuild. However, disconnect or failure of an active connector can occur at any time during the copy process. The associated detach processing to detach the connector from the old and/or the new structure is deferred by CFRM until the copy process has been completed or stopped.

The new structure is allocated by the structure allocation process with sufficient number of structure objects to perform the copy process for all required and/or desired old structure objects. Global structure controls in the new structure are set up appropriately by the structure allocation process. The static structure attributes such as number of castout classes, storage classes, list headers, and locks are guaranteed, in one embodiment, to be the same as in the old structure.

The counts of event monitor-controls, entries, and elements may differ from the old structure counts, but the structure allocation process has ensured that the new structure maximum object counts are greater than or equal to the corresponding changed/in-use object counts from the old structure. Thus, the copy process is in general able to propagate everything desired from the old to the new structure without encountering full conditions in the new structure.

When processing a cache structure, the structure allocation process attempts to ensure that the new structure is allocated with sufficient directory entries to be able to copy all changed directory entries and all changed directory entries with registered interest. If the number of directory entries cannot be met, the structure allocation process attempts to provide enough directory entries to copy all changed directory entries (and the copy process skips processing for copying registration information). If this number of directory entries cannot be met, the system-managed rebuild is stopped.

At times, during the copy process, an internal syncpoint operation is performed. These internal syncpoints coordinate the processing of the phases of the copy process itself among the systems that are participating in the copy process. In one example, the structure copy controls are used to synchronize this processing.

Users can be attached directly from the unassigned state into the failed-persistent state. This is used in the propagation of failed-persistent structure connectors, and also in the propagation of objects in the structure associated with unconnected users.

Additionally, detach commands are able to perform detach related cleanup when any detach is processed. A detach from the failed-persistent state to either the failed persistent or not assigned state might find valid information associated with the subject UID/LCID that needs to be cleaned up.

The copy process runs in parallel across a subset of the set of active systems, without regard for which systems have active connectors running on them. This is so that the copy process can be performed as quickly as possible and to minimize the time during which the structure is quiesced, and in order to ensure that the copy process can be performed even for structures which have no active connectors at that time.

To assist in parallelization of the copy process for list headers and castout classes, a scan process is used. This scan process makes use of a scan cursor structure control and a scan control object in each list header or castout class header. All values are initialized to zero in the new structure, when the structure is allocated. The copy process then makes use of commands to perform the following functions:

claim next—scans forward from the scan cursor location to find the next unclaimed list header or castout class; updates the scan control to claim it for the requesting system instance of the copy process (COPYID); advances the scan cursor to point to the claimed header; and returns the number of the claimed header.

mark done—updates the scan control for a particular header to indicate that copy processing is done for that header.

These functions are performed via, for instance, a Write Castout Class Scan Controls or Write List Set Scan Controls command, for cache and list structures, respectively. These functions provide an efficient means for instances of the copy process to claim list headers or castout classes for processing and to mark them done when they have completed their copy processing.

The copy process runs as a separate task ATTACHed out of the main CRFM task on each participating system (CRFM decides which systems are participating in the copy process; it is, for instance, some subset of the set of copy capable systems (i.e., excluding down level systems not capable of performing the copy process)) that has connectivity to both coupling facilities where the old and new structures are allocated. CFRM limits the parallelism to a reasonable number of participants to avoid overwhelming the subchannels, links or coupling facility processors with copy process requests. CFRM initializes the copy controls to indicate the initial set of participants/workers and copy process phase information, and then attaches (e.g., ATTACH) the copy process task instances to run on their respective systems. CFRM passes the copy process task a parmlist, one example of which follows:

Information about MFID/SID/structure type for the old structure to be copied from, and the new target structure to be copied to. (MFID is an identifier of the coupling facility.)

A field that CFRM invalidates when it wants to stop the copy process task for any reason (e.g., because of a failure of some other copy process on a different system). The copy process task checks this field frequently (e.g., prior to every coupling facility operation) and terminates processing with an appropriate return code when the field is invalidated by CFRM.

CFRM uses an invalidation mechanism to stop running instances of the copy process, which the copy process honors.

An indication of whether or not cache registrations are to be copied for a cache structure.

Other persistent state information about the copy process, which may be needed for performing recovery, or across copy process sync points.

The copy process task performs the copy process until it encounters an-error that causes it to terminate processing, until it is requested to stop by CFRM and terminates processing, or until the copy-process completes successfully.

CFRM keeps track of the subset of systems that are participating in the copy process, that is, which are running the copy process task, and keeps track of these various successful or unsuccessful completions of the copy process on each system. (CFRM also monitors system failures of the systems participating in the copy process.) A confirmed string of participating systems is used and updated by CFRM for this purpose.

When each system's copy process task indicates completion to CFRM, CFRM removes that system from the confirmed string and evaluates whether or not all copy processes were successful. If all copy processes were successful, CFRM can move the rebuild process forward into the rebuild cleanup phase. If all copy processes were not successful, CFRM can stop the rebuild process or take action to recover the copy process from failures that were encountered during the copy process.

Local vectors are not copied during the copy process; one vector exists for the pair of structures per user. The attach process for each of the active users of the structure attaches the same local vector to the new structure for a user as is attached to the old structure for that user.

When a switch to the new structure occurs, at rebuild cleanup time, the contents of all users' local cache vectors may or may not be cleared for a-cache structure. If the copy process was able to copy cache registration information, then local cache contents and validity have been preserved and there is no need to clear the local vectors. However, if the copy process did not copy cache registration information, then local cache contents and validity are not preserved in the new structure, so all users' local vectors are to be cleared in this case to reflect this. No clearing of the local vectors occurs on a switch to the new structure for a list structure, since all registrations are copied for a list structure.

The particular steps employed during the copy process depend on the type of structure (e.g., cache, list or lock structure) being copied. The processing employed to copy each type of structure is described below.

Cache Structure Copy Process

One type of structure to be copied is the cache structure. Before describing the processing associated with copying a cache structure, however, a number of assumptions associated with cache structures are described. These assumptions correspond to the particular embodiment described herein. Other embodiments may have the same or differing assumptions. These are only offered as examples.

In one embodiment, the cache structure assumptions include the following:

Unchanged data does not need to be copied, since by definition it resides on DASD, as well as in the cache structure and is disposable. Therefore, only data elements associated with changed entries are copied to the new structure.

Changed directory entries are also copied. When registration information is copied, unchanged directory entries with registered interest are also copied to the new structure (but the accompanying data elements are not copied). Copying of registration information is desirable to avoid invalidating locally-cached information, but it is optional; if the new structure has an insufficient number of directory entries to accommodate the copying of registration information associated with unchanged directory entries with registered interest, then no registration information is copied and local vectors are cleared for the structure.

Any entry which is marked as changed via the change bit or which has a non-zero castout lock with any castout lock state, is considered changed.

In the event that registration information is not copied to the new structure, when a switch to using the new structure exclusively is performed, users' local vectors are cleared for a cache structure, invalidating users' local cache entries.

When registration information is successfully copied, this clearing of local vectors is not performed.

The order of storage class queues in the new structure need not match the order in the old structure.

The order of castout class queues in the new structure need not match the order in the old structure, but in general, it is desirable to write the entries to the new structure in the order in which they appear in the castout class.

This castout class ordering is not necessarily writing the entries in UDF order, but it is the closest approximation to UDF ordering that can be achieved, and therefore, makes the establishment of the UDF order queue in the new structure as inexpensive as possible.

Storage class event counters are copied from the old structure to the new structure so that users of storage class counters do not see a sudden unpredictable shift in the event counters, when a switchover occurs to the new structure.

There are two types of storage class counters: event counters, which count events that have occurred, and are therefore, expected to be monotonically increasing for the life of a structure; and snapshot counters, which contain snapshot counts of objects in the structure, and which therefore, fluctuate as the object counts themselves do. Only the event counters are propagated to the new structure; the snapshot counters in the new structure reflect the actual counts of the objects that are present in the new structure instance, and thus, in a sense they have been propagated implicitly by propagating the objects themselves (e.g., entries, elements) to the new structure.

Figure 26:
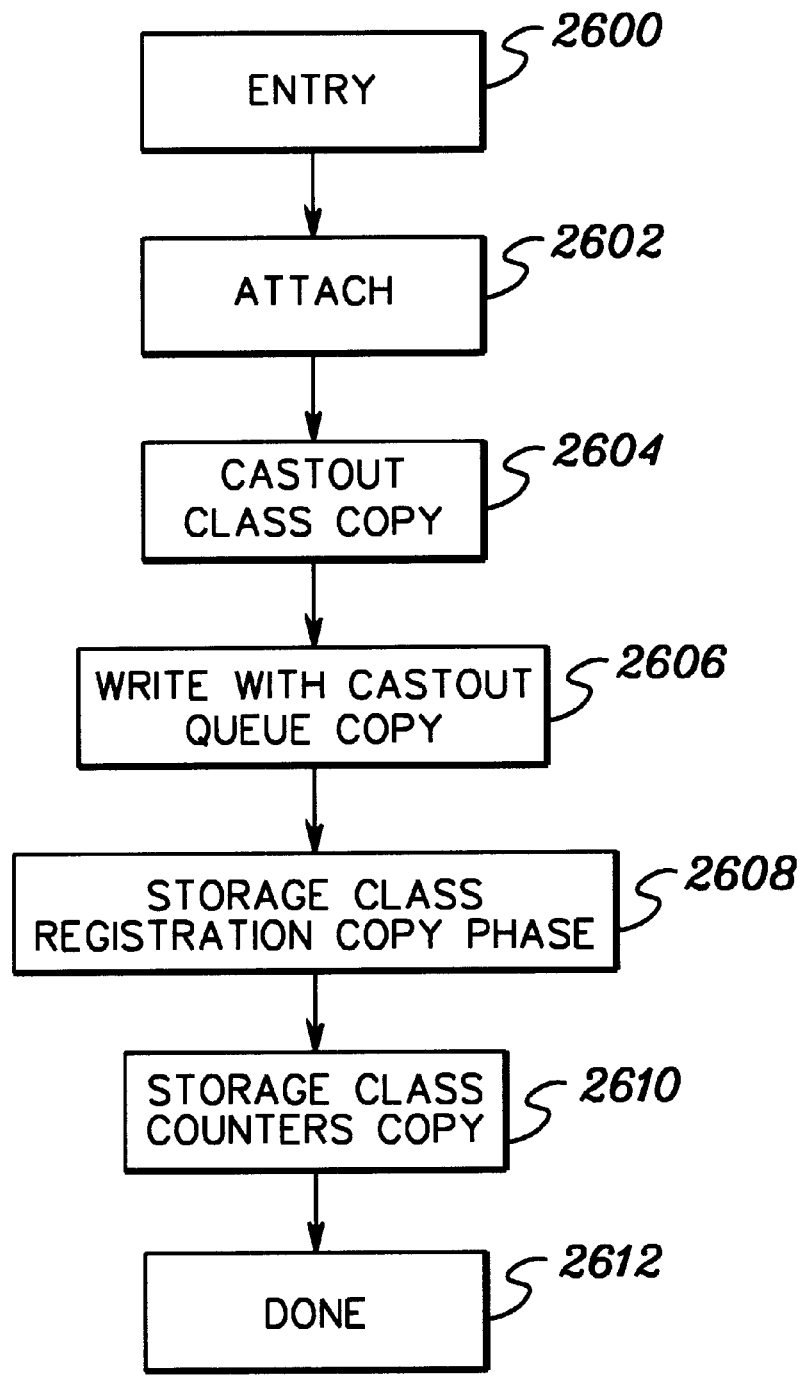
FIG. 26 depicts one embodiment of the logic associated with a cache copy phase, in accordance with the principles of the present invention.

There are a number of phases associated with copying a cache structure. One example of these phases is depicted in FIG. 26 and described in detail below. Some of the phases are considered single phases indicating that only one system participates in the phase, while others are multiple phases indicating that one or more systems may participate.

An initial phase of the copy process is the entry phase, which is a multiple phase, STEP 2600. Thus, one or more systems participate in the entry phase. In particular, CFRM creates copy processor tasks on a subset of the systems, which then cooperate to copy the structure. All participating instances of the copy task are indicated as workers in the worker string of the structure copy controls.

No actual copying of structure objects is performed in this phase. Instead, each instance of the copy task resets its bit in the worker string to indicate that it has received control successfully. When all participating systems have entered the entry phase of the copy process, a syncpoint is reached and a transition into the next phase takes place. This transition includes, for instance, updating the phase to the next phase (e.g., attach phase).

In one example, the updating of the phase is accomplished by invoking a Write Cache Copy Controls (WCCC) command that is used to update the structure copy controls. Each of the participating systems invokes this command to update the controls. Each time the controls are updated, a version number is incremented. This version number is used to ensure the controls are updated properly. In particular, the structure copy controls version number allows compare and swap serialization of, and updates to, the structure copy controls object.

In one embodiment, the Write Cache Copy Controls (WCCC) command includes a message command block having, for instance, the following operands: a message header; a command code (CC); a structure identifier (SID); a structure copy control version number (SCCVN); and a comparative structure authority (CSAU), each of which is described above.

Figure 27:
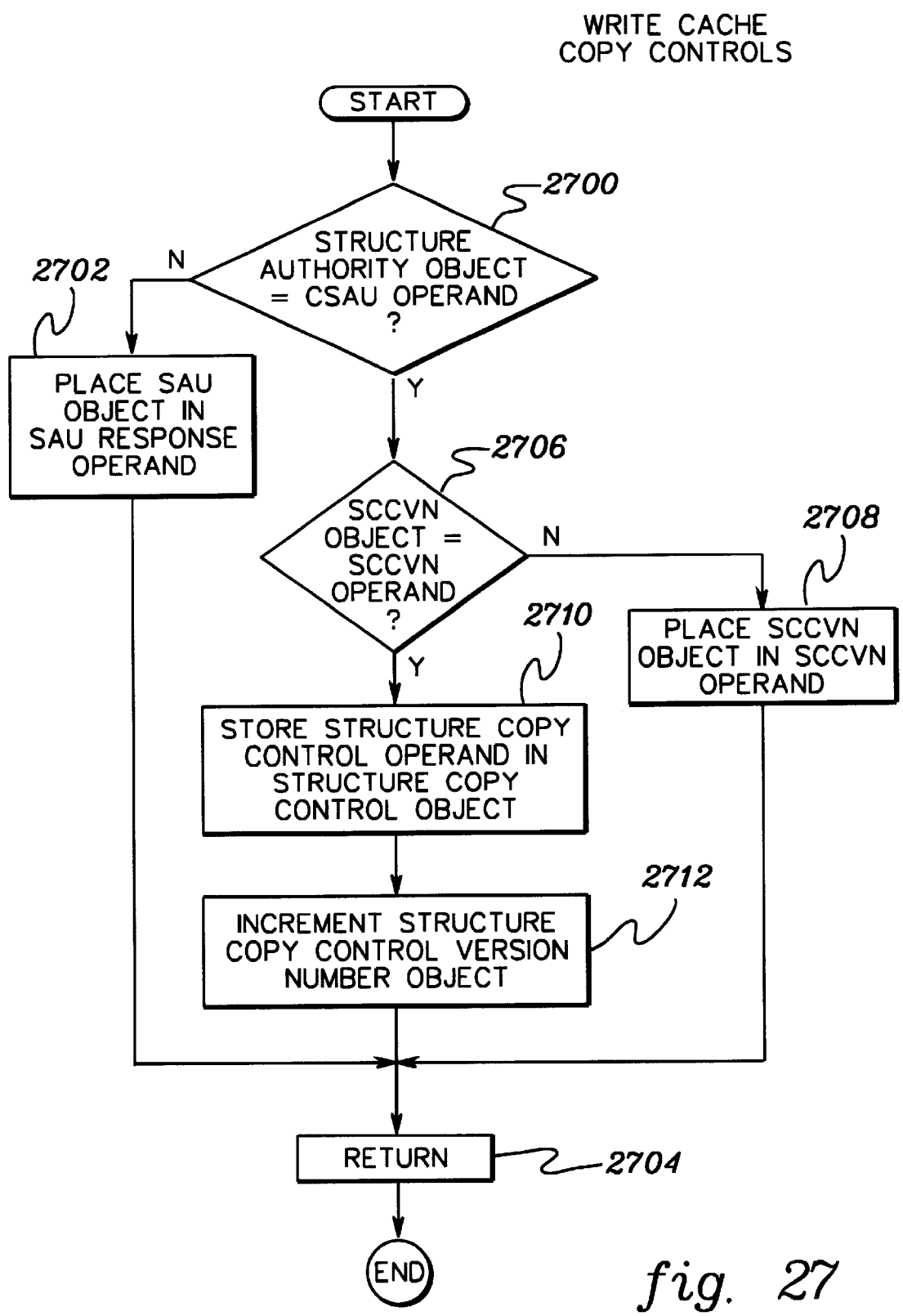
FIG. 27 depicts one embodiment of the logic associated with writing cache copy controls used during the cache copy phase of the present invention.

One embodiment of the logic associated with the Write Cache Copy Controls command is described with reference to FIG. 27. Initially, the structure authority object is compared to the comparative structure authority operand, INQUIRY 2700. If these values are not equal, then the structure authority object is placed in the structure authority response operand, STEP 2702, and the structure authority operand and an indicative response code are returned, STEP 2704. This ends the Write Cache Copy Controls command.

Returning to INQUIRY 2700, when the structure authority object matches the comparative structure authority operand, a further determination is made as to whether the structure copy control version number object is equal to the structure copy control version number operand, INQUIRY 2706. If these values are not equal, then the structure copy control version number object is placed in the structure copy control version number operand, STEP 2708, and the structure copy control version number operand and an indicative response code are returned, STEP 2704.

However, when both comparisons result in matching values, INQUIRY 2706, then the structure copy control request operand is stored in the structure copy control object, STEP 2710. Thereafter, the structure copy control version number object is incremented, STEP 2712, and a successful response code is returned, STEP 2704.

In addition to updating the phase, transitioning to the next phase also includes indicating in the worker string of the structure copy controls the one or more systems that are to perform the next phase. If the phase is a single phase, then a single worker copy process instance is selected to perform the phase. This selection can be made in any number of ways. For example, the last worker to invoke the Write Cache Copy Controls command can be designated the selected worker. As another example, the operating system can preselect the worker to perform each phase. If, however, the phase is a multiple phase, then the worker string is set to the participant string of the structure copy controls.

As depicted in FIG. 26, the next phase of the cache copy process is an attach phase, which is a single phase, in this embodiment, STEP 2602. During this phase, zero or more users are attached to the new structure in a failed-persistent state (i.e., an assigned but not attached state).

During this attach processing, the selected worker system reads attachment information for the old and new structures, and if there are any users who are actively attached to the old structure for which the local cache identifier (LCID) is unassigned in the new structure, it attaches that user to the new structure directly into the failed-persistent state, propagating any relevant attachment information.

Using the above technique, the selected worker system propagates any users with failed-persistent attachments to the old structure to the new structure, by attaching the user to the new structure directly into the failed-persistent state. (Note that, in one embodiment, these new structure attachments are performed with a local cache authority (LCAU) and attachment information (AINF) that are the same as that associated with the attachment to the old structure.)

One embodiment of the logic associated with the attach copy processing phase is described with reference to FIG. 28. Initially, the local cache identifier vector for the old structure is obtained, STEP 2800. In one example, a Read Cache Structure Information (RCSI) command is used to retrieve the LCID vector.

The Read Cache Structure Information command includes a message command block having, for instance, the following operands: a message header; a command code (CC); a structure identifier (SID); and a data block size (DBS).

Operationally, when the Read Cache Structure Information command is processed, the data block size request operand is checked. When the data block size request operand is non-zero and when sufficient message buffer space is provided, the structure copy control is placed in a data block. When the data block size request operand is zero, no data block is returned.

Additionally, the values of the cache controls are placed in the response operands, and the control values along with a response code are returned. In particular, the total directory entry and data area element counts for the coupling facility cache are-placed in the TDEC and TDAEC operands respectively; the adjunct assignment indicator is placed in the AAI operand; the UDF order queue indicator is placed in the UDFBQI operand; the name class mask is placed in the NCM operand; the maximum storage class is placed in the MSC operand; the maximum castout class is placed in the MCC operand; the data area element characteristic is placed in the DAEX operand; the cache size is placed in the SS operand; the maximum structure size is placed in the MXSS operand; the minimum structure size is placed in the MASS operand; the user structure control is placed in the USC operand; the structure authority is placed in the SAU operand; the target structure size is placed in the TSS operand; the target maximum entry count is placed in the TGDAEC operand; the castout class cursor is placed in the CCCUR operand; the WWCO-queue-counter is placed in the WQC operand; the structure copy control version number is placed in the SCCVN operand; the extended user structure control is placed in the EUSC operand; the global count of unchanged directory entries with registered interest is placed in the GCUDRI operand; the free directory entry count is placed in the FDEC operand; the free data area element count is placed in the FDAEC operand; and the LCID vector is placed in the LCIDV operand.

Thus, the response block for the Read Cache Structure Information command includes, for instance, the following: a response descriptor; a response code; a total directory entry count (TDEC); a total data area element count (TDAEC); an adjunct assignment indicator (AAI); an UDF order queue indicator (UDFOQI); a reapportionment in progress indicator (REIPI); a structure size change indicator (SSCI); a maximum storage class (MSC); a maximum castout class (MCC); a data area element characteristic (DAEX); a maximum data area size (MDAS); a structure size. (SS); a maximum structure size (MXSS); a minimum apportionment structure size (MASS); a structure authority (SAU); a user structure control (USC); an LCID vector (LCIDV); a target structure size (TSS); a target directory entry count (TGDEC); a target data area element count (TGDAEC); a pending directory to data ratio (PDTDR); a marginal structure size (MRSS); a total structure change count (TSCC); a total changed data area element count (TCDAEC); a castout class cursor (CCCUR); an extended user structure control (EUSC); a WWCO queue counter (WQC); a structure copy control version number (SCCVN); a global count of unchanged directory entries with registered interest (GCUDRI); a free directory entry count (FDEC); and a free data area element count (FDAEC).

Figure 28:
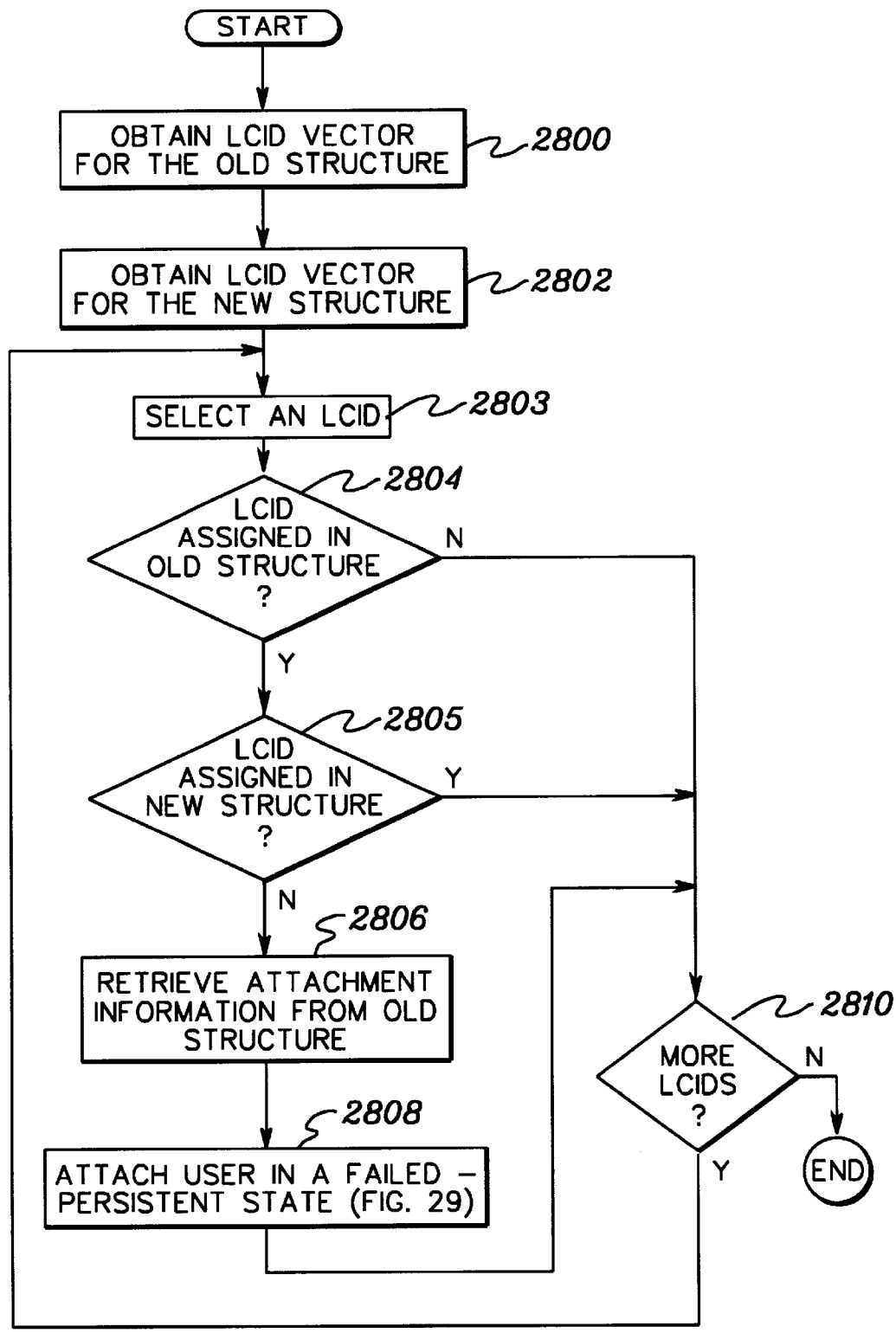
FIG. 28 depicts one embodiment of the logic associated with cache attach copy processing used in accordance with the principles of the present invention.

Continuing with FIG. 28, in addition to obtaining the LCID vector for the old structure, the LCID vector for the new structure is also obtained, STEP 2802. Similar to obtaining the vector for the old structure, the vector for the new structure is obtained using, for instance, the Read Cache Structure Information command.

After obtaining the LCID vectors for the old and new structures, processing continues for any of the local cache identifiers that are assigned in the old structure, but unassigned in the new structure. In particular, an LCID to be processed is selected, STEP 2803. Then, a determination is made as to whether the LCID is assigned in the old structure, INQUIRY 2804. In one example, this determination is made by examining the LCID vector for the old structure. In particular, the bit corresponding to that LCID is examined. If it is equal to one, then the LCID is assigned. If the LCID is assigned in the old structure, then a determination is made as to whether the LCID is unassigned in the new structure, INQUIRY 2805.

If the LCID bit position in the vector of the new structure is equal to zero indicating that the LCID is unassigned in the new structure, then processing continues with STEP 2806. Specifically, attachment information is retrieved from the old structure. In one example, the information is retrieved using a Read Local Cache Information command.

The Read Local Cache Information command includes a message command block having, for instance, the following operands: a message header; a command code (CC); a structure identifier (SID); and a local cache identifier (LCID).

Operationally, the Read Local Cache Information command causes the values of the local cache controls to be placed in the response operands, and to return the control values along with a response code. In particular, the attachment status is placed in the AS operand; the local cache token is placed in the LCT operand; the local cache authority is placed in the LCAU operand; the system identifier is placed in the SYID operand; and the attachment information is placed in the AINF operand. Thus, in one embodiment, the message response block for the Read Local Cache Information command includes, for instance, a response descriptor; a response code (RC); an attachment status (AS); a local cache token (LCT); a local cache authority (LCAU); a system identifier (SYID); and attachment information (AINF).

After retrieving the attachment information from the old structure that is associated with the LCID that is assigned in the old structure, but unassigned in the new structure, the user identified by that LCID is attached to the new structure in the failed-persistent state, STEP 2808. In one embodiment, an Attach Local Cache Command is used to attach the user in the failed-persistent state.

The Attach Local Cache command employs a message command block, which includes, for instance, the following operands: a message header; a command code (CC) indicating that this is an Attach Local Cache command; a structure identifier (SID); a local cache identifier (LCID); an attachment request type (ART); a local cache token (LCT); a local cache authority (LCAU); a comparative local cache authority (CLCAU); and attachment information (AINF), each of which is described above.

Figure 29:
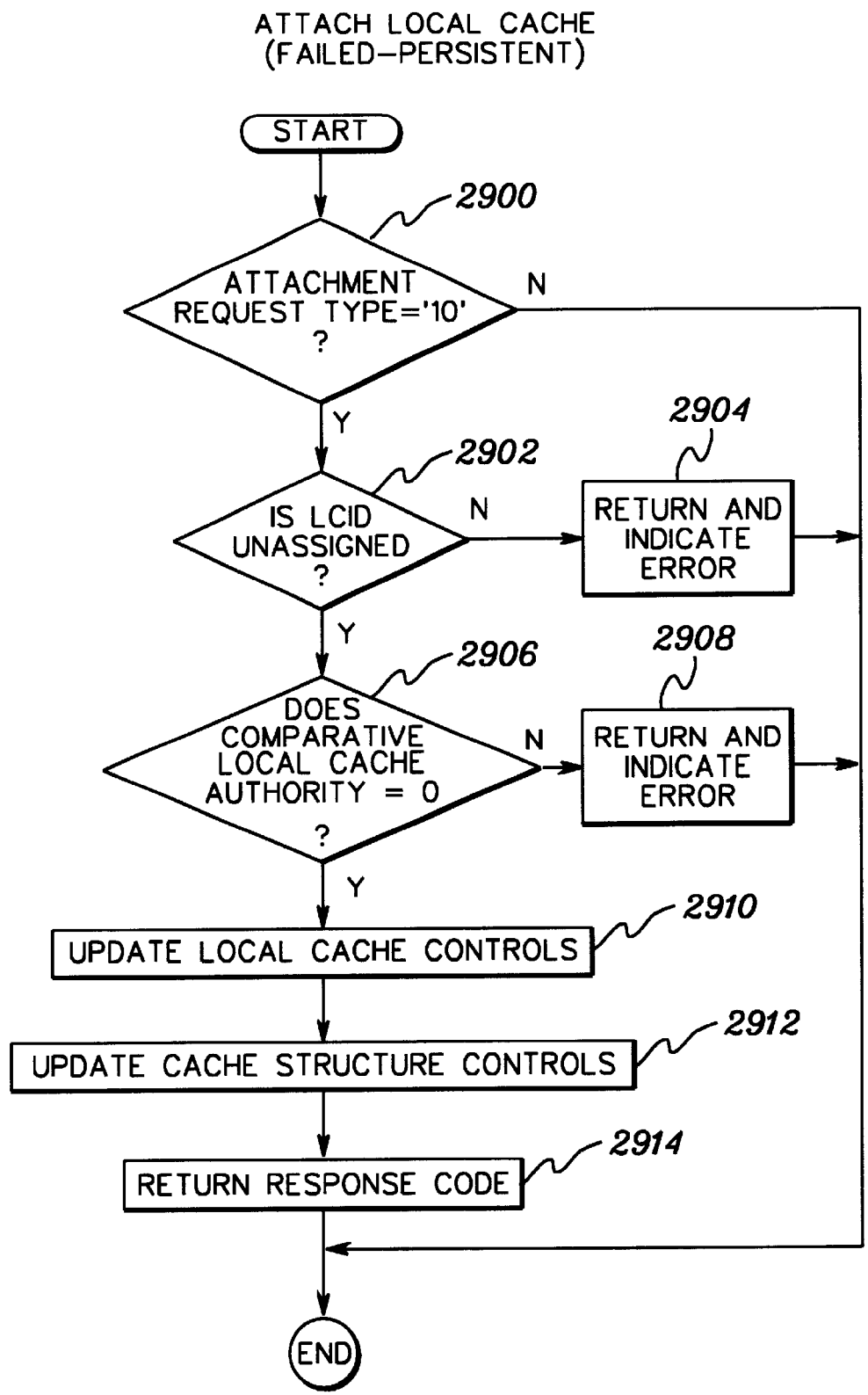
FIG. 29 depicts one embodiment of the logic associated with attaching a local cache in the failed- persistent state during the cache copy process of the present invention.

The Attach Local Cache command can be used to place the local cache in one of a plurality of states including, but not limited to, an attached state, a detachment pending state, and a failed-persistent state. In this example, the user is attached in the failed persistent state, and one embodiment of the logic associated with the Attach Local Cache command employed to attach the user in the failed-persistent state, is described in detail with reference to FIG. 29.

Initially, a determination is made as to whether the attachment request type indicates that the user is to be attached in the failed-persistent state, INQUIRY 2900. Specifically, if the attachment request type is equal to a specified value (e.g., binary '10'), then attachment in the failed-persistent state is indicated, and processing of the Attach Local Cache command continues. However, if such an attachment is not indicated, then processing ends, in this example.

Continuing with the attachment in a failed-persistent state, a determination is made as to whether the local cache identifier (LCID) is unassigned, INQUIRY 2902. If the LCID is assigned, then the LCID state is incompatible with the attachment request type. Thus, an error is indicated and various information is returned in the response operands including, for instance, the local cache authority, attachment information and attachment status, STEP 2904.

If, however, the LCID is unassigned, then a determination is made as to whether the comparative local cache authority is equal to zero, INQUIRY 2906. If the comparative local cache authority comparison fails, then once again an error is indicated and various information including, for instance, the local cache authority and the attachment information are returned in the response operands, STEP 2908.

When the attachment request type is equal to the specified value, the LCID is unassigned, and the comparative local cache authority comparison succeeds, the local cache becomes assigned but remains in the detached state. The local cache authority and the attachment information request operands are stored in the corresponding local cache controls, STEP 2910. Additionally, the local cache token, the system identifier, and the detachment restart token within the local cache controls are set to zero. Further, the appropriate bit in the LCID vector of the cache structure controls is set to one indicating that the local cache is assigned, STEP 2912. Thereafter, a response code indicating completion is returned, STEP 2914.

Returning to FIG. 28, after the user is attached in the failed persistent state, or if the LCID was not assigned in the old structure or not unassigned in the new structure, a determination is made as to whether any other LCIDs are to be processed, INQUIRY 2810. If so, processing continues with STEP 2803. If there are no additional LCIDs assigned in the old structure, but unassigned in the new structure, then processing of the attach copy processing ends.

At this point, any assigned local cache identifiers that may be visible in the old structure are valid in the new structure (either fully attached to the new structure in the active state, or assigned but not attached in the failed-persistent state).

Since users are being attached into the assigned, but not attached failed-persistent state and then proceeding to copy information that may reflect their LCID (e.g. castout locks and registrations), CFRM will request, in this embodiment, that a directory cleanup scan be performed in the future when such users are detached (regardless of whether they are detached from the failed persistent state to the unassigned state, or to the failed-persistent state). State information (e.g., detachment pending state) remembers that the failed persistent connection is in a "cleanup required" state, both in the CFRM policy and in the structure itself, so that this cleanup can be performed.

When the attach copy processing is complete, a transition into the next phase of processing is performed. As described above, transitioning employs the Write Cache Copy Controls command to perform a compare and swap of the structure copy controls. In this example, transitioning switches the processing to a castout class copy processing phase, as shown in FIG. 26, STEP 2604. The castout class copy phase is a multiple phase, in this example, and thus, the worker string of the structure copy controls is set equal to the participant string.

Figure 30:
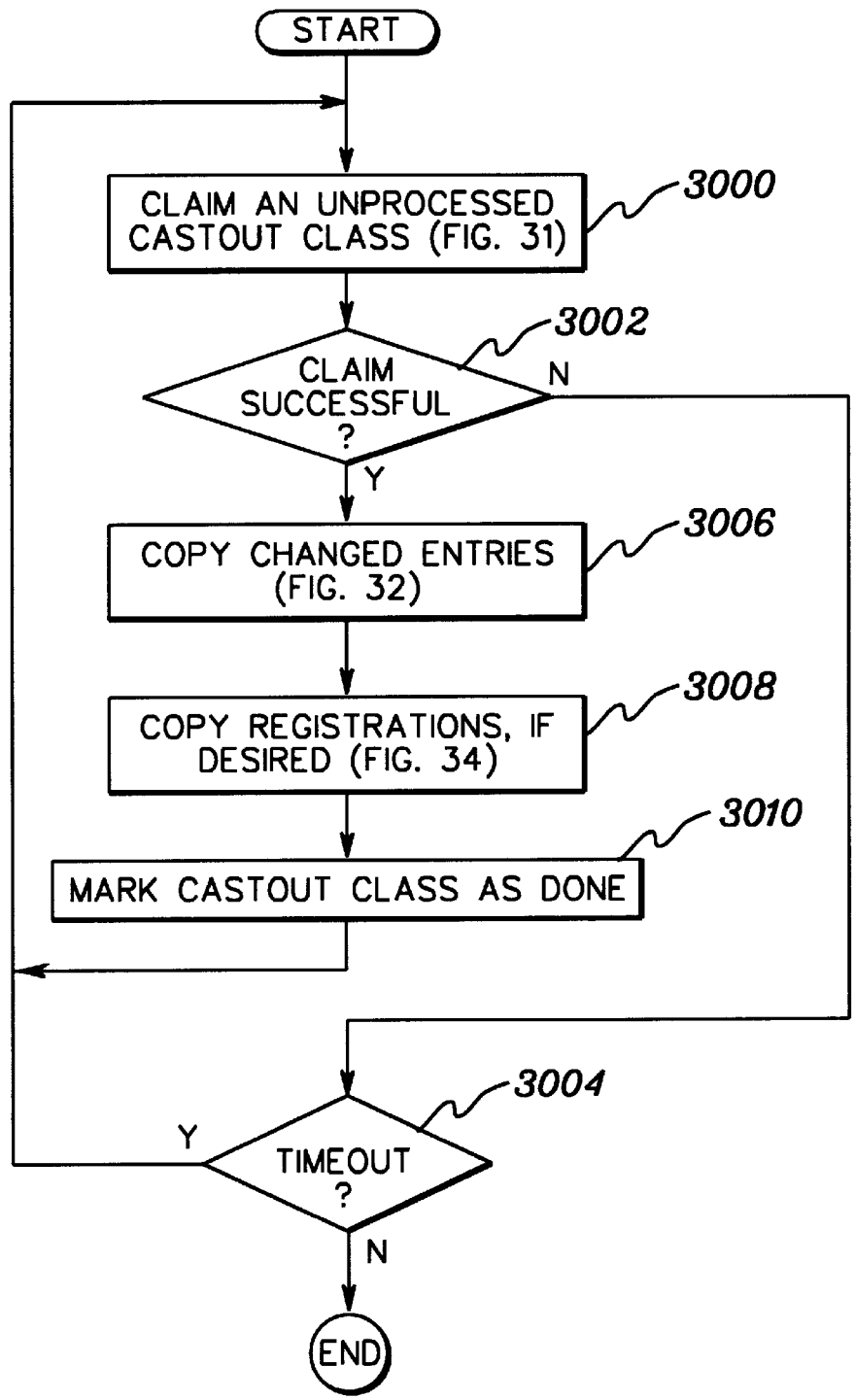
FIG. 30 depicts one embodiment of the logic associated with castout class copy processing, in accordance with the principles of the present invention.

In one embodiment, the castout class copy processing phase is performed on a per castout class basis. Thus, processing is parallelized on the per castout class basis. One embodiment of the logic associated with the castout class copy phase is described in detail with reference to FIG. 30. Initially, each system running the copy process uses, for instance, a claim next function in the new structure to attempt to claim an unprocessed castout class, STEP 3000.

As one example, the claim next function is performed by a Write Castout Class Scan Controls (WCCSC) command. This command employs a message command block, which includes, for instance, the following operands: a message header; a command code (CC); a structure identifier (SID); a castout class scan controls update type (CCSCUT); a castout class (CCL); a castout class scan restart token (CCSRT); and a castout class scan identifier (CCSID).

Figure 31:
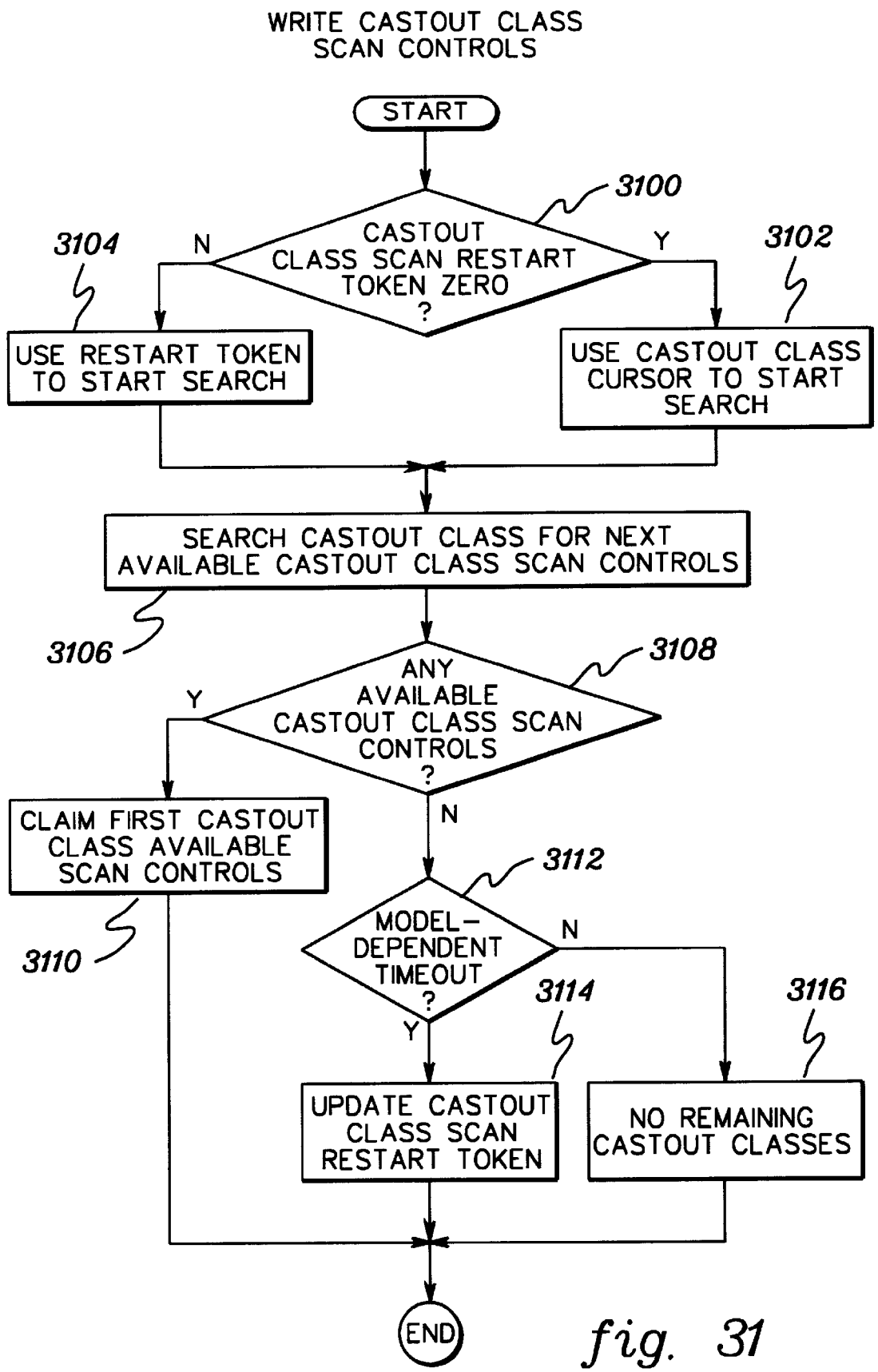
FIG. 31 depicts one embodiment of the logic associated with writing castout class scan controls, in accordance with the principles of the present invention.

The Write Castout Class Scan Controls command can be used to update controls for one or more castout classes. The controls to be updated depend on the value of the update type. In this example, the update type indicates the claiming of the next available castout class. One embodiment of the logic associated with claiming the next available castout class is described with reference to FIG. 31. Initially, a determination is made as to where to start the processing, INQUIRY 3100. In particular, if the castout class scan restart token is zero, then processing starts with the castout class specified by the castout class cursor, STEP 3102. Specifically, the claim next function uses a scan cursor to make the process of locating an available class efficient, and updates the cursor appropriately to reflect the claimed class. Otherwise, processing resumes from the restart token, STEP 3104.

The castout classes are then searched for the first available castout class with available castout class scan controls, STEP 3106. In one example, a castout class has available scan controls, when the CCSID and the CCSST objects in the castout class header are both zero.

If a castout class with available castout class scan controls is found, INQUIRY 3108, then the castout class scan controls are claimed, STEP 3110. For example, the castout class scan identifier is set equal to the CCSID request operand; the castout class cursor is set to the value of the claimed castout class; the value of the claimed castout class is placed in the CCL response operand, and the CCL operand and a response code indicating success are returned. This completes the command.

However, if the search has ended without finding a castout class with available scan controls, then a determination is made as to whether the search ended due to a model-dependent timeout, INQUIRY 3112. If so, then the castout class scan restart token is generated and placed in the CCSRT response operand, STEP 3114. The CCSRT operand and an indicative response code are returned.

If the search did not end because of a model-dependent timeout, then there are no remaining castout classes to be searched, STEP 3116. Thus, processing ends with an indicative return code.

Returning to FIG. 30, thereafter, a determination is made as to whether the claim attempt was successful, INQUIRY 3002. If the attempt was unsuccessful, then a further determination is made as to whether the processing timed-out, thereby causing the unsuccessful attempt, INQUIRY 3004.

If the function did not timeout, then there was no available class to be claimed, in which case the system is done with its changed directory entry copy process for all castout classes. However, if the claim next function did timeout, then processing continues with STEP 3000.

Returning to INQUIRY 3002, if the function was successful, then a castout class number is returned. Thus, the copy process continues by copying changed entries of the claimed castout class, STEP 3006. One embodiment of the logic associated with copying changed entries is described with reference to FIG. 32. Initially, a restart token is initialized to zero, STEP 3200. Thereafter, it is assumed that there is data in the castout class to be processed, INQUIRY 3202, and thus, a command is issued to attempt to retrieve a set of directory entries, STEP 3204. As one example, a Read Castout Class (RCC) command is used to read in a portion of the changed/castout locked directory entries from the claimed castout class. Full directory entry information block (DEIB) information for each of the directory entries is retrieved using this command. One example of a Read Castout Class command is described below. (A further example of RCC is described in U.S. Pat. No. 5,493,668 entitled "Multiple Processor System Having Software For Selecting Shared Cache Entries Of An Associated Castout Class For Transfer To A DASD With One I/O Operation," Elko et al, Issued on Feb. 20, 1996, which is hereby incorporated herein by reference in its entirety.)

In one example, a Read Castout Class command employs a message command block having, for instance, the following operands: a message header; a command code (CC) indicating the read castout class command; a structure identifier (SID); a name mask (NM); a castout class (CCL); a restart token (RT); a name (N); a data block size (DBS); and a castout class request type (CCRT).

The Read Castout Class command is used to scan a castout class and to place information on selected entries of the castout class in a data block. The information returned depends on the castout class request type. In this example, the desired information is directory entry information blocks and therefore, the castout class request type is set equal to one.

When the castout class request type is one, and the name in the castout class matches the input name under the mask conditions, a directory entry information block is added to the DEIB list and the processed count is increased by one. In one example, the chosen name mask allows any name to be selected.

The castout class scan is controlled by the restart token request operand. A token value of zero starts the processing and a non-zero token value restarts the processing from the place designated by the token. Processing is completed when the data block is full, when the entire castout class has been processed, or when a model-dependent timeout has been exceeded. When the data block is full, a restart token is generated and returned along with a data block, the processed count and an indicative response code. When the end of the castout class is reached, the data block, the processed count and an indicative response code are returned to the program. When a model-dependent timeout occurs before the end of the table is reached, a restart token is generated and returned along with the data block, the processed count and an indicative response code.

Figure 32:
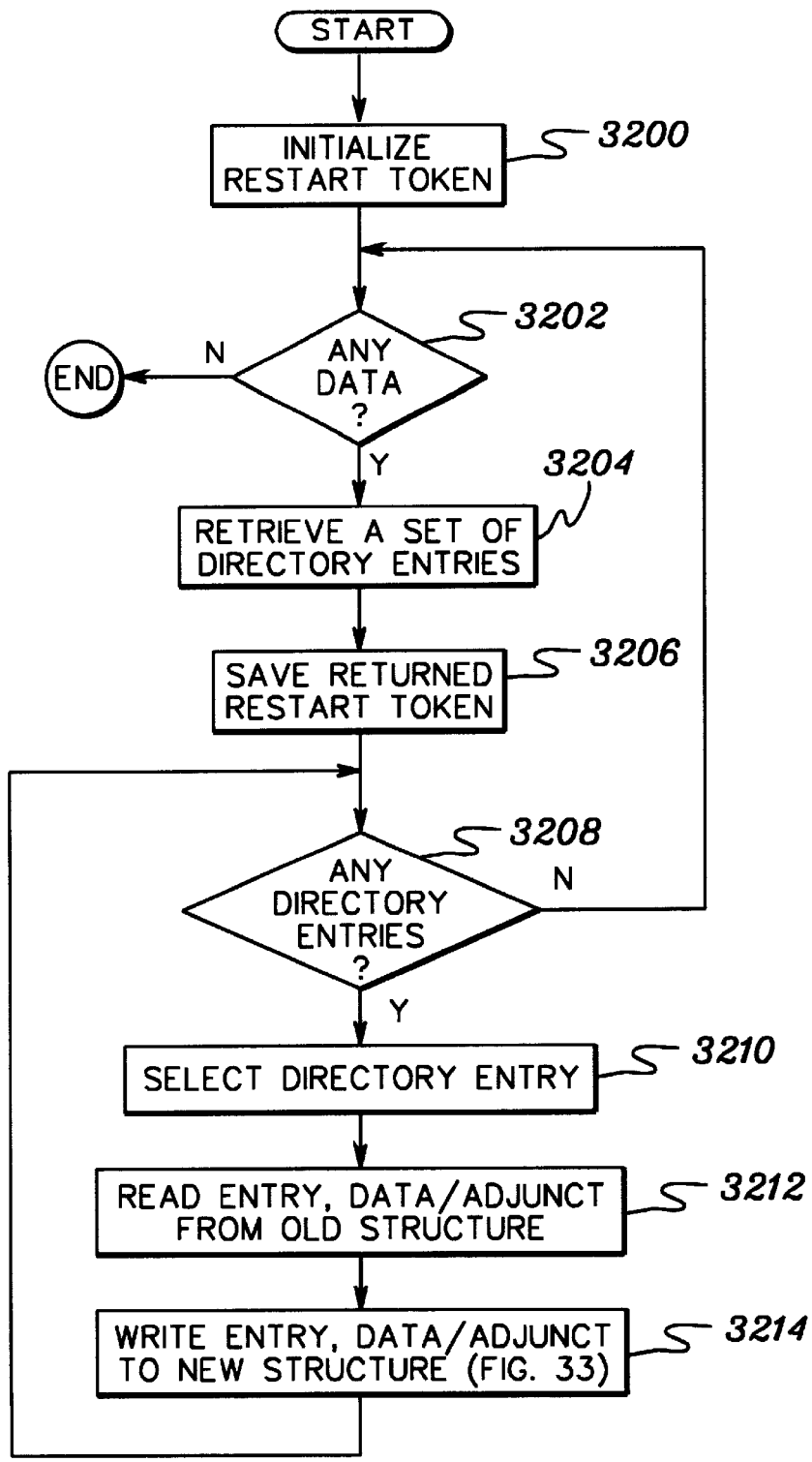
FIG. 32 depicts one embodiment of the logic associated with copying changed entries during the cache copy phase of the present invention, in accordance with the principles of the present invention.

Continuing with FIG. 32, after retrieving a set of directory entries, the returned restart token is saved for further use, STEP 3206. Thereafter, a determination is made as to whether any directory entries were retrieved, INQUIRY 3208. If a directory entry was retrieved, that directory entry is selected, STEP 3210, and the entry, data and adjunct data (if present) are read from the old structure. In particular, if the DEIB indicates the entry has data, a read command is used to read the data/adjunct from the old structure. As one example, this read command is a Read and Register (RAR) command, which is described in detail in U.S. Pat. No. 5,537,574 entitled "Sysplex Shared Data Coherency Method," Elko et al., Issued on Jul. 16, 1996, which is hereby incorporated herein by reference in its entirety. In this particular embodiment, this command is invoked with suppress-registration requested, assignment not requested, and name-replacement not requested, so that no structure objects in the old structure are updated.

If the DEIB indicates that the entry has no data/adjunct, the directory information is all there is, so no read is required.

Subsequent to reading the data (if any), the entry, and data/adjunct are propagated to the new structure, STEP 3214. In one example, a Write and Register (WAR) command is used to write the entry and its associated data/adjunct to the new structure. One embodiment of the WAR command is described below. (A further example is described in U.S. Pat. No. 5,537,574 entitled "Sysplex Shared Data Coherency Method," Elko et al., Issued on Jul. 16, 1996, which is hereby incorporated herein by reference in its entirety.)

In one example, the Write and Register command employs a message command block having, for instance, the following operands: a message header; a command code (CC); a structure identifier (SID); a local-cache identifier (LCID); a storage class (STC); a castout class (CCL); a name (N); a replacement name (RN); a local cache entry number (LCEN); a user data field (UDF); a change control (CHGC); a name replacement control (NRC); castout parity bits (QP); a castout lock control (COLC); a complement copy invalidation control (CCIC); a change bit overindication (CBO); an attachment override control (AOC); a castout process id (CPID); a data area size (DAS); a comparative version number (CVN); a version number (VN); a suppress registration (SREG); a version comparison request type (VCRT); a version request type (VRT); and an adjunct area (AA). If there is no adjunct data, then the message command block does not include an adjunct area.

The WAR command is used to write the entry and its associated data/adjunct to the new structure, with different WAR operands depending on the state of the directory entry in the old structure.

For example, the following operands are commonly set on writes to the new structure, regardless of the state of the DEIB:

| | |
|---|---|
| STC - | value from DEIB |
| N - | value from DEIB |
| RN - | 0 (no registrations) |
| LCEN - | 0 (no registrations) |
| NRC - | 0 (no registrations) |
| CCIC - | 0 (no registrations) |
| SREG - | 1 (no registrations) |
| AOC - | 1 (perform write as long as LCID is assigned, need not be actively attached). |
| VN - | value from DEIB |
| CVN - | 0 (no comparing VN info) |
| VCRT - | 0 (no VN comparison) |
| VRT - | 011 (replace VN with value from DEIB) |
| DAS - | value from DEIB |
| AA - | value from RAR message response block (if adjunct is present) |
| Data - block | value from RAR data block (if data is present) |

The following additional operands are set on a case-by-case basis, depending on the state of the DEIB:

a. DEIB indicates entry has the change bit on (C=1) and is not locked for castout. (This state results from a normal store-in cache protocol, prior to castout.)

The following operands are set for this case:

| | |
|---|---|
| CHGC - | 1 (to write the entry changed (C = 1) and set the CCL, CP, and UDF values for the entry) |
| COLC - | 0 (since the castout lock is not to be obtained) |
| LCID - | 0 (not obtaining the castout lock) |
| CPID - | 0 (not obtaining the castout lock) |
| CCL - | value from DEIB |
| CP - | value from DEIB |
| UDF - | value from DEIB | b. DEIB indicates entry has the change bit off (C=0) and is not locked for castout.

In this embodiment, the copy process should not be retrieving or propagating any such entries, because only entries that are changed/castout-locked are retrieved. This case should not occur. If it does, diagnostic information is recorded, and the copy process is aborted.

c. DEIB indicates entry has the change bit on (C=1) and is locked for castout in the write-with-castout state.

In this embodiment, this is a protocol violation. The entry is locked for castout in a write-with-castout state, implying a store-thru protocol is being used; but the same entry is also marked changed, implying a store-in protocol is being used. This case should not occur. If it does, diagnostic information is recorded, and the copy process ends.

d. DEIB indicates entry has the change bit off (C=0) and is locked for castout in the write-with-castout state.

This state results from a normal store-thru cache protocol, when the castout lock is obtained on a write, prior to it being unlocked. Note that such entries may or may not have data/adjunct, since the castout lock may be obtained on a write with zero data.

The following operands are set for this case:

| | |
|---|---|
| CHGC - | 0 (to write the entry unchanged (C = 0)) |
| COLC - | 1 (to obtain the castout lock in the write-with-castout state) |
| LCID - | value from DEIB (to set the castout lock value) |
| CPID - | value from DEIB (to set the castout lock value) | e. DEIB indicates entry has the change bit on (C=1) and is locked for castout in the read-for-castout state.

This state results from a normal store-in cache protocol, when the castout lock is obtained by castout processing, and a more recent changed copy of the entry is written "through" the castout lock, prior to it being unlocked.

The following operands are set for this case:

| | |
|---|---|
| CHGC - | 1 (to set the CCL, CP and UDF values for the entry) |
| CBO - | 1 (to set the change bit (C = 1) for the entry) |
| COLC - | 1 (to obtain the castout lock in the read -for -castout state) |
| LCID - | value from DEIB (to set the castout lock value) |
| CPID - | value from DEIB (to set the castout lock value) |
| CCL - | value from DEIB |
| CP - | value from DEIB |
| UDF - | value from DEIB | f. DEIB indicates entry has the change bit off (C=0) and is locked for castout in the read-for-castout state.

This state results from a normal store-in cache protocol, when the castout lock is obtained by castout processing, but no more recent changed copy of the entry is written "through" the castout lock, prior to it being unlocked.

The following operands are set for this case:

| | |
|---|---|
| CHCG - | 1 (to set the CCL, CP, and UDF values for the entry) |
| CBO - | 0 (to not set the change bit (C = 0)for the entry) |
| COLC - | 1 (to obtain the castout lock in the read -for -castout state) |
| LCID - | value from DEIB (to set the castout lock value) |
| CPID - | value from DEIB (to set the castout lock value) |
| CCL - | value from DEIB |
| CP - | value from DEIB |
| UDF - | value from DEIB |

In one embodiment, the buffers used to copy the data are system owned. Since reads and writes are performed in parallel, both a read buffer and a write buffer are used. That is, an overlap of the read of the next entry to be written with the write of the previous entry that was read in occurs. This will be a standard double-buffering protocol; both the currently active read and write complete before the buffers are flipped and the next read/write pair of requests are driven. This allows some amount of parallelism to occur in copying the castout class, while at the same time attempting to preserve the order of the castout class queue (which in turn makes it more likely that the UDF-order queue ordering is easy to maintain), and without overwhelming the channel subsystem and coupling facility by trying to drive too many parallel requests. The data buffers are of the size implied by the old structure's DAEX and MDAS; that is, each buffer is large enough to read in the structure's maximum-size entry, which could be up to, for instance, 64 k in size.

Figure 33:
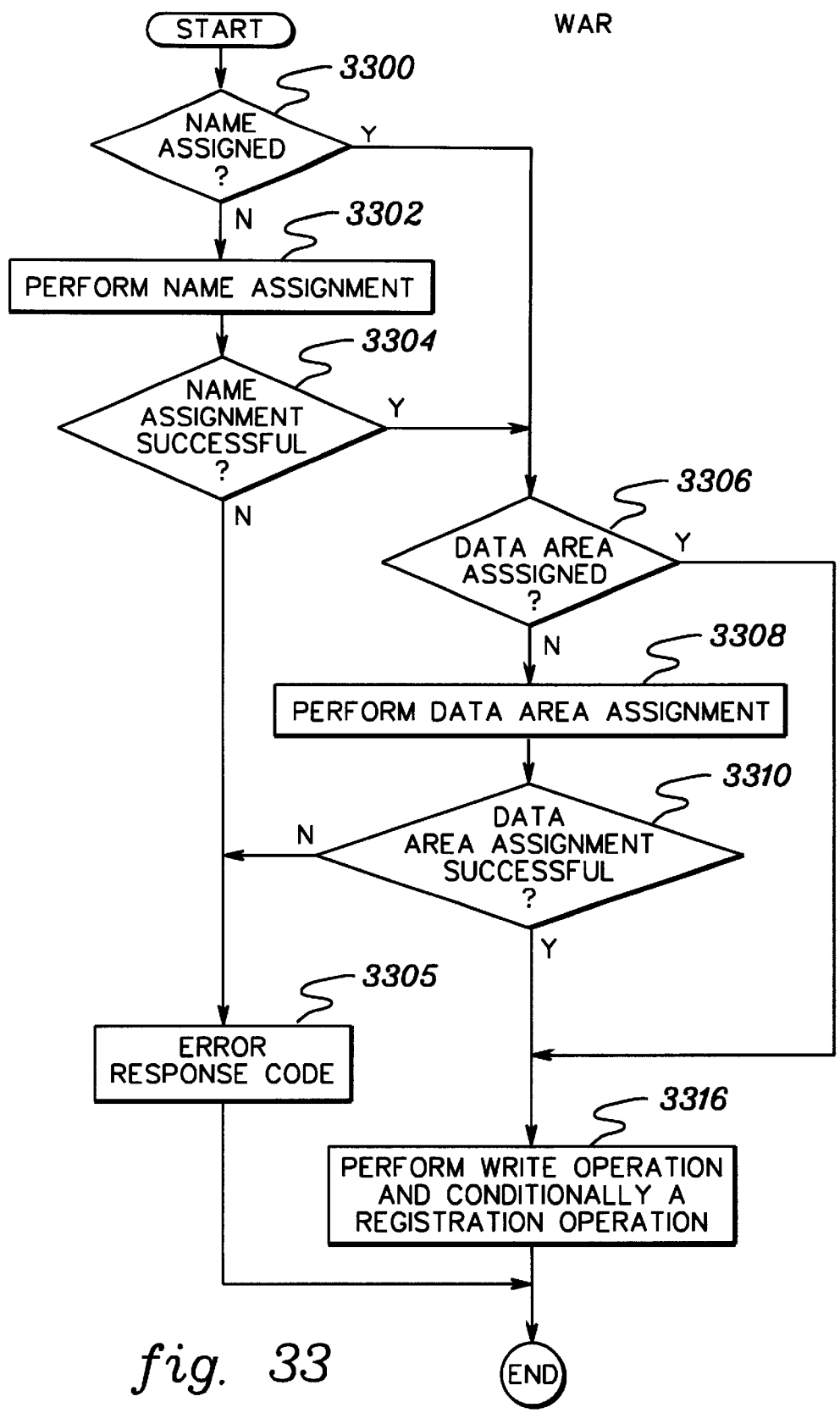
FIG. 33 depicts one embodiment of the logic associated with a Write and Register command, used in accordance with the principles of the present invention.

One embodiment of the logic associated with a Write and Register command is described with reference to FIG. 33. In this example, the WAR command is used to write data that is not cached in the new structure. Initially, a determination is made as to whether a name has been assigned to the directory, INQUIRY 3300. This determination is made by using the name operand in the message command block and performing a directory lookup in the cache directory to see if the name exists (i.e., a directory entry exists with the same name field). If a name has not been assigned, then name assignment is performed, STEP 3302. A name assignment is processed for the specified name and storage class by obtaining an invalid directory entry, marking it valid, initializing the name, setting the castout parity bits to the null value, and attaching the directory entry to the directory. The count of directory entries in the storage class is incremented. Name assignment is further described in U.S. Pat. No. 5,457,793 entitled "Software Cache Management Of A Shared Electronic Store In a Supplex," Elko et al., Issued Oct. 10, 1995, which is hereby incorporated herein by reference in its entirety.

Subsequent to performing the name assignment, a determination is made as to whether the assignment was successful, INQUIRY 3304. If the assignment was unsuccessful, then an error response code is returned, STEP 3305.

However, if the assignment was successful, or if no assignment needed to be made, then a further determination is made as to whether a data area assignment is to be made, INQUIRY 3306. In one example, this determination is made by checking the data area size operand. If the DAS operand is greater than zero, then such an assignment is to be made, STEP 3308. Thus, a data area assignment is processed for the specified name, storage class and data area size by obtaining an ordered collection of available data area elements, attaching them to the directory entry, setting the data bit to one and setting the data area size object to the value of the DAS operand. Data area assignment is further described in U.S. Pat. No. 5,537,574 entitled "Sysplex Shared Data Coherency Method," Elko et al., Issued on Jul. 16, 1996, which is hereby incorporated herein by reference in its entirety.

Subsequent to performing the data area assignment, a determination is made as to whether it was successful, INQUIRY 3310. If the data area assignment was unsuccessful, then an indicative error code is returned, STEP 3305.

However, if the data area assignment was successful, or if no assignment was necessary, then a write operation is performed, as well as a conditional registration operation, STEP 3316. Specifically, when the change control is zero and the suppress registration bit is zero, the data is written unchanged and the LCEN is registered. When the change control is one and the suppress registration bit is zero, the data is written changed and the LCEN is registered. When the suppress registration bit is one, the data is written, but the LCEN is not registered.

Subsequent to writing the entry and data/adjunct to the new structure, processing continues with INQUIRY 3208 (FIG. 32) to determine if there are any more directory entries within the retrieved set of directory entries. If there are more directory entries, then processing continues as described above. However, if there are no more directory entries in that set, then processing continues with INQUIRY 3202 to determine if there is any more data in the claimed castout class. If there is more data, then processing continues as described above.

In particular, each system continues processing by reading sets of directory entries via RCC for the castout class it has claimed, reading the associated data via RAR, and writing the entries and data to the new structure via WAR, until getting RC=0 from the RCC (indicating that all entries for the castout class have been returned). Note that the RCC cursor is not lost for these requests (which might be caused by entries being deleted from the old structure or by entries being moved around on the castout class queues), because the old structure is quiesced. When RCC indicates there is no more data for the claimed castout class, the process of copying changed entries for that class is complete.

Returning to FIG. 30, at this point in the copy phase, the changed entries and their associated data of the claimed castout class have been copied. Now, any registrations associated with the changed directory entries of the claimed castout class are copied, if desired, STEP 3008.

In one embodiment, a Read Local Cache Registers (RLCRS) command is used to read registrations for a particular castout class from the old structure. This command returns a restart token so that processing can continue to process the remainder of the castout class from where it left off. Once a block of registrations has been read in, a Register Name List (RNL) command is repeatedly used to perform the registrations in the new structure. This is because while the RLCRS command uses a large data block (in this example), the RNL is limited (in this example) to processing smaller data blocks at a time. Thus, in general a plurality of RNL commands may be needed to process the registrations returned by a single issuance of the RLCRS command. These commands are used until RLCRS indicates that the registrations for the entire castout class have been processed.

One example of the logic associated with copying registrations is described with reference to FIG. 34. Initially, a restart token is set to zero, STEP 3400, and then processing continues until an end of the castout class queue for the claimed castout class is reached. As an example, a determination is made as to whether the end of the queue is reached, INQUIRY 3402. In one embodiment, it is the Read Local Cache Registers command that indicates whether the end of the queue has been reached. When the end of the queue has been reached, then the copy registrations processing phase is ended, STEP 3404. However, if the end of the queue has not been reached, then processing continues as indicated herein. In particular, the Read Local Cache Registers command is invoked in order to read a list of local cache registers into a data block, STEP 3406.

In one embodiment, the Read Local Cache Registers command includes a message command block having, for instance, the following operands: a message header; a command code (CC); a structure identifier (SID); a data block size (DBS); a storage class (STC); a castout class (CCL); an LCR read type (LCRRT); an assignment control (AC); a browse identifier (BID); and a local cache registration restart token (LCRRTK). In this phase of processing, the Read Local Cache Registers command is invoked with, for instance, CCL, LCRRT=00, AC=0, and the current LCRRTK.

Figure 35:
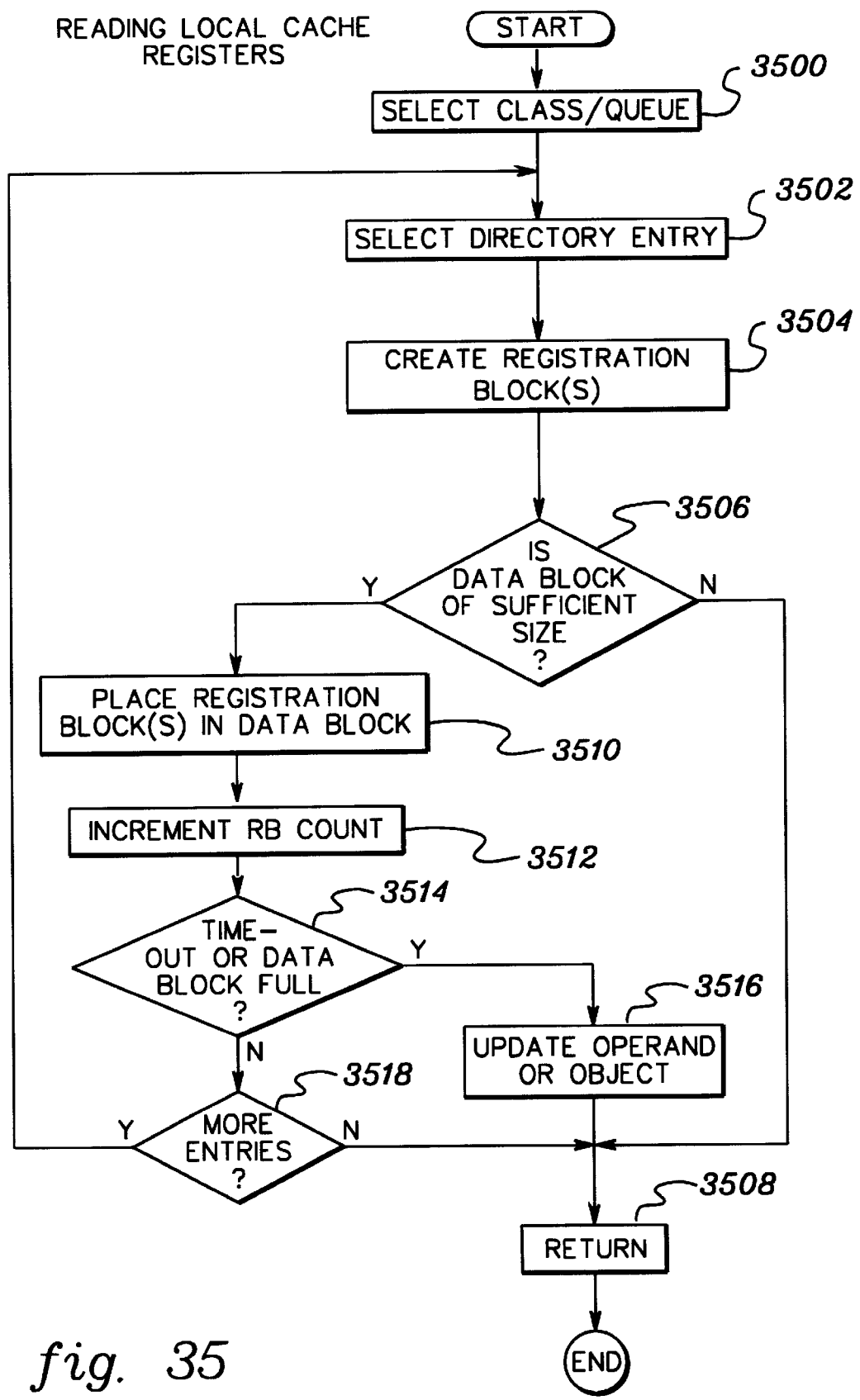
FIG. 35 depicts one embodiment of the logic associated with reading local cache registers during the cache copy phase of the present invention.

One embodiment of the logic associated with the Read Local Cache Registers command having the above-set operands is described in detail with reference to FIG. 35. Initially, the castout class is selected, STEP 3500. For example, when the LCR read type is binary '00', the castout class specified by the CCL request operand is scanned. Thereafter, if the LCR restart token is zero, processing starts with the top directory entry on the castout class queue; otherwise, processing resumes from the LCR restart token, STEP 3502.

As the selected directory entry queue is scanned, the valid rows in the local cache register for the selected directory entry are placed in one or more registration blocks, STEP 3504. As shown in FIG. 36a, a registration block 3600 includes a plurality of operands that are updated during the registration block creation process. (In one example, there is one block for each row). The operands are updated, for instance, as follows: the storage class is placed in the STC operand; the name field from the directory is placed in the name operand; the local cache identifier is placed in the LCID operand; and the local cache entry number is placed in the LCEN operand. Additionally, the assignment control is set to the value of the assignment control request operand (i.e., a value of zero), and the name replacement control and replacement name operands are set to zero.

Returning to FIG. 35, thereafter, a determination is made as to whether a data block to receive the created registration blocks is of a sufficient size to ensure that all the registration blocks for a directory entry can be placed in the data block, INQUIRY 3506. In one example, this determination is made by comparing the data block size request operand to four. If the data block size operand is less than four, then there is insufficient space to ensure that all registration blocks for a directory entry can be placed in the data block. In this scenario, the command is completed, no data is placed in the data block and a response code indicating such is returned, STEP 3508.

However, if the data block is of a sufficient size, then the registration blocks are placed in the data block, STEP 3510. One example of a data block 3602 is depicted in FIG. 36b.

Returning to FIG. 35, after placing the registration blocks in the data block, a registration block count is incremented, STEP 3512. Thereafter, if the search ends with a model-dependent timeout or a data block full condition, INQUIRY 3514, then an internal pointer to the last directory entry processed is generated and placed in the LCRRTK response operand, STEP 3516. The LCRRTK and the RB count response operands, as well as the data block are then returned, STEP 3508.

On the other hand, if a timeout or data block full condition is not realized, then a determination is made as to whether there are more directory entries for the castout class, INQUIRY 3518. Should there be more directory entries, then processing continues with select directory entry, STEP 3502, as described above.

When the last directory entry in the castout class is processed, INQUIRY 3518, the RB count, the data block and a response code are returned, STEP 3508.

Returning to FIG. 34, subsequent to invoking the Read Local Cache Registers command, the local cache restart token is set to the returned restart token, STEP 3408. Thereafter, processing continues for the set of data returned by the RLCRS command. Assuming that a set of data was returned, INQUIRY 3410, that set of data is broken up into smaller data blocks for use with the Register Name List command, as described below.

Initially, prior to invoking the Register Name List command, various operands associated with the command are set, STEP 3412. For example, a registration block count (RBC) is set to the number of registration blocks that are present in the set of data returned by RLCRS. Additionally, a starting registration index (SRX) is set to one, and an ending registration index (ERX) is set to RBC. Thereafter, processing of the registration blocks continues.

Assuming there are registration blocks to process, INQUIRY 3414, a group of registration blocks is selected, STEP 3416, and the Register Name List command is invoked to process the registration blocks in the selected group, STEP 3418. In one embodiment, the Register Name List command includes a message command block having, for instance, the following operands: a message header; a command code (CC); a structure identifier (SID); a starting registration index (SRX); an ending registration index (ERX); a local cache identifier (LCID); a local cache identifier location bit (LCIDLC); a halt register name list bit (HRNL); an attachment override control (AOC); and an invalidate without reclaim control (IWORC). In this particular example, the Register Name List command is invoked with SRX=1, ERX=count of registration blocks in the group, LCIDLC=1, HRNL=1, AOC=1 and IWORC=1.

After invoking the Register Name List command, SRX is set to the returned registration index, STEP 3420. Thereafter, processing continues with INQUIRY 3414 to determine if there are any more registration blocks to be processed. If the returned registration index is less than or equal to ERX, then there are more registration blocks to process and processing continues with STEP 3416. Otherwise, if there are no more registration blocks to be processed for this set of data, processing continues with INQUIRY 3410 to determine if there are more sets of data that were returned by the Read Local Cache Registers command. If no more data was returned, then processing continues with INQUIRY 3402 to determine whether the end of the queue has been reached. When the end of queue has been reached, then processing of the copy registrations phase is complete.

Returning to FIG. 30, at this point, the claimed castout class can be marked as done, using for instance, a "mark done" function, STEP 3010. In one example, the mark done function includes invoking the Write Castout Class Scan Controls command (described herein) with the CCSUT operand set to '001' to set the castout class scan controls state to completed. Thereafter, processing continues with STEP 3000.

Note that, in this embodiment, as each castout class has been copied, the UDF-order queue (if the structure supports them) associated with the castout class have also been copied implicitly. The castout class order is not necessarily UDF order; in fact, because entries move down the castout class queue every time they are written changed but they do not have their UDF values updated whenever this occurs, it may be a poor approximation to UDF order.

In accordance with one aspect of the present invention, CFRM updates the copy controls to mark instances of the copy process as 'failed' for a variety of different reasons. The copy process task instances poll the copy controls as they are processing a phase, and while waiting for phase syncpoints to be reached, so that they may observe and react to these failures in a timely manner.

When a bit in the failed string comes on, the copy process instance(s) who observe this take the appropriate recovery action, depending on the phase processing is in at the time. If the failed system was processing a single phase, or was the last system actively processing for a multiple phase, such that the worker string will become zero after the failed system is removed, the recovering system enters this phase of processing by marking itself a 'worker'. If the failed system is not the last system actively processing for a multiple phase, the recovering system may already be processing for the phase (in which case it continues to process), or may have completed processing for the phase (in which case it re-enters this phase by marking itself a 'worker'.)

After recovery processing is done and the copy controls are atomically updated, there is at least one system marked as a worker for the current phase. This worker system recovers/continues processing for the phase during which the failure occurred.

A failure of a participant in the copy process for castout classes is one example of a failed instance of the copy process. When this failure is observed, the CFRM performs a function to recover castout class scan controls that were claimed by the failed worker but not marked done. The recovery operation uses, for instance, the reset function on the Write Castout Class Scan Controls (WCCSC) command.

Figure 31A:
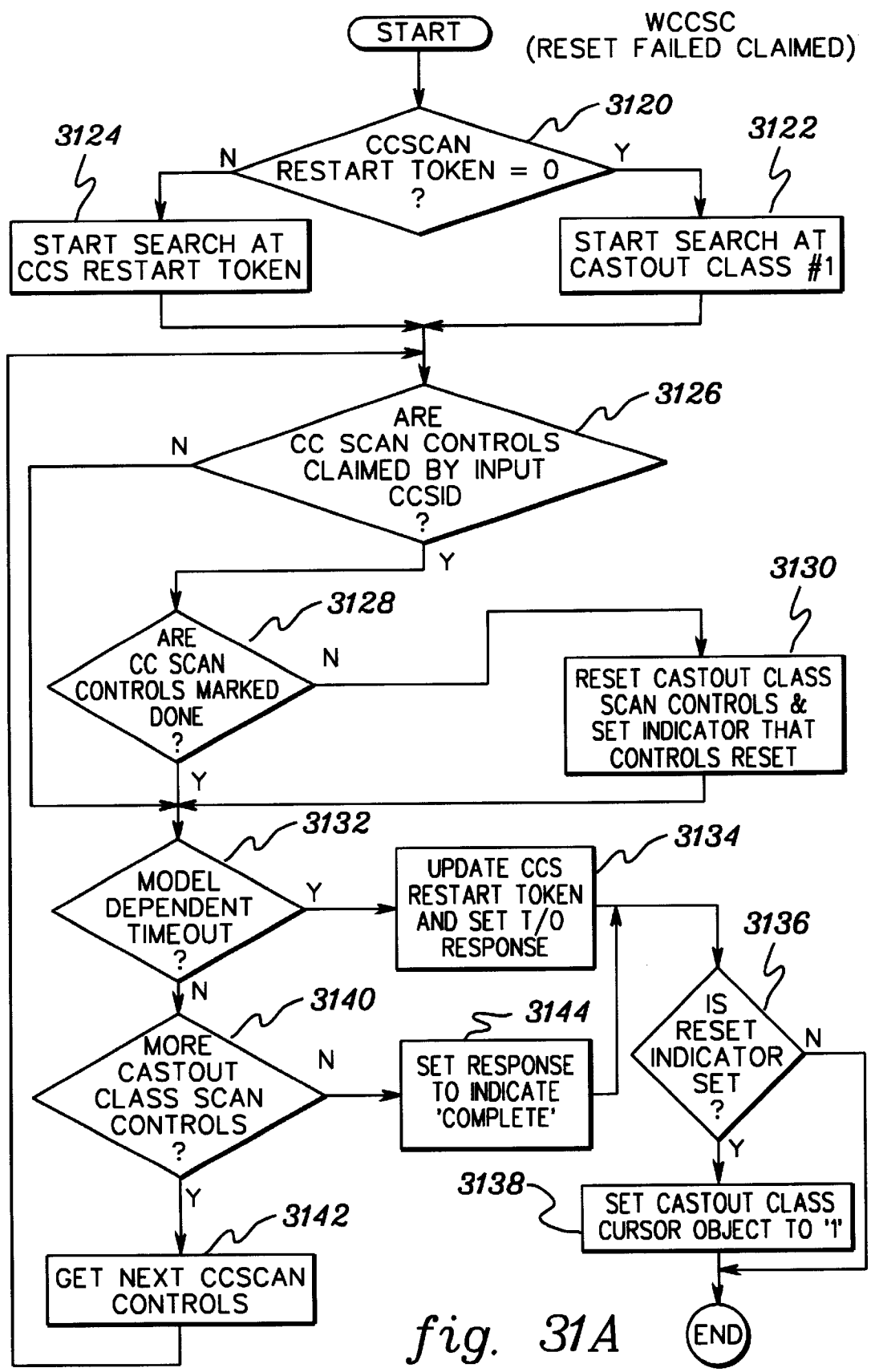
FIG. 31a depicts one embodiment of the logic associated with resetting a failed claimed castout class scan controls, in accordance with the principles of the present invention.

In one example, the WCCSC command is executed with the following operands: a SID; a castout class scan controls update type (CCSCUT); a castout class scan restart token (CCSRT); and a castout class scan identifier (CCSID). The CCSCUT operand specifies that the requested function is resetting selected castout class scan controls. The CCSID operand specifies the failed worker instance which is used for selection. One embodiment of the logic associated with the reset function is described with reference to FIG. 31*a*.

The operation is controlled by the castout class scan restart token. For example, when the restart token is zero, INQUIRY 3120, processing commences with castout class number one, STEP 3122, and when the castout class scan restart token is nonzero, processing starts with the castout class specified by the castout class scan restart token, STEP 3124.

Thereafter, the castout class scan controls of a castout class are tested. For example, a determination is made as to whether the castout class scan controls are claimed by the input CCSID, INQUIRY 3126. If the castout class scan controls are claimed, a further determination is made as to whether they are marked as done, INQUIRY 3128. If they are claimed, but not marked as done, and the CCSID control matches the CCSID request operand, then the controls are reset to the available state and an indicator is set specifying that at least one set of controls were reset, STEP 3130. If the castout class scan controls are claimed by a different CCSID, or are claimed and marked done, or are available, no change is made to the controls. In either case, processing continues as described below.

A determination is made as to whether a model-dependent timeout has been reached, INQUIRY 3132. If processing has timed out, then the castout class scan restart token is updated to point to the next castout class to be processed and a timeout (T/O) response is indicated, STEP 3134. Thereafter, a determination is made as to whether the reset indicator is set, INQUIRY 3136. If so, then at least one set of controls were reset. In this case, the castout class cursor object is set to a value of '1', STEP 3138. However, if the indicator is not set, then processing ends.

Returning to INQUIRY 3132, if there was no timeout, then a determination is made as to whether there are more castout class scan controls to be processed, INQUIRY 3140. If there are more castout class scan controls, then the next castout class scan controls is obtained, STEP 3142, and processing continues with INQUIRY 3126. However, if all the castout classes were processed, then a 'complete' response is indicated, STEP 3144, and processing continues with INQUIRY 3136.

As each copy task completes the castout class queue processing, it turns off its bit in the worker string-. Then, when the syncpoint is reached (all participants' bits off), a transition into the next phase occurs by setting the phase to the next phase. In this embodiment, the next phase is a write-with-castout (WWCO) queue copy phase, STEP 2606 (FIG. 26).

In one embodiment, the write with castout queue copy processing phase is a single phase, and thus, one selected instance of the copy process on a selected system is used to perform the processing. The selected instance of the copy process propagates the entries on the old structure's write-with-castout (WWCO) queue to the new structure's write-with-castout queue. This processing is similar to that described above for copying a single claimed castout class (see FIG. 32), except that a command referred to as Read WWCO Queue (RWQ) is used to retrieve the DEIBs for the entries on the queue. Once the DEIBs are retrieved, the RAR/WAR processes described above are used to copy the changed entry information and data to the new structure.

One embodiment of the logic used to copy entries in the WWCO queue is depicted below:

Set RESTOKEN=0 DO until RWQ indicates no more data in the WWCO queue
  Issue RWQ to retrieve a set of DEIBs, using RESTOKEN
  Remember the returned RESTOKEN for subsequent use
  DO for each retrieved DEIB (if any)
    Issue RAR w/suppress registration to read the entry data and adjunct (if present from the old structure)
    ISSUE WAR with the appropriate options based on the DEIB state information to write the entry data and adjunct (if present) to the new structure
  ENDDO for each DEIB
ENDDO until RWQ indicates done In one example, the RWQ command invoked during the copy processing includes a message command block having, for instance, a message header; a command code (CC); a structure identifier (SID); a name mask (NM); a restart token (RT); a name (N); and a data block size (DBS).

Operationally, the RWQ command scans the WWCO queue, when sufficient message buffer space is provided.

Further, a name block is added to the DEIB list, and the processed count is increased by one for each name in the WWCO queue that matches the input name under the mask condition. In one example, the chosen name mask selects all names for processing.

The WWCO queue scan is controlled by the restart token request operand. A token value of zero starts the processing, and a non-zero token value restarts the processing from the place designated by the token. Processing is completed when the data block is full, when the entire WWCO queue has been processed, or when a model-dependent timeout has been exceeded. When the data block is full, a restart token is generated and returned along with the DEIB list, the processed count and an indicative response code. When the end of the WWCO queue is reached, the DEIB list, the processed count, and an indicative response code are returned to the program. When a model-dependent timeout occurs before the end of the table is reached, a restart token is generated and returned along with the DEIB list, the processed count and an indicative response code.

After the above processing is complete, the changed entries on the WWCO queue and their associated data have been copied. If registrations are to be copied, the registrations associated with these same changed directory entries on the WWCO queue are now copied. In one embodiment, the Read Local Cache Registers (RLCRS) command (described above with reference to FIG. 34) is used to read registrations for the WWCO queue from the old structure. Similar to the processing described above, the RLCRS command returns a restart token so that processing can continue to process the remainder of the WWCO queue from where it left off. Once a block of registrations have been read in, the register name list command is used repeatedly to perform the registrations in the new structure. This continues until the RLCRS command indicates that the registrations for the entire WWCO queue have been processed.

Figure 34:
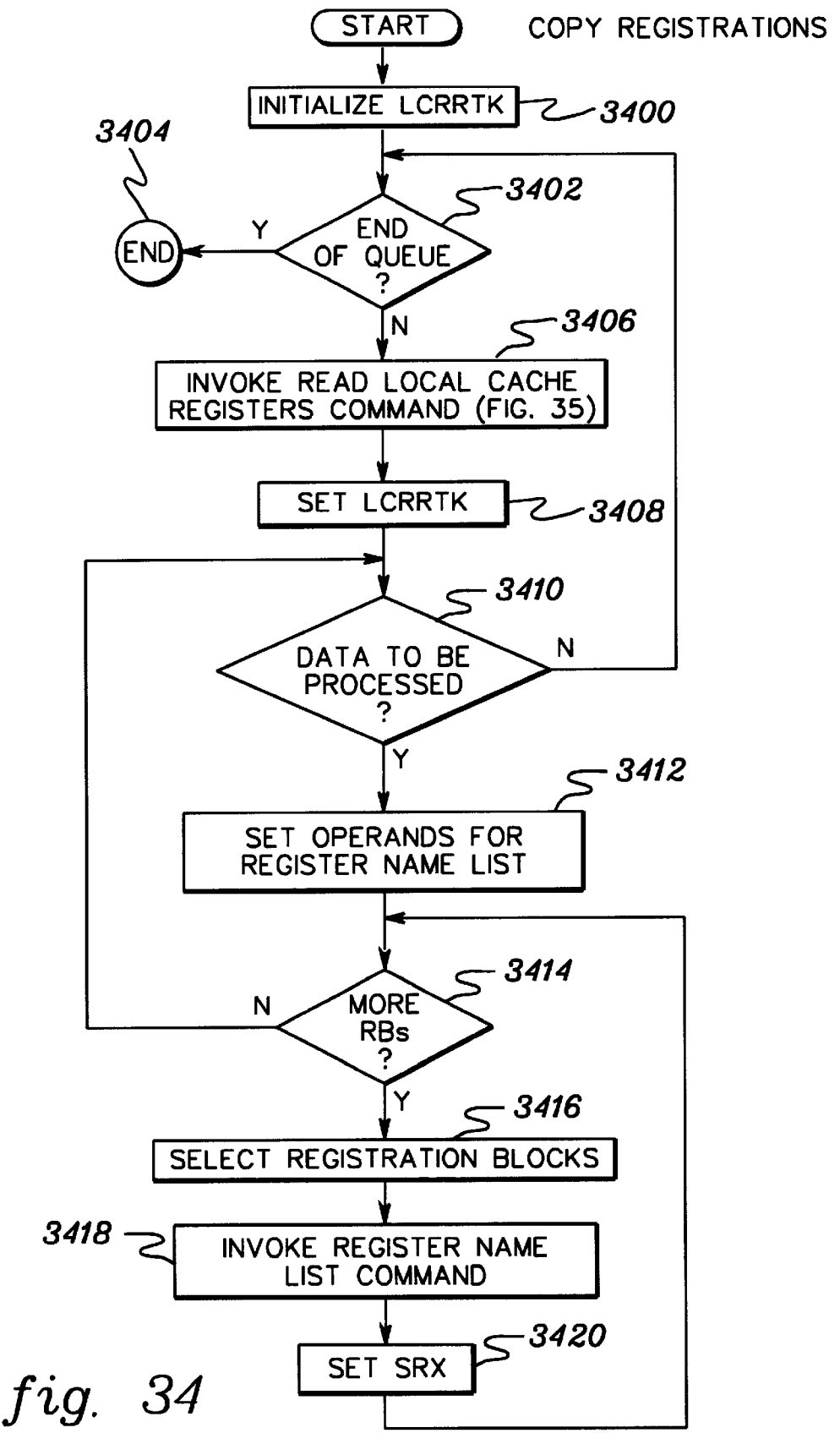
FIG. 34 depicts one embodiment of the logic associated with copying registrations during the cache copy phase of the present invention.

In one embodiment, the logic used to copy the WWCO queue registrations is similar to the logic for copying castout class registrations (see FIG. 34). However, in this scenario, the RLCRS command does not need a CCL and LCRRT is set equal to 01 to indicate that the WWCO queue is to be processed. One example of the logic associated with copying WWCO queue registration is depicted below:

Set LCRRTK=0
DO until RLCRS indicates end of WWCOQ
   Invoke RLCRS command with LCRRT=01, AC=0, and current LCRRTK
   Set LCRRTK to returned restart token
   DO for each chunk of data returned by RLCRS (breaking up the large data block used on RLCRS into smaller data blocks for use with RNL)
     Set RBC to the number of RBs that are present in the chunk
     Set SRX to 1
     Set ERX to RBC
     DO UNTIL done with returned RBs for this chunk
     Invoke RNL command with appropriate SRX, ERX, LCIDLC=1, HRNL=1, AOC=1, IWORC=1
       Set SRX to returned registration index
     ENDDO until done with returned RBs for this chunk
   ENDDO for each chunk of data returned by RLCRS
ENDDO until end of WWCOQ Operationally, the Read Local Cache Registers command scans the WWCO queue. If the LCR restart token is zero, processing starts with the top directory entry on the WWCO queue; otherwise, processing resumes from the LCR restart token. The selected directory entry queue is scanned, and the valid rows in the local cache register for each selected directory entry in the selected queue are placed in registration blocks. Each registration block that is created is placed in the data block and the RB count is incremented.

When the search ends with a model-dependent timeout or the data block is full, an internal pointer to the last directory entry processed is generated and placed in the LCRRTK response operand. The LCRRTK and RB count response operands, the data block and an indicative response code are returned.

When the last directory entry in the WWCO queue is processed, the RB count, the data block and an indicative response code are returned.

In addition to the above, if registration information is being copied, then there will be a transition into another copy phase, referred to as the storage class registration copy processing phase. However, prior to transitioning into this next phase, a storage class browse controls clean up is performed. This cleans up any browse controls that might have been left dirty from a prior system-managed rebuild attempt against the same structure. This clean up is performed by looping through and issuing, for instance, a Write Storage Class Information (WSCI) command with the storage class controls update type equal to 001 against the old structure for each storage class, requesting to reset the browse controls for the storage class to the inactive state.

In one example, the Write Storage Class Information command includes a message command block having, for instance, the following operands: a message header; a command code (CC); a structure identifier (SID); a read hit counter (RHC); a read miss directory hit counter (RMDHC); a read miss assignment supp. counter (RMASC); a read miss name assigned counter (RMNAC); a read miss target storage class full counter (RMTSFC); a write hit change bit zero counter (WHCB0C); a write hit change bit one counter (WHCB1C); a write miss not registered counter (WMNRC); a write miss invalid state counter (WMISC); a write miss target storage class full counter (WMTSFC); a directory entry reclaim counter (DERC); a data area reclaim counter (DARC); a cross-invalidate (XI) for directory reclaim counter (XIFDRC); an XI for write counter (XIFWC); an XI for name invalidation counter (XINIC); an XI for complement invalidation counter (XICIC); a castout counter (COC); a reference signal miss counter (RSML); a target storage class full counter (TSCFC); a completed reference list counter (CRLL); a partially completed reference list counter (PCRLC); an XI for LCEN replacement counter (XICRC); a write unchanged with XI counter (WUXIC); a storage class controls update type (STCUT); a browser identifier (BID); and a storage class (STC).

Although the message command block includes various counters, at this time, the command is being used only to update the browse controls and thus, the counters are not needed.

Figure 37:
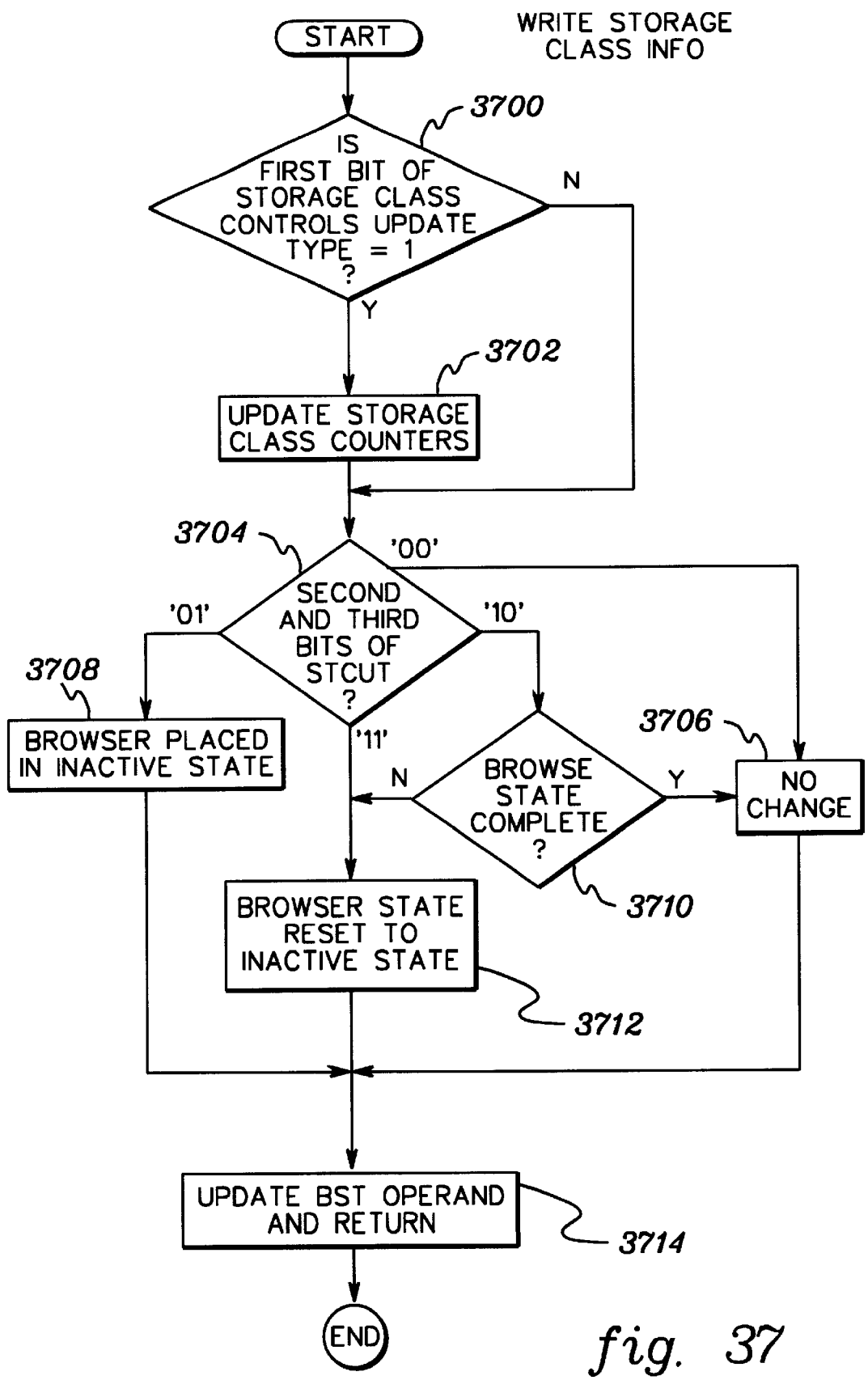
FIG. 37 depicts one embodiment of the logic associated with writing storage class information during the cache copy phase of the present invention.

One embodiment of the logic associated with the Write Storage Class Information command is described with reference to FIG. 37. This command is being used to conditionally update the browse controls.

Initially, a determination is made as to whether the first bit of the storage class controls update type is equal to a predefined value, e.g., one, INQUIRY 3700. When the first bit of the storage class controls update type is one, the storage class counters (see FIG. 7) are set equal to the values of the corresponding request operands, STEP 3702. Otherwise, the storage class counters are not updated. In this example, the counters are not being updated, so the first bit is not equal to one.

Thereafter, a further determination is made as to the values of the second and third bits of the storage class controls update type, INQUIRY 3704. When the second and third bits of the operand are 00, no change is made to the browse controls, STEP 3706. When the second and third bits of the operand are 01, the browser specified by the browser identifier request operand is placed in the inactive state, STEP 3708. When the second and third bits of the storage class controls update type is equal to 10 and the browse state is not complete, INQUIRY 3710, the browse state is reset to the inactive state, STEP 3712. However, if the browse state is complete, no change is made, STEP 3706. Further, when the second and third bits of the operand are 11, the browse state is reset to the inactive state, STEP 3712. Thereafter, the final browse state is placed in the BST response operand and an indicative response code is returned, STEP 3714.

Subsequent to completing the storage class browse controls cleanup, a transition to the next phase takes place, STEP 2608 (FIG. 26). In particular, the Write Cache Copy Controls command is used to set the phase to the storage class registration copy processing phase (STC reg) and to set the worker string equal to the participant string, since the STC reg phase is a multiple phase. (If registrations are not to be copied, then the STC reg phase is skipped.)

In one example, the storage class registration phase of the copy processing is invoked to copy registrations associated with unchanged directory entries. This processing makes use of storage classes and a cooperative browse mechanism per storage class. In this processing, each copy process instance runs through and attempts to browse each storage class in the old structure. For each storage class, either the browse is not yet started (in which case the command (e.g., the RLCRS command) starts the browse and returns registration information); is active (in which case the RLCRS command returns registration information); or is completed (in which case the RLCRS command does nothing). When the browse is in progress for a storage class, a control referred to as a browse cursor maintains a pointer to the next registration that is to be returned by the RLCRS command. By using the browse cursor, several copy process instances can cooperatively read all of the registration information from a storage class (though each of the instances returns only a disjoint subset of the registration information in the storage class). When one storage class becomes browse complete, the copy process proceeds onto the next storage class, until all of the storage classes are complete.

Figure 38:
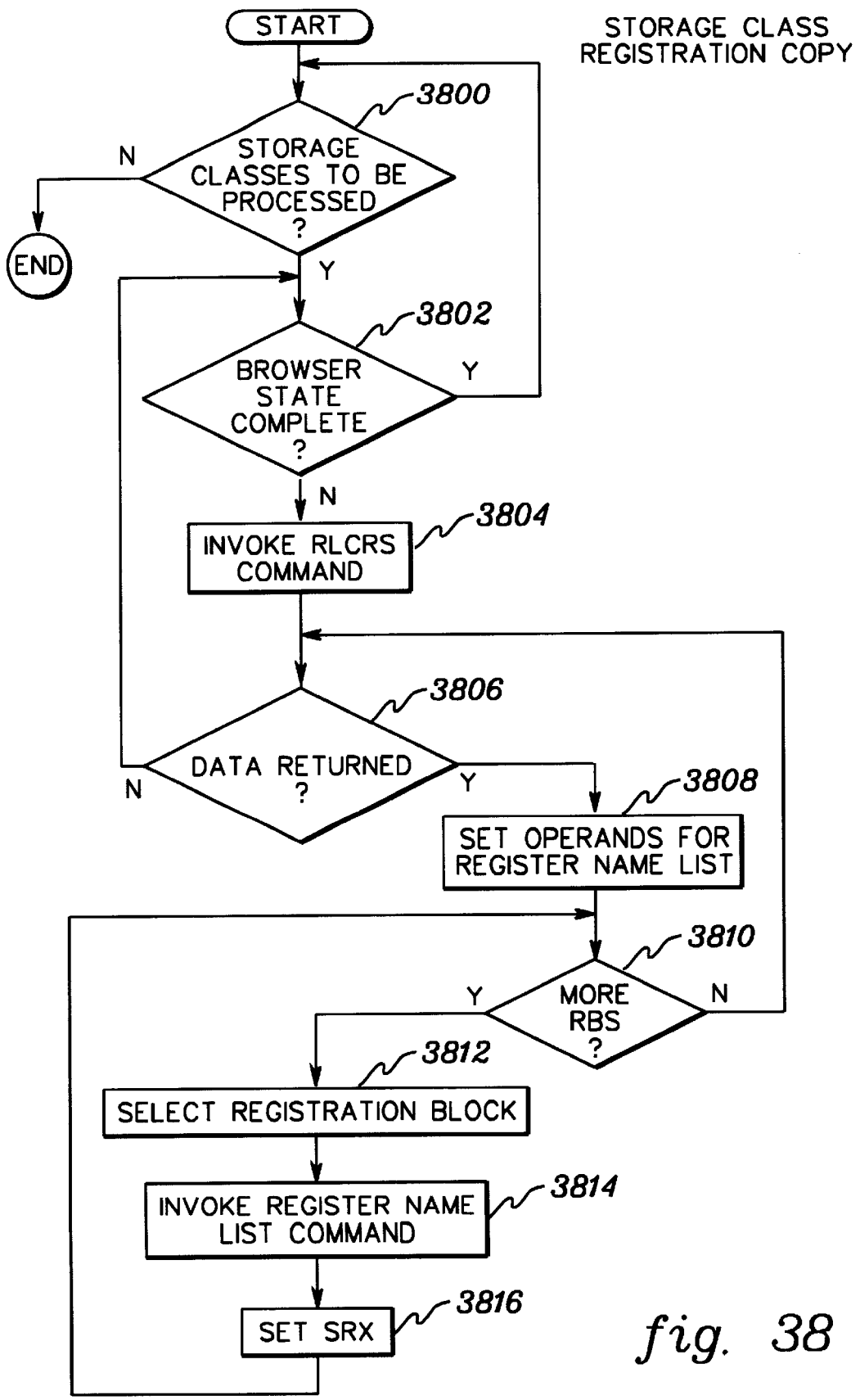
FIG. 38 depicts one embodiment of the logic associated with copying storage class registrations during the cache copy process of the present invention.

One embodiment of the logic associated with the storage class registration copy processing is described with reference to FIG. 38. Initially, a determination is made as to whether there are storage classes to be processed, INQUIRY 3800. As one example, to make this determination, a counter is compared to the maximum storage class (MSC) value (i.e., the maximum number of storage classes). Processing continues from storage class 1 to the maximum number of storage classes. When there are storage classes to be processed, processing continues for each storage class until it is indicated as browse complete, INQUIRY 3802. In particular, in one example, the Read Local Cache Registers command indicates when the browse is complete for a particular storage class. When the browse state is complete for a particular storage class, processing continues with INQUIRY 3800 to obtain another storage class to be processed, if any. However, if the state is not browse complete, then processing continues, as described herein.

Initially, the Read Local Cache Registers command is invoked to browse the local cache registers in a storage class, STEP 3804. In one example, the command is invoked with STC, BID, LCRRT=10 and AC=1.

When the LCR read type is 10 and the browse state is not in the complete state, the storage class specified by the STC request operand is scanned using the browse controls. If the browse state is inactive, the browse state is set to active, the browser active bit is set to binary 1 in the first row of the browse register, and the browse identifier in the first row is set equal to the BID request operand. The browse cursor and the current and previous browse cursors for the browser are set to zero and the scan is initiated from the top of the storage class queue. If the browse state is active, the browser is inactive, and the browse register has an available row, the browse active bit is set to binary 1 in the selected row of the browse register, and the browser identifier in the selected row is set equal to the BID request operand. The current and previous browse cursors are set equal to the browse cursor and the scan is initiated from the directory entry identified by the browse cursor.

If the browse state is active and the browser is also active, the current and previous browse cursors are set equal to the browse cursor and the scan is initiated from the directory entry identified by the browse cursor.

The selected storage class queue is scanned and a registration block is created for each directory entry in which the change bit and castout lock are both zero. (The registrations for the changed or locked for castout entries were previously copied in conjunction with the copying of the castout class queues and the WWCO queue.) Each registration block that is created is placed in the data block and the RB count is incremented.

When the search ends with a model-dependent timeout or the data block is full, an internal pointer to the last directory entry processed is generated in the browse cursor object and in the current browse cursor object for the browser. The LCRRTK response operand is set to zero and the LCRRTK and RB count response operands, the data block and an indicative response code are returned. When the browser is inactive and no rows are available in the browse register, the command is complete and an indicative response code is returned. No scan is performed.

When the last directory entry in the storage class is processed, an internal pointer to the last directory entry is generated and placed in the current browse cursor object, the browse cursor object is reset to zero, and the browse state is set to the completed state. The RB count, the data block and an indicative response code are returned.

Subsequent to invoking the RLCRS command, each set of data returned by the command is processed.

Assuming data was returned by the RLCRS command, INQUIRY 3806, various operands are set, which are associated with the Register Name List command, STEP 3808. In one example, these operands include a registration block count, which is set equal to the number of registration blocks in this set of registration blocks returned by the RLCRS command; a starting registration index (SRX), which is set equal to 1 and an ending registration index (ERX), which is set equal to the registration block count.

Assuming a registration block exists, INQUIRY 3810, the group of registration blocks is selected to be processed, STEP 3812. In particular, the Register Name List command is invoked with the appropriate SRX, ERX, LCIDLEC=1, HRNL=1, AOC=1 and IWORC=1 to process the registration blocks, STEP 3814.

Subsequent to processing the selected registration block, the starting registration index is set to the returned registration index, STEP 3816. Thereafter, processing continues with INQUIRY 3810 to select another group of registration blocks, if available. When there are no more registration blocks for this set of data to be processed, processing continues with INQUIRY 3806 to select another set of data returned by the RLCRS command. When there is no more data, processing continues at INQUIRY 3802, which makes a check of the browse state. If the browse state is not complete, then processing continues as described above. However, when the browse state is complete for that particular storage class, then processing continues with INQUIRY 3800 to determine if there are any further storage classes to be processed. The storage class registration copy process continues until all the storage classes have been processed.

The above processing manipulates browse controls via the RLCRS command in the old structure. During this processing, the old structure's browse controls are used to track the progress of the cooperative browse within each of the storage classes as the copying proceeds. Upon successful completion of this phase of processing, all storage classes are in the browse complete state in the old structure.

In one embodiment, if the system-managed rebuild proceeds forward to the new structure, these controls do not need to be cleaned up; the old structure in which those controls reside is going to be deallocated anyway. If the system-managed rebuild is stopped and the old structure is kept, however, these controls need to be reset to the inactive state reentering this phase of processing on a subsequent system-managed rebuild of the structure (described above with reference to the write with castout queue processing).

A failure of a participant in the copy process for registrations in storage classes is another example of a failed instance of the copy process. When a failure occurs during the storage class registration copy phase, the coupling facility has kept track of a previous and current browse cursor (PBCUR and CBCUR) value for each copy process instance. While the browse for a storage class is active, these delineate the entries for which registration copy is 'in-progress' by each of the copy process instances at the time of the failure. For the failed copy process instance, this is the set of registrations that were returned to that failed copy process instance, and which that instance therefore had sole responsibility for copying. The instance may have already copied some or all of these registrations prior to failing, but, in one example, the recovering copy process instance explicitly forces a copy of all of these registrations at the time of recovery prior to cleaning up the failed user.

Once the registrations have been copied completely, the recovering instance resets the failed instance's browse controls (e.g., PBCUR and CBCUR values), removes the failed instance from the copy controls, and restarts STC registration copy processing for the phase starting with STC=1.

Figure 38A:
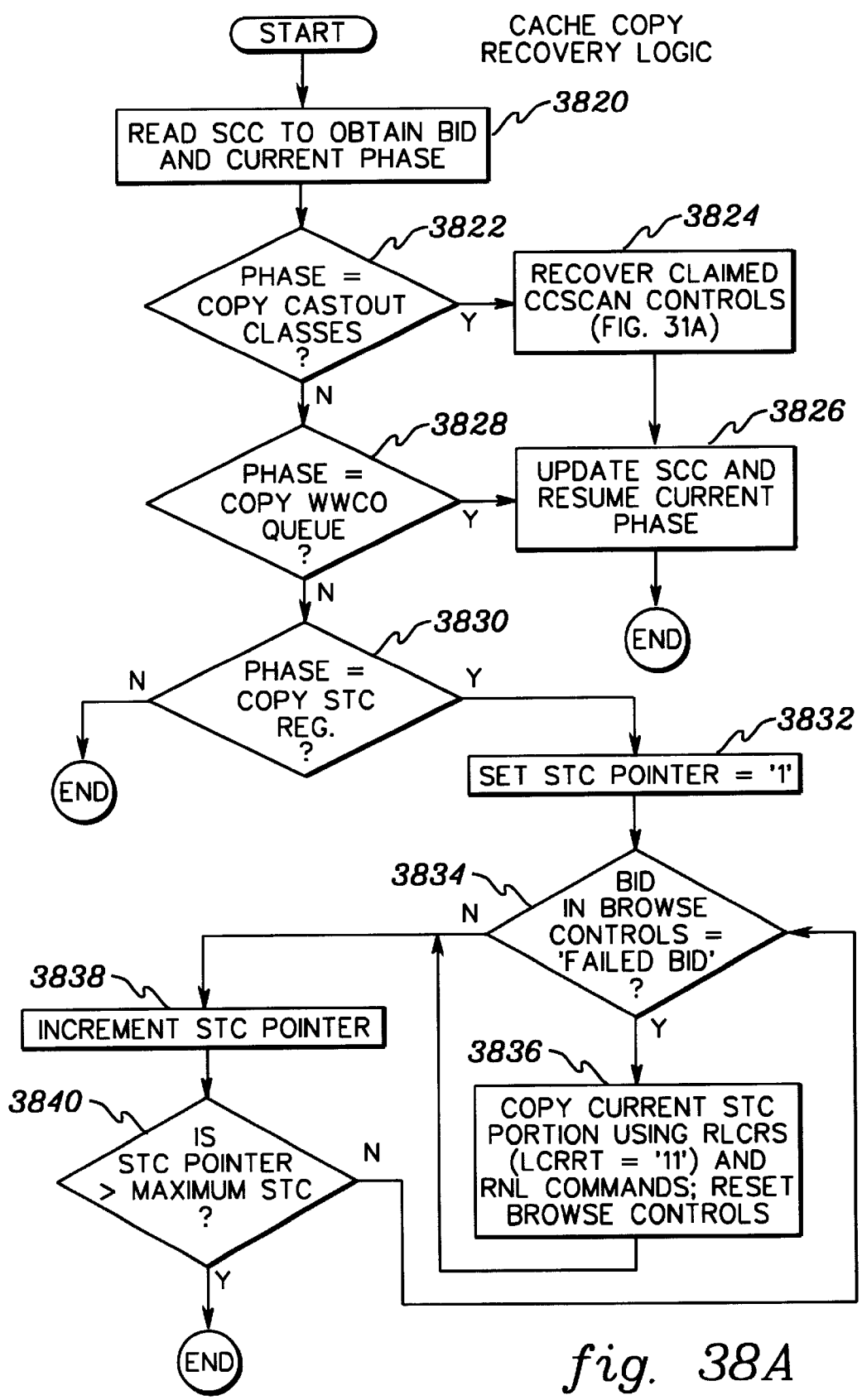
FIG. 38a depicts one embodiment of the logic associated with cache copy recovery, in accordance with the principles of the present invention.

One embodiment of the overall logic for recovering for a failed copy process instance is described with reference to FIG. 38a. When a failure of a copy process instance is detected, the structure copy controls are read to ascertain the BID/COPYID of the system that failed and the current phase, STEP 3820.

If the current phase is copying castout classes, INQUIRY 3822, then the function to recover claimed castout class scan controls is invoked for any castout class scan controls claimed by the failed system, and the castout-class cursor is reset to 1, STEP 3824. Subsequently, the copy controls are updated to remove the failed system and to continue or resume processing of the castout-classes formerly claimed by the failed system, STEP 3826. This causes any previously copied directory entries, data and registrations to be re-copied.

However, if the current phase is not the copy castout classes phase, a determination is made as to whether the current phase is the WWCO queue copy phase, INQUIRY 3828. If the current phase is processing the WWCO queue, the copy controls are updated to remove the failed system and take over ownership of the WWCO copy process, STEP 3826. This also recopies any directory entries, data and registrations that were copied by the failed system.

If the current phase is not the copy castout classes phase or the WWCO queue copy phase, a determination is made as to whether the current phase is the storage class registration copy phase, INQUIRY 3830. If not, processing ends. However, if the current phase is processing storage class registrations, then each storage class is recovered in sequence starting with storage class 1, STEP 3832, and continuing to the maximum storage class. For each storage class, the following processing is performed until the RLCRS command returns a done indication. Initially, a determination is made as to whether the BID in the browse controls equals the failed BID, INQUIRY 3834. If so, processing issues the RLCRS command with an LCR request type (LCRRT) of binary "11" to read the current set of registration blocks using the setting of the previous browse cursor (PBCUR) and the current browser cursor (CBCUR) in the browse controls for the storage class, STEP 3836. This processing retrieves the portion of the storage class registration tables that were being processed by the failed instance and does not update the PBCUR and CBCUR. This processing is retryable and can be done several times by many different recovering systems, if required or desired, until the registration copy process has completed for the identified portion of the storage class. In each case, a set of registration blocks is returned, and the RNL command is used to copy the registrations to the new structure. Once the portion of the storage class identified by the PBCUR and CBCUR values has been successfully copied to the new structure, the WSCI command is invoked to reset the browse controls for the storage class and for the failed BID.

Thereafter, or if the BID is not the failed BID, the STC pointer is incremented, STEP 3838, and a check is made to determine if the pointer is greater than the maximum storage class, INQUIRY 3840. If there are more storage classes, processing continues with INQUIRY 3834. When all the storage classes have been successfully processed, the structure copy controls are updated to remove the failed system and to continue or resume processing of the storage classes from STC="1".

Returning to FIG. 26, subsequent to completing the storage class registration copy process, a transition to the next phase takes place. In one example, the next phase is a storage class counters copy processing phase, which is a single phase. As described above, the next phase is transitioned into by selecting the next phase and by selecting a single worker instance in the worker string.

In this phase of processing, the storage class counters (e.g., the event counters) for each of the defined storage classes in the structure are copied, STEP 2610. The copy process reads the storage class counters for each defined storage class from the old structure (using, for instance, a Read Storage Class Information (RSCI) command) and writes them to the new structure using, for instance, a Write Storage Class Information (WSCI) command. The format of the command block for the Write Storage Class Information command matches, in one example, the format of the Read Storage Class Information response block. However, the write command only sets, in this example, a subset of the counts (the event counts).

The Write Storage Class Information command allows the storage class counters that measure events across time intervals to be set to predefined values. This is useful when a structure is copied between facilities and in ensuring that the event counters continue to appear as monotonically increasing after the copy is complete.

The WSCI is described herein. To write the storage class counters, the WSCI command is invoked with STCUT equal to binary 100 to update the storage counters of the new structure.

In one embodiment, there is no need for this phase of processing to reset or correct the castout class scan cursor or scan control values, which are used as a serialization mechanism in the new structure. These objects are only used by the copy process in a new structure that is freshly allocated by the structure allocation process. When the system-managed rebuild completes and the new structure becomes the only active structure instance, these objects are residual. If the structure is ever copied again, the residual values are not important, because only the new structure uses these fields for serialization purposes, and the residual values would be in the old structure at that time.

Returning to FIG. 26, after completion of this processing, the next phase is transitioned into by setting the phase to Done and by setting the worker string equal to the participant string, STEP 2612.

Upon reaching this phase, all necessary and/or desired structure data has been propagated. The processing for this phase is for the copy process task to issue a request to inform the CFRM task that it is complete (passing the appropriate return code) and to give up control. The CFRM main task collects these responses for the systems. When the systems participating in the copy process have reported completion, CFRM determines whether or not the systems successfully completed the copy process. If so, CFRM marks the structure to indicate that the copy phase is complete and proceeds on to the next phase of rebuild. Otherwise, CFRM stops the rebuild process.

List/Lock Structure Copy Process

Other types of structures to be copied include list and lock structures. Before describing the processing associated with copying a list and/or a lock structure (hereinafter list/lock structure), a number of assumptions associated with list/lock structures are described. These assumptions correspond to the particular embodiments described herein. Other embodiments may have the same or differing assumptions. These are only offered as examples.

In one embodiment, the following assumptions are made for a list/lock structure:

All entries/data elements are copied. All entries and data are considered "changed" in a list structure.

For an active user who is connected to both the old and new structure, or for an active user who is connected only to the old structure, but not the new structure (an "unconnected" user), list registration information is copied. This includes list monitoring registrations, event monitor control (EMC) sublist monitoring registrations, and event-queue monitoring registrations. For a user who is failed-persistent to the old structure, there is no list registration information to propagate (all such information would have been cleaned up by the detach scan that was done when the user became failed-persistent).

Because list registrations are copied to the new structure, whenever a switchover to use the new structure exclusively is made, there is no need to clear the users' local vectors for a list structure.

Lock-table entries are copied, regardless of whether the locks are associated with a user that is connected or unconnected to the new structure.

List-header objects are copied, including the list state transition count (LSTC). Event-queue header objects are also copied, including the event queue transition count (EQTC).

The order of EMCs on the event queue in the new structure need not match the order in the old structure.

The copy process ensures that the EMCs get queued to the event queue in the new structure, if they are currently queued to the event queue in the old structure, to avoid "overindication" of sublist event transitions.

Programmable list entry IDs (PLEIDs) in the old structure instance are used in order for the copy process to copy the structure. If the old structure is using PLEIDs, the copy process propagates the PLEID from one structure to the other directly as it copies the entries and data.

XES internally assigns unique PLEIDs to the entries, unbeknownst to the user. These MVS-generated PLEIDs include, for example, the 4-byte SYSID of the originator of the request, plus an 8-byte time of day (TOD) value. To the user, these MVS-generated PLEIDs look like coupling facility generated LEIDs, so the user is unaware that PLEIDs are in use.

A Read EMC List command is used to return EMCs associated with a specified list. It returns EMCs for the list in no particular order by sublist or by UID within a sublist, but it returns all registered EMCs for all sublists and UIDs regardless of whether or not particular EMCs are currently queued to the event queue at the time of the request.

This command accepts an EMC restart token to use as a starting point, and returns such an EMC restart token to use as a cursor to continue after a timeout or buffer full condition. The cursor designates the next EMC to be processed; the cursor for the EMC scan does not get lost, while processing the command redrives, because the structure is quiesced. The command also accepts a list number range to bound the returned EMCs to those associated with a particular range of lists. For the copy process, a range of the single list that is being copied at the time is specified.

The format of the EMCs in the data block returned is suitable for use as the input data block on a Register Event Monitors (REMS) command.

Register Event Monitors (REMS) command is defined to be able to use UID in the data block entries (in the format returned by the Read EMC List command), rather than providing for only a single UID in the MCB to be applied to all of the EMCs in the data block. This allows the retrieved EMC registrations to be propagated efficiently without needing to sort the EMCs into groups on a per-UID basis.

A Read LTE Range command is used to return nonzero LTEN/LTEV pairs for a requested range of lock table entries. It returns an LTEN to use as a cursor for restart after timeout/buffer full, and a processed count indicating how many nonzero lock table entries were returned in the data buffer.

A Store LTEs command is used to write the nonzero LTEN/LTEV pairs (using the buffer format returned on Read LTE Range) to the lock table without performing any lock comparisons. The processed count returned on the Read LTE Range command determines the ending index value for the lock table entries in the data block which are to be processed.

Operands on a Write List Controls (WLC) command are provided that allow the cursor direction to be set and at the same time, to explicitly set the list cursor value to point to an arbitrary entry on the list.

Operands on a Register List Monitor (RLM) command allow the EQTC to be set when registering interest in monitoring an event queue.

Figure 39:
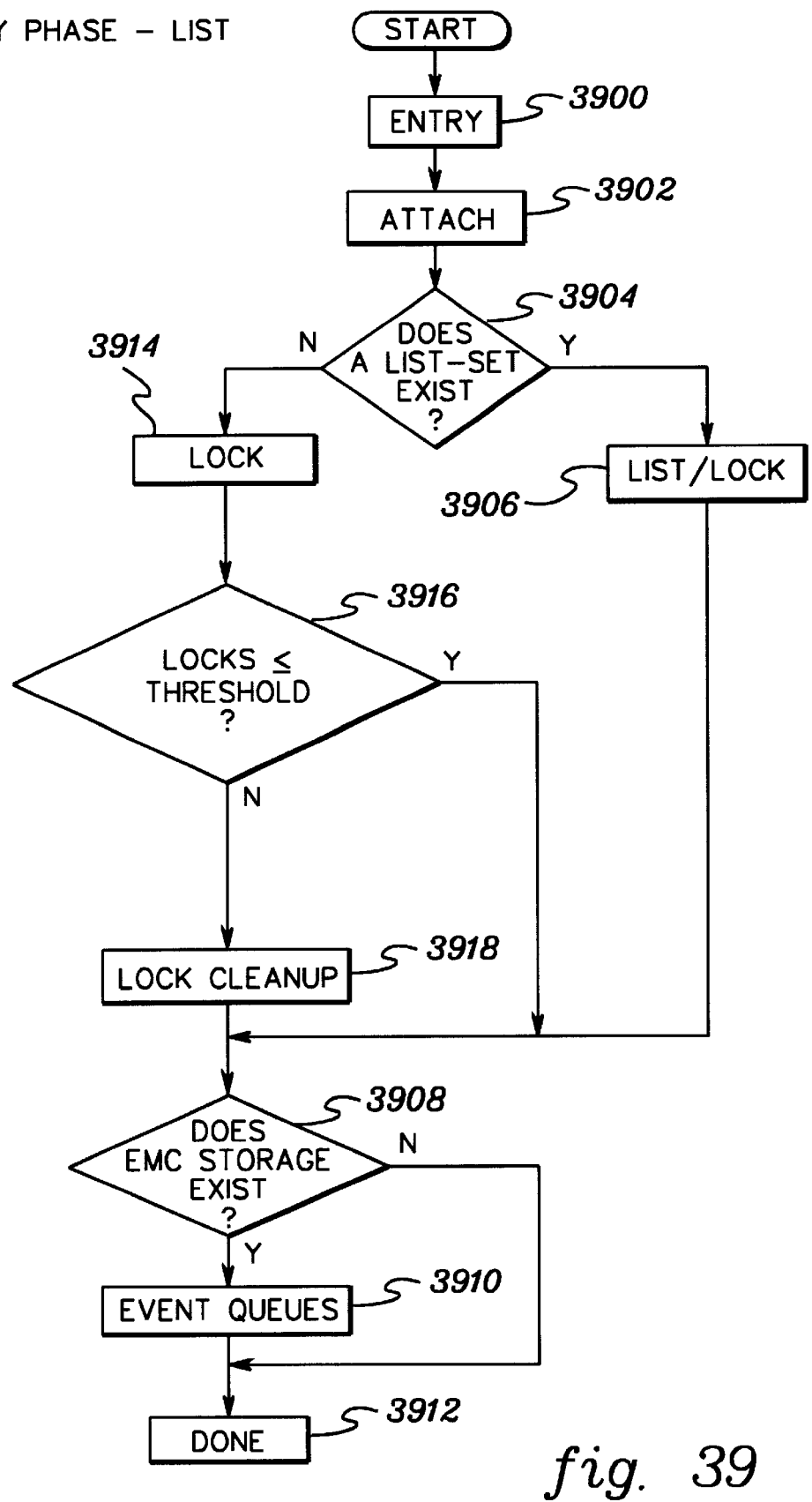
FIG. 39 depicts one embodiment of the logic associated with copying list structures, in accordance with the principles of the present invention.

As with the cache structure copy process, there are a number of phases associated with copying a list/lock structure. One example of these phases is depicted in FIG. 39 and described in detail below.

An initial phase of the list/lock structure copy process is the entry phase, which is a multiple phase in this embodiment, STEP 3900. Thus, one or more systems participate in the entry phase. In particular, CFRM creates copy processor tasks on a subset of the systems, which then cooperate to copy the structure. All participating instances of the copy task are indicated as workers in the worker string of the structure copy controls.

No actual copying of structure objects is performed in this phase. Instead, each instance of the copy task resets its bit in the worker string to indicate that it has received control successfully. When all participating systems have entered the entry phase of the copy process, a syncpoint is reached and a transition into the next phase occurs, as described above.

In one example, the next phase of the list/lock copy process is an attach phase, which is, for instance a single phase, STEP 3902. During this phase, zero or more users are attached to the new structure in a failed-persistent state.

During the attach processing, the selected worker system reads attachment information for the old and new structures, and if there are any users who are actively attached to the old structure for which the user identifier (UID) is unassigned in the new structure, it attaches that user to the new structure directly into the failed-persistent state, propagating any relevant attachment information.

Using the above technique, the selected worker system propagates any users with failed-persistent attachments to the old structure to the new structure, by attaching the user to the new structure directly into the failed-persistent state. (Note that, in one embodiment, these new structure attachments are performed with user authority and user attachment controls (UAC) that are the same as that associated with the attachment to the old structure.)

One embodiment of the logic associated with the attach copy processing phase is described with reference to FIG. 40. Initially, the user identifier vector for the old structure is obtained, STEP 4000. In one example, a Read List Structure Controls (RLSC) command is used to retrieve the UID vector. The Read List Structure Controls command includes a message command block having, for instance, the following operands: a message header; a command code (CC); a structure identifier (SID); and a data block size (DBS).

Operationally, when the Read List Structure Controls command is processed, the data block size request operand is checked. In one embodiment, when the data block size request operand is non-zero and when sufficient message buffer space is provided, the structure copy control is placed in a data block. When the data block size request operand is zero, no data block is returned.

Additionally, the values of the list structure controls are placed in the response operands, and the control values along with a response code are returned. In one example, the response operands include a response descriptor; a response code (RC); a monitor reapportionment in progress indicator (MREIPI); an entry reapportionment in progress indicator (EREIPI); a structure size change indicator (SSCI); a maximum data list entry size (MDLES); a list structure type (LST); a lock table entry characteristic (LTEX); a list element characteristic (LELX); a minimum apportionable structure size (MASS); a lock table entry count (LTEC); a list count (LC); a structure size (SS); a maximum structure size (MXSS); a target structure size (TSS); a target maximum element count (TMELC); a target maximum entry count (TMEC); a maximum list set element count (MLSELC); a list set element count (LSELC); a nonzero lock table entry count (NLTEC); a maximum list set entry count (MLSEC); a list set entry count (LSEC); a structure authority (SAU); a user structure control (USC); a user identifier vector (UIDV); a pending entry to element ratio (PETELR); a marginal structure size (MRSS); an event monitor controls count (EMCC); a maximum event monitor controls count (MEMCC); a target maximum event monitor count (TMEMC); a pending monitor to entry storage ratio (PMTESR); a list set cursor (LSCUR); a structure copy control version number (SCCVN); and an extended user structure control (EUSC).

Figure 40:
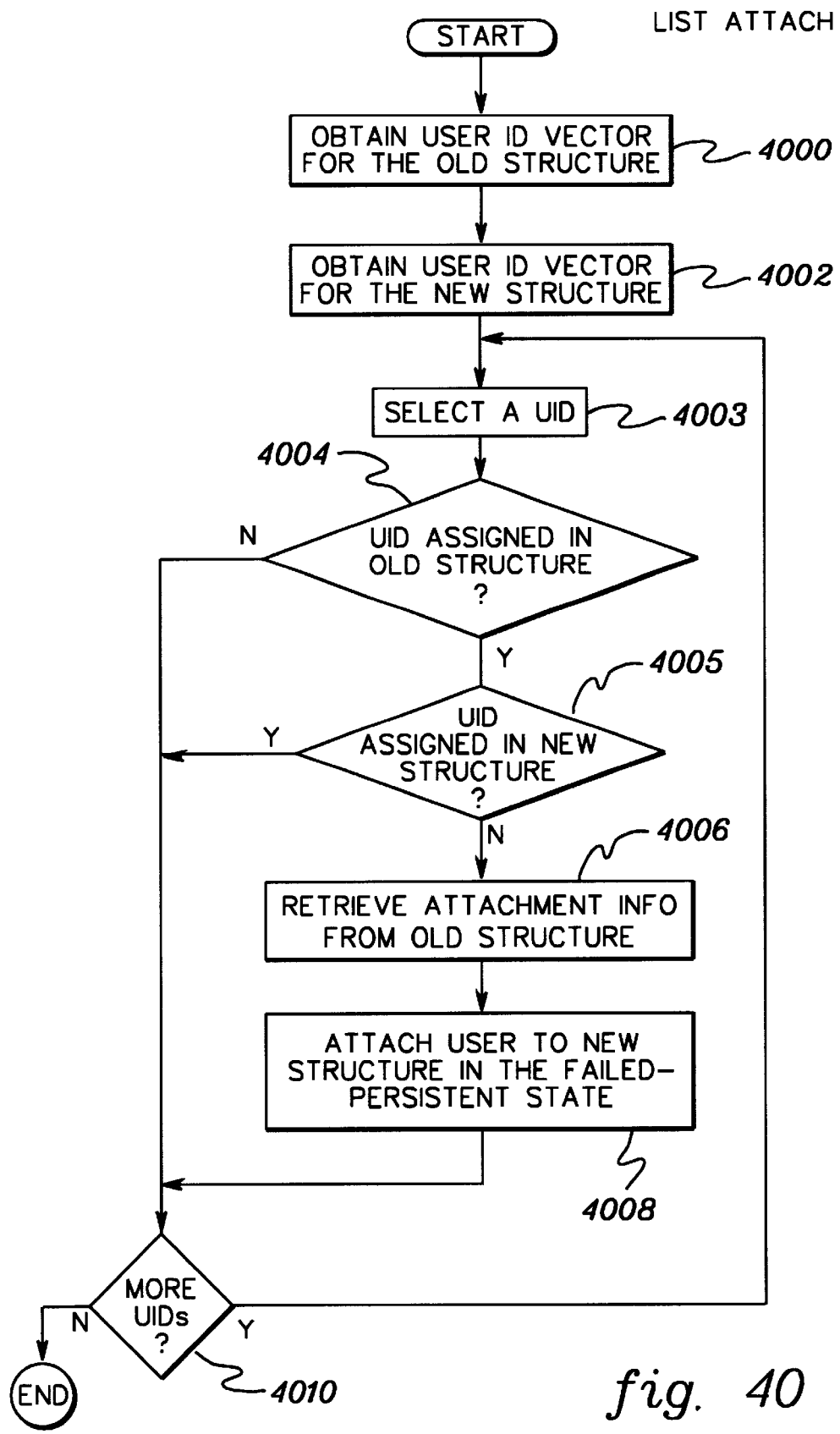
FIG. 40 depicts one embodiment of the logic associated with attaching a user to a list structure during the list copy phase of the present invention.

Continuing with FIG. 40, in addition to obtaining the UID vector for the old structure, the UID vector for the new structure is also obtained, STEP 4002. Similar to obtaining the vector for the old structure, the vector for the new structure is obtained using, for instance, the Read List Structure Controls command.

After obtaining the vectors for the old and new structures, processing continues for any of the user identifiers that are assigned in the old structure, but unassigned in the new structure. In particular, a UID to be processed is selected, STEP 4003. Then, a determination is made as to whether the UID is assigned in the new structure, INQUIRY 4004. In one example, this determination is made by examining the UID vector for the old structure. In particular, the bit corresponding to that UID is examined. If it is equal to one, then the UID is assigned. If the UID is assigned in the old structure, then a determination is made as to whether the UID is unassigned in the new structure, INQUIRY 4005.

If the UID bit position in the vector of the new structure is equal to zero indicating that the UID is unassigned in the new structure, then processing continues with STEP 4006. Specifically, attachment information is retrieved from the old structure using, for instance, a read command.

After retrieving the attachment information from the old structure that is associated with the UID that is assigned in the old structure, but unassigned in the new structure, the user identified by that UID is attached to the new structure in the failed persistent state, STEP 4008. In one embodiment, an Attach List Structure User (ALSU) command is used to attach the user in the failed persistent state.

The Attach List Structure User command employs a message command block, which includes, for instance, the following operands: a message header; a command code (CC); a structure identifier (SID); an attachment request type (ART); a user identifier (UID); a list notification token (LNT); a comparative user authority (CUAU); a user authority (UAU); and a user attachment control (UAC).

One embodiment of the Attach List Structure User command is described below with reference to FIG. 41. (A further example of the ALSU command is described in "Method And Apparatus For Coupling Data Processing Systems," Elko et al., U.S. Pat. No. 5,317,739, Issued May 31, 1994, which is hereby incorporated herein by reference in its entirety.) The Attach List Structure User command attaches the list structure user, when the user authority comparison succeeds and the UID state is compatible with the attachment request type.

Figure 41:
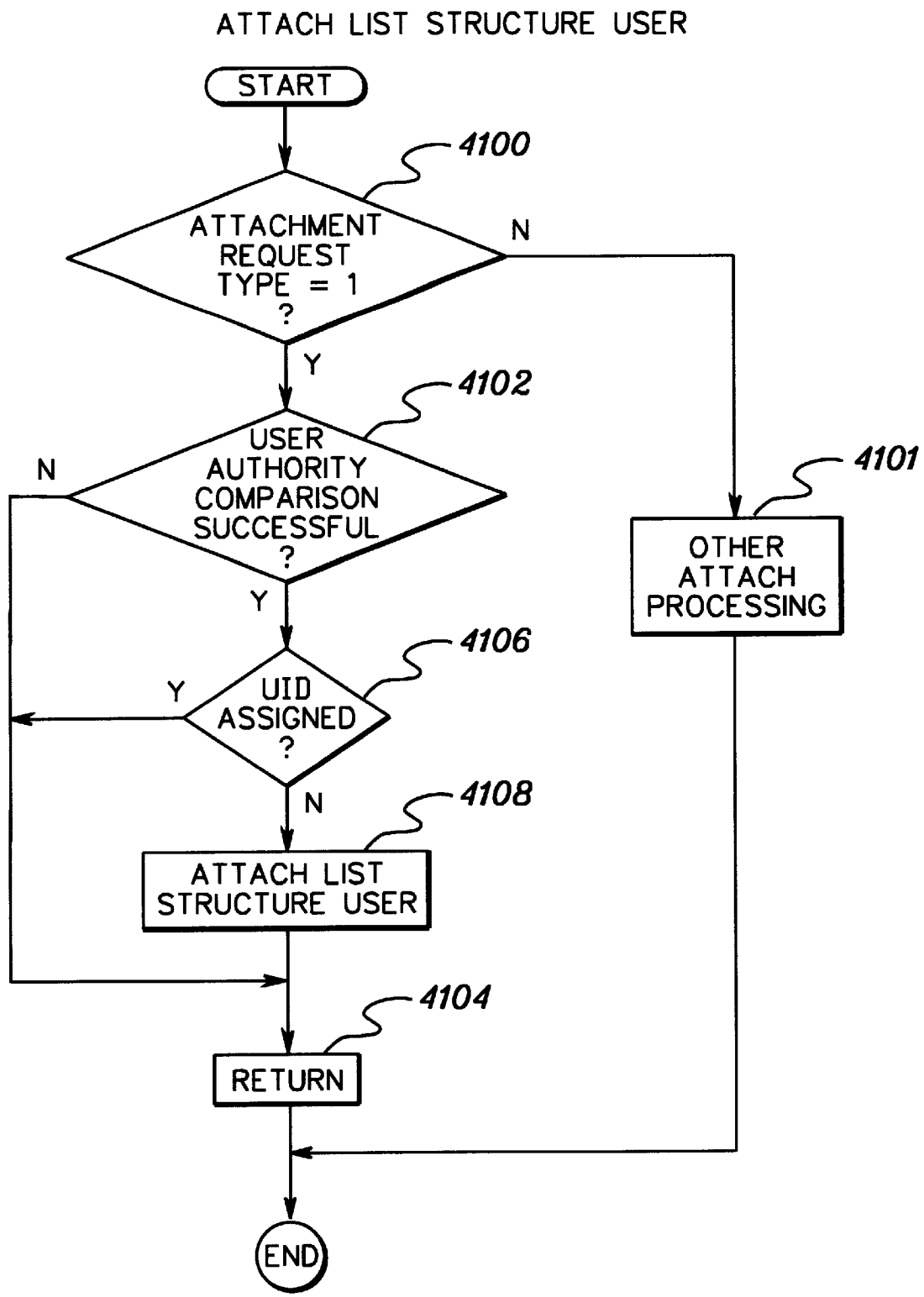
FIG. 41 depicts one embodiment of the logic associated with attaching a list structure user in the failed-persistent state, in accordance with the principles of the present invention.

In particular, initially, a determination is made as to whether the attachment request type indicates that the user is to be attached in a failed-persistent state, INQUIRY 4100 (FIG. 41). Specifically, if the attachment request type is equal to a specified value (e.g., binary 1), then attachment in the failed-persistent state is indicated, and processing of the Attach List Structure User Command continues. However, if such an attachment is not indicated, then other attach processing, which is not relevant in this example, may be performed, STEP 4101.

Continuing with the attachment in the failed-persistent state, a determination is made as to whether the user authority comparison was successful, INQUIRY 4102. In one example, this comparison depends on whether the user identifier is in the assigned or unassigned state. When the user identifier is in the assigned state, the comparative user authority request operand is compared with the user authority object. However, when the user identifier is in the unassigned state, the comparative user authority request operand is compared to zero. If the user authority comparison fails, the user authority, the user attachment control and an indicative response code are returned, STEP 4104.

However, if the user authority comparison is successful, then a determination is made as to whether the user identifier is assigned, INQUIRY 4106. If the attachment request type is equal to one and the user identifier is assigned, then the user authority, user attachment control, user state and an indicative response code are returned in the response operands, STEP 4104.

However, if the attachment request type is equal to one and the UID is not assigned, then the list structure user is attached, STEP 4108. In particular, the user authority and the user attachment control request operands are stored in the corresponding user controls, the LNT and SYID user controls are set to zero, the appropriate assigned bit in the user identified vector is set to one, and the user is placed in the detached state. Thereafter, a successful response code is returned, STEP 4104.

Returning to FIG. 40, after the user is attached in the failed persistent state, or if the UID was not assigned in the old structure or not unassigned in the new structure, a determination is made as to whether any other UIDs are to be processed. If so, processing continues with STEP 4003. If there are no additional UIDs assigned in the old structure, but unassigned in the new structure, then processing of the attach copy processing ends.

Once the above steps are taken, any active UIDs that may be visible in the old structure are valid in the new structure (either fully attached to the new structure in the active state, or assigned but not attached in the failed-persistent state).

Since users are being attached into the assigned, but not attached failed-persistent state and then proceeding to copy information that may reflect their UID (e.g. locks and registrations), CFRM will request, in this embodiment, that a directory cleanup scan be performed in the future when such users are detached (regardless of whether they are detached from the failed persistent state to the unassigned state, or to the failed-persistent state). State information (e.g., detachment pending state) remembers that the failed persistent connection is in a "cleanup required" state, both in the CFRM policy and in the structure itself, so that this cleanup can be performed.

When the attach copy processing is complete, a transition into the next phase of processing is performed. In one example, this transition includes making a determination as to whether a list set exists, INQUIRY 3904 (FIG. 39). If the structure has an allocated list set, then the phase is set to list/lock; however, if there is no allocated list set, then the phase is set to lock, as described herein.

Assuming that a list set exists, the next phase to be processed is the list/lock phase, STEP 3906. Thus, the worker string is set equal to the participant string of the structure copy controls, to copy the list headers and any associated locks. In one example, a Write List Copy Controls command is used to update the structure copy controls for a list structure (see FIG. 27 Write Cache Copy Controls command for details).

In one embodiment, the list/lock copy process is parallelized on a per-list-header basis. One embodiment of the logic associated with the list/lock copy phase is described in detail with reference to FIG. 42. Initially, each system running the copy process uses, for instance, a claim next function in the new structure to attempt to claim an unprocessed list header, STEP 4200.

In one embodiment, the claim next function is performed by a Write List Set Scan Controls (WLSSC) command. This command employs a message command block, which includes, for instance, the following operands: a message header; a command code (CC); a structure identifier (SID); an LSSC update type (LSSCUT); a list set scan restart token (LSSRT); a list set scan identifier (LSSID); and a list number (LN).

Figure 43:
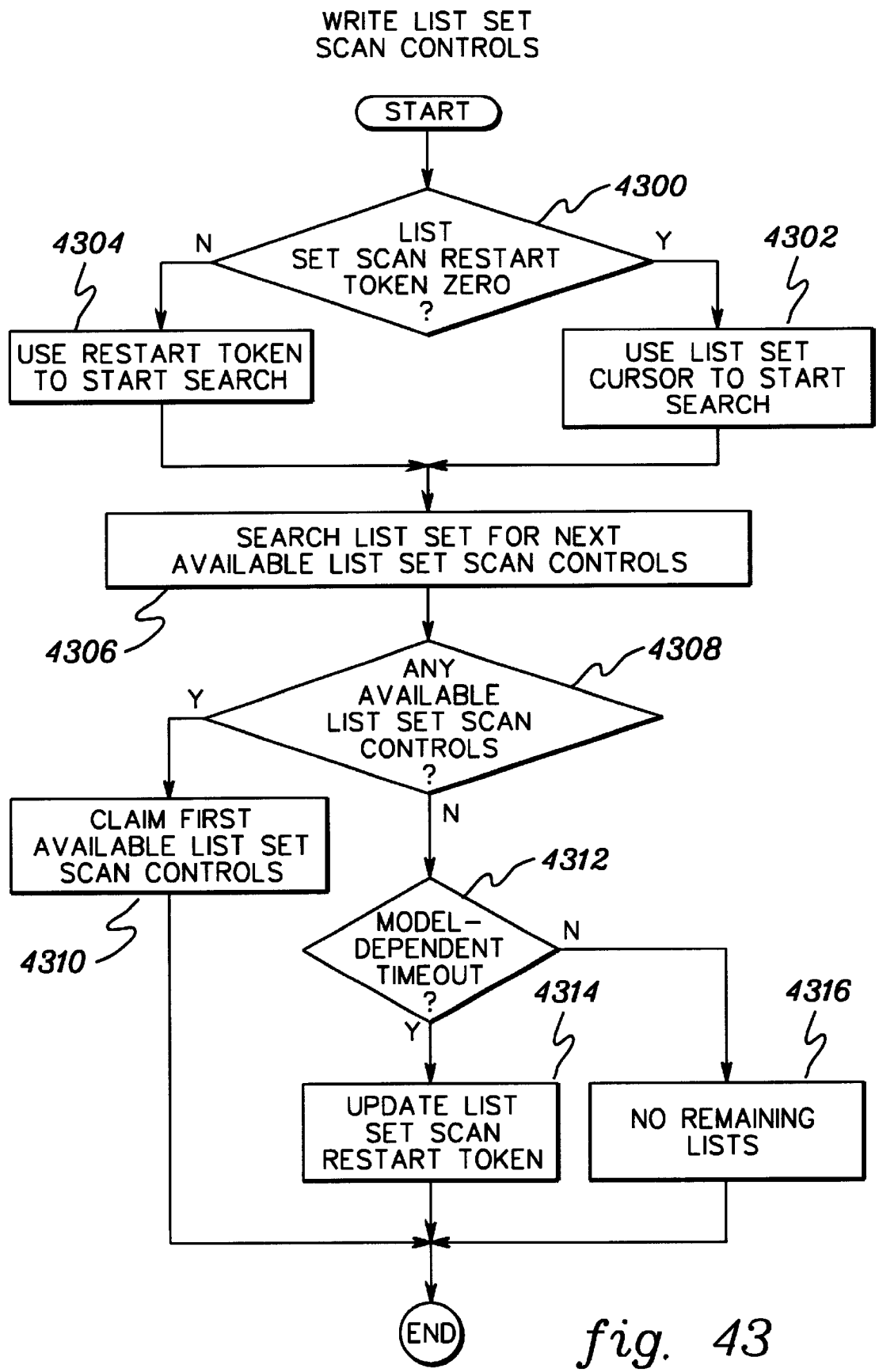
FIG. 43 depicts one embodiment of the logic associated with writing list set scan controls during the list copy phase of the present invention.

The Write List Set Scan Controls command can be used to update controls for one or more lists. The controls to be updated depend on the value of the update type. In this example, the update type indicates the claiming of the next available list. One embodiment of the logic associated with claiming the next available list is described with reference to FIG. 43.

Initially, a determination is made as to whether the list set scan restart token is zero, INQUIRY 4300. If the list set scan restart token is zero, then the scan of the list set starts at the list set cursor, STEP 4302. In particular, the claim next function uses a scan cursor to make the process of locating an available list efficient, and updates the cursor appropriately to reflect the claimed list. Otherwise, the scan begins at the restart token, STEP 4304.

The list set is searched for the next available (i.e., not already owned) list set scan controls, STEP 4306. When the search encounters a list with available list set scan controls, INQUIRY 4308, then the list set scan controls are claimed, STEP 4310. For example, the list set scan identifier is set equal to the LSSID request operand; the list set cursor is set equal to the list number for the claimed list; the claimed list number is placed in the LN response operand; and the LN operand and an indicative response code are returned.

Returning to INQUIRY 4308, if available list set scan controls have not been found, and the search ended with a model-dependent timeout, INQUIRY 4312, then the list set scan restart token is generated and placed in the LSSRT response operand, STEP 4314. The LSSRT operand and an indicative response code are returned.

However, if available list set scan controls have not been found and the search did not end with a timeout, then there are no remaining lists, STEP 4316, and the command ends.

Returning to FIG. 42, thereafter, a determination is made as to whether the attempt was successful, INQUIRY 4202. If the attempt was unsuccessful, then a further determination is made as to whether the processing timed out, thereby causing the unsuccessful attempt, INQUIRY 4204.

If the function did not timeout, then there was no available list to be claimed, in which case the system is done with its list copy process for all lists. However, if the claim next function did timeout, then processing continues with STEP 4200.

Figure 44:
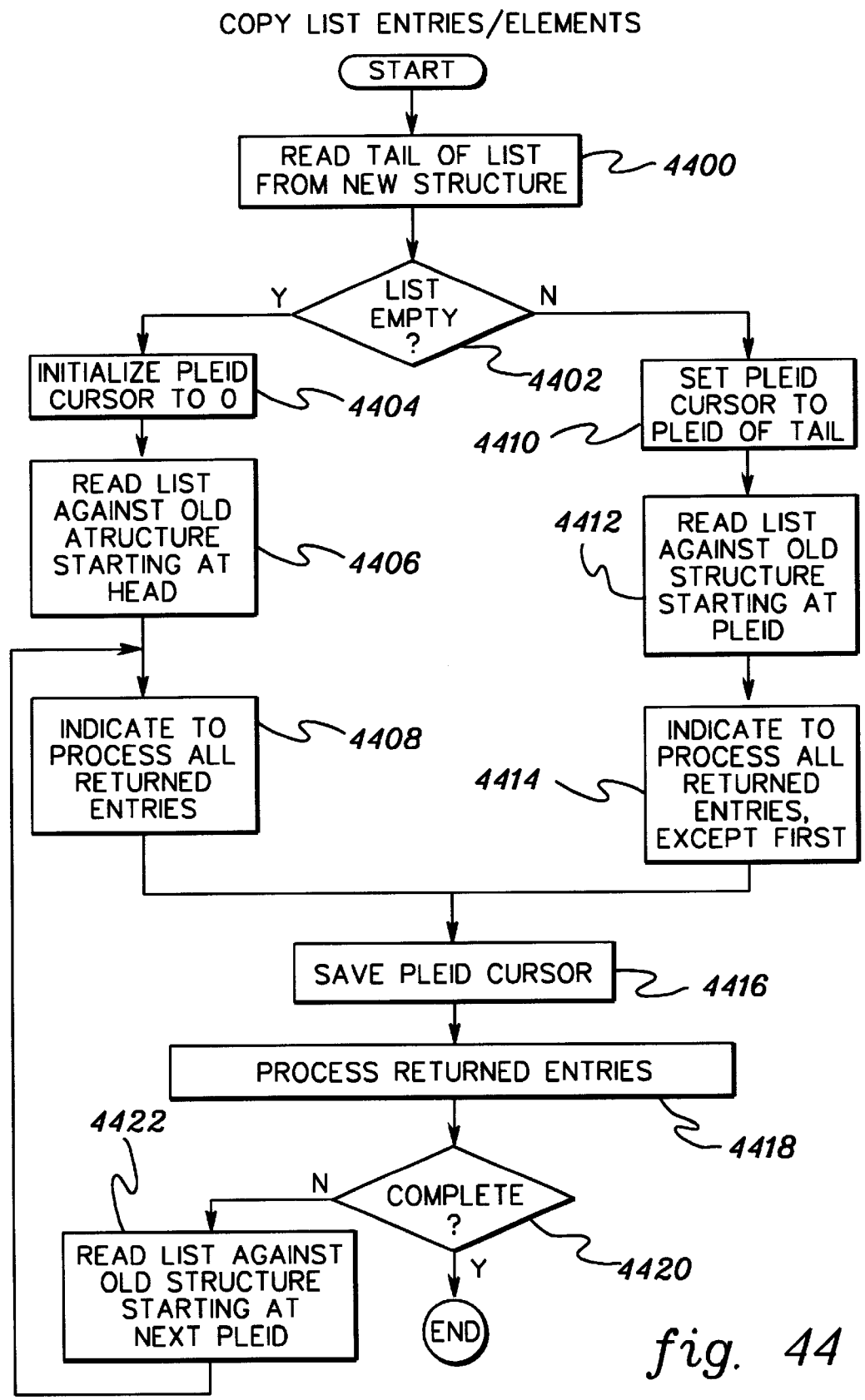
FIG. 44 depicts one embodiment of the logic associated with copying list entries/elements during the list copy phase of the present invention.

Returning to INQUIRY 4202, if the function was successful, then the list number is returned, and the copy process continues by copying list entries/elements of the claimed list, STEP 4206. One embodiment of the logic associated with copying the list entries/elements is described with reference to FIG. 44.

Initially, the entry at the tail of the list is read from the new structure, STEP 4400 using, for instance, a read command.

On the initial invocation of the copy process, the read command receives an "entry not found" response code, since the list in the new structure is empty. On a re-invocation of the copy process (e.g., after recovery), however, some entries may have been propagated to the list in the new structure, and this provides an indication as to whether the PLEID of the last entry was successfully propagated, so that re-copying of the entry is avoided.

Thereafter, a determination is made as to whether the list is empty, STEP 4402. In one example, this determination is made by examining the response code returned by the read command issued against the new structure.

When the read command indicates that the list is empty, a programmable LEID (PLEID) cursor is initialized to zero, STEP 4404, and another read command (a read list) is issued against the old structure, starting at the head of the list, STEP 4406. This command reads the list entry controls, adjunct list entry and data list entry for entries on the claimed list. Thereafter, an indication is made to process the returned entries, STEP 4408.

Returning to INQUIRY 4402, if the list in the new structure is not empty, then the PLEID cursor is set equal to the PLEID of the tail, STEP 4410, and the read list command is issued against the old structure, starting at the PLEID, STEP 4412. Thereafter, an indication is made to process the returned entries, except for the first entry, STEP 4414. (The first entry is skipped, since it was the last entry to be successfully copied.)

Subsequent to indicating that the returned entries are to be processed, STEPS 4408, 4414, the PLEID cursor returned on the read list command is saved, STEP 4416, and the returned entries are processed, STEP 4418.

In one example, in order to process the returned entries, each entry is written to the tail of the list in the new structure using, for instance, a Write List Entry command. One example of a Write List Entry command is described in "Method And Apparatus For Coupling Data Processing Systems," Elko et al., U.S. Pat. No. 5,317,739, Issued May 31, 1994, which is hereby incorporated herein by reference in its entirety.

Specifically, the Write List Entry command is used to write the list entry/adjunct/data to the new structure. The information is written to the tail of the new list so that the list order is preserved. In one embodiment, the entry is written with the same list entry controls (LEC) attributes (e.g., PLEID, name/key, version number, data size, etc.) as the old structure entry. The WLE command includes various operands, which are set as follows, in one embodiment:

| | |
|---|---|
| DLES - | value from LEC information returned by RL |
| LLB - | 0 (no lock operation) |
| LRT - | 000 (no lock operation) |
| VCRT - | 0 (no VN comparison) |
| KRT - | 00 (no key comparison) |
| DIR - | 1 (tail of list) |
| ELT - | 000 (unkeyed position) |
| LNCT - | 0 (no list number comparison) |
| VRT - | 011 (no VN comparison, replace VN) |
| LCURT - | 0 (no list cursor update) |
| LET - | value from LEC information returned by RL |
| WRT - | 10 (create) |
| CGLM - | 0 (no lock comparison) |
| LTEN - | 0 (no lock operation) |
| LN - | value from LEC information returned by RL |
| LEID - | value from LEC information returned by RL |
| VN - | value from LEC information returned by RL |
| CVN - | 0 (no VN comparison) |
| LEK/LEN - | value from LEC information returned by RL |
| AKRT - | 00 (no key assignment) |
| AKUT - | 0 (no assignment key update) |
| LAURT - | 0 (no LAU replacement) |
| LAUCT - | 00 (no LAU comparison) |
| LCUT - | 00 (no list cursor update) |
| UID - | 0 |
| LLM - | 0 (no lock operation) |
| LAU - | 0 (no LAU replacement) |
| CLAU - | 0 (no LAU comparison) |
| AKI - | 0 (no assignment key update) |
| ALE - | value from ALE information returned by RL |
| Data - buffer | value from data information returned by RL |

(As one example, the buffers used in these copy process commands are system owned.)

Once the entries returned on a particular read list have been written to the new structure, a determination is made as to whether the read of the old structure is complete, INQUIRY 4420. If so, processing ends. If the read of the old structure is not complete, then processing of the list continues by performing another old structure read list command using the RL PLEID cursor that was returned on the prior read list, STEP 4422. This PLEID is the entry identifier of the next entry to be processed (i.e., the next unprocessed entry on the list). Thereafter, processing continues with STEP 4408, as described above. Processing continues in this manner until all entries/elements on the list have been copied.

Figure 42:
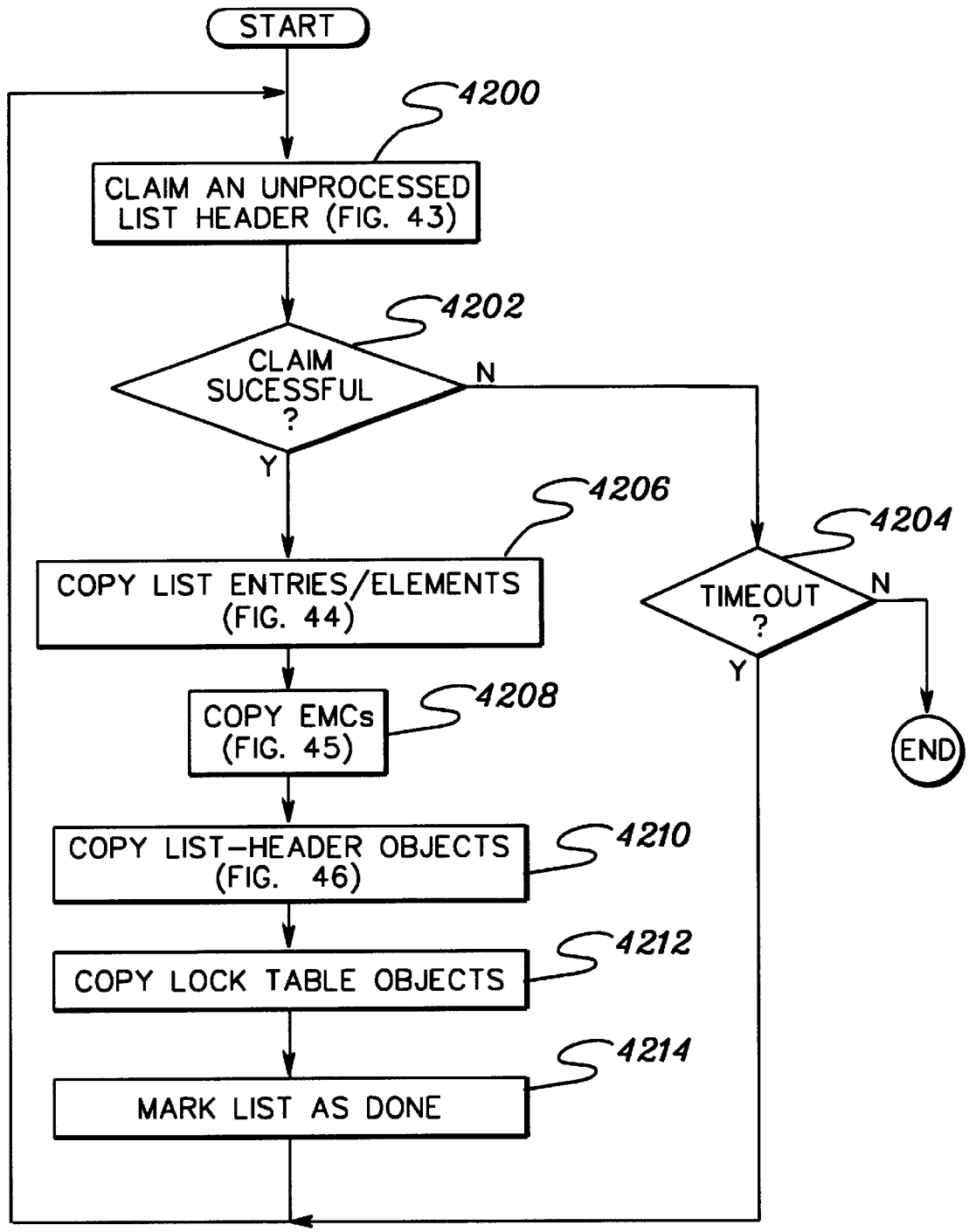
FIG. 42 depicts one embodiment of the logic associated with copying list/lock structures during the list copy phase of the present invention.

Once all of the list entries/elements are propagated, then processing of the copy list entries/elements is complete. Thus, the list/lock copy process continues with propagating the event monitor controls (EMCs) (e.g., for all UIDs) associated with all subsets of the list, STEP 4208 (FIG. 42).

In one embodiment, this is accomplished by employing a Read EMC List (REMCL) command to read a group of EMCs, belonging to any UID, from the old structure. The command takes a cursor for the EMC scan; starting with a cursor of zero. Further, a list number range, which includes the single list that is being processed is also provided, to bound processing to the sublists of that list.

As described below, for each group of EMCs returned, the EMCs are written to the new structure by passing the buffer of EMC information that was returned by the Read EMC List command as input on a Register Event Monitors (REMS) command. As the EMCs are registered in the new structure, they are queued to the appropriate user's event queue, if they were queued to the event queue in the old structure.

One embodiment of the logic associated with copying the event monitor controls is described with reference to FIG. 45. Initially, an EMC restart token is initialized to zero, STEP 4500. Thereafter, it is assumed that there are event monitor controls to be processed, INQUIRY 4502, and thus, a command is issued to retrieve the event monitor controls of the list, STEP 4504. As one example, a Read Event Monitor Controls List (REMCL) command is used to read in a range of EMCs from the claimed list.

The Read Event Monitor Controls List command employs a message command block having, for instance, the following operands: a message header; a command code (CC); a structure identifier (SID); a data block size (DBS); an EMC restart token (ERT); a starting list number (SLN); and an ending list number (ELN).

The Read Event Monitor Controls List command reads a range of EMCs into the data block. The event monitor controls with list numbers within the range of values starting at the starting list number up to and including the ending list number are read. The event monitor controls within the list set are scanned starting with the starting list number or the EMC restart token, until a model-dependent time period elapses, the data block is full of event monitor controls, or the last event monitor control is scanned. A zero restart token causes the entire list to be processed starting at the starting list number operand. A valid non-zero EMC restart token starts the processing at the event monitor control object designated by the EMC restart token.

The EMCs are scanned starting with the starting list number, then in ascending order by list number up to the ending list number. The EMCs in a list number are scanned, for instance, in an unpredictable ordering for list entry keys (LEKs), and an unpredictable ordering for UIDs within the list entry key (LEK).

When the last EMC within the list number range is processed, the EMC processed count and an indicative response code are returned.

When the command times out or the data block is full, the EMC processed count, EMC restart token and an indicative response code are returned.

Subsequent to reading a range of EMCs into a data block, the EMC restart token returned by the REMCL command is saved, STEP 4506. Thereafter, a starting event index is set equal to one and an ending event index is set equal to the number of the event monitor controls returned by the Read Event Monitor Controls List command, STEP 4508.

Subsequently, a determination is made as to whether there are event monitor controls to be registered, INQUIRY 4510. Assuming there are event monitor controls to be registered, those event monitors are registered, STEP 4512. In one example, the event monitors are registered using a Register Event Monitors (REMS) command.

In one embodiment, the Register Event Monitors command includes a message command block having, for instance, the following operands: a message header; a command code (CC); a structure identifier (SID); an initial notification request type (INRT); a user identifier location control (UIDLC); a halt register event monitors control (HREMS); an attachment override control (AOC); an EMC queued indicator control (EMQIC); a user identifier (UID); a starting event index (STX); and an ending event index (ETX).

In this example, the REMS command is invoked with INRT=1; UIDLC=1 indicating the UID location is in each of the registration requests returned by REMCL; HREMS=1 specifying that the command is to halt if it detects an error condition where a registration is being performed to an unassigned UID; AOC=1 indicating it is permissible to process registration commands for users in the assigned but not attached, failed-persistent state; EMQIC=1 specifying that the EMC is to be queued or not queued based on the EMC queued indicator in the returned EMC registration request itself, rather than on the state of the sublist at the time of the registration request; and using the current starting and ending indices as set in STEP 4508.

Operationally, the Register Event Monitors command processes the registration requests starting with the event monitor controls object specified by the starting event index, and continuing in order as specified in the data block up to the ending event index. Each requested event monitor is registered.

The user identifier that is used to process a particular registration request is the user identifier in the event monitor control operand from the data block (UIDLC=1).

When the last event monitor specified by the ending event index is processed, the event monitor controls count, the maximum event monitor controls count, the monitored object state vector and an indicative response code are returned in the response operands.

If a model-dependent time period has elapsed, the current event index of the next event monitor controls to be processed, the event monitor controls count, the maximum event monitor controls, the monitored object state vector and an indicative response code are returned in the response operands.

Figure 45:
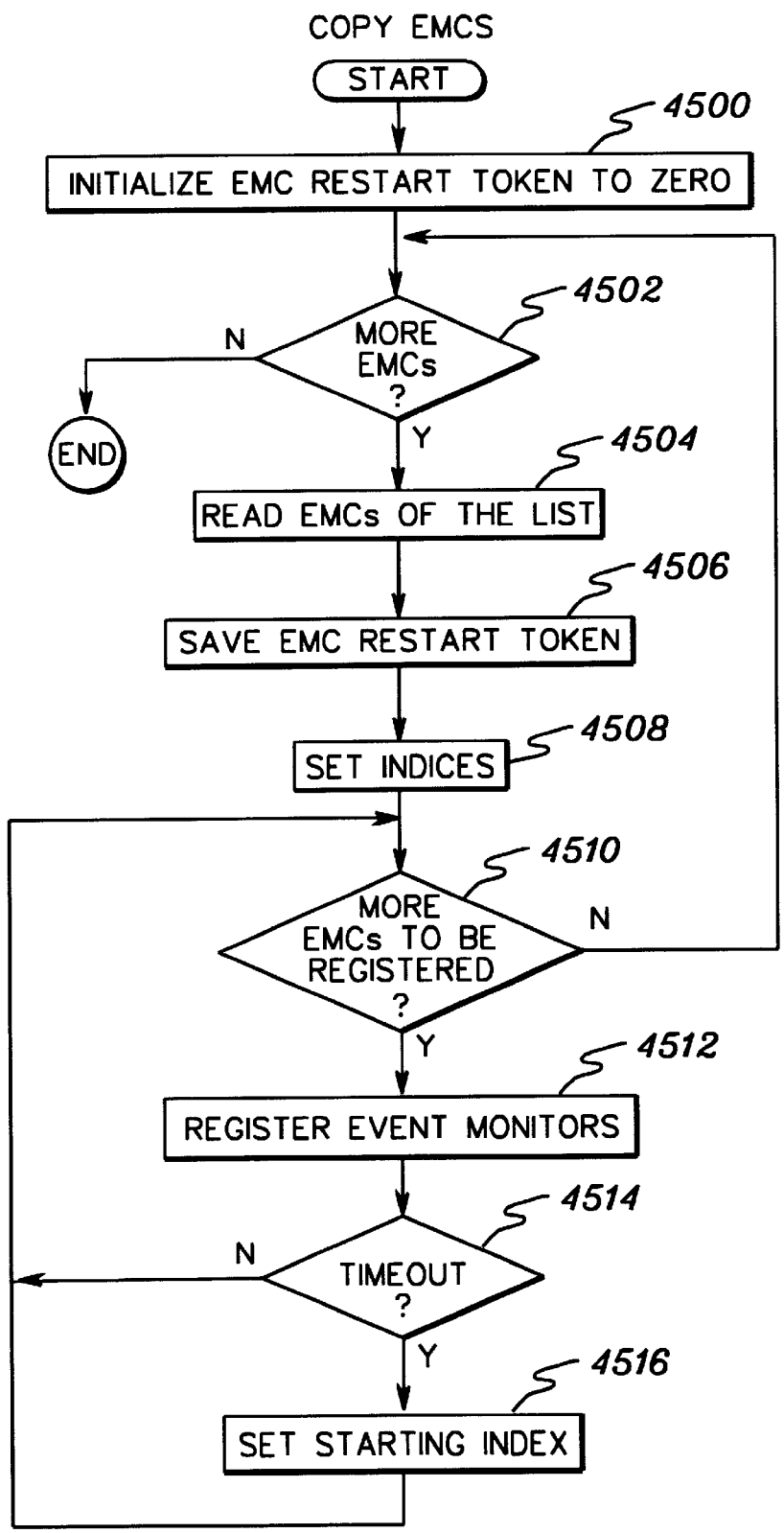
FIG. 45 depicts one embodiment of the logic associated with copying event monitor controls during the list copy phase of the present invention.

Continuing with FIG. 45, if the REMS command times out, INQUIRY 4514, then the starting index is set to the returned index, STEP 4516. Thereafter, or if there is no timeout, processing continues with INQUIRY 4510.

When there are no more EMCs to be registered for the current REMCL, processing continues with INQUIRY 4502 to determine if there are more EMCs for the list. When all of the EMCs for the list have been processed, then the copy EMCs processing is complete.

Returning to FIG. 42, once all of the EMCs are copied, the list-header objects are copied for the list, STEP 4210. As described below, in one embodiment, a command (e.g., Read List Controls (RLC)) is invoked against the old structure list header to read the list control objects for the list (including the list-monitor table). Another command (e.g., Register List Monitor (RLM)) is then issued to perform list-monitoring registration against the new structure for every UID that had a registered list monitoring interest in the old structure. This propagates all the list monitor control information.

Thereafter, a Write List Controls (WLC) command is invoked against the new structure to set any other "settable" (i.e., those governed by the LCT bits) list controls, appropriately to their values from the old structure, as returned on the RLC command.

One embodiment of the processing associated with copying the list header objects is described with reference to FIG. 46. Initially, the old structure's list header is read using, for instance, a Read List Controls (RLC) command, STEP 4600. The RLC command is used to read the list controls and the list monitor table of the old structure's list header.

The Read List Controls command includes a message command block having, for instance, the following operands: a message header; a command code (CC); a structure identifier (SID); and a list number (LN).

Operationally, when sufficient message buffer space is provided, the list controls and an indicative response code are returned in the response operands. In one example, the response operands include a response descriptor; a response code (RC); a list set scan state. (LSSST); a list set scan identifier (LSSID); a cursor direction (CDIR); a list entry count limit (LECL) or a list element count limit (LELCL); a list entry count (LEC) or a list element count (LELC); a list state transition count (LSTC); a list cursor (LCUR); a list authority (LAU); a list monitor table; a user list control (ULC); a LMT an assignment key (AK); and an assignment key threshold (AKT).

After reading the old structure's list header (FIG. 46), processing continues for the UIDs starting at one and continuing to the user identifier limit (UIDL). In particular, a determination is made as to whether there are UIDs to be processed, INQUIRY 4602. If there are UIDs to be processed, then a further determination is made as to whether the list monitoring active bit (LMAB) is equal to one indicating that list monitoring is active for this UID, INQUIRY 4604. If list monitoring is not active, then processing continues with INQUIRY 4602. However, if list monitoring is active for the UID, then the list monitor is registered, STEP 4606.

In one example, in order to register the list monitor, a Register List Monitor (RLM) command is invoked for the UID, requesting INRT=1 which requests initial notification when the registration of list monitoring interest is performed; AOC=1 (permissible to perform the command for a UID in the assigned but not attached failed-persistent state) and the same LNEN/LNRT used in the old structure.

Since (a) all the entries/elements for the list have been copied, causing the list to be empty or not-empty as appropriate in the new structure, and (b) INRT is requested, the RLM commands also have the effect of refreshing the state of the local vector bits that various users are using to monitor this list. In theory, this is not necessary, since the bits should all be in the right state based on the still-active list monitoring registrations in the old structure, which are using the same local vector. Note that list vectors are not cleared when switchover occurs to using the new structure for a list (because for a list, the registrations are preserved in the new structure).

In one example, the Register List Monitor command includes a message command block having, for instance, the following operands: a message header; a command code (CC); a structure identifier (SID); a monitor request type (MRT); an initial notification request type (INRT); a write event queue transition count (WEQTC); an attachment override control (AOC); a list notification request type (LNRT) or an event notification request type (ENRT); a user identifier (UID); a list notification entry number (LNEN) or an event notification entry number (ENEN); a list number (LN); a list entry key (LEK); a user notification controls (UNC); and an event queue transition count (EQTC).

Operationally, the Register List Monitor command registers the designated monitor, as specified by the monitor request type. When a list monitor is registered, the list entry count or the list element count, the monitored object state and an indicative response code are returned in the response operand. Since, in this example, the initial notification request type operand is one, the list monitor is notified.

Figure 46:
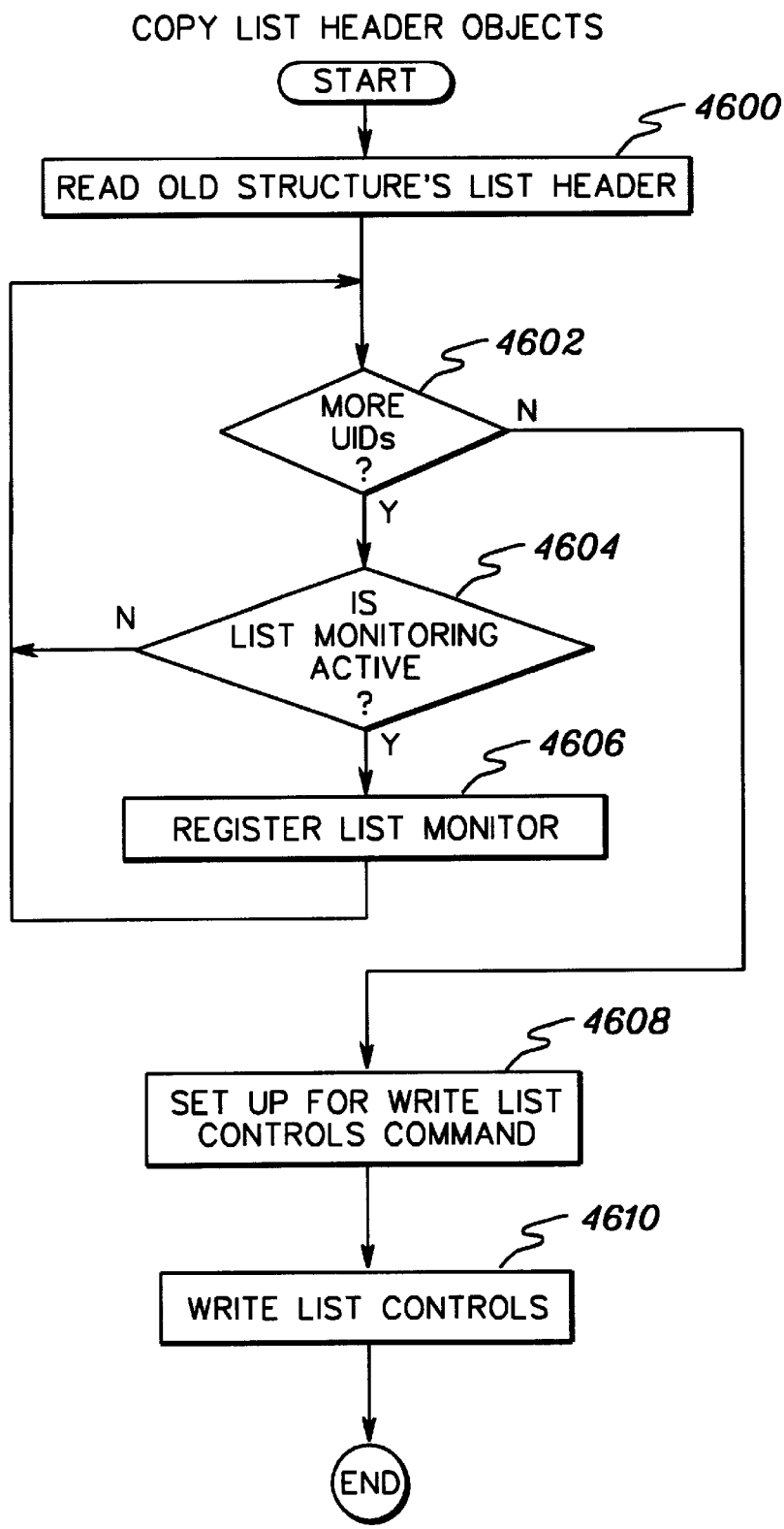
FIG. 46 depicts one embodiment of the logic associated with copying list header objects during the list copy phase of the present invention.

Continuing with FIG. 46, after registering the list monitor for this user identifier, processing continues with INQUIRY 4602. When all of the list monitors have been registered for the possible UIDs, then processing continues with setting up for the Write List Controls command, STEP 4608. In particular, the setting up includes setting the settable list controls. In one example, the settable list controls includes the following:

| | |
|---|---|
| CDIR - | cursor direction |
| LCUR - | list cursor CDT = 1 to set the list cursor to point to the particular list entry that the list cursor is pointing to in the old structure. |
| LECL/ - LELCL | list entry/element count limit. This is set carefully. If the limit in the old structure is equal to the corresponding maximum object count in the old structure, then the limit in the new structure is not set. In this case, it defaults to the appropriate maximum object count in the new structure. Otherwise, the limit in the new structure is explicitly set equal to the limit in the old structure. |
| LAU - | list authority |
| ULC - | user list control (list description) |
| AK - | assignment key |
| AKT - | assignment key threshold |
| LSTC - | list state transition count |

The set up for the Write List Controls command also includes determining whether the LECL/LELCL needs to be set. In one embodiment, the list controls are set after the list is completely populated, particularly as far as the LECL/LELCL is concerned. This is to avoid list full conditions in the new structure when entries are copied to the list. If the list limits were first set, then the list limits might cause writes to the new structure to fail.

Subsequent to setting up for the Write List Controls command, the list controls are set, STEP 4610. In particular, a Write List Controls command is invoked on the new structure's list header to set the list controls. An LCT on the WLC command is specified that requests updating of all of the objects as described above. Operands on the WLC command are used to be able to set the list cursor value explicitly to its value in the old structure's list cursor object. One example of a Write List Controls command is described below and in "Method And Apparatus For Coupling Data Processing Systems," Elko et al., U.S. Pat. No. 5,317,739, Issued May 31, 1994;, which is hereby incorporated herein by reference in its entirety.

In one embodiment, the Write List Controls command includes a message command block having, for instance, the following operands: a message header; a command code (CC); a structure identifier (SID); a list control type (LCT); a cursor direction (CDIR); a cursor direction type (CDT); a retry index (RX); a retry version number (RVN); a list number (LN); a list entry count limit (LECL) or list element count limit (LELCL); a list entry identifier (LEID); a comparative list authority (CLAU); a list authority (LAU); a user list control (ULC); an assignment key (AK); an assignment key threshold (AKT); and a list state transition count (LSTC).

The Write List Controls (WLC) command writes the list controls for the specified list number. In one example, the list authority is compared to the value of the CLAU operand and replaced with the value of the LAU operand, when they are equal. When the list authority comparison and replacement are successful, the write list controls command writes the list controls, depending on the list control type. In this case, the list control indicates that all of the settable list controls are set.

If the list cursor bit is one and the cursor direction type bit is one, and the entry designated by the LEID request operand exists on the list designated by the LN operand, then the list cursor object is initialized to the LEID operand value and the CDIR object direction is set to left, if the value of the CDIR operand is binary 0 or is set to right, if the value of the CDIR operand is binary 1.

When the list controls are written, an indicative response code is returned in the response operand.

When the list authority comparison fails, the list authority, the user list control and an indicative response code are returned in the response operands.

Subsequent to writing the list controls, processing of the copy list header is complete.

Returning to FIG. 42, subsequent to propagating the list controls, the lock table objects are copied for a segment of the lock table, if there is a lock table associated with the structure, STEP 4212.

In one embodiment of the number of locks exceeds some threshold, e.g., 1024, then the segment of the locks (out of the total locks) that corresponds to the list header that has been claimed for processing (out of the total list headers) is copied. That is, the lock range that is copied for a given list number (LN) is given by the following formula:

| starting LTE = | (LTEC*LN)/LC |
| ending LTE = | ((LTEC*(LN + 1))/LC) − 1, where LTEC is lock table entry count and LC is list count. |

However, if the number of locks is below the threshold numbers of locks, then the system that claims list number 0 for processing copies all of the locks.

For example, the following lock table ranges would be copied if there were 7 list headers (numbered 0 through 6) and 1M (1048576) locks (numbered 0 through 1048575):

| LN | LTE range copied |
|---|---|
| 0 | 0–149795 |
| 1 | 149796–299592 |
| 2 | 299593–449388 |
| 3 | 449389–599185 |
| 4 | 599186–748981 |
| 5 | 748982–898778 |
| 6 | 898779–1048575 |

Two commands, a Read LTE Range (RLTR) and Store LTEs (SLTES), are used to propagate the ranges of locks. These commands are described further below.

In one embodiment, double-buffering may be used to read the next buffer full of LTEs, as the previous buffer full of LTEs is written to the new structure, to achieve overlap in read/write processing.

Continuing with FIG. 42, at this point, everything associated with the claimed list has been copied, so the claimed list can be marked as done using, for instance, a "mark done" function (e.g., using WLSSC command), STEP 4214.

A failure of a participant in the copy process for lists is another example of a failed instance of the copy process. When this failure is observed, the CFRM performs a function to recover list set scan controls that were claimed by the failed worker but not marked done. The recovery operation uses, for instance, the reset function on the Write List Set Class Scan Controls (WLSSC) command.

Figure 43A:
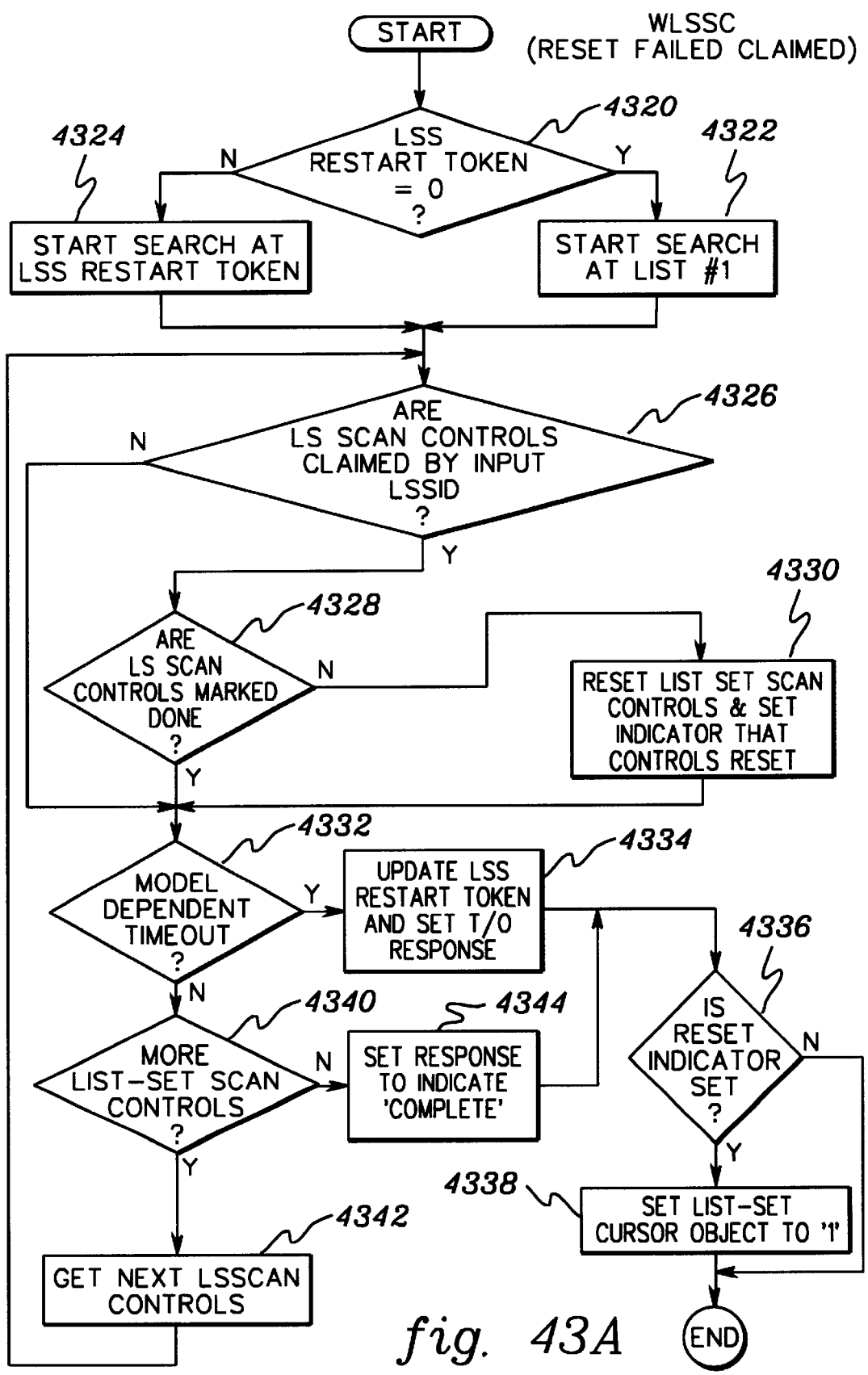
FIG. 43a depicts one embodiment of the logic associated with resetting a failed claimed list set scan controls, in accordance with the principles of the present invention.

In one example, the WLSSC command is executed with the following operands: a SID; a list set scan controls update type (LSSCUT); a list set scan restart token (LSSRT); and a list set scan identifier (LSSID). The LSSCUT operand specifies that the requested function is resetting selected list set scan controls. The LSSID operand specifies the failed worker instance which is used for selection. One embodiment of the logic associated with the reset function is described with reference to FIG. 43a.

The operation is controlled by the list set scan restart token. For example, when the restart token is zero, INQUIRY 4320, processing commences with list number one, STEP 4322; and when the list set scan restart token is nonzero, processing starts with the list set specified by the list set scan restart token, STEP 4324.

Thereafter, the list set scan controls of a list are tested. For example, a determination is made as to whether the list set scan controls are claimed by the input LSSID, INQUIRY 4326. If the list set scan controls are claimed, a further determination is made as to whether they are marked as done, INQUIRY 4328. If they are claimed, but not marked as done, and the LSSID control matches the LSSID request operand, then the controls are reset to the available state and an indicator is set specifying that at least one set of controls were reset, STEP 4330. If the list set scan controls are claimed by a different LSSID, or are claimed and marked done, or are available, no change is made to the controls. In either case, processing continues as described below.

A determination is made as to whether a model-dependent timeout has been reached, INQUIRY 4332. If processing has timed out, then the list set scan restart token is updated to point to the next list to be processed and a timeout (T/O) response is indicated, STEP 4334.

Thereafter, a determination is made as to whether the reset indicator is set, INQUIRY 4336. If so, then at least one set of controls were reset. In this case, the list set cursor object is set to a value of '1', STEP 4338. However, if the indicator is not set, then processing ends.

Returning to INQUIRY 4332, if there was no timeout, then a determination is made as to whether there are more list set scan controls to be processed, INQUIRY 4340. If there are more list set scan controls, then the next list set scan controls is obtained, STEP 4342, and processing continues with INQUIRY 4326. However, if all the lists were processed, INQUIRY 4340, then a 'complete' response is indicated, STEP 4344, and processing continues with INQUIRY 4336.

When there are no more available list headers to process, the copy process resets its bit in the worker string and waits for a syncpoint to be reached. When this syncpoint is reached, transition to the next phase takes place.

In determining what the next phase of processing is to be, an inquiry is made as to whether event monitor control (EMC) storage exists, INQUIRY 3908 (FIG. 39). If EMC storage exists, then the next phase is the event queue controls copy phase; otherwise, the next phase is the done phase.

Assuming EMC storage exists, the event queue controls copy processing phase is the next phase to be discussed, STEP 3910. This phase is, for instance, a single phase, and is used to copy the event-queue controls information, including event queue monitoring registrations. The system performing this phase of processing copies the event queue controls information from the old structure for every UID and registers event queue monitoring interest in the new structure using the returned information, as described below.

Figure 47:
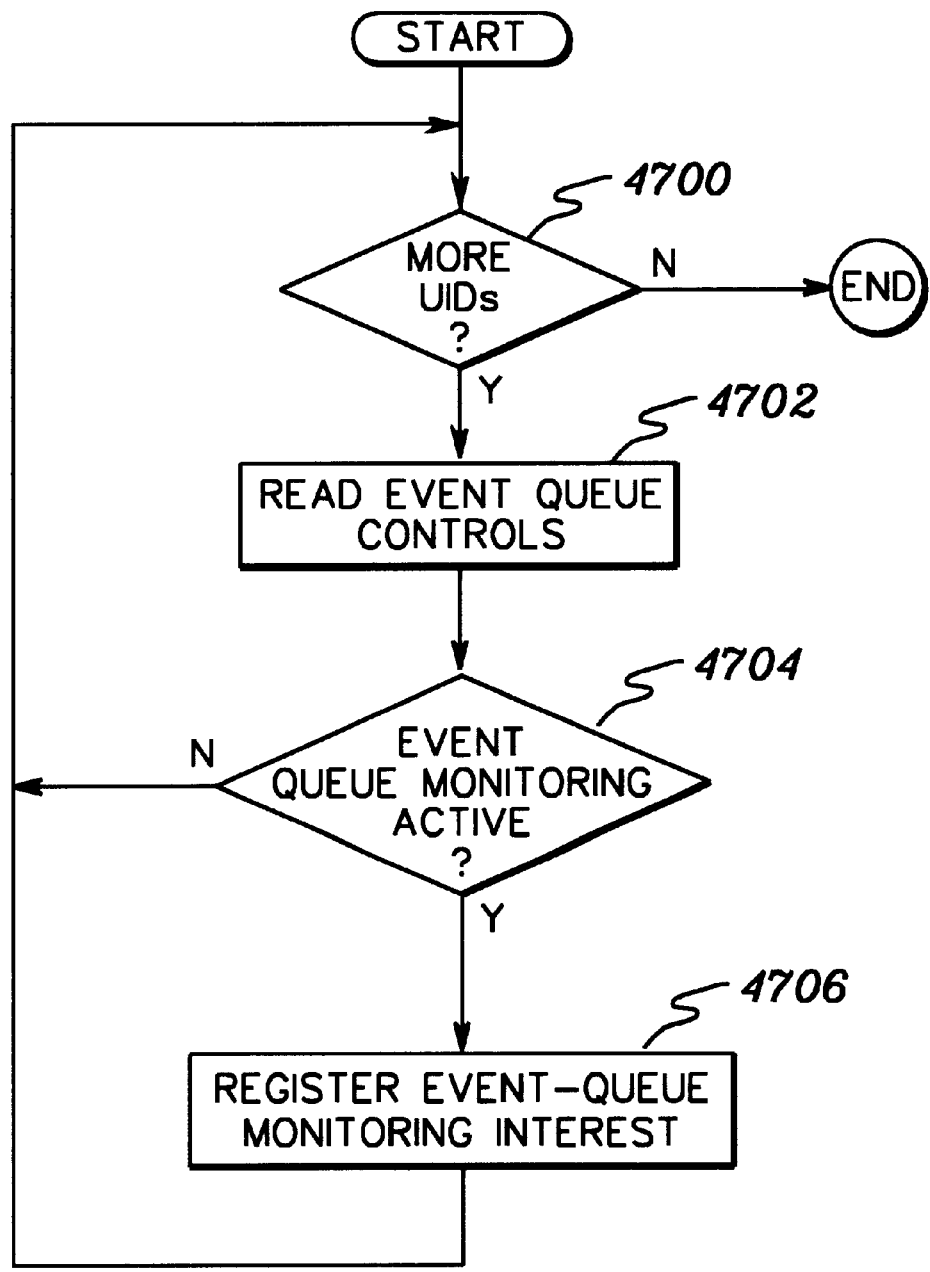
FIG. 47 depicts one embodiment of the logic associated with copying event queue controls during the list copy phase of the present invention.

One embodiment of the logic associated with copying the event queue controls information is described with reference to FIG. 47. Initially, a determination is made as to whether there are user ids to be processed, INQUIRY 4700. In particular, processing continues for each UID from one to the UID limit. Assuming that there are UIDs to be processed, a Read Event Queue Controls (REQC) command is invoked for the old structure to read the event queue controls for the current UID, STEP 4702.

As an example, the Read Event Queue Controls command includes a message command block having, for instance, the following operands: a message header; a command code (CC); a structure identifier (SID); and a user identifier (UID).

Operationally, upon a successful execution of the command, a message response block having, for instance, the following operands is returned: a response descriptor; a response code; an event notification request type (ENRT); an event queue monitoring active bit (EQMAB); an event notification entry number (ENEN); an event monitor controls queue count (EMCQC); and an event queue transition count (EQTC).

Subsequent to reading the event queue controls, a determination is made as to whether event queue monitoring is active, INQUIRY 4704. If it is not active, as indicated by the event queue monitoring active bit, then processing continues with INQUIRY 4700.

Otherwise, if the event queue monitoring active bit is on, then event queue monitoring interest is registered, STEP 4706. In one example, a Register List Monitor command is used to register the interest. This command uses the same registration parameters as in the old structure, which were returned on REQC (see description of STEP 4702).

When the Register List Monitor command registers an event queue monitor, the event monitor controls queued count, the monitored object state and an indicative response code are returned in the response operands. If the initial notification request type operand is one, the event queue monitor is notified.

Further, when the write event queue transition count (WEQTC) bit is one and the monitor register type specifies register event queue monitor, the event queue transition count object is written. Otherwise, the event queue transition count object is not written. In this embodiment, WEQTC is set equal to one to copy the event queue transition count.

Subsequent to registering event queue monitoring interest, a determination is made as to whether there are more UIDs to be processed, INQUIRY 4700. If there are no more UIDs to be processed, then the event queue controls copy processing is complete.

Note that since (a) the event-queue has been populated appropriately in the list/lock phase, and (b) INRT has been requested, these RLM commands also have the effect of refreshing the state of the local vector bits that the users are using to monitor their event queues. In theory, this is not necessary, since the bits should all be in the right state based on the still-active event-queue monitoring registrations in the old structure, which are using the same local vector.

By refreshing the state of the local vector bits during the copy process, any missing LNs will be corrected as the copy process proceeds. Note that list vectors are not cleared, when a switchover to using the new structure for a list occurs (because for a list, the registrations are preserved in the new structure).

In one embodiment, there is no need for the event queue copy phase to reset or correct the list scan cursor or scan control values, which have been used as a serialization mechanism in the new structure. These objects are only used by the copy process in a new structure that is freshly allocated by the structure. allocation process. When the system-managed rebuild completes and the new structure becomes the only active structure instance, these objects are residual. If the structure is ever copied again, these residual values are not important, because only the new structure (not the old) uses these fields for serialization purposes, and the residual values will be in the old structure at that time.

Returning to FIG. 39, subsequent to copying the event queue controls or if EMC storage did not exist, INQUIRY 3908, then a transition to the next phase takes place. In one example the next phase is a done phase, which is a multiple phase, STEP 3912.

When the done phase is reached, all necessary and/or desired structure data has been propagated. Thus, processing for the done phase includes the copy process task issuing a request to inform the CFRM task that it is complete (passing the appropriate return code), and giving up control. The CFRM main task collects these responses for all systems. When all systems participating in the copy process have reported completion, CFRM determines whether or not all systems successfully completed the copy process. If so, CFRM marks the structure to indicate that the copy phase is complete, and proceeds on to the next phase of rebuild. Otherwise, CFRM stops the rebuild process.

Described above is the copy process when a list set exists. However, when a list set does not exist, STEP 3904, processing proceeds, as described below.

In particular, when there is no allocated list set, the next phase is a lock table copy processing phase, STEP 3914. It may be a multiple or a single phase depending on the number of allocated locks for the structure. For example, if the lock table has 1024 locks (an arbitrary number) or fewer, one system is selected to copy all of the locks. Otherwise, multiple systems (up to, for instance, 32) are indicated as workers, and the lock table copy process is parallelized among them.

For the parallel lock copy process, the systems race to compare and swap a global byte of each of the first 32 lock entries in the new structure from 0 to their COPYID. For each of the 32 entries, this succeeds for only one system, who then has the responsibility to copy the corresponding $\frac{1}{32}$ nd of the lock table entries (the system that wins responsibility for copying the 0th portion of the lock table avoids copying the first 32 entries numbered 0 through 31, which are being used for serialization purposes). For all other systems, they proceed to try and claim the next lock table entry, and so on until all 32 lock table entries have been claimed and processed.

Because there can be any arbitrary number of locks, the table might not be evenly divisible into 32 pieces. When calculating the lock table entry range for each piece, the starting and ending LTE for the range is calculated, so as to ensure that all entries get copied at least once (some may get copied more than once, which is acceptable).

Copying of each piece of the lock table (of which there is only one for the non-parallel copy process, and of which there are, for instance, 32 in the parallel copy process), uses two commands designed for that purpose. The first command, a Read LTE Range (RLTR) command, done to the old structure, returns multiple nonzero LTEs in the requested range, and returns an LTEN to use as a cursor for restart within the range. The data buffer contains LTEN/LTEV pairs as read from the old structure.

The second command, a Store LTEs (SLTES) command, takes the data buffer full of LTEN/LTEV pairs and writes them to the new structure lock table without lock comparison being performed (that way, if two systems happen to write some of the same entries, no harm done). The process continues until end-of-range is reached. The system then updates the lock table entry, which is being used for serializing copy processing for the piece, to mark it as done by changing the global byte value from the COPYID value to the done value. The above processing is further described below.

In one embodiment, double-buffering may be used to read the next buffer full of LTEs, as the previous buffer full of LTEs is written to the new structure, to achieve overlap in read/write processing.

One embodiment of the logic associated with the lock table copy processing is described with reference to FIG. 48a. Initially, a determination is made as to whether the number of locks is less than or equal to a predefined threshold (e.g., 1024), INQUIRY 4800. If there are 1024 locks or fewer, then a lock range is set, STEP 4802. In one example, the lock range is set to 0:LTEC-1. Thereafter, a Copy Lock Range procedure is called, STEP 4804.

One example of the Copy Lock Range procedure is described with reference to FIG. 48b. Initially, a starting lock index is set to an input start of range value and an ending lock index is set to the input end of range value, STEP 4806. Thereafter, processing continues until the end of the range is reached. For example, a determination is made as to whether the end of the RLTR range is reached, INQUIRY 4808. If the end of the range is reached, then processing of the copy lock range is complete, STEP 4810. However, if the end of the range is not reached, then a Read Lock Table Range (RLTR) command is issued with the starting and ending indexes to read the range of lock table entries, STEP 4812.

In one embodiment, the Read Lock Table Range command includes a message command block having, for instance, the following format: a message header; a command code (CC); a structure identifier (SID); a data block size (DBS); a start of lock table entry range (SLTER); and an end of lock table entry range (ELTER).

Figure 49:
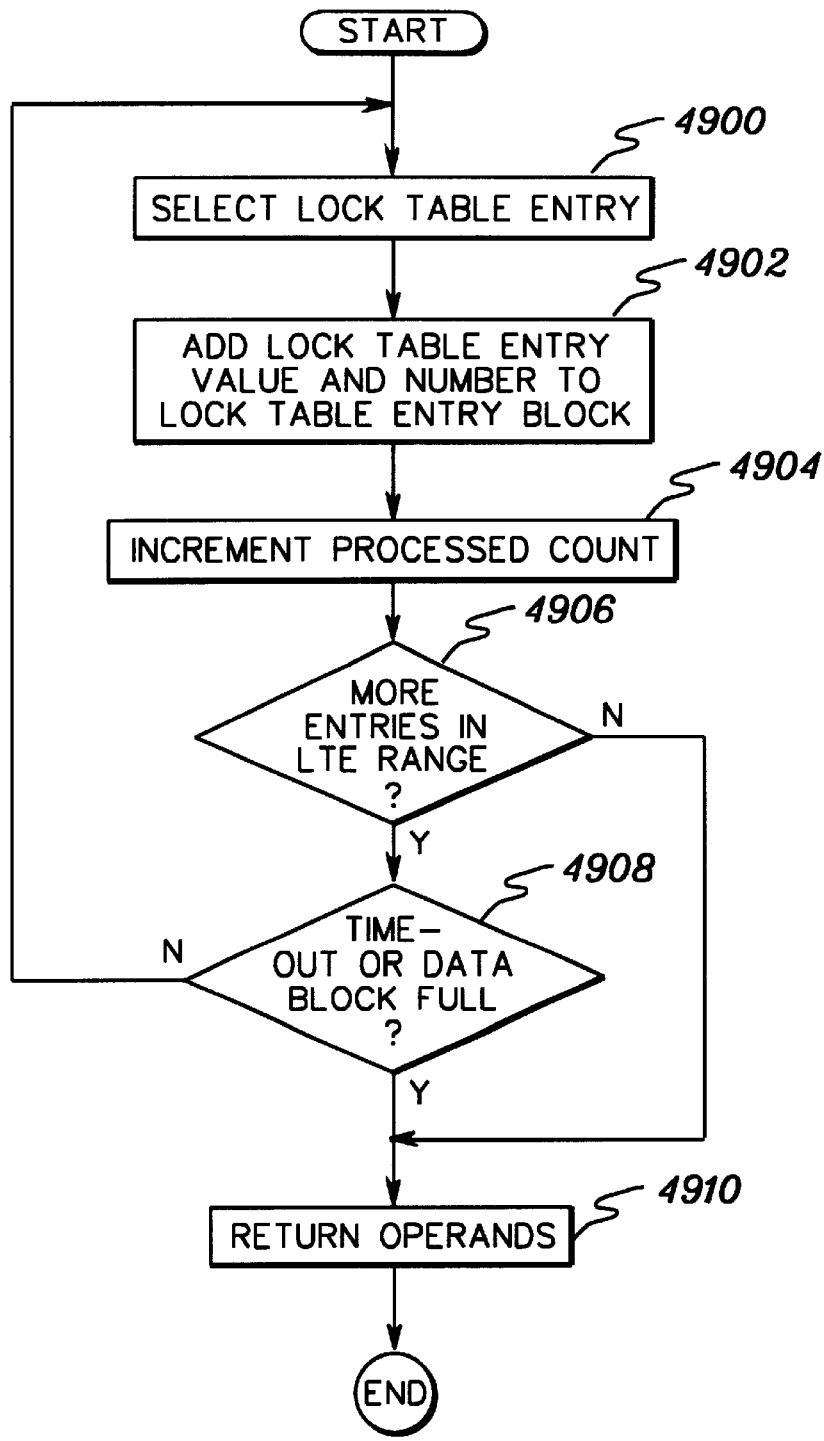
FIG. 49 depicts one embodiment of the logic associated with reading a lock table range, in accordance with the principles of the present invention.

Referring to FIG. 49, operationally, the Read Lock Table Range command scans the lock table entries starting at the start of the LTEN range until a model-dependent time period elapses, the data area is full or the end of the LTEN range is reached. For example, during the scan, a lock table entry is selected, STEP 4900. In one example, the first selected entry corresponds to the start of the range. Then, the lock table entry value and lock table entry number for that selected entry is added to the lock table entry block, STEP 4902, and the processed count is incremented by one for each entry block placed in the data block, STEP 4904. Only non-zero lock table entries are returned. The lock table entry blocks are placed in the data block in increasing order by lock table entry number.

Thereafter, a determination is made as to whether there are more entries to be scanned, INQUIRY 4906. If there are more entries, then the processing continues. In one example, a determination is made as to whether a timeout or data block full condition is met, INQUIRY 4908. If not, processing continues with STEP 4900. When a model-dependent time period has elapsed or the data block is full, then the LTEN of the next LTE to be processed, the processed count and a response code indicating timeout or data block is full is returned in the response operands, STEP 4910.

Returning to INQUIRY 4906, when the last lock table entry in the lock table entry range specified is scanned, the lock table entry number, processed count and an indicative response code are returned in the response operands.

Returning to FIG. 48b, subsequent to issuing the Read Lock Table Range command, a determination is made as to whether there was a timeout or a buffer full condition, INQUIRY 4814. If there was a timeout or the buffer was full, then the starting lock index is adjusted to the lock index that was returned by the RLTR command, STEP 4816. Thereafter, or if a timeout or a buffer full condition was not met, then a further determination is made as to whether any locks were returned by the Read Lock Table Range command, INQUIRY 4818.

If no locks were returned, then processing continues with INQUIRY 4808. However, if locks were returned, then the starting index for the Store Lock Table Entries command is set to one and the ending index is set to the number of locks returned by the Read Lock Table Range command, STEP 4820. Processing then continues until the end of the range is reached.

For example, a determination is made as to whether the range has been reached, INQUIRY 4822. If the end of the range has been reached, then processing continues with INQUIRY 4808. However, if the end of the range has not been reached, then the lock table entries are stored using, for instance, the Store Lock Tables Entries command, STEP 4824.

In one embodiment the Store Lock Table Entries command includes a message command block having, for instance, the following operands: a message header; a command code (CC); a structure identifier (SID); a start data index (SDX); and an end data index (EDX). Further, the SLTES command has the data block returned by RLTR as an input operand.

Operationally, in one embodiment, the Store Lock Table Entries Command stores the lock table entry blocks starting at the start data index until a model-dependent time period elapses, an error occurs in processing or the end data index is reached. The lock table entry block is processed by storing the value of the lock table entry in the entry specified by the lock table entry number in the lock table entry block. When the last lock table entry is stored, a successful response code is returned.

When a model-dependent time period has elapsed, then the current data index, which is the number of the next lock table entry block to be processed and a response code indicating timeout are returned.

Returning to FIG. 48b, subsequent to performing the Store Lock Table Entries command, a determination is made as to whether the Store Lock Table Entries command ended with a timeout, INQUIRY 4826. If not, then processing continues with INQUIRY 4822. However, if a timeout has occured, then the starting index is adjusted, STEP 4828, and processing again continues with INQUIRY 4822. When the end of the SLTES range has been reached, then processing continues with INQUIRY 4808.

Figure 48A:
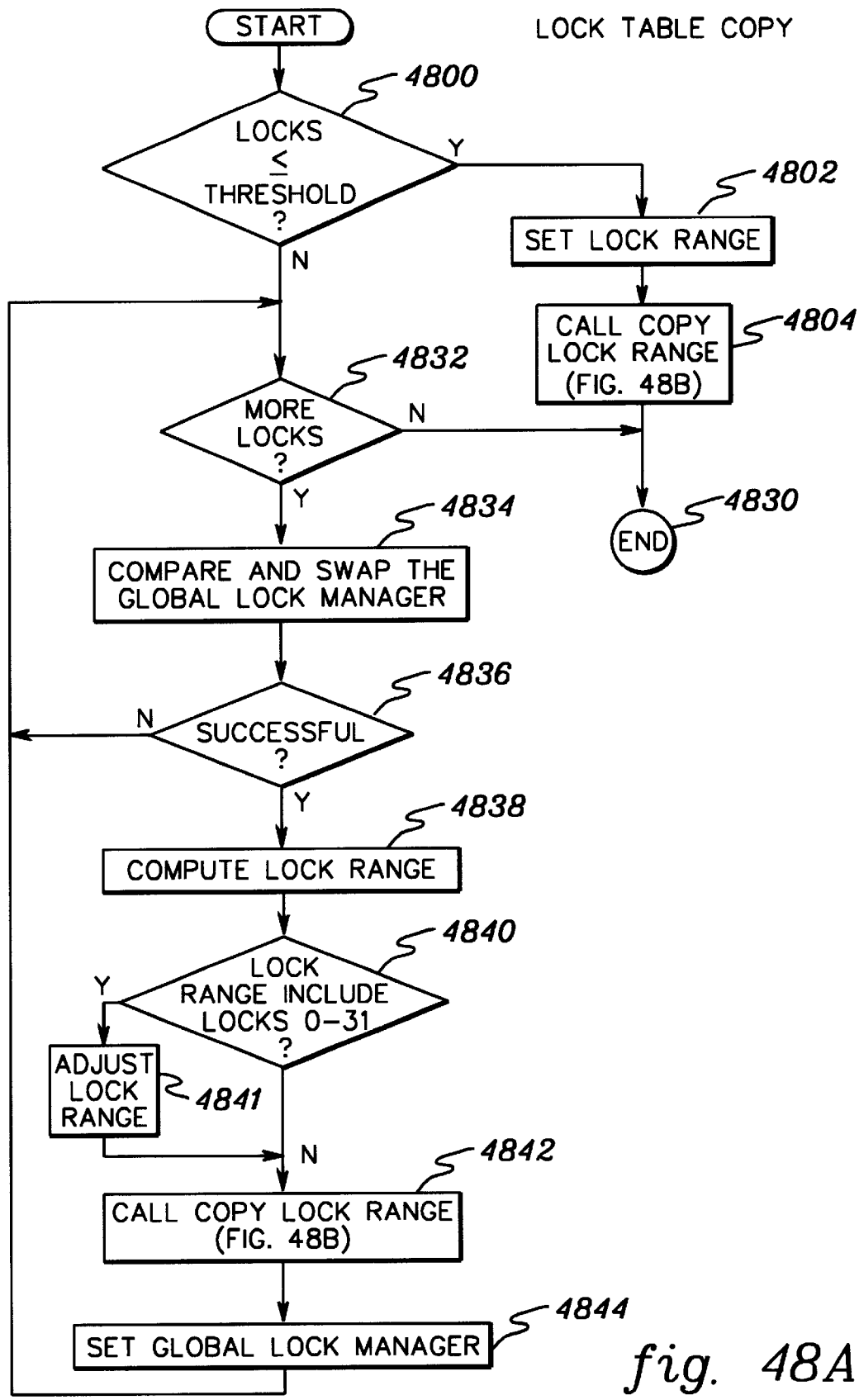
FIG. 48a depicts one embodiment of the logic associated with copying a lock table during the list copy phase of the present invention.
Figure 48B:
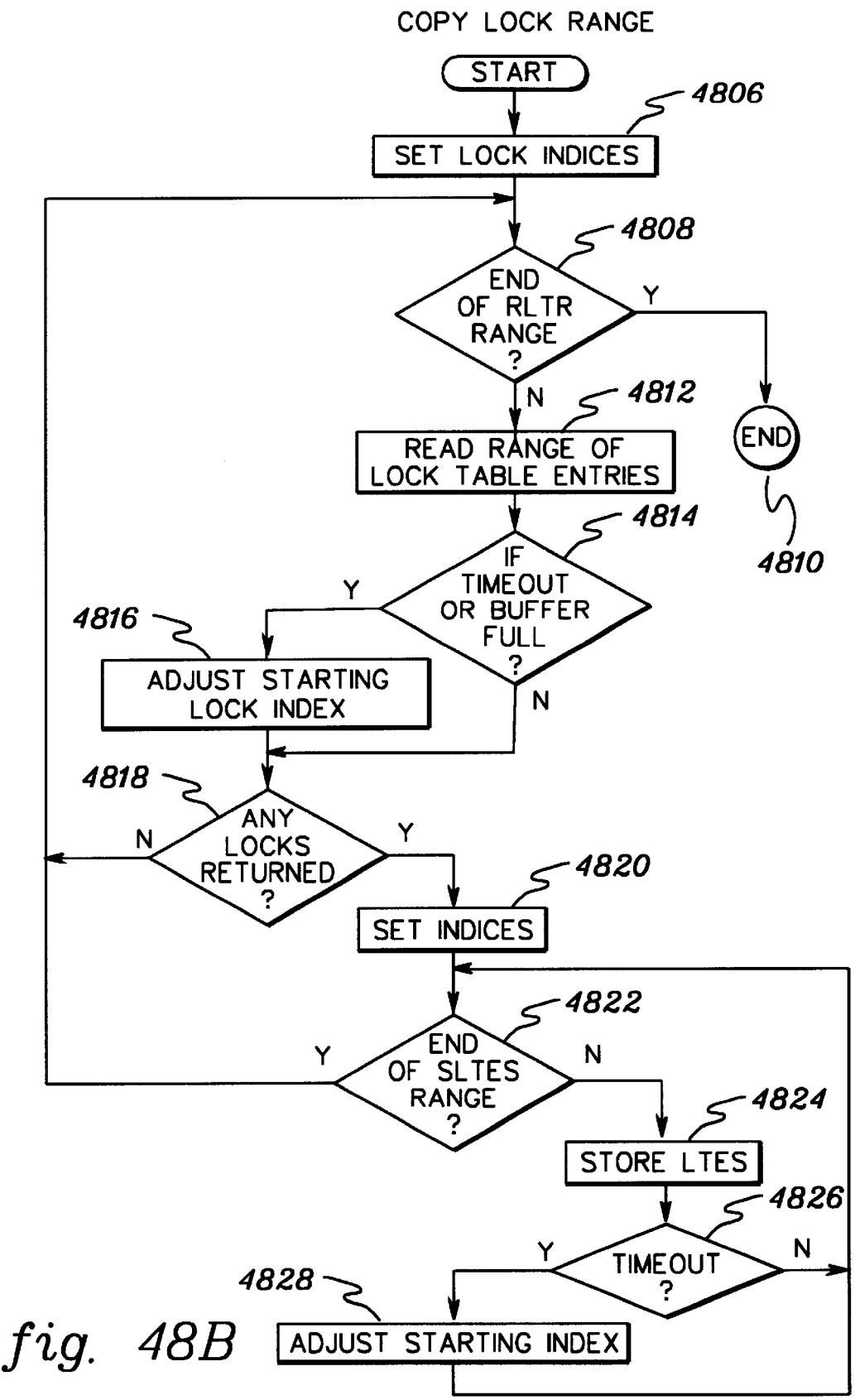
FIG. 48b depicts one embodiment of the logic associated with copying a lock range in accordance with the principles of the present invention.

When the Copy Lock Range procedure has run to completion, the lock table copy process for the case in which the number of lock table entries is less than or equal to 1024 locks is complete, STEP 4830 (FIG. 48a).

Returning to INQUIRY 4800, if the number of locks is greater than the threshold, then processing continues as described herein. In particular, processing is performed for each of the first 32 locks (0–31). Initially, a determination is made as to whether there are locks in the lock table entry 0–31 range to be processed, INQUIRY 4832. If there are no more locks to be processed, then the lock table copy processing is complete, STEP 4830.

However, if there are more locks to be processed, a compare and swap of the global lock manager takes place, STEP 4834. In one example, a Write Lock Table Entry command is used to perform the compare and swap from zero to the COPYID. One example of the Write Lock Table entry command is described in detail in "Method And Apparatus For Coupling Data Processing Systems," Elko et al., U.S. Pat. No. 5,317,739, Issued May 31, 1994, which is hereby incorporated herein by reference.in its entirety.

Thereafter, a determination is made as to whether the compare and swap was successful, INQUIRY 4836. If the compare and swap was unsuccessful, then processing continues with INQUIRY 4832. However, if the compare and swap was successful, then a lock range to be copied is computed, STEP 4838.In one example, the lock range is computed using the following formula:

Starting lock range=(LTEC×the lock number)÷32 Ending lock range=((LTEC×(the lock number +1)) 32)÷1.

Thereafter, a determination is made as to whether the lock range includes locks 0–31, INQUIRY 4840. If it does, then the lock range is adjusted so that it does not include locks 0–31, STEP 4841. After adjusting the lock range or if the range does not include locks 0–31, then the Copy Lock Range procedure is called, as described above, STEP 4842.

After the Copy Lock Range procedure is completed, the global lock manager is set from the COPYID to a predefined value, such as FF, which indicates that the corresponding lock table range is done being copied, STEP 4844. In one example, the Write Lock Table Entry command is used to set the lock's global lock manager. Thereafter, processing continues with INQUIRY 4832.

Returning to FIG. 39, after the lock table copy processing is complete, a determination is made as to whether the number of locks is less than or equal to the threshold, INQUIRY 3916. If the number of locks is less than or equal to the threshold (e.g., 1024), then processing continues with INQUIRY 3908. Specifically, no lock table cleanup is needed in that instance.

However, if the number of locks is greater than the threshold, then processing transitions into a lock cleanup phase, STEP 3918. In one embodiment, the lock cleanup phase of processing copies, for instance, the first 32 locks (numbered 0–31) from the old structure to the new structure. As an example, the Read Lock Table Range (RTLR) and Store LTEs commands are used to perform the copying. In particular, the lock range is set to 0:31 and the Copy Lock Range procedure is called.

The lock table cleanup processing cleans up and propagates the lock table entries that were being used as a serialization point in the multiple lock table copy processing. After completing the cleanup, processing continues with INQUIRY 3908.

Returning to FIG. 19, subsequent to processing the copy phase, CFRM transitions into the next phase of processing, the cleanup phase, STEP 1912.

CLEANUP PHASE

Figure 50:
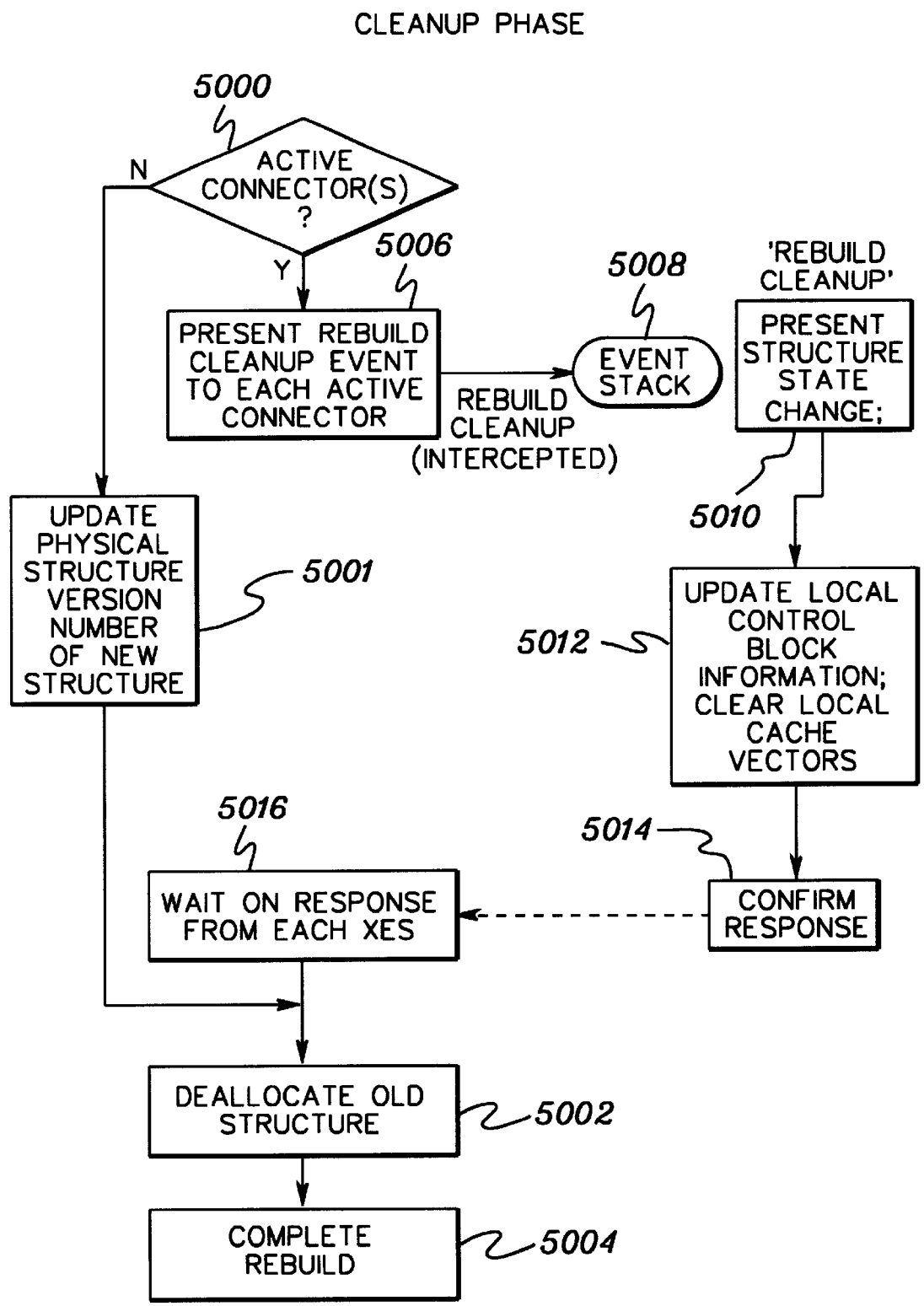

During the cleanup phase, control structures are updated, particularly when a connector is successfully attached to the new structure. One embodiment of the logic associated with the cleanup phase is described with reference to FIG. 50.

Initially, a determination is made as to whether there are any active connectors to the new structure, INQUIRY 5000. If there are no active connectors, then the physical structure version number of the new structure is updated to equal that of the old structure, STEP 5001, and the old structure is deallocated STEP 5002. (In one example, deallocation is described in "Method And Apparatus For Coupling Data Processing Systems," Elko et al., U.S. Pat. No. 5,317,739, Issued May 31, 1994, which is hereby incorporated herein by reference in its entirety.) Thereafter, CFRM transitions into the complete phase, STEP 5004.

Returning to INQUIRY 5000, if there are one or more active connectors to the new structure, then a rebuild cleanup event is presented to each active connector, STEP 5006. As described above, even though the rebuild cleanup event is presented to each active connector, this event is intercepted by XES, so that none of the connectors ever see the event (5008).

Subsequently, a Structure State Change Notification event is delivered to the connectors (it is not intercepted), which informs the connectors of changes in the physical attributes of the structure caused by its relocation during the system-managed rebuild, STEP 5010. Thus, the connectors can observe structure state changes in various attributes such as CFLEVEL, structure version number, etc.

Internally, XES updates its local control block information to reflect the new structure instance rather than the old structure, and XES clears the user's local vector, if registration information was not successfully copied for a cache structure, STEP 5012.

Thereafter, XES internally confirms the rebuild cleanup event, STEP 5014. When a response is received from each XES, STEP 5016, then the old structure is deallocated, STEP 5002, and CFRM transitions into the complete phase, STEP 5004.

Returning to FIG. 19, subsequent to processing the cleanup phase, CFRM transitions into the next phase of processing, the completion phase, STEP 1914.

COMPLETION PHASE

Figure 51:
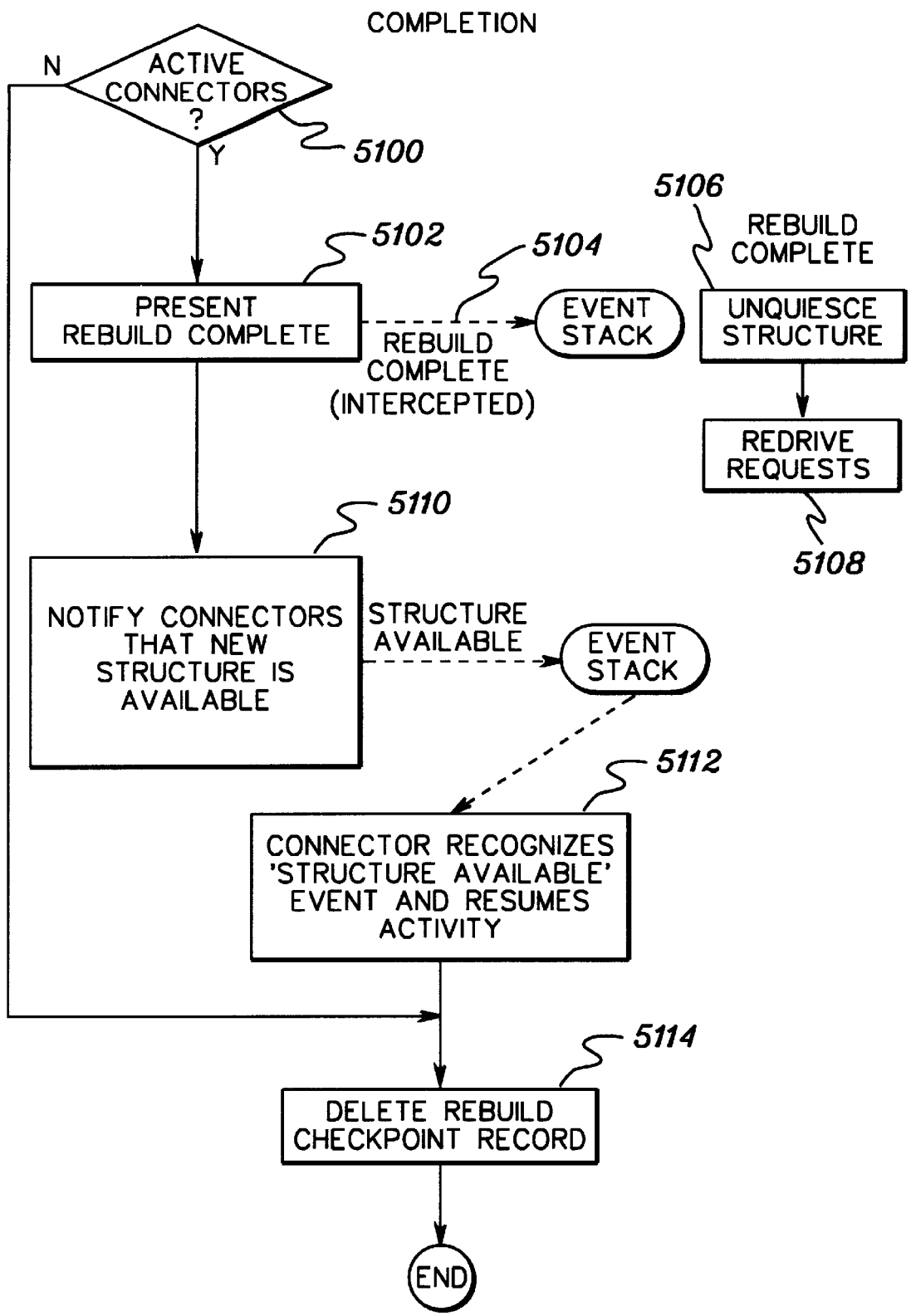
FIG. 51 depicts one embodiment of the logic associated with the completion phase of FIG. 19, in accordance with the principles of the present invention.

During the completion phase, system-managed rebuild processing is completed. One embodiment of the logic associated with the completion phase is described with reference to FIG. 51.

Initially, a determination is made as to whether there are any active connectors to the new structure, INQUIRY 5100. If there are one or more active connectors to the new structure, then a rebuild complete event is presented to each active connector, STEP 5102. Similar to other events described above, this event is intercepted by XES, so that none of the connectors ever see the event (5104). Internally, XES unquiesces the structure, STEP 5106, and redrives all the requests that were held on the delay queue while the structure was quiesced, STEP 5108. Because all XES control structures were updated above during the cleanup phase, these requests now process against the new (and now only) structure instance. New requests from the connector are no longer placed on the delay queue at this point, they execute normally. No confirmation by XES to the rebuild process complete event is required.

In addition to the above, a structure available event is delivered to the connectors, which is not intercepted, STEP 5110. This event indicates to the connector that normal usage of the structure can resume. Thus, the connectors can unquiesce the structure at their level, if they did any quiesce processing in response to the structure temporarily unavailable event earlier on, STEP 5112.

Thereafter, or if there were no active connectors to the structure, the rebuild checkpoint record is deleted, STEP 5114. This completes the processing for the completion phase.

Described in detail above is one embodiment of a system-managed rebuild process that enables the contents of one structure to be rebuilt into another structure under the control of the operating system. As examples, the rebuild can include copying from one structure to another structure, repopulating the second structure, and/or reconstructing the second structure from, for instance, log data or distributed local data.

In addition to the above, the technique described herein can be used to depopulate a coupling facility (i.e., remove all structures from a coupling facility). This is accomplished by issuing a rebuild against each structure of a facility and requesting that the new structures be located in a different coupling facility. This could be performed by a single command.

In accordance with one aspect of the present invention, the operating system controlling the rebuild process (including, but not limited to, the copy phase) has no intimate knowledge of the structures it is copying. In particular, it has no knowledge or understanding of its contents or how the contents are managed. It has no ability to serialize accesses to different components in storage. The knowledge of data content, data management and serialization is the responsibility of the owners of the structures (i.e., the exploiters).

In one aspect of the present invention, copying of the structures can be performed even if there are no connectors to the structures. Additionally, system failures during the copying is tolerated. Recovery procedures are in place. Further, even if recovery fails, the state of in-flight recovery may be preserved.

As a result of the rebuild, connections to the structures are preserved in their original state (including failed-persistent connections). Further, entry ids of list structures are preserved across structures.

The cache copy process enables objects to be copied with content state. Further, storage class counters and/or registrations can be copied. Additionally, the lock copy process uses the lock table itself as the copy controls.

In a further aspect of the present invention, directed allocation enables the behavior of an existing allocation to be maintained.

In yet a further aspect of the present invention, fully-associative non-linear collections of items (e.g., arrays, directories) can be browsed by multiple browsers. In one example, the multiple browsers browse the collection concurrently. The collection is segmented into portions in a manner that is transparent to the browsers of the collection. (As is known, fully-associative collections of items have no external sequencing and are not architecturally segmentable. Further, each collection is generally very large.)

In the particular embodiment discussed herein, various phases of processing were described. These phases are only examples. Other embodiments may include the same or differing phases without departing from the spirit of the present invention Further, each of the phases or processes described herein can stand by itself, i.e., need not necessarily be included in a system-managed rebuild. For example, directed allocation can be used by any type of process that desires directed allocation of a structure. Similarly, the copy processes can be utilized aside from system-managed rebuild.

Is The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Further, the objects, operands and controls described herein are only exemplary. Additional or differing objects, operands and/or controls may be used in other embodiments.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of modifying storage structures within a shared storage processor of a computing environment, said shared storage processor being coupled to one or more processors oar said computing environment, and said method comprising:

specifying, without deriving from a structure size and a ratio of entries to elements, one or more target maximum counts to be used in modifying a storage structure of said shared storage processor; and modifying said storage structure using said one or more target maximum counts.

2. The method of claim 1, wherein said modifying comprises performing at least one of an expansion of said storage structure, a contraction of said storage structure and a reapportionment of said storage structure.

3. The method of claim 1, wherein said storage structure is a list structure.

4. The method of claim 1, wherein said storage structure is a cache structure.

5. The method of claim 1, further comprising adjusting at least one target maximum count of said one or more target maximum counts to at least one requested value prior to using said at least one target maximum count in said modifying.

6. The method of claim 1, wherein said one or more target maximum counts comprises at least one of one or more target maximum entry counts, one or more target maximum element counts, and one or more target maximum event monitor counts.

7. The method of claim 1, wherein said storage structure is modified in a same manner as another storage structure.

8. A system of modifying storage structures within a shared storage processor of a computing environment, said shared storage processor being coupled to one or more processors of said computing environment, and said system comprising:

means for specifying, without deriving from a structure size and a ratio of entries to elements, one or more target maximum counts to be used in modifying a storage structure of said shared storage processor; and means for modifying said storage structure using said one or more target maximum counts.

9. The system of claim 8, wherein said means for modifying comprises means for performing at least one of an expansion of said storage structure, a contraction of said storage structure and a reapportionment of said storage structure.

10. The system of claim 8, wherein said storage structure is a list structure.

11. The system of claim 8, wherein said storage structure is a cache structure.

12. The system of claim 8, further comprising means for adjusting at least one target maximum count of said one or more target maximum counts to at least one requested value prior to using said at least one target maximum count in the modifying.

13. The system of claim 8, wherein said one or more target maximum counts comprises at least one of one or more target maximum entry counts, one or more target maximum element counts, and one or more target maximum event monitor counts.

14. The system of claim 8, wherein said storage structure is modified in a same manner as another storage structure.

15. A system of modifying storage structures within a shared storage processor of a computing environment, said shared storage processor being coupled to one or more processors of said computing environment, and said system comprising:

a first processor adapted to specify, without deriving from a structure size and a ratio of entries to elements, one or more target maximum counts to be used in modifying a storage structure of said shared storage processor; and a second processor adapted to modify said storage structure using said one or more target maximum counts.

16. The system of claim 15, wherein said first processor and said second processor are the same processor.

17. The system of claim 15, wherein said first processor and second processor are different processors.

18. At least one program storage device readable by a machine, tangibly embodying at least one program of instructions executable by the machine to perform a method of modifying storage structures within a shared storage processor of a computing environment, said shared storage processor being coupled to one or more processors of said computing environment, and said method comprising:

specifying, without deriving from a structure size and a ratio of entries to elements, one or more target maximum counts to be used in modifying a storage structure of said shared storage processor; and modifying said storage structure using said one or more target maximum counts.

19. The at least one program storage device of claim 18, wherein said modifying comprises performing at least one of an expansion of said storage structure, a contraction of said storage structure and a reapportionment of said storage structure.

20. The at least one program storage device of claim 19, wherein said storage structure is a list structure.

21. The at least one program storage device of claim 18, wherein said storage structure is a cache structure.

22. The at least one program storage device of claim 18, wherein said method further comprises adjusting at least one target maximum court of said one or more target maximum counts to at least one requested value prior to using said at least one target maximum count in said modifying.

23. The at least one program storage device of claim 18, wherein said one or more target maximum counts comprises at least one of one or more target maximum entry counts, one or more target maximum element counts, and one or more target maximum event monitor counts.

24. The at least one program storage device of claim 18, wherein said storage structure is modified in a same manner as another storage structure.

* * * * *

UNITED STATES PATENT AND TRADEMARK OFFICE
CERTIFICATE OF CORRECTION

PATENT NO. : 6,594,667 B2  Page 1 of 1
DATED : July 15, 2003
INVENTOR(S) : Dahlen et al.

It is certified that error appears in the above-identified patent and that said Letters Patent is hereby corrected as shown below:

<u>Column 8,</u>
Line 28, delete "with-each" and insert -- with each --

<u>Column 28,</u>
Line 13, delete "5" after the word "size"

<u>Column 34,</u>
Line 42, insert the word -- encoding -- after the word "following"

<u>Column 102,</u>
Line 30, delete the word "oar" and insert the word -- of --

<u>Column 104,</u>
Line 20, delete "19" and insert -- 18 --

Signed and Sealed this

Sixteenth Day of December, 2003

JAMES E. ROGAN
*Director of the United States Patent and Trademark Office*